(12) United States Patent
Masukawa

(10) Patent No.: US 8,465,674 B2
(45) Date of Patent: *Jun. 18, 2013

(54) DECAHYDRONAPHTHALENE COMPOUND, LIQUID CRYSTAL COMPOSITION INCLUDING THE COMPOUND AND LIQUID CRYSTAL DISPLAY DEVICE CONTAINING THE LIQUID CRYSTAL COMPOSITION

(75) Inventor: Tokifumi Masukawa, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/390,936

(22) PCT Filed: Aug. 9, 2010

(86) PCT No.: PCT/JP2010/063496
§ 371 (c)(1),
(2), (4) Date: Feb. 17, 2012

(87) PCT Pub. No.: WO2011/021525
PCT Pub. Date: Feb. 24, 2011

(65) Prior Publication Data
US 2012/0145959 A1    Jun. 14, 2012

(30) Foreign Application Priority Data
Aug. 18, 2009  (JP) ................. 2009-189240

(51) Int. Cl.
| C09K 19/32 | (2006.01) |
| C09K 19/30 | (2006.01) |
| C09K 19/34 | (2006.01) |
| C09K 19/12 | (2006.01) |
| C09K 19/20 | (2006.01) |
| C07C 43/21 | (2006.01) |
| C07C 43/225 | (2006.01) |
| C07C 25/13 | (2006.01) |
| C07C 69/76 | (2006.01) |

(52) U.S. Cl.
USPC ........ 252/299.62; 560/56; 568/633; 568/634; 570/127; 570/129; 570/130; 570/131; 252/299.61; 252/299.63; 252/299.66; 252/299.67

(58) Field of Classification Search
CPC ............. C09K 19/322; C09K 2019/326; C09K 2019/0411; C07C 43/21
USPC ................. 560/56; 568/633, 634; 570/127, 570/129, 130, 131; 252/299.62, 299.63, 252/299.66
See application file for complete search history.

(56) References Cited

U.S. PATENT DOCUMENTS
| 8,097,309 B2 * | 1/2012 | Kawasaki et al. ............ 428/1.1 |
| 2010/0328600 A1 * | 12/2010 | Shimada et al. ............. 349/182 |
| 2011/0043747 A1 * | 2/2011 | Kawasaki et al. ............ 349/186 |

FOREIGN PATENT DOCUMENTS
| EP | 0332007 | 9/1989 |
| JP | 02-004725 | 1/1990 |
| JP | 2001-039902 | 2/2001 |
| JP | 2001-039903 | 2/2001 |
| JP | 2004-075667 | 3/2004 |
| WO | 89/08633 | 9/1989 |
| WO | 2009/031437 | 3/2009 |
| WO | 2009/034867 | 3/2009 |

OTHER PUBLICATIONS

F. M. Leslie, "Distortion of Twisted Orientation Patterns in Liquid Crystals by Magnetic Fields", Molecular Crystals and Liquid Crystals, 1970, pp. 57-72, vol. 12.

* cited by examiner

Primary Examiner — Shean C Wu
(74) Attorney, Agent, or Firm — Jianq Chyun IP Office

(57) ABSTRACT

A compound represented by the formula (1) is provided.

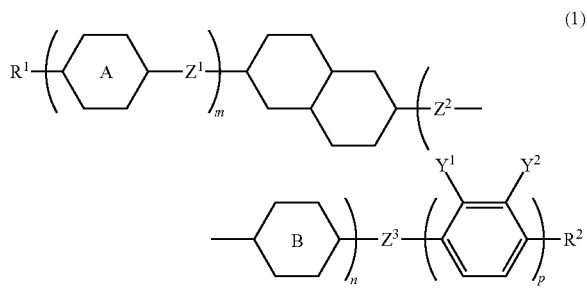

In the formula (1), for example, $R^1$ and $R^2$ are alkyl having 1 to 10 carbons, alkoxy having 1 to 9 carbons or alkenyl having 2 to 10 carbons; the ring A and the ring B are 1,4-cyclohexylene or 1,4-phenylene; $Z^1$ and $Z^2$ are a single bond and $Z^3$ is —$CH_2O$— or —$OCH_2$—; $Y^1$ and $Y^2$ are halogen, —$CF_3$, —$CHF_2$, —$CH_2F$, —$OCF_3$, —$OCHF_2$ or —$OCH_2F$; and m and n is 0, 1 or 2, p is 1 or 2, and the sum of m, n and p is 1, 2 or 3.

22 Claims, No Drawings

DECAHYDRONAPHTHALENE COMPOUND, LIQUID CRYSTAL COMPOSITION INCLUDING THE COMPOUND AND LIQUID CRYSTAL DISPLAY DEVICE CONTAINING THE LIQUID CRYSTAL COMPOSITION

CROSS-REFERENCE TO RELATED APPLICATION

This application is a 371 of international application of PCT application Ser. No. PCT/JP2010/063496, filed on Aug. 9, 2010, which claims the priority benefit of Japan application no. 2009-189240, filed on Aug. 18, 2009. The entirety of each of the above-mentioned patent applications is hereby incorporated by reference herein and made a part of this specification.

BACKGROUND OF THE INVENTION

1. Field of the Invention

The invention relates to a new compound and a liquid crystal composition. More specifically, it relates to a liquid crystal compound having a decahydronaphthalene ring and negative dielectric anisotropy ($\Delta\varepsilon$), a liquid crystal composition including this compound, and a liquid crystal display device containing the liquid crystal composition.

2. Description of Related Art

A display device utilizing a liquid crystal compound (in this patent application, a liquid crystal compound is used as a generic term for a compound that exhibits a liquid crystal phase and a compound that exhibits no liquid crystal phases but useful as a component of a liquid crystal composition) has been widely used for the display of a watch, a calculator, a word processor or the like. The display device utilizes characteristics such as the refractive index anisotropy ($\Delta n$) and the dielectric anisotropy ($\Delta\varepsilon$) of the liquid crystal compound.

A liquid crystal phase includes a nematic liquid crystal phase, a smectic liquid crystal phase and a cholestric liquid crystal phase, and the nematic liquid crystal phase is most widely applied. A display mode includes a DS (dynamic scattering) mode, a DAP (deformation of aligned phases) mode, a GH (guest-host) mode, a TN (twisted nematic) mode, a STN (super twisted nematic) mode, a TFT (thin film transistor) mode, a VA (vertical alignment) mode, an IPS (in-plane switching) mode and a PSA (polymer sustained alignment) mode.

A liquid crystal compound used for these display modes is required to exhibit a liquid crystal phase in a wide temperature range, centering at room temperature, to be sufficiently stable under conditions in which the display device is used, and also to have sufficient characteristics for driving the display device. However, no single liquid crystal compound that satisfies these conditions has been found until now.

The actual situation is that a liquid crystal composition is prepared by mixing from several to several tens of liquid crystal compounds in order to satisfy the required characteristics. It is required that the liquid crystal composition is stable to moisture, light, heat and air, which are normally present under conditions in which the display device is used, and is stable to an electric field or electromagnetic radiation, and is also stable chemically to a compound that will be mixed. It is required that the liquid crystal composition has suitable values of a variety of physical properties such as refractive index anisotropy ($\Delta n$) and dielectric anisotropy ($\Delta\varepsilon$), depending on the display mode or the shape of the display device. Furthermore, it is important that each component in the liquid crystal composition has an excellent solubility in each other.

In recent years, modes such as IPS, VA and OCB among the display modes have been receiving attention as a display mode capable of overcoming a narrow viewing angle of a liquid crystal display device, which is the greatest subject to be solved. In liquid crystal display devices having these modes, a liquid crystal display device, especially having the VA mode or the IPS mode, has been studied earnestly, since it has an excellent responsivity in addition to a wide viewing angle, and is capable of providing a high-contrast display. The liquid crystal composition used in the liquid crystal display devices having these display modes is characterized by the negative dielectric anisotropy ($\Delta\varepsilon$). It is known that a liquid crystal composition having a large negative dielectric anisotropy ($\Delta\varepsilon$) can decrease the driving voltage of a liquid crystal display device containing the liquid crystal composition (Non-patent document No. 1). Accordingly, liquid crystal compounds as the components of the liquid crystal composition are also required to have a larger negative dielectric anisotropy ($\Delta\varepsilon$).

A compound having a high maximum temperature of a nematic phase ($T_{NI}$) is on demand for driving the liquid crystal display device in a wide temperature range.

A variety of liquid crystal compounds in which lateral hydrogen on the benzene ring had been replaced by fluorine have conventionally been studied as a component of a liquid crystal composition having negative dielectric anisotropy (Patent documents No. 1 and No. 2). For example, a compound represented by the formula (a) has been reported (hereinafter, it may be abbreviated to the compound (a). The same applies to a compound represented by another formula, giving the compound (b) and so forth). However, the compound (a) did not always have a large value although it had negative dielectric anisotropy ($\Delta\varepsilon$), and the value might not be sufficiently large for decreasing the driving voltage of a liquid crystal display device having a VA mode, an IPS mode or the like.

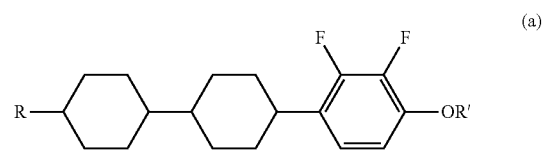

(a)

In the formula (a), R and R' are alkyl.

Thus, in a compound having a 2,3-difluorophenylene moiety, attempts have been made to increase the absolute value of negative dielectric anisotropy ($\Delta\varepsilon$). For example, a compound having the 2,3-difluorophenylene moiety, to which an ethyleneoxy bonding group is introduced has been reported (Patent document No. 3). The compound (b) has a low maximum temperature of a nematic phase ($T_{NI}$) in comparison with the compound (a), although it has a large negative dielectric anisotropy ($\Delta\varepsilon$) in comparison with the compound (a).

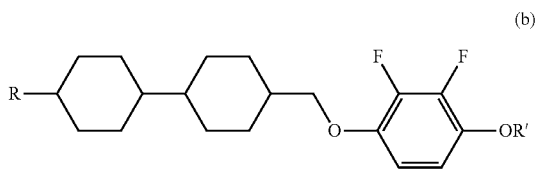

In the formula (b), R and R' are alkyl.

Accordingly, a liquid crystal compound in which the absolute value of negative dielectric anisotropy ($\Delta\varepsilon$) is large and maximum temperature of a nematic phase ($T_{NI}$) is high is in demand.

PRIOR ART

Patent Document

Patent document No. 1: JP 2811342 B (1998).
Patent document No. 2: JP H02-004725 A (1990).
Patent document No. 3: EP 332007 A (1989).
Patent document No. 4: WO 2009-034867 A (2009).
Patent document No. 5: WO 2009-031437 A (2009).

Non-Patent Document

Non-Patent Document No. 1: Mol. Cryst. Liq. Cryst., 12, 57 (1970).

SUMMARY OF THE INVENTION

The first aim of the invention is to provide a liquid crystal compound not only having a large negative dielectric anisotropy ($\Delta\varepsilon$) and a high maximum temperature of a nematic phase, but also having at least one of characteristics such as stability to heat, light or the like, a suitable refractive index anisotropy ($\Delta n$) and an excellent compatibility with other liquid crystal compounds.

The second aim of the invention is to provide a liquid crystal composition including the compound and having at least one of characteristics such as a low viscosity, a suitable refractive index anisotropy ($\Delta n$), a suitable negative dielectric anisotropy ($\Delta\varepsilon$), a low threshold voltage, a high maximum temperature of a nematic phase (the phase transition temperature between a nematic phase and an isotropic phase) and a low minimum temperature of a nematic phase, or having a suitable balance between at least two of the characteristics.

The third aim of the invention is to provide a liquid crystal display device containing the composition and having at least one of characteristics such as a short response time, low power consumption, a low driving voltage, a large contrast and a wide temperature range in which the device can be used, or having a suitable balance between at least two of the characteristics.

Means for Solving the Subject

As a result of research on the subject described above, the inventors have found that a compound having three structural units of
1) a decahydronaphthalene ring
2) —CH$_2$O— or —OCH$_2$—

3)

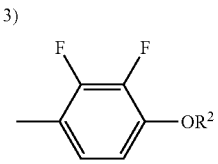

has an increased absolute value of negative dielectric anisotropy ($\Delta\varepsilon$) and an increased maximum temperature of a nematic phase ($T_{NI}$), those of which are caused by the synergistic effect. Moreover, it was found that the subjects could be solved by applying the effect, and thus the invention has completed.

That is to say, the invention includes a structure such as items 1 to 21.

Item 1. A compound represented by the formula (1).

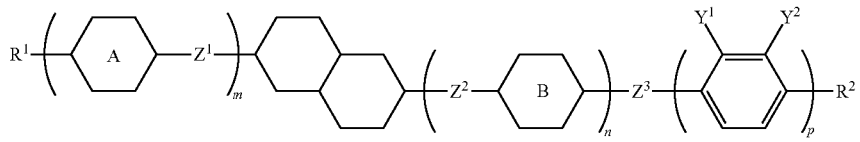

In the formula (1), $R^1$ and $R^2$ are independently alkyl having 1 to 10 carbons, and in the alkyl, arbitrary —CH$_2$— may be replaced by —O—, —S—, —CO— or —SiH$_2$—, and arbitrary —(CH$_2$)$_2$— may be replaced by —CH=CH— or —C≡C—;

the ring A and the ring B are independently 1,4-cyclohexylene or 1,4-phenylene, and in the rings, arbitrary one —CH$_2$— may be replaced by —O—, —S—, —CO— or —SiH$_2$— and arbitrary —(CH$_2$)$_2$— may be replaced by —CH=CH—, in the 1,4-phenylene, arbitrary —CH= may be replaced by —N=, and in the rings, arbitrary hydrogen may be replaced by halogen, —CF$_3$, —CHF$_2$, —CH$_2$F, —OCF$_3$, —OCHF$_2$ or —OCH$_2$F;

$Z^1$ and $Z^2$ are independently a single bond or alkylene having 1 to 4 carbons, and in the alkylene, arbitrary —CH$_2$— may be replaced by —O—, —S—, —CO— or —SiH$_2$—, arbitrary —(CH$_2$)$_2$— may be replaced by —CH=CH— or —C≡C—, and arbitrary hydrogen may be replaced by halogen; and $Z^3$ is —CH$_2$O— or —OCH$_2$—;

$Y^1$ and $Y^2$ are independently halogen, —CF$_3$, —CHF$_2$, —CH$_2$F, —OCF$_3$, —OCHF$_2$ or —OCH$_2$F; and m and n are independently 0, 1 or 2, p is 1 or 2, and the sum of m, n and p is 1, 2 or 3.

Item 2. The compound according to item 1, wherein in the formula (1) according to item 1, $R^1$ and $R^2$ are independently alkyl having 1 to 10 carbons, alkoxy having 1 to 9 carbons or alkenyl having 2 to 10 carbons;
the ring A and the ring B are independently 1,4-cyclohexylene, 1,4-cyclohexenylene, 1,3-dioxane-2,5-diyl, 1,4-phenylene or pyrimidine-2,5-diyl;
$Z^1$ and $Z^2$ are independently a single bond, —(CH$_2$)$_2$—, —(CH$_2$)$_4$—, —COO—, —OCO—, —CF$_2$O—, —OCF$_2$—, —CH=CH—, —CF=CF—, —C≡C—, —CH$_2$O— or —OCH$_2$—; and
$Y^1$ and $Y^2$ are independently fluorine or chlorine.

Item 3. The compound according to item 1 or 2, wherein in the formula (1) according to item 1, $R^2$ is alkoxy having 1 to 9 carbons.

Item 4. The compound according to any one of items 1 to 3, wherein in the formula (1) according to item 1, $Z^3$ is —CH$_2$O—.

Item 5. The compound according to any one of items 1 to 4, wherein in the formula (1) according to item 1, $R^1$ is alkyl having 1 to 7 carbons, alkoxy having 2 to 6 carbons or alkenyl having 2 to 7 carbons; and $R^2$ is alkoxy having 2 to 6 carbons;
the ring A and the ring B are independently 1,4-cyclohexylene or 1,4-phenylene; $Z^1$ and $Z^2$ are independently a single bond, —(CH$_2$)$_2$—, —COO—, —OCO—, —CH=CH—, —CH$_2$O— or —OCH$_2$—; and
$Y^1$ and $Y^2$ are fluorine.

Item 6. The compound according to any one of items 1 to 5, wherein in the formula (1) according to item 1, $Z^1$ and $Z^2$ are a single bond.

Item 7. A compound represented by the formula (1-1).

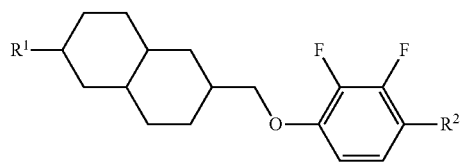

(1-1)

In the formula (1-1), $R^1$ is alkyl having 1 to 7 carbons, alkoxy having 2 to 6 carbons or alkenyl having 2 to 7 carbons; and $R^2$ is alkoxy having 2 to 6 carbons.

Item 8. A compound represented by the formula (1-2) or (1-3).

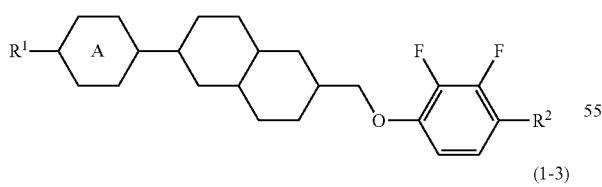

(1-2)

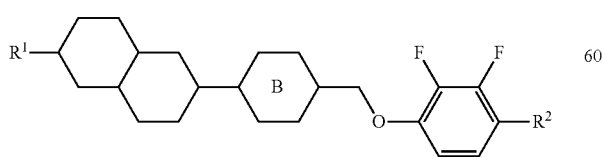

(1-3)

In the formulas (1-2) and (1-3), $R^1$ is alkyl having 1 to 7 carbons, alkoxy having 2 to 6 carbons or alkenyl having 2 to 7 carbons; $R^2$ is alkoxy having 2 to 6 carbons; the ring A and the ring B are independently 1,4-cyclohexylene or 1,4-phenylene.

Item 9. A compound represented by the formula (1-4).

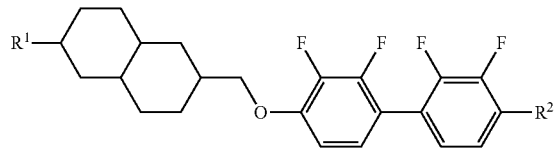

(1-4)

In the formula (1-4), $R^1$ is alkyl having 1 to 7 carbons, alkoxy having 2 to 6 carbons or alkenyl having 2 to 7 carbons; and $R^2$ is alkoxy having 2 to 6 carbons.

Item 10. A compound represented by the formula (1-5) or (1-6).

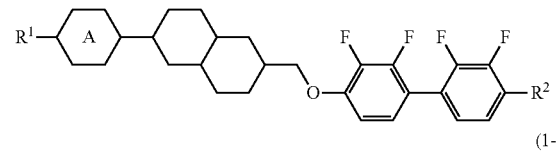

(1-5)

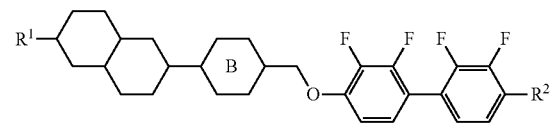

(1-6)

In the formulas (1-5) and (1-6), $R^1$ is alkyl having 1 to 7 carbons, alkoxy having 2 to 6 carbons or alkenyl having 2 to 7 carbons; $R^2$ is alkoxy having 2 to 6 carbons; the ring A and the ring B are independently 1,4-cyclohexylene or 1,4-phenylene.

Item 11. A liquid crystal composition including a first component and a second component, wherein the first component is at least one selected from compounds according to any one of items 1 to 10.

Item 12. The liquid crystal composition according to item 11, including at least one compound selected from the group of compounds represented by the general formulas (2), (3) and (4) as the second component.

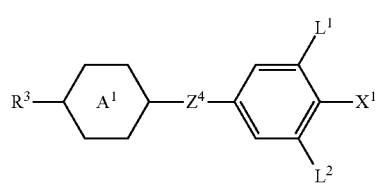

(2)

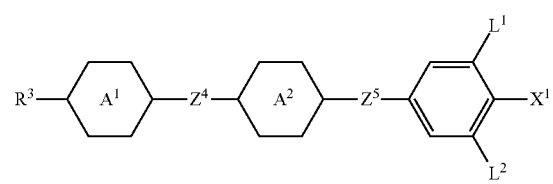

(3)

(4)

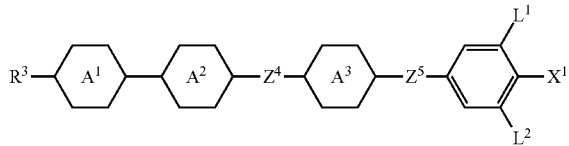

(5)

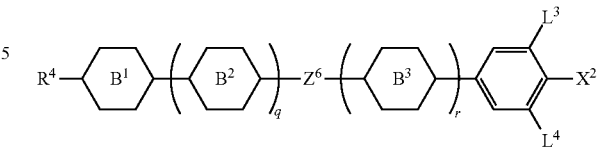

In the formulas (2) to (4), $R^3$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

$X^1$ is independently fluorine, chlorine, —$OCF_3$, —$OCHF_2$, —$CF_3$, —$CHF_2$, —$CH_2F$, —$OCF_2CHF_2$ or —$OCF_2CHFCF_3$;

the ring $A^1$, the ring $A^2$ and the ring $A^3$ are independently 1,4-cyclohexylene, 1,3-dioxane-2,5-diyl, pyrimidine-2,5-diyl, 1-tetrahydropyran-2,5-diyl or 1,4-phenylene in which arbitrary hydrogen may be replaced by fluorine;

$Z^4$ and $Z^5$ are independently —$(CH_2)_2$—; —$(CH_2)_4$—, —COO—, —$CF_2O$—, —$OCF_2$—, —CH=CH—, —C≡C—, —$CH_2O$— or a single bond; and $L^1$ and $L^2$ are independently hydrogen or fluorine.

Item 13. The liquid crystal composition according to item 11, including at least one compound selected from the group of compounds represented by the general formula (5) as the second component.

In the formula (5), $R^4$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

$X^2$ is —C≡N or —C≡C—CN;

the ring $B^1$, the ring $B^2$ and the ring $B^3$ are independently 1,4-cyclohexylene, 1,4-phenylene in which arbitrary hydrogen may be replaced by fluorine, 1,3-dioxane-2,5-diyl, 1-tetrahydropyran-2,5-diyl or pyrimidine-2,5-diyl;

$Z^6$ is —$(CH_2)_2$—, —COO—, -$CF_2O$—, —$OCF_2$—, -$CH_2O$- or a single bond;

$L^3$ and $L^4$ independently hydrogen or fluorine; and q is 0,1 or 2,and r is 0 or 1.

Item 14. The liquid crystal composition according to item 11, including at least one compound selected from the group of compounds represented by the general formulas (6), (7), (8), (9), (10) and (11) as the second component.

(6)

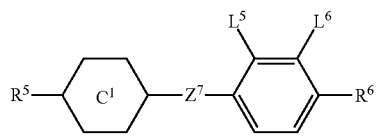

(7)

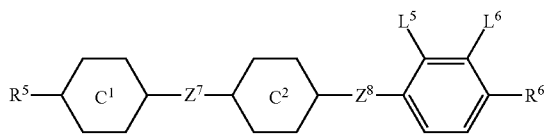

(8)

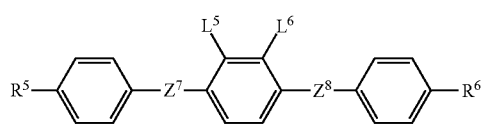

(9)

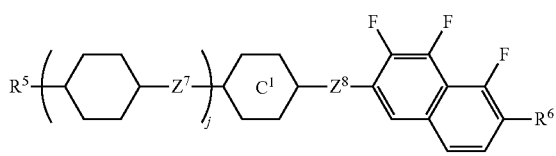

(10)

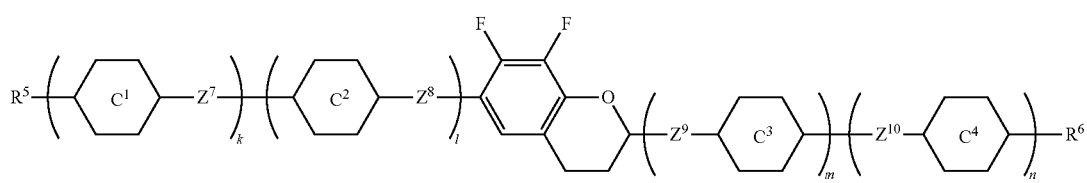

(11)

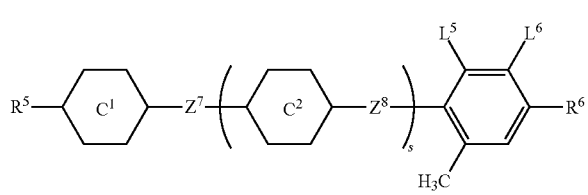

In the formulas (6) to (11), $R^5$ and $R^6$ are independently alkyl having 1 to 10 carbons or alkenyl having 2 to 10 carbons, and in the alkyl and the alkenyl arbitrary —$CH_2$— may be replaced by —O—, and in the alkenyl arbitrary hydrogen may be replaced by fluorine;

the ring $C^1$, the ring $C^2$, the ring $C^3$ and the ring $C^4$ are independently 1,4-cyclohexylene, 1,4-cyclohexenylene, 1,4-phenylene in which arbitrary hydrogen may be replaced by fluorine, 6-tetrahydropyran-2,5-diyl or decahydro-2,6-naphthalene;

$Z^7, Z^8, Z^9$ and $Z^{10}$ are independently —$(CH_2)_2$—, —COO—, —$CH_2O$—, —$OCF_2$—$OCF_2(CH_2)_2$— or a single bond;

$L^5$ and $L^6$ are independently fluorine or chlorine; and j, k, l, m, n and s are independently 0 or 1, and the sum of k, l, m and n is 1 or 2.

Item 15. The liquid crystal composition according to item 11, including at least one compound selected from the group of compounds represented by the general formulas (12), (13) and (14) as the second component.

(12)

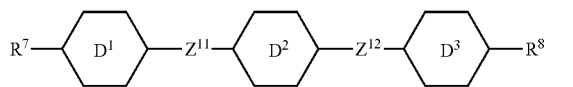

(13)

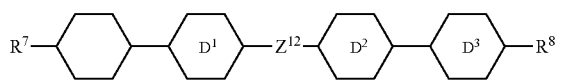

(14)

In the formulas (12) to (14), $R^7$ and $R^8$ are independently alkyl having 1 to 10 carbons or alkenyl having 2 to 10 carbons, and in the alkenyl, arbitrary hydrogen may be replaced by fluorine and arbitrary —$CH_2$— may be replaced by —O—;

the ring $D^1$, the ring $D^2$ and the ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{11}$ and $Z^{12}$ are independently —C≡C—, —COO—, —$(CH_2)_2$—CH=CH— or a single bond.

Item 16. The liquid crystal composition according to item 12, further including at least one compound selected from the group of compounds represented by the general formula (5) according to item 13.

Item 17. The liquid crystal composition according to item 12, further including at least one compound selected from the group of compounds represented by the general formulas (12), (13) and (14) according to item 15.

Item 18. The liquid crystal composition according to item 13, further including at least one compound selected from the group of compounds represented by the general formulas (12), (13) and (14) according to item 15.

Item 19. The liquid crystal composition according to item 14, further including at least one compound selected from the group of compounds represented by the general formulas (12), (13) and (14) according to item 15.

Item 20. The liquid crystal composition according to any one of items 11 to 19, further including at least one optically active compound and/or at least one polymerizable compound.

Item 21. The liquid crystal composition according to any one of items 11 to 20, further including at least one antioxidant and/or at least one ultraviolet light absorber.

Item 22. A liquid crystal display device containing the liquid crystal composition according to any one of items 11 to 21.

Usage of the terms in this specification is as follows. The terms, a liquid crystal compound, a liquid crystal composition and a liquid crystal display device may be abbreviated to a compound, a composition and a device, respectively. A liquid crystal display device is a generic term for a liquid crystal display panel and a liquid crystal display module. The maximum temperature of a nematic phase is the phase transition temperature between a nematic phase and an isotropic phase, and may simply be abbreviated to the clearing point or the maximum temperature. The minimum temperature of the nematic phase may simply be abbreviated to the minimum temperature. A compound represented by the formula (1) may be abbreviated to the compound (1). This abbreviation may apply to a compound represented by the formula (2) or the like. In the formula (1) and so forth, the symbols A, B, $A^1$, $B^1$ or the like surrounded by a hexagonal shape correspond to the ring A, the ring B, the ring $A^1$, the ring $B^1$ or the like, respectively. The amount of a compound, which is expressed in a percentage, means a weight percentage (% by weight) based on the total weight of the composition. A plurality of the same symbols of the ring A, $R^1$, $Y^1$ or the like were described in the same or different formulas, where arbitrary two of the same symbols may have the same or different meanings.

"Arbitrary" is used not only in cases where the position is arbitrary but also in cases where the number is arbitrary. However, it is not used in cases where the number is 0 (zero). The expression "arbitrary A may be replaced by B, C or D" includes cases where arbitrary A is replaced by B, and arbitrary A is replaced by C, and arbitrary A is replaced by D, and also cases where a plurality of A are replaced by at least two of B, C and/or D. For example, "alkyl in which arbitrary —$CH_2$— may be replaced by —O— or —CH=CH—" includes alkyl, alkenyl, alkoxy, alkoxyalkyl, alkoxyalkenyl and alkenyloxyalkyl. Incidentally, it is undesirable in the invention that two successive —$CH_2$— should be replaced by —O— to give —O—O—. It is also undesirable that the terminal —$CH_2$— in the alkyl should be replaced by —O—.

Effect of the Invention

The invention provides a liquid crystal compound not only having a large negative dielectric anisotropy (Δ∈) and a high maximum temperature of a nematic phase, but also having at least one of characteristics such as stability to heat, light or the like, a high clearing point, a suitable refractive index anisotropy (Δn) and an excellent compatibility with other liquid crystal compounds. The invention also provides a liquid crystal composition having one of characteristics such as a low viscosity, a suitable refractive index anisotropy (Δn), a suitable negative dielectric anisotropy (Δ∈), a low threshold voltage and a low minimum temperature of a nematic phase. The invention also provides a liquid crystal display device having at least one of characteristics such as a short response time, low power consumption, a low driving voltage, a large contrast and a wide temperature range in which the device can be used.

DESCRIPTION OF THE EMBODIMENTS

Hereinafter, the invention will be explained more specifically.

The compound of the invention is a compound represented by the following formula (1), that is to say, the compound (1).

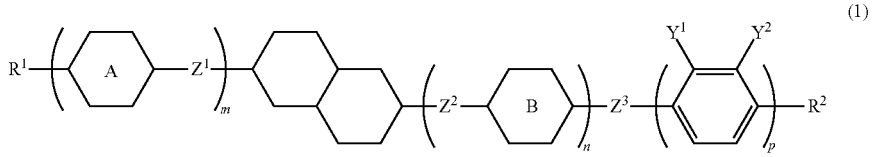

In the formula (1), $R^1$ and $R^2$ are independently alkyl having 1 to 10 carbons, and in the alkyl, arbitrary —$CH_2$— may be replaced by —O—, —S—, —CO— or —$SiH_2$— and arbitrary —$(CH_2)_2$— may be replaced by —CH=CH— or —C≡C—. Two oxygens located adjacent to each other are undesirable in consideration of the stability of the compound.

$R^1$ includes alkyl having 1 to 10 carbons, alkoxy having 1 to 9 carbons, alkoxyalkyl having 2 to 9 carbons, alkoxyalkoxy having 2 to 9 carbons, alkenyl having 2 to 10 carbons, alkenyloxy having 2 to 9 carbons, alkenyloxyalkyl having 3 to 9 carbons and alkoxyalkenyl having 3 to 9 carbons. It is desirable that alkyl chain in these groups should be straight. When the alkyl chain is straight, the temperature range of a liquid crystal phase is wide and the viscosity is low. It is desirable that the double bond in the alkenyl should be in the odd positions and the configuration should be trans. When the alkenyl has a plurality of double bonds, unconjugated double bonds are desirable.

The alkyl is —$CH_3$, —$C_2H_5$—$C_3H_7$—$C_4H_9$, —$C_5H_{11}$, —$C_6H_{13}$, —$C_7H_{15}$, —$C_8H_{17}$, —$C_9H_{19}$ or —$C_{10}H_{21}$;
the alkoxy is —$OCH_3$, —$OC_2H_5$, —$OC_3H_7$, —$OC_4H_9$, —$OC_5H_{11}$, —$OC_6H_{13}$; —$OC_7H_{15}$, —$OC_8H_{17}$ or —$OC_9H_{19}$;
the alkoxyalkyl includes —$CH_2OCH_3$, —$CH_2OC_2H_5$, —$(CH_2)_2OCH_3$ and —$(CH_2)_2OC_2H_5$;
The alkoxyalkoxy includes —$OCH_2OCH_3$, —$OCH_2OC_2H_5$, —$O(CH_2)_2OCH_3$ and —$O(CH_2)_2OC_2H_5$;
the alkenyl includes —CH=$CH_2$, —CH=$CHCH_3$, —CH=$CHC_2H_5$, —$(CH_2)_2$CH=$CH_2$, —CH=$CHC_3H_7$, —$(CH_2)_2$CH=$CHCH_3$, —$(CH_2)_3$CH=$CH_2$, —CH=CH$(CH_2)_2$CH=$CH_2$ and —$(CH_2)_2$CH=CH$(CH_2)_2$CH=$CH_2$;
the alkenyloxy includes —$OCH_2$CH=$CH_2$, —$OCH_2$CH=$CHCH_3$ and —$OCH_2$CH=$CHC_2H_5$;
the alkenyloxyalkyl includes —$CH_2OCH_2$CH=$CH_2$, —$CH_2OCH_2$CH=$CHCH_3$ and —$(CH_2)_2$—O—$(CH_2)_2$CH=$CH_3$; and
the alkoxyalkenyl includes —CH=$CHCH_2OCH_3$, —CH=$CHCH_2OC_2H_5$ and —$CH_2$CH=$CHCH_2OCH_3$.

Desirable $R^1$ is —$CH_3$, —$C_2H_5$, —$C_3H_7$, —$C_4H_9$, —$C_5H_{11}$,—$C_6H_{13}$, —$C_7H_{15}$,—$C_8H_{17}$, —$C_9H_{19}$,—$C_{10}H_{21}$, —$OCH_3$, —$OC_2H_5$, —$OC_3H_7$, —$OC_4H_9$, —$OC_5H_{10}$, —$OC_6H_{13}$, —$OC_7H_{15}$, —$OC_8H_{17}$, —$OC_9H_{19}$, —CH=$CH_2$—CH=$CHCH_3$, —CH=$CHC_2H_5$, —$(CH_2)_2$CH=$CH_2$, —CH=$CHC_3H_7$, —$(CH_2)_2$CH=$CHCH_3$, —$(CH_2)_3$CH=$CH_2$, —CH=CH$(CH_2)_2$CH=$CH_2$ or —$(CH_2)_2$CH=CH$(CH_2)_2$CH=$CH_2$ More desirable $R^1$ is —$CH_3$, —$C_2H_5$, —$C_3H_7$, —$C_4H_9$, —$C_5H_{11}$, —$C_6H_{13}$, —CH=$CH_2$, —CH=$CHCH_3$, —CH=$CHC_2H_5$, —$(CH_2)_2$CH=$CH_2$, —CH=$CHC_3H_7$—$(CH_2)_2$CH=$CHCH_3$, —$(CH_2)_3$CH=$CH_2$, —CH=CH$(CH_2)_2$CH=$CH_2$ or —$(CH_2)_2$CH=CH$(CH_2)_2$CH=$CH_2$.

$R^2$ includes alkyl having 1 to 10 carbons, alkoxy having 1 to 9 carbons, alkoxyalkyl having 2 to 9 carbons, alkoxyalkoxy having 2 to 9 carbons, alkenyl having 2 to 10 carbons, alkenyloxy having 2 to 9 carbons, alkenyloxyalkyl having 3 to 9 carbons and alkoxyalkenyl having 3 to 9 carbons. It is desirable that alkyl chain in these groups should be straight. When the alkyl chain is straight, the temperature range of a liquid crystal phase is wide and the viscosity is low. It is desirable that the double bond in the alkenyl should be in the odd positions and the configuration should be trans. When the alkenyl has a plurality of double bonds, unconjugated double bonds are desirable.

The alkyl is —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$ or —$C_{10}H_{21}$;
the alkoxy is —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$ or —$OC_9H_{19}$;
the alkoxyalkyl includes —$CH_2OCH_3$, —$CH_2OC_2H_5$, —$(CH_2)_2OCH_3$ and —$(CH_2)_2OC_2H_5$;
The alkoxyalkoxy includes —$OCH_2OCH_3$, —$OCH_2OC_2H_5$, —$O(CH_2)_2OCH_3$ and —$O(CH_2)_2OC_2H_5$;
the alkenyl includes —CH=$CH_2$, —CH=$CHCH_3$, —CH=$CHC_2H_5$, —$(CH_2)_2$CH=$CH_2$, —CH=$CHC_3H_7$, —$(CH_2)_2$CH=$CHCH_3$, —$(CH_2)_3$CH=$CH_2$; —CH=CH$(CH_2)_2$CH=$CH_2$ and —$(CH_2)_2$CH=CH$(CH_2)_2$CH=$CH_2$;
the alkenyloxy includes —$OCH_2$CH=$CH_2$, —$OCH_2$CH=$CHCH_3$ and —$OCH_2$CH=$CHC_2H_5$;
the alkenyloxyalkyl includes —$CH_2OCH_2$CH=$CH_2$, —$CH_2OCH_2$CH=$CHCH_3$ and —$(CH_2)_2$—O—$(CH_2)_2$CH=$CH_3$; and
the alkoxyalkenyl includes —CH=$CHCH_2OCH_3$, —CH=$CHCH_2OC_2H_5$ and —$CH_2$CH=$CHCH_2OCH_3$.

Desirable $R^2$ is —$OCH_3$, —$OC_2H_5$, —$OC_3H_7$, —$OC_4H_9$, —$OC_5H_{10}$, —$OC_6H_{13}$, —$OC_7H_{15}$, —$OC_8H_{17}$ or —$OC_9H_{19}$.

In the formula (1), the ring A and the ring B are independently 1,4-cyclohexylene or 1,4-phenylene; in the rings, arbitrary one —$CH_2$— may be replaced by —O—, —S—, —CO— or —$SiH_2$— and arbitrary —$(CH_2)_2$— may be replaced by —CH=CH—; in the 1,4-phenylene, arbitrary one —CH= may be replaced by —N=; and in these rings, arbitrary one hydrogen may be replaced by halogen, —$CF_3$, —$CHF_2$, —$CH_2F$, —$OCF_3$, —$OCHF_2$ or —$OCH_2F$. The two rings A may have the same or different meanings when m is 2, and the two rings B may have the same or different meanings when n is 2.

The refractive index anisotropy (Δn) is small and the viscosity is low when these rings are 1,4-cyclohexylene. The maximum temperature of a nematic phase can be increased when the liquid crystal compound is added to a liquid crystal composition.

The refractive index anisotropy (Δn) is relatively large and the orientational order parameter is large, when these rings are 1,4-phenylene in which hydrogen may be replaced by halogen.

Desirable ring A and ring B are 1,4-cyclohexylene, 1,4-cyclohexenylene, 1,3-dioxane-2,5-diyl, 1,4-phenylene, 2-fluoro-1,4-phenylene, 3-fluoro-1,4-phenylene, 2,3-difluoro-1,4-phenylene, 2-fluoro-3-chloro-1,4-phenylene, 2-chloro-3-fluoro-1,4-phenylene, 2,3-dichloro-1,4-phenylene or 1,3-pyrimidine-2,5-diyl. More desirable ring A and ring B are 1,4-cyclohexylene or 1,4-phenylene.

$Z^1$ and $Z^2$ are independently a single bond or alkylene having 1 to 4 carbons, and in the alkylene, arbitrary —$CH_2$— may be replaced by —O—, —S—, —CO— or —SiH$_2$—, arbitrary —(CH$_2$)$_2$— may be replaced by —CH=CH— or —C≡C—, and arbitrary hydrogen may be replaced by halogen. Two Z$^1$ may have the same or different meanings when m is 2, and two Z$^2$ may have the same or different meanings when n is 2.

Z$^1$ and Z$^2$ include a single bond, —(CH$_2$)$_2$—, —CH=CH—, —CF$_2$O—, —OCF$_2$—, —CH$_2$O—, —OCH$_2$—(CH$_2$)$_4$—, —C≡C—, —COO—, —OCO—, —C≡C—, —CH$_2$CO—, —COCH$_2$—, —CH$_2$SiH$_2$—, —SiH$_2$CH$_2$—, —O—(CH$_2$)$_2$O—, —(CH$_2$)$_2$COO—, —(CH$_2$)$_2$OCO—, —COO(CH$_2$)$_2$—, —OCO(CH$_2$)$_2$—, —(CH$_2$)$_2$CF$_2$O—, —(CH$_2$)$_2$OCF$_2$—, —CF$_2$O—(CH$_2$)$_2$—, —OCF$_2$(CH$_2$)$_2$—, —CH=CH—CH$_2$O— and —OCH$_2$—CH=CH—. With regard to the configuration of the double bond of bonding groups such as —CH=CH—, —CF=CF—, —CH=CH—CH$_2$O— and —OCH$_2$—CH=CH—, trans is preferable to cis.

Desirable Z$^1$ and Z$^2$ are a single bond, —(CH$_2$)$_2$—, —(CH$_2$)$_4$—, —COO—, —OCO—, —CF$_2$O—, —OCF$_2$—, —CH=CH—, —CF=CF—, —C≡C—, —CH$_2$O— or —OCH$_2$—. More desirable Z$^1$ and Z$^2$ are a single bond, —(CH$_2$)$_2$—, —COO—, —OCO—, —CH=CH—, —CH$_2$O— or —OCH$_2$—. Most desirable Z$^1$ and Z$^2$ are a single bond.

Z$^3$ is —CH$_2$O— or —OCH$_2$—. Desirable Z$^3$ is —CH$_2$O—

Y$^1$ and Y$^2$ are independently halogen, —CF$_3$—CHF$_2$, —CH$_2$F, —OCF$_3$—OCHF$_2$ or —OCH$_2$F. Two Y$^1$ may have the same or different meanings when p is 2, and two Y$^2$ may have the same or different meanings when p is 2. Desirable Y$^1$ and Y$^2$ are fluorine or chlorine. More desirable Y$^1$ and Y$^2$ are fluorine.

m and n are independently 0, 1 or 2, p is 1 or 2, and the sum of m, n and p is 1, 2 or 3. When the sum of m, n and p is 1, the compound has a low viscosity and is excellent in compatibility at low temperatures. When the sum of m, n and p is 2 or 3, the compound has a high maximum temperature of a nematic phase. The compound where is 1 has a low viscosity and a high maximum temperature of a nematic phase. The compound where p is 2 has a large negative dielectric anisotropy.

More desirable examples of the compound (1) are the compound (1-1) to (1-6). The compounds exhibit chemical stability, a large negative dielectric anisotropy, a high maximum temperature of a nematic phase, a suitable optical anisotropy and an excellent compatibility with other liquid crystal compounds by having such structures. The invention can provide a liquid crystal composition having at least one of characteristics such as a low viscosity, a suitable refractive index anisotropy (Δn), a low threshold voltage, a high maximum temperature of a nematic phase and a low minimum temperature of a nematic phase, or has a suitable balance between at least two of the characteristics, when the compound is included.

The compound (1-1) has a large negative dielectric anisotropy, a high maximum temperature of a nematic phase and a low viscosity.

The compound (1-2) and (1-3) have a large negative dielectric anisotropy, a particularly high maximum temperature of a nematic phase and a relatively low viscosity.

The compound (1-4) has a particularly high large negative dielectric anisotropy and a particularly high maximum temperature of a nematic phase.

The compounds (1-5) and (1-6) have a particularly large negative dielectric anisotropy and a particularly high maximum temperature of a nematic phase.

The compound (1) of the invention can be prepared by the introduction of a predetermined group into R$^1$, R$^2$, A, B, Z$^1$, Z$^2$, Z$^3$, Y$^1$ and Y$^2$ in the formula. The introduction of these kinds of groups can be carried out by known and general synthetic organic methods. Representative examples of the synthesis include the methods described in "Vol. 14: Synthesis and Reaction of Organic Compounds" (1978) in Shin-Jikken Kagaku Kouza (New Experimental Chemistry Course, in English; Maruzen Co., Ltd.), or "Vol. 19 to Vol. 26: Organic Synthesis Ito VIII" (1991) in Daiyonnhan-Jikken Kagaku Kouza (Fourth edition-Experimental Chemistry Course, in English; Maruzen Co., Ltd.).

In one example of the method for the formation of the bonding groups Z$^1$, Z$^2$, Z$^3$ or Z$^4$, the schemes will be shown first, and next the scheme will be explained in item (I) to item (XI). In these schemes, MSG$^1$ or MSG$^2$ is a monovalent organic group having at least one ring. A plurality of MSG$^1$ (or MSG$^2$) used in the schemes may have the same or different meanings. The compounds (1A) to (1K) correspond to the compound (1).

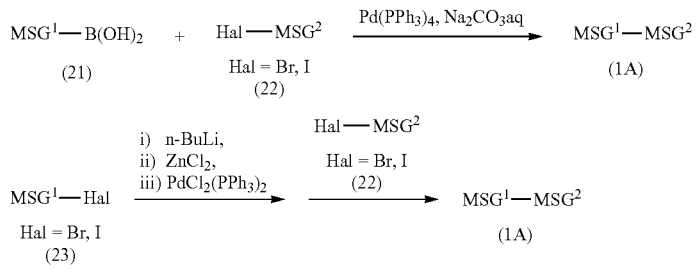

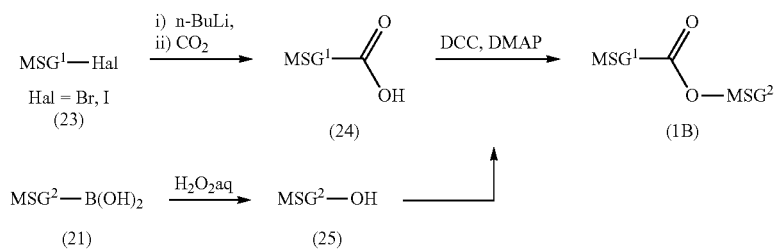

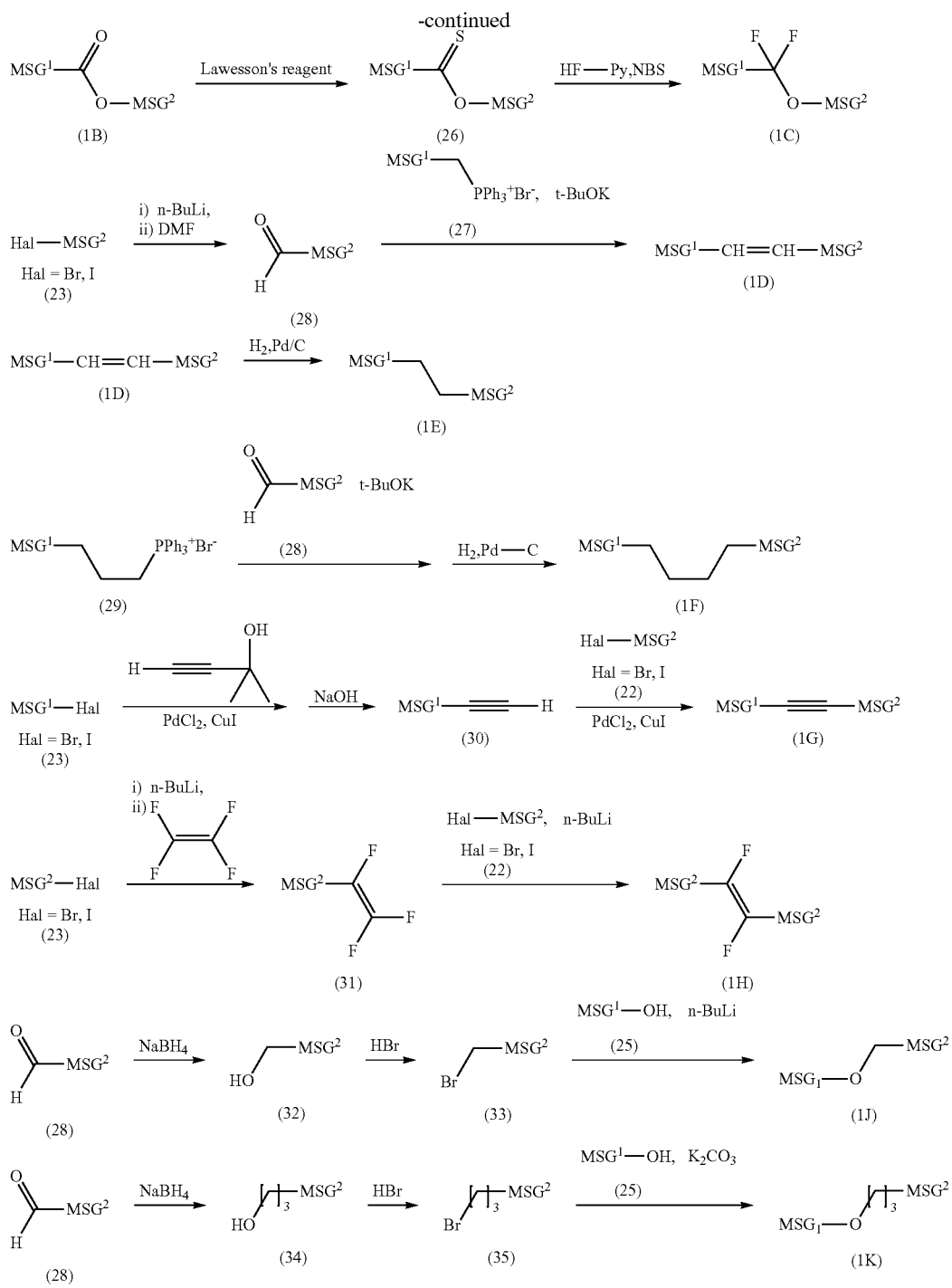

(I) Formation of a Single Bond

The compound (1A) is prepared by the reaction of the arylboronic acid (21) with the compound (22) prepared by known methods, in the presence of a catalyst such as tetrakis(triphenylphosphine)palladium in an aqueous solution of a carbonate. This compound (1A) is also prepared by the reaction of the compound (23) prepared by known methods with n-butyllithium and then with zinc chloride, and then by the reaction with the compound (22) in the presence of a catalyst such as dichlorobis(triphenylphosphine)palladium.

(II) Formation of —COO— and —OCO—

The carboxylic acid (24) is prepared by the reaction of the compound (23) with n-butyllithium and then with carbon dioxide. Dehydration of the compound (24) and the phenol (25) prepared by known methods, in the presence of DDC (1,3-dicyclohexylcarbodiimide) and DMAP (4-dimethylaminopyridine) gives the compound (1B) having —COO—. The compound having —OCO— is also prepared by this method.

(III) Formation of —CF$_2$O— and —OCF$_2$—

The treatment of the compound (1B) with a thionating agent such as Lawesson's reagent gives the compound (26).

The compound (26) is fluorinated with a hydrogen fluoride-pyridine complex and NBS (N-bromosuccinimide) to give the compound (1C) having —CF$_2$O—. See M. Kuroboshi et al., Chem. Lett., 1992, 827. The compound (1C) is also prepared by the fluorination of the compound (26) with (diethylamino)sulfur trifluoride (DAST). See W. H. Bunnelle et al., J. Org. Chem. 1990, 55, 768. The compound having —OCF$_2$— is also prepared by this method. These bonding groups can also be formed according to the method described in Peer. Kirsch et al., Angew. Chem. Int. Ed. 2001, 40, 1480.

(IV) Formation of —CH═CH—

The compound (23) is treated with n-butyllithium, and then with a formamide such as N,N-dimethylformamide (DMF) to give the aldehyde (28). The phosphonium salt (27) prepared by known methods is treated with a base such as potassium tert-butoxide, and the resulting phosphorus ylide is allowed to react with the aldehyde (28) to give the compound (1D). Since the cis-isomer is formed depending on the reaction conditions, the cis-isomer is isomerized to the trans-isomer by known methods as requested.

(V) Formation of —(CH$_2$)$_2$—

The compound (1E) is prepared by the hydrogenation of the compound (1D) in the presence of a catalyst such as palladium on carbon.

(VI) Formation of —(CH$_2$)$_4$—

A compound having —(CH$_2$)$_2$—CH═CH— is prepared according to the method described in item (IV), using the phosphonium salt (29) instead of the phosphonium salt (27). The catalytic hydrogenation of the resulting compound gives the compound (1F).

(VII) Formation of —C≡C—

The reaction of the compound (23) with 2-methyl-3-butyn-2-ol in the presence of a catalyst of dichloropalladium and a copper halide, followed by deprotection of the product under basic conditions gives the compound (30). The compound (1G) is prepared by the reaction of the compound (30) with the compound (22) in the presence of a catalyst of dichloropalladium and a copper halide.

(VIII) Formation of —CF═CF—

The compound (23) is treated with n-butyllithium, and then allowed to react with tetrafluoroethylene to give the compound (31). The compound (22) is treated with n-butyllithium, and then allowed to react with the compound (31) to give the compound (1H).

(IX) Formation of —CH$_2$O— or —OCH$_2$—

The compound (28) is reduced with a reducing agent such as sodium borohydride to give the compound (32). The compound (32) is halogenated with hydrobromic acid or the like, giving the compound (33). The compound (33) is allowed to react with the compound (25) in the presence of potassium carbonate or the like, giving the compound (1J).

(X) Formation of —(CH$_2$)$_3$O— or —O(CH$_2$)$_3$—

The compound (1K) is prepared according to the method described in item (IX), using the compound (34) instead of the compound (32).

(XI) Formation of —(CF$_2$)$_2$—

A compound having —(CF$_2$)$_2$— is prepared by fluorination of a diketone (—COCO—) with sulfur tetrafluoride in the presence of a hydrogen fluoride catalyst according to the method described in J. Am. Chem. Soc., 2001, 123, 5414.

Next, one example of the method for the preparation of a decahydronaphthalene compound represented by the formula (1) will be shown. First, the scheme on the preparation of the reaction intermediate (40) having a octahydronaphthalene-2-one moiety will be explained, and then one example of the method for the preparation of a decahydronaphthalene compound represented by the formula (1) will be described.

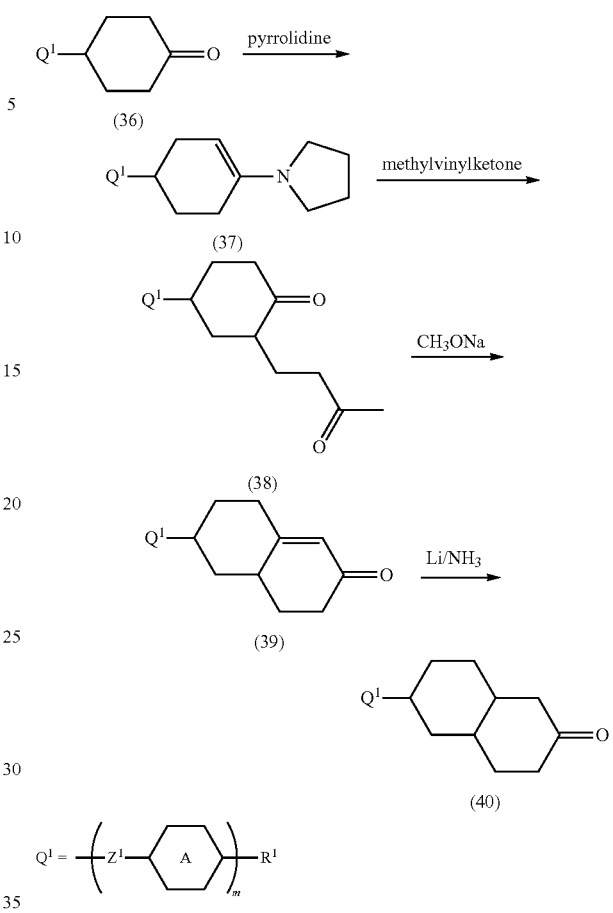

In the compounds (36) to (40), $Q^1$ is a structural unit in the formula (1). The structural unit is shown in the scheme. The meanings of the symbols of $R^1$, A and $Z^1$ in these compound are just the same as those described in item 1.

Methods for the synthesis of the compound (36) to the compound of the formula (40) are described in W. Sucrow and H. Wolter, Chem. Ber., 118, 3350 (1985) or the like.

The compound (37) is prepared by the reaction of the compound (36) with pyrrolidine. The reaction is carried out at reflux under conditions in which water is removed, preferably in a solvent such as toluene, with which water forms an azeotropic mixture, in a reaction vessel equipped with a Dean-Stark apparatus. The compound (38) is prepared by the addition of methyl vinyl ketone to the compound (37). The reaction is preferably carried out in a solvent such as toluene at a temperature of the boiling point of the solvent. After the addition reaction has proceeded sufficiently, the compound (38) is obtained by the addition of an acid such as hydrochloric acid. The compound (39) is prepared by the cyclization reaction of the compound (38). The reaction is preferably carried out in a solvent such as methanol in the presence of a base such as sodium methoxide. The compound (40) is prepared by Birch reduction of the compound (39). The reaction is carried out in a liquid ammonia solvent in the presence of sodium or lithium.

The compound (36), which is a starting material, can be easily prepared according to the methods in synthetic organic chemistry.

The decahydronaphthalene compound (1) can be prepared by converting the compound (40) into the corresponding alcohol, aldehyde, carboxylic acid or the like according to the methods in synthetic organic chemistry, and then by using the methods (I) to (XI) described above.

The compound of the invention has an excellent compatibility with other liquid crystal materials, a low viscosity and a wide temperature range of a liquid crystal phase in comparison with a known compound having a similar structure. The compound has a low threshold voltage and a relatively low viscosity in comparison with a similar compound. The compound of the invention also has sufficient physical and chemical stability under conditions in which a liquid crystal display device is usually used, and are particularly excellent as a components of a nematic liquid crystal composition. Thus, the compound can suitably used as components of a liquid crystal composition for use in a TN mode, a STN mode, a TFT mode, a VA mode, an IPS mode and a PSA mode.

The liquid crystal composition of the invention should include a compound represented by the formula (1) described above as a component A. The composition may include the component A only. The composition may include the component A and another component that is not specifically described in this specification. The liquid crystal composition of the invention having a variety of characteristics can be provided by the addition of a component selected from the components B, C, D and E, these of which will be shown below, to the component A. The content of the component A in the liquid crystal composition of the invention is suitably in the range of 1 to 99% by weight, preferably in the range of 3 to 90% by weight, and more preferably 5 to 60% by weight, based on the total weight of the liquid crystal composition.

Desirable components that will be added to the component A are the component B that is at least one compound selected from the group of compounds represented by the formulas (2), (3) and (4) described above, and/or the component C that is at least one compound selected from the group of compounds represented by the formula (5) described above, and/or the component D that is at least one compound selected from the group of compounds represented by the formulas (6), (7), (8), (9), (10) and (11) described above. Further, the threshold voltage, the temperature range of a liquid crystal phase, the refractive index anisotropy, the dielectric anisotropy, the viscosity and so forth can be adjusted by the addition of the component E that is at least one compound selected from the group of compounds represented by the formulas (12), (13) and (14).

In each compound included in the liquid crystal composition that is used in the invention, there are no major differences in characteristics even if the compound is an analogue composed of any isotope.

In the component B described above, desirable examples of the compound (2) include the compounds (2-1) to (2-16), desirable examples of the compound (3) include the compounds (3-1) to (3-112), and desirable examples of the compound (4) include the compounds (4-1) to (4-54).

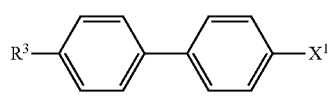

(2-1)

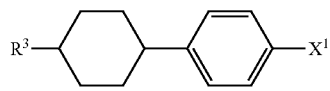

(2-2)

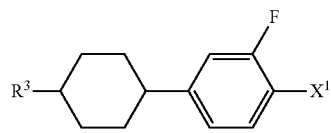

(2-3)

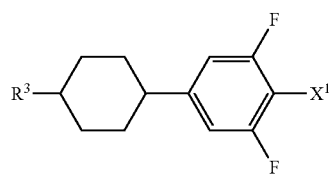

(2-4)

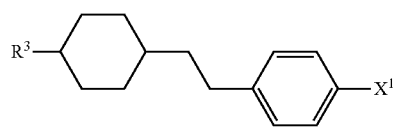

(2-5)

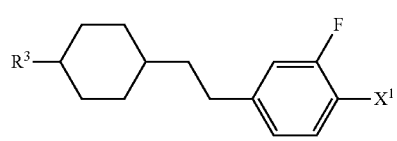

(2-6)

(2-7)

(2-8)

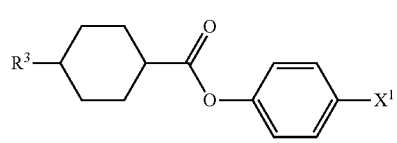

(2-9)

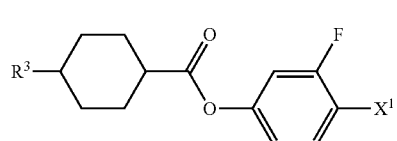

(2-10)

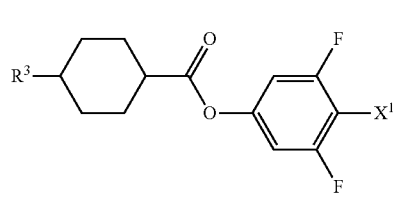

(2-11)

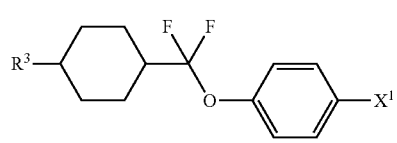

(2-12)

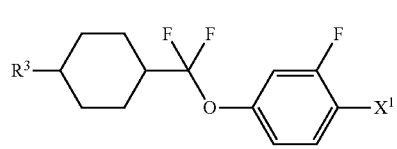

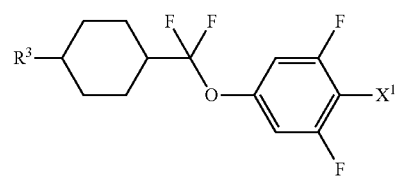
(2-13)
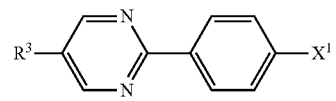
(2-14)
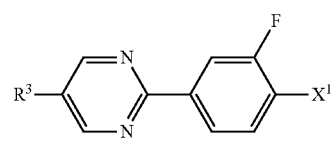
(2-15)
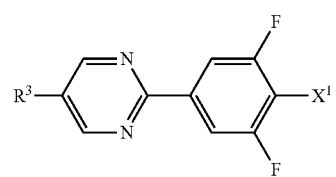
(2-16)
(3-1)
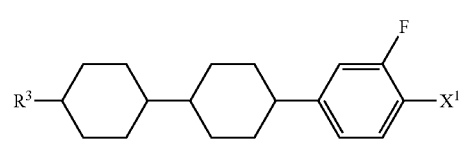
(3-2)
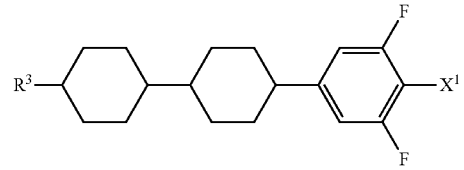
(3-3)
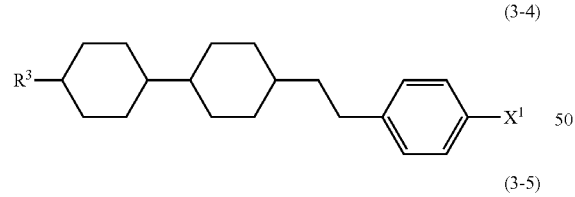
(3-4)
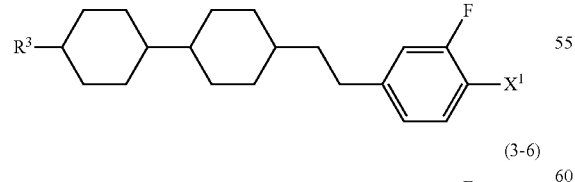
(3-5)
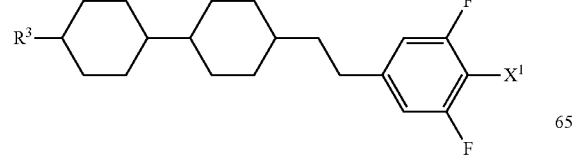
(3-6)
(3-7)
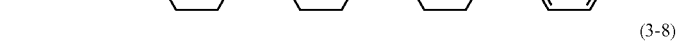
(3-8)
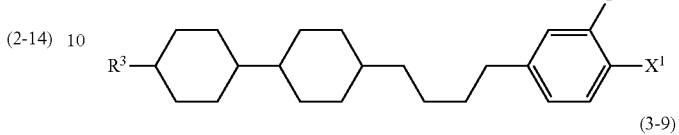
(3-9)
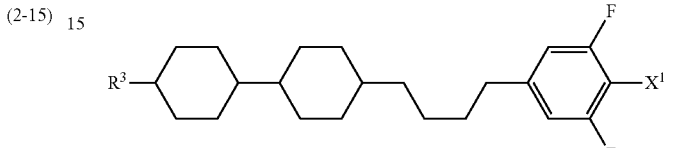
(3-10)
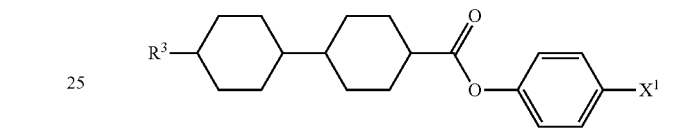
(3-11)
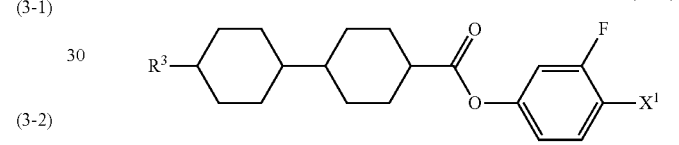
(3-12)
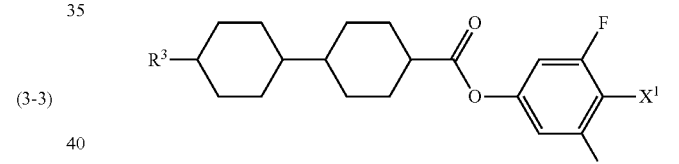
(3-13)
(3-14)
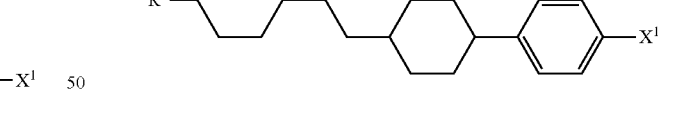
(3-15)

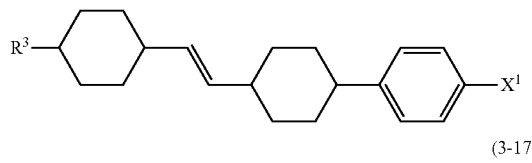 (3-16)
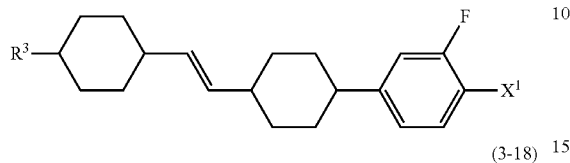 (3-17)
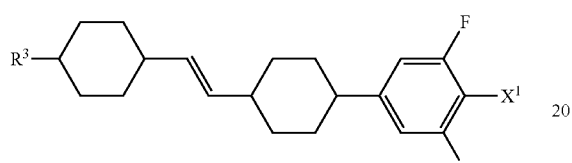 (3-18)
 (3-19)
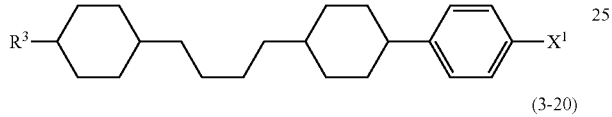 (3-20)
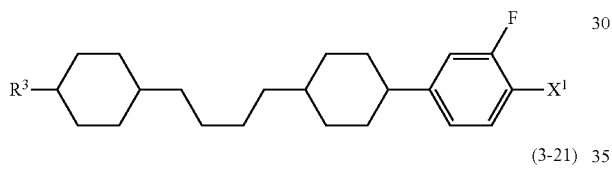 (3-21)
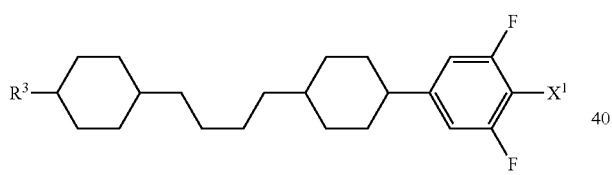 (3-22)
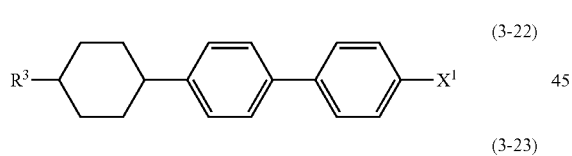 (3-23)
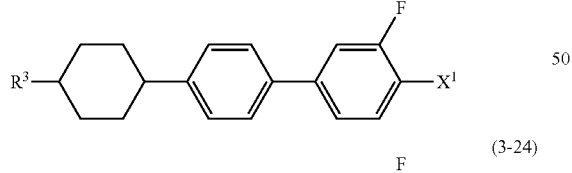 (3-24)
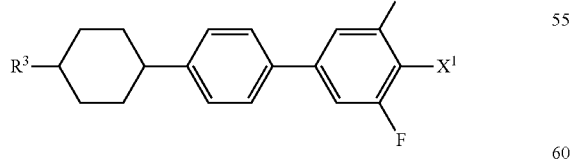 (3-25)
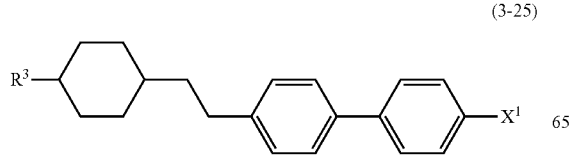
 (3-26)
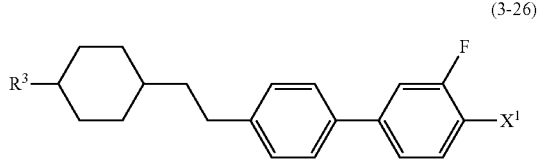 (3-27)
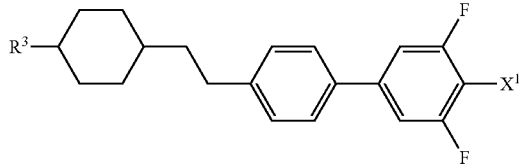 (3-28)
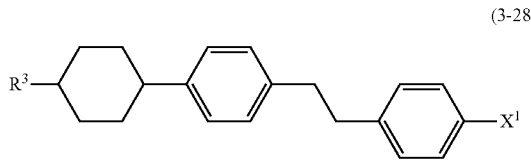 (3-29)
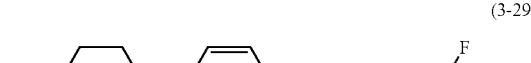 (3-30)
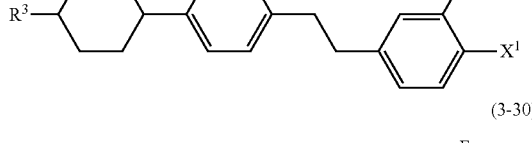 (3-31)
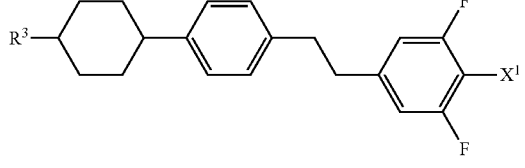 (3-32)
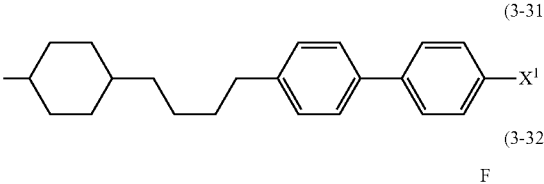 (3-33)
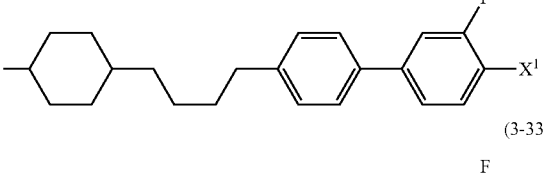 (3-34)
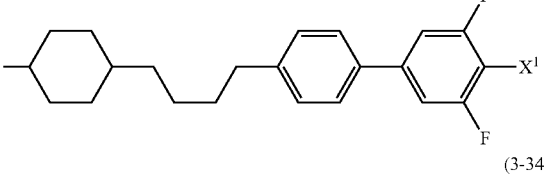 (3-35)
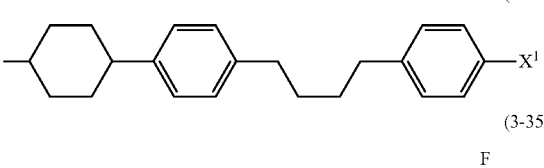
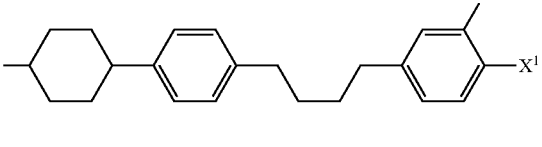

(3-36) 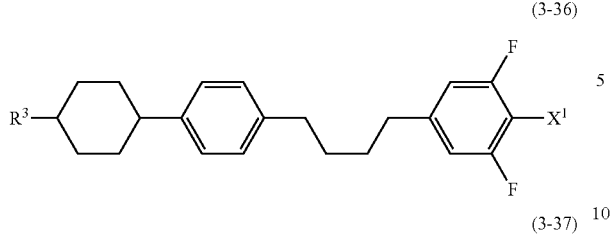
(3-37) 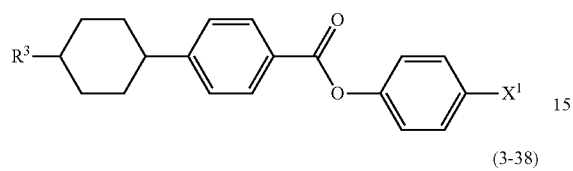
(3-38) 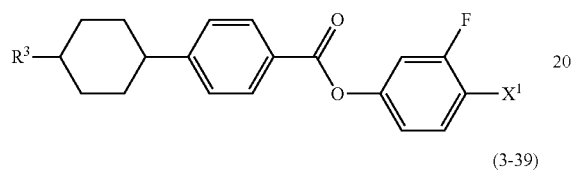
(3-39) 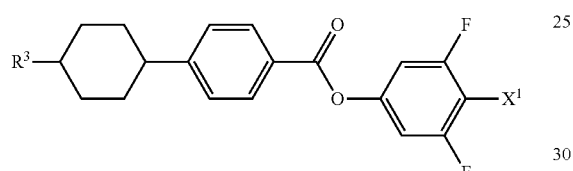
(3-40) 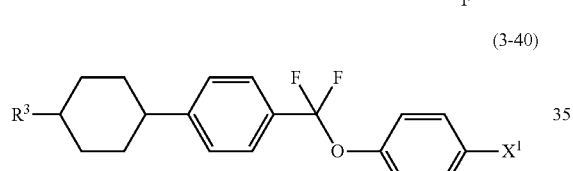
(3-41) 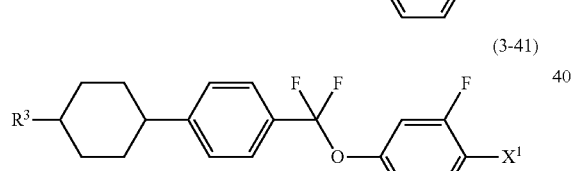
(3-42) 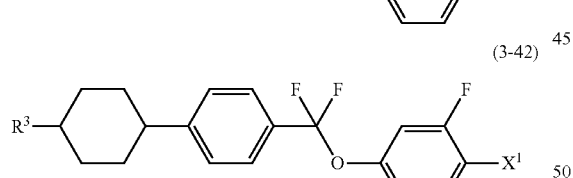
(3-43) 
(3-44) 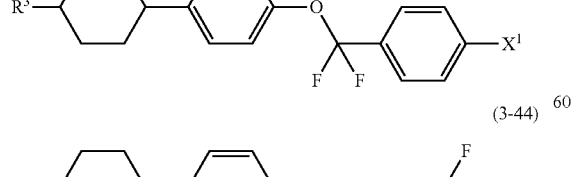
(3-45) 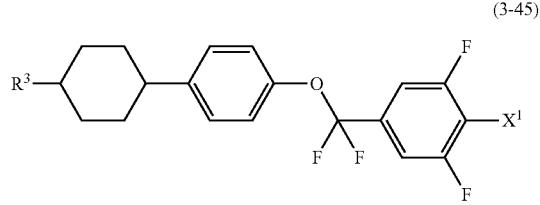
(3-46) 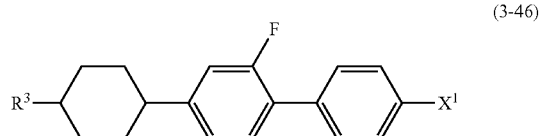
(3-47) 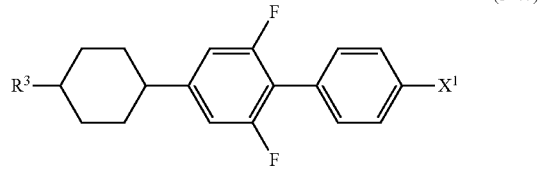
(3-48) 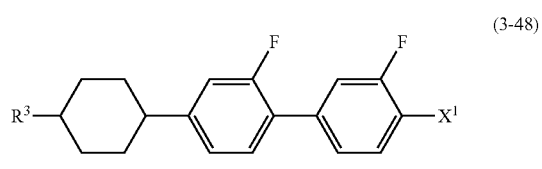
(3-49) 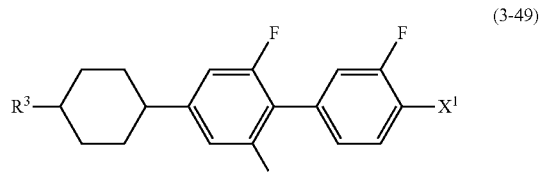
(3-50) 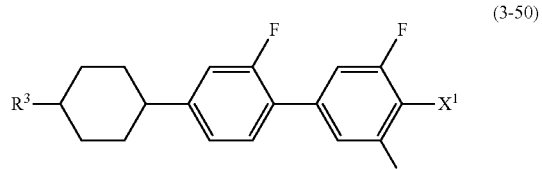
(3-51) 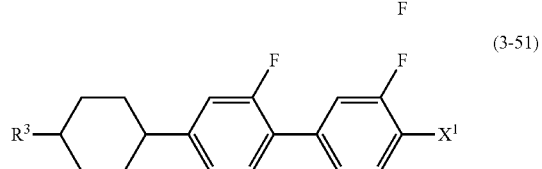
(3-52) 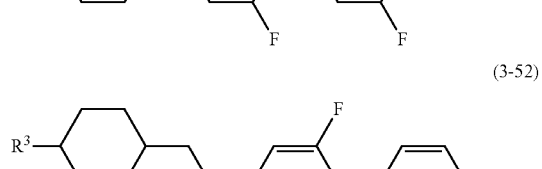
(3-53) 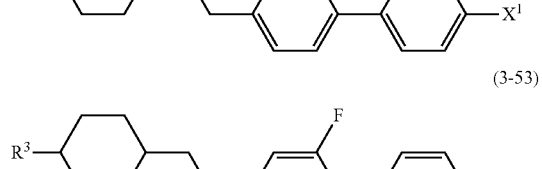

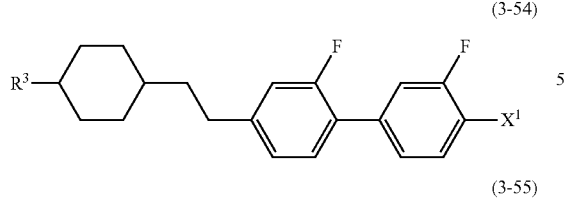
(3-54)
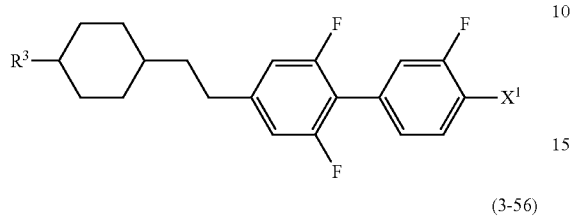
(3-55)
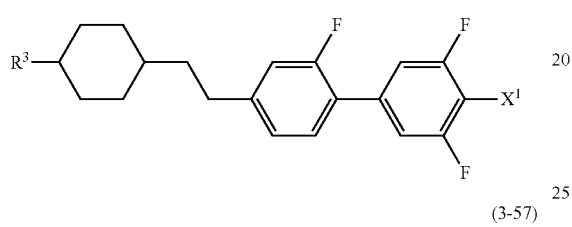
(3-56)
(3-57)
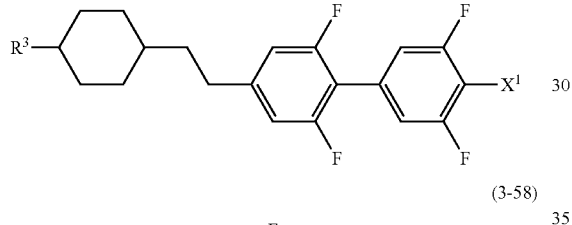
(3-58)
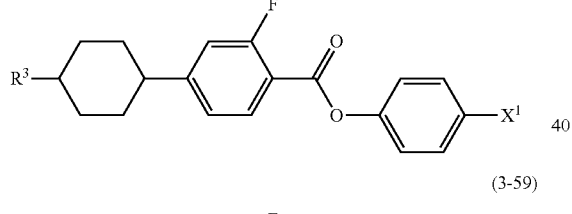
(3-59)
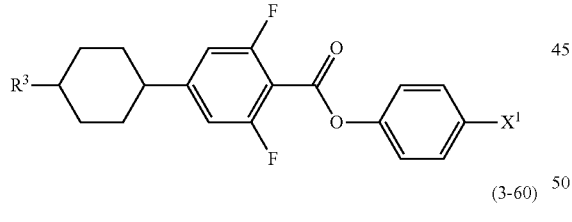
(3-60)
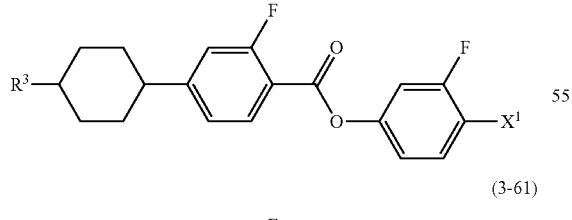
(3-61)
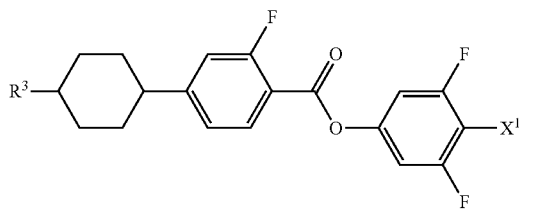
(3-62)
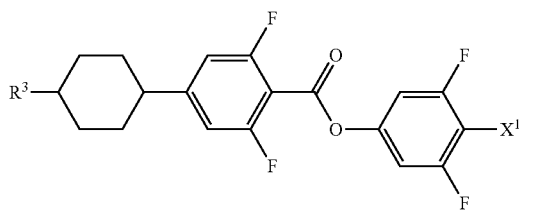
(3-63)
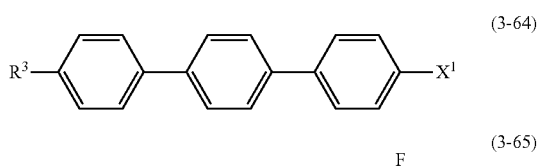
(3-64)
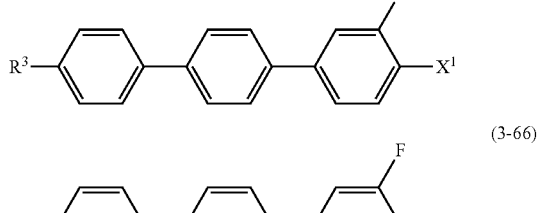
(3-65)
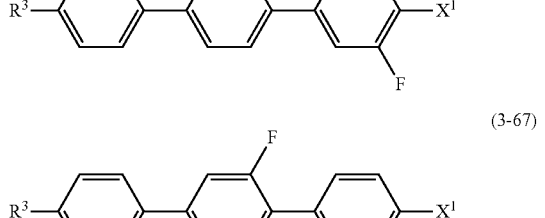
(3-66)
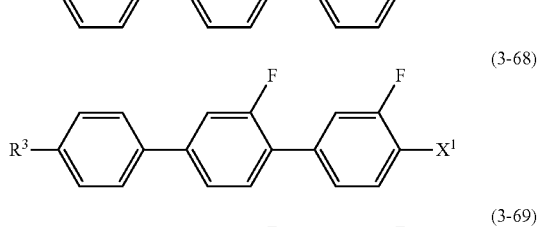
(3-67)
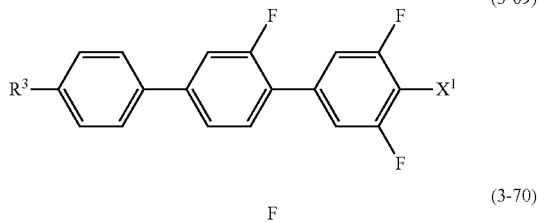
(3-68)
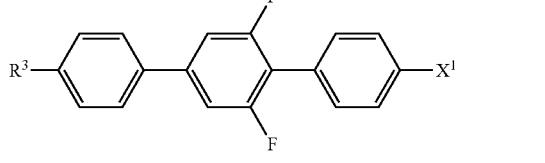
(3-69)
(3-70)

(3-71) 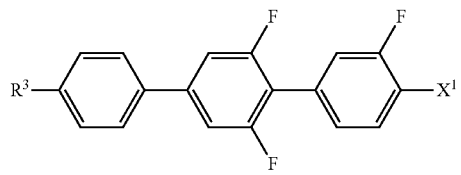
(3-72) 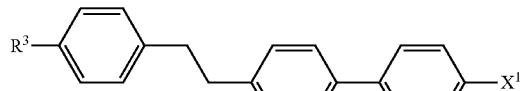
(3-73) 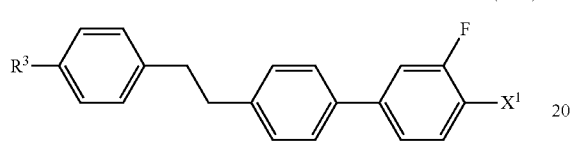
(3-74) 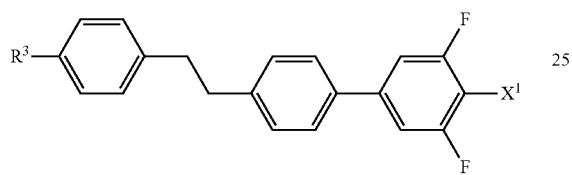
(3-75) 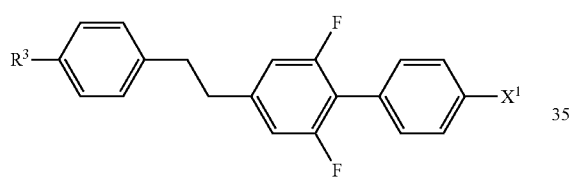
(3-76) 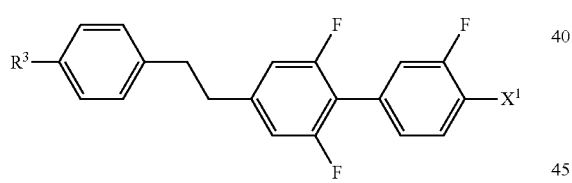
(3-77) 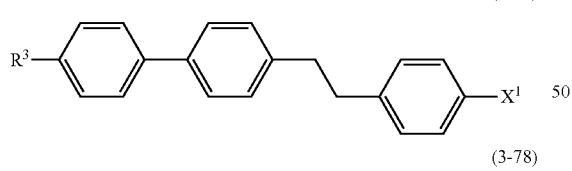
(3-78) 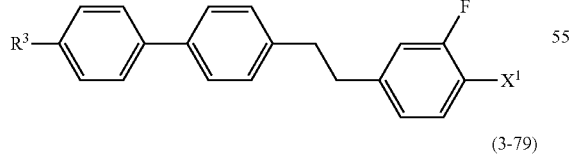
(3-79)
(3-80) 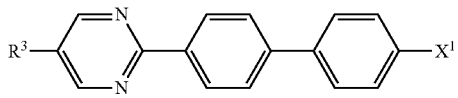
(3-81) 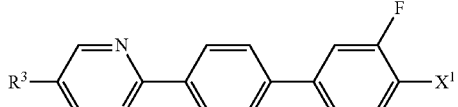
(3-82) 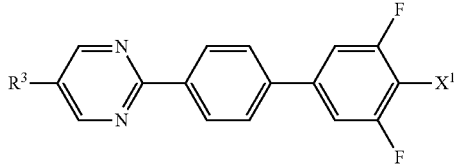
(3-83) 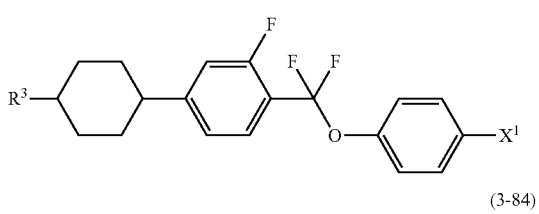
(3-84) 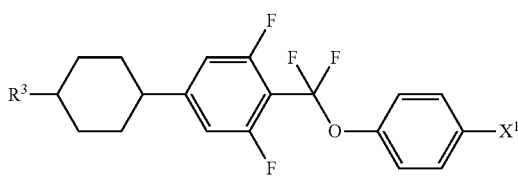
(3-85) 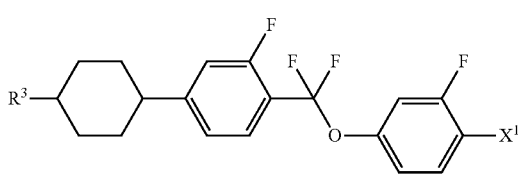
(3-86) 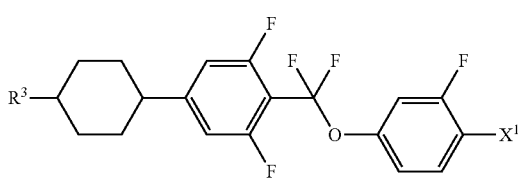
(3-87) 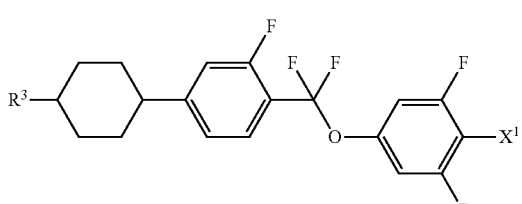

(3-88) 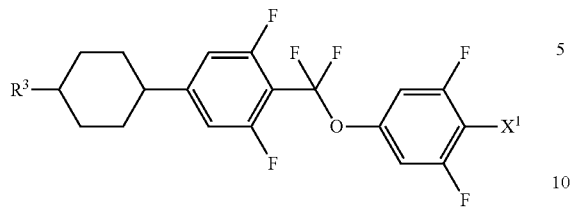
(3-89) 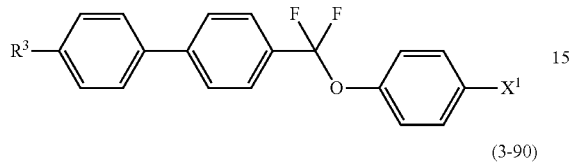
(3-90) 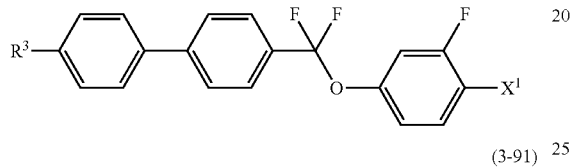
(3-91) 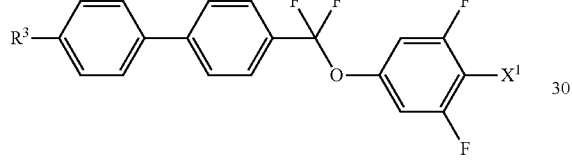
(3-92) 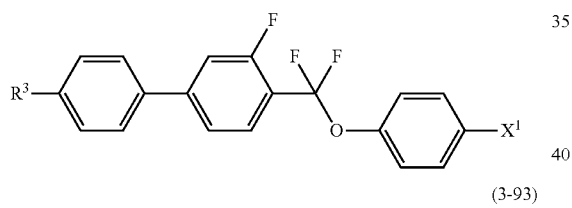
(3-93) 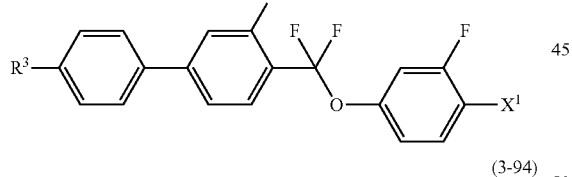
(3-94) 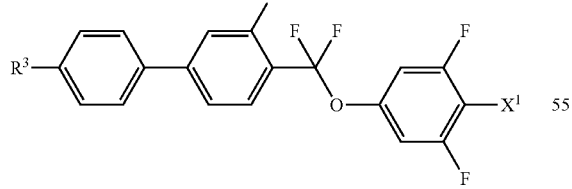
(3-95) 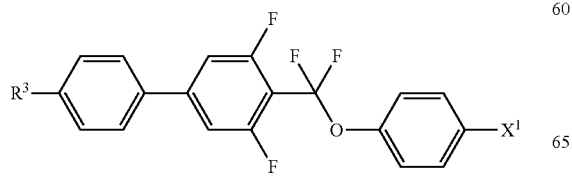
(3-96) 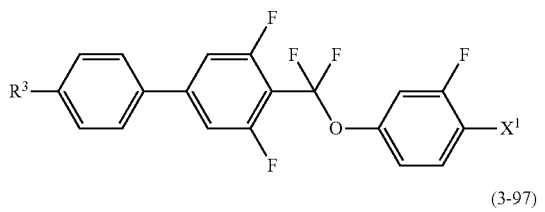
(3-97) 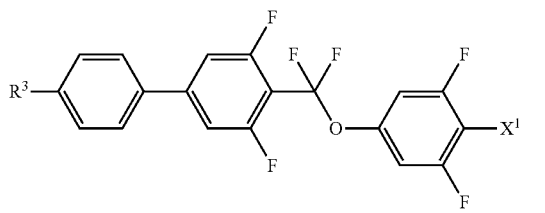
(3-98) 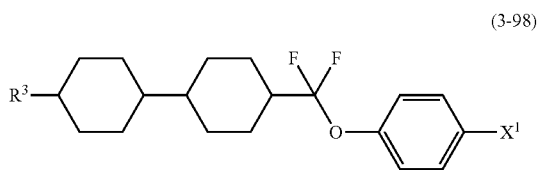
(3-99) 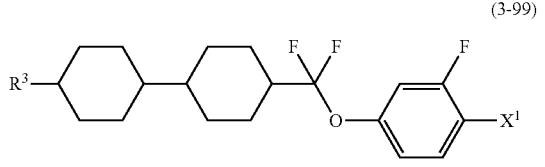
(3-100) 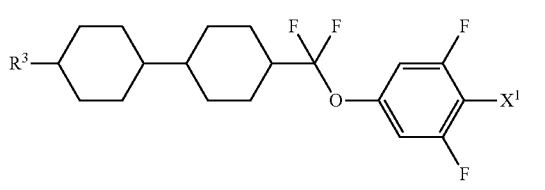
(3-101) 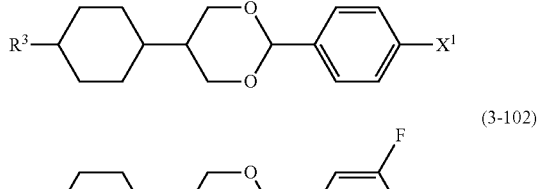
(3-102) 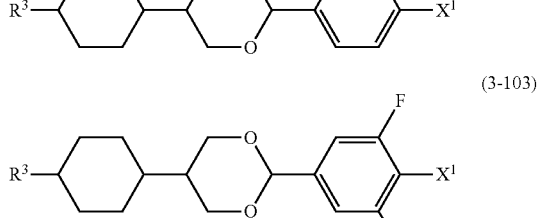
(3-103) 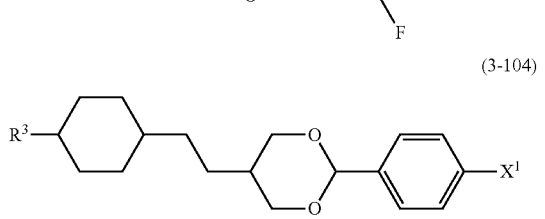
(3-104)

(3-105)
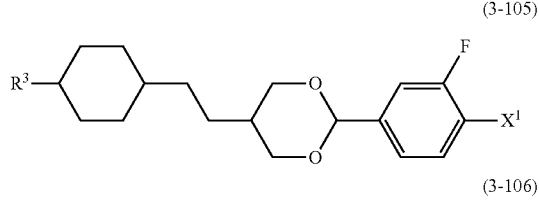
(3-106)
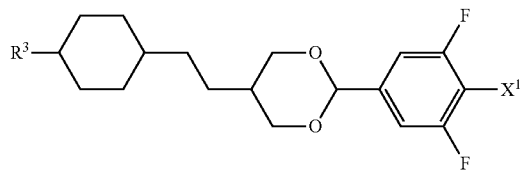
(3-107)
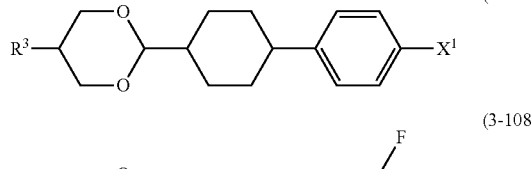
(3-108)
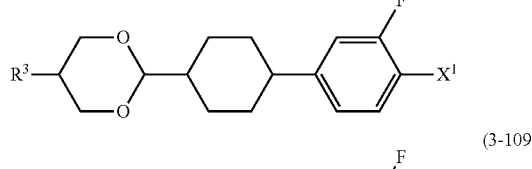
(3-109)
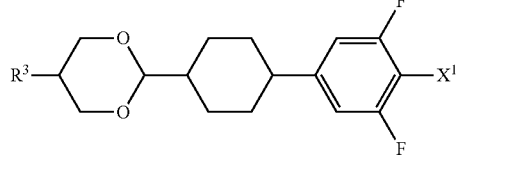
(3-110)
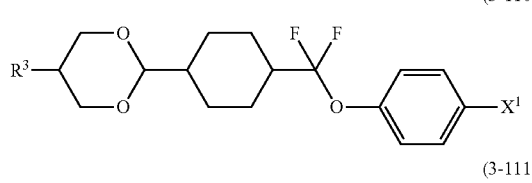
(3-111)
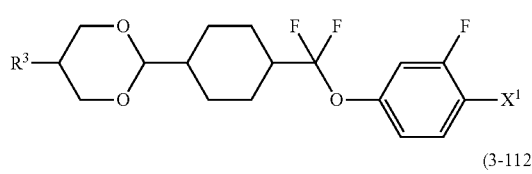
(3-112)
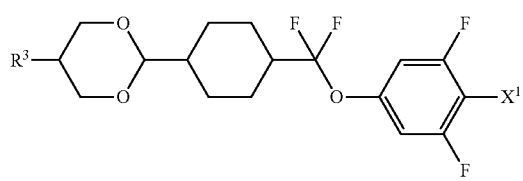
(4-1)
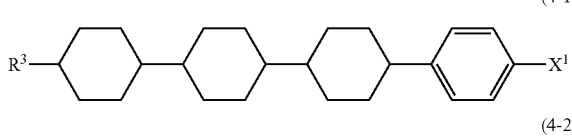
(4-2)
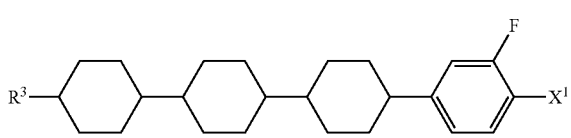
(4-3)
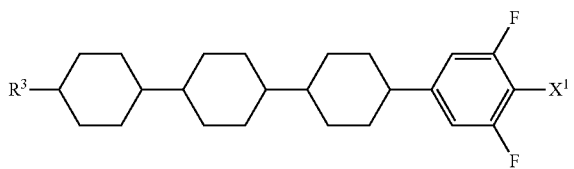
(4-4)
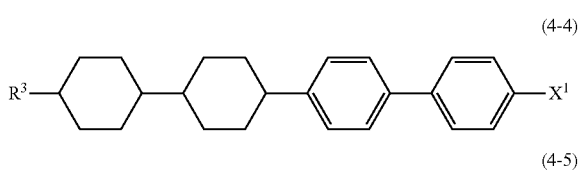
(4-5)
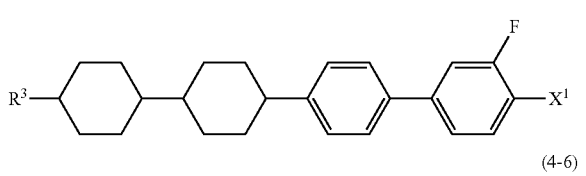
(4-6)
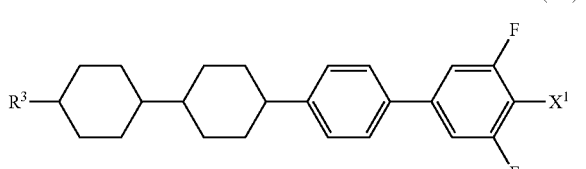
(4-7)
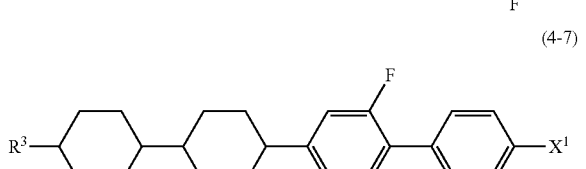
(4-8)
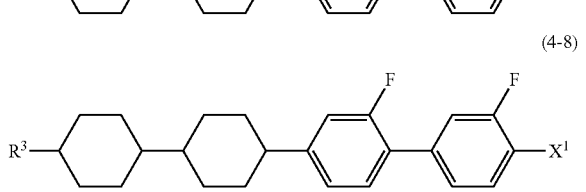
(4-9)
(4-10)
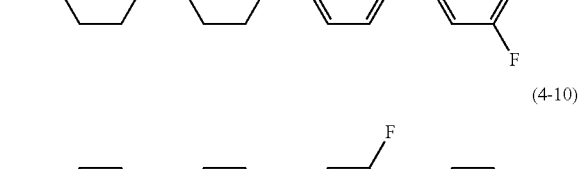
(4-11)
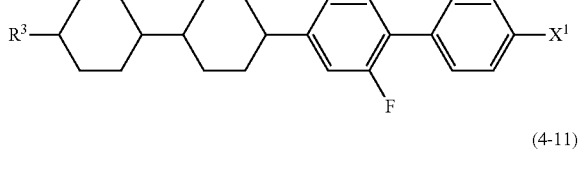
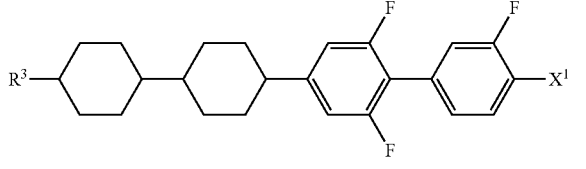
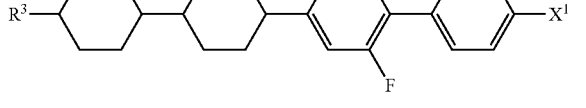

(4-12) 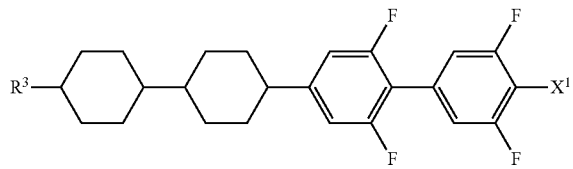
(4-13) 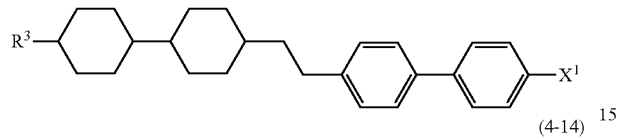
(4-14) 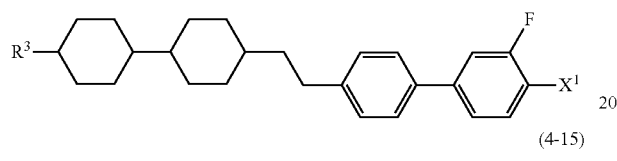
(4-15) 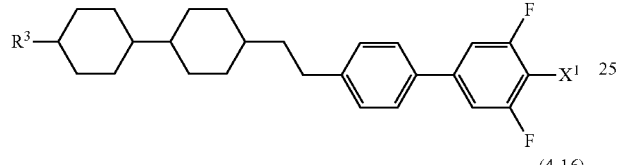
(4-16) 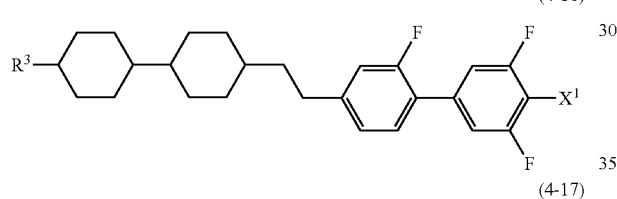
(4-17) 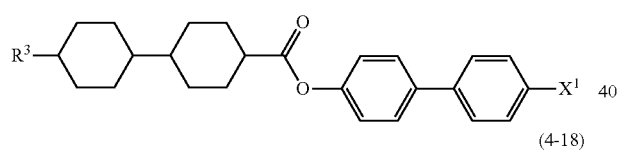
(4-18) 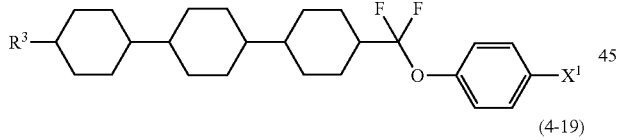
(4-19) 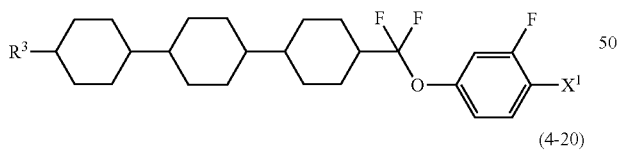
(4-20) 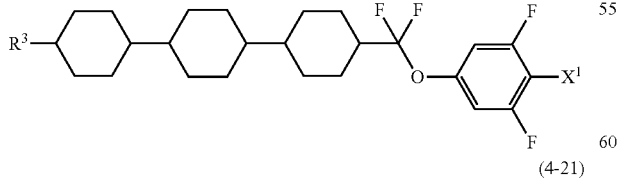
(4-21) 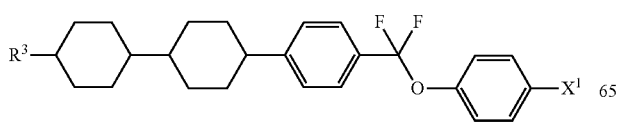
(4-22) 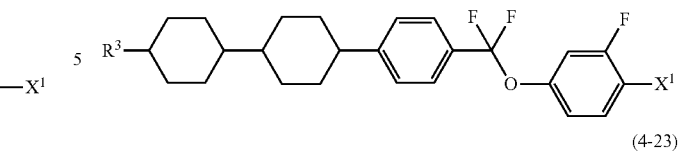
(4-23) 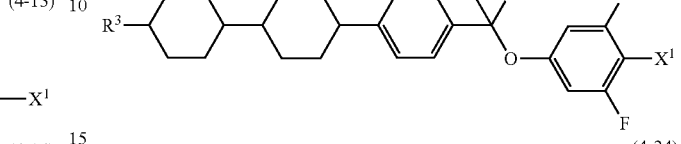
(4-24) 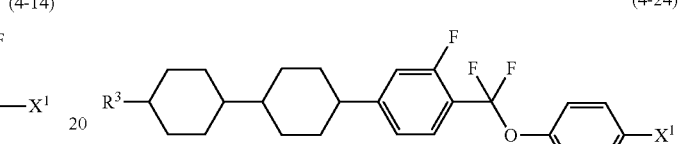
(4-25) 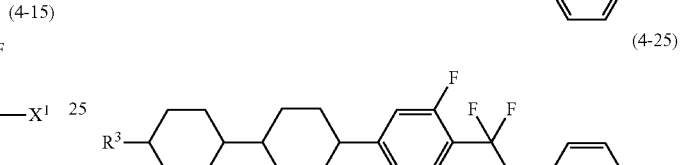
(4-26) 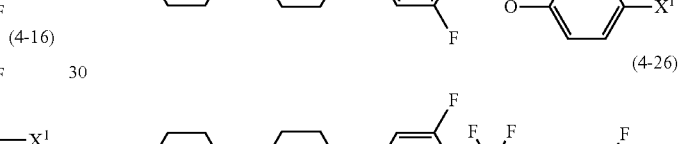
(4-27) 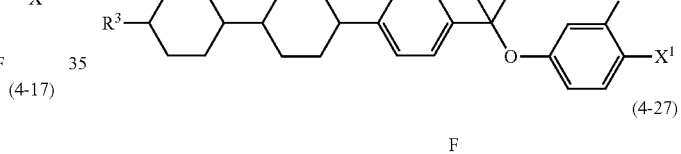
(4-28) 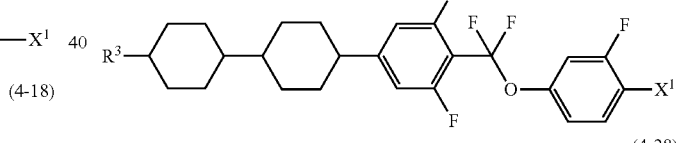
(4-29) 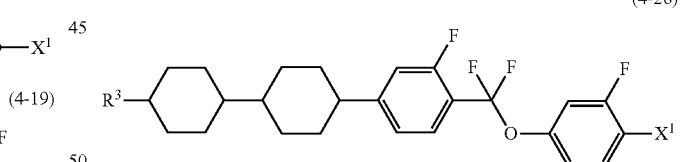
(4-30) 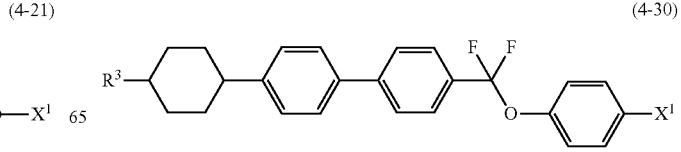

(4-31) 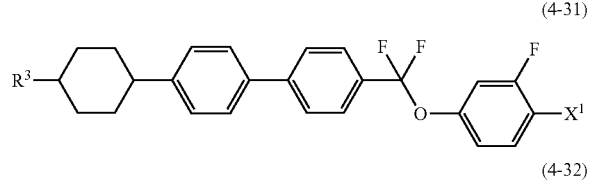
(4-32) 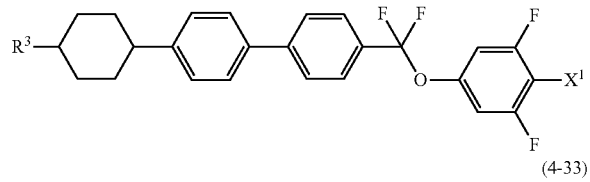
(4-33) 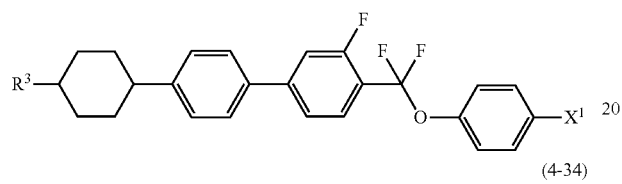
(4-34) 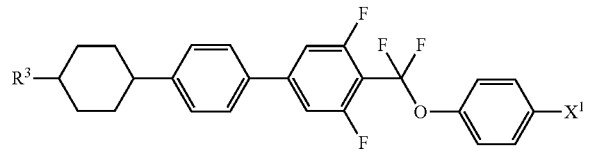
(4-35) 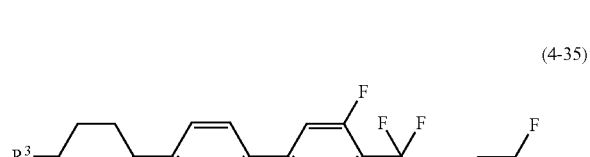
(4-36) 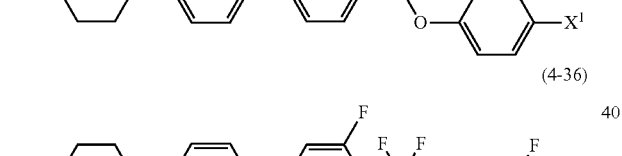
(4-37) 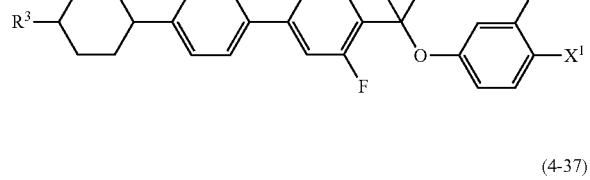
(4-38) 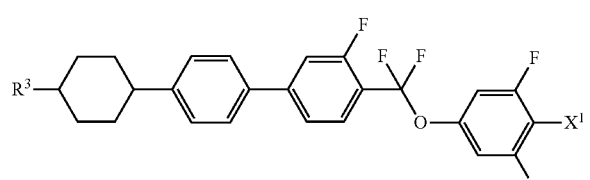
(4-39) 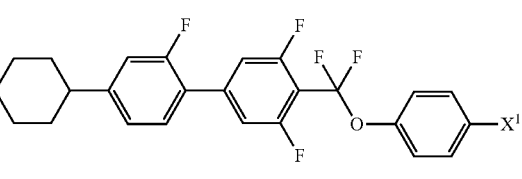
(4-40) 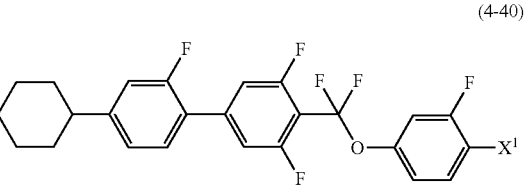
(4-41) 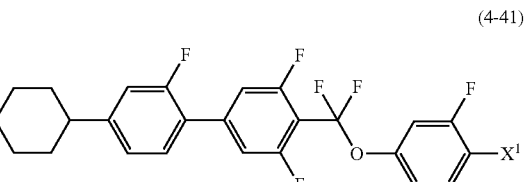
(4-42) 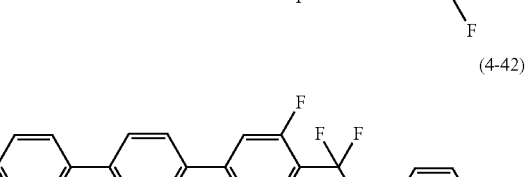
(4-43) 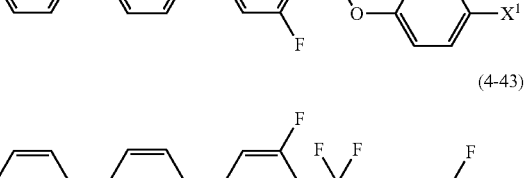
(4-44) 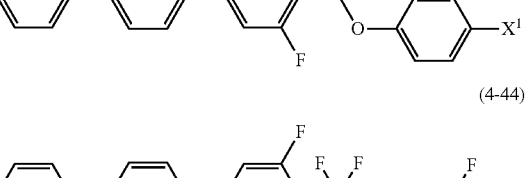
(4-45) 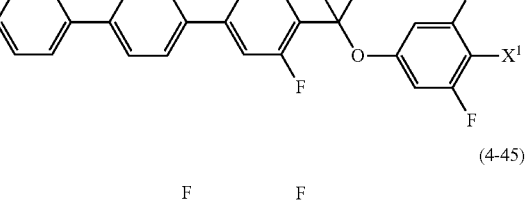
(4-46) 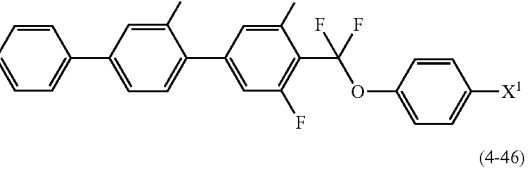

-continued

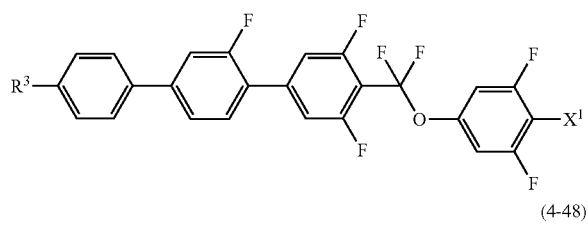
(4-47)
(4-48)
(4-49)

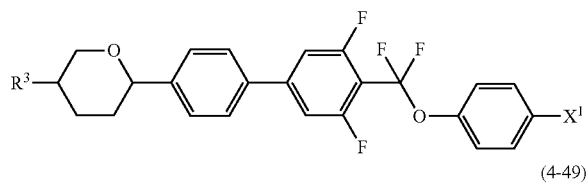
(4-50)
(4-51)

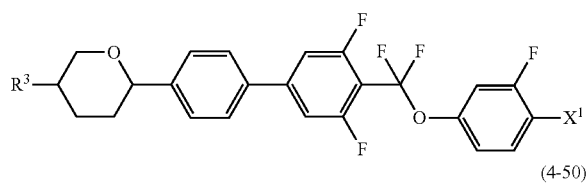
(4-52)
(4-53)

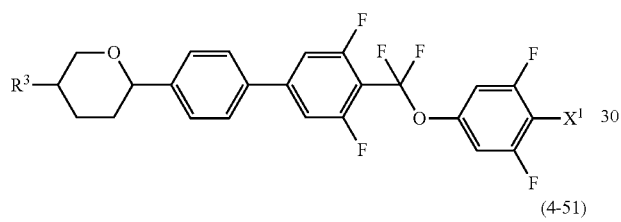
(4-54)

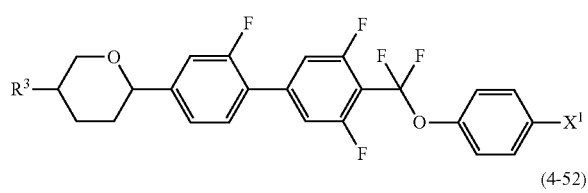

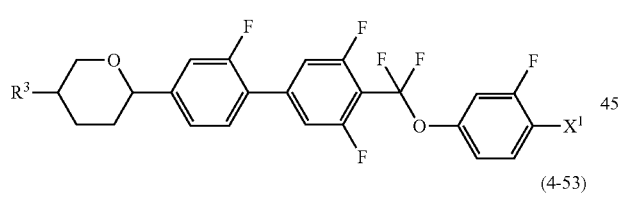

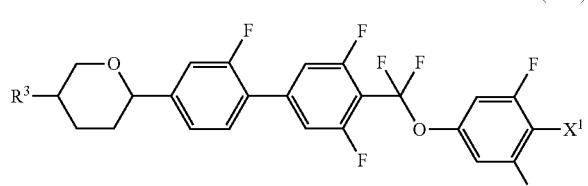

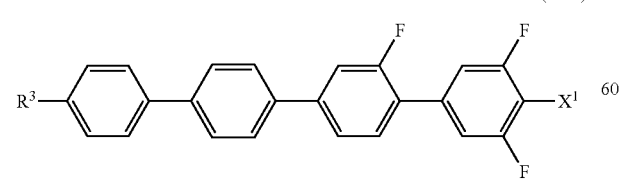

In the formulas, the definitions of $R^3$ and $X^1$ are just the same as those described previously.

The compounds (2) to (4), that is to say, the component B, is used in the preparation of the liquid crystal composition for use in a TFT mode and a PSA mode, since they have positive dielectric anisotropy and an particularly excellent thermal or chemical stability. The content of the component B in the liquid crystal composition of the invention is suitably in the range of 1% to 99% by weight, preferably in the range of 10% to 97% by weight, and more preferably 40% to 95% by weight based on the total weight of the liquid crystal composition. The viscosity can be adjusted by a further addition of the compounds (12) to (14) (the component E).

Desirable examples of the compound (5) described above, that is to say, the component C, include the compounds (5-1) to (5-64).

(5-1)

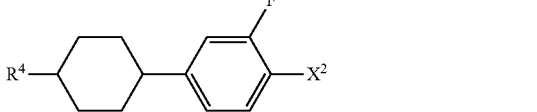
(5-2)
(5-3)
(5-4)

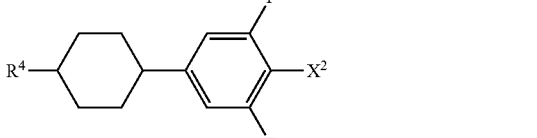
(5-5)
(5-6)
(5-7)

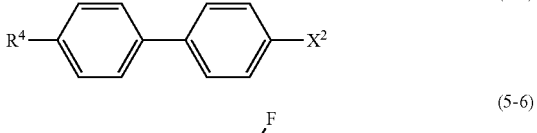
(5-8)
(5-9)

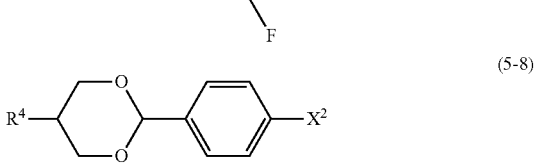

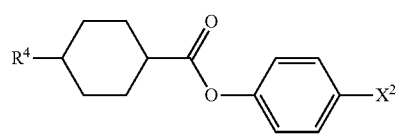 (5-10)
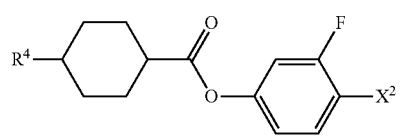 (5-11)
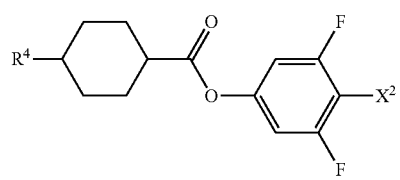 (5-12)
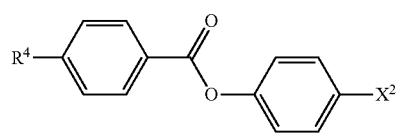 (5-13)
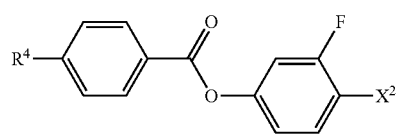 (5-14)
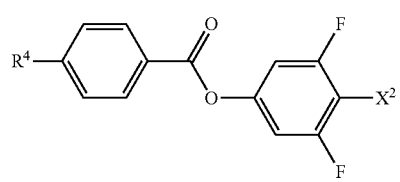 (5-15)
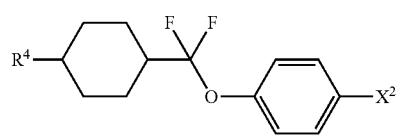 (5-16)
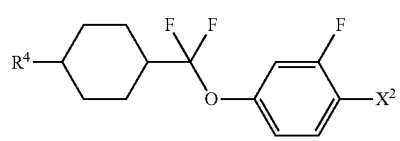 (5-17)
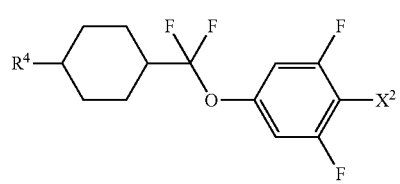 (5-18)
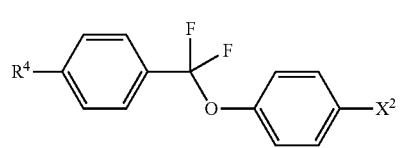 (5-19)
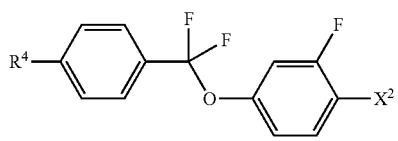 (5-20)
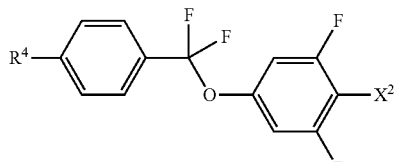 (5-21)
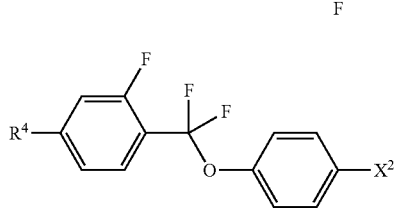 (5-22)
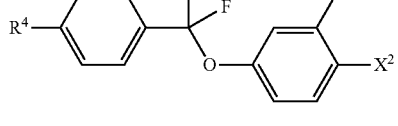 (5-23)
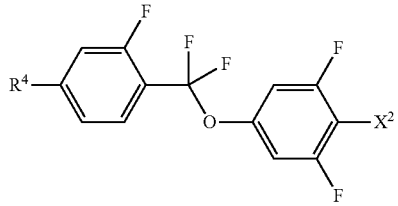 (5-24)
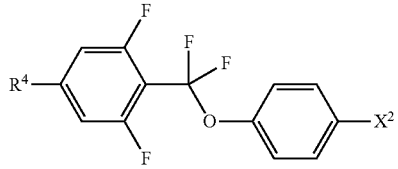 (5-25)
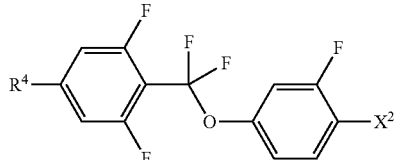 (5-26)
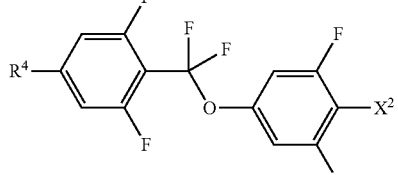 (5-27)
 (5-28)

(5-29) 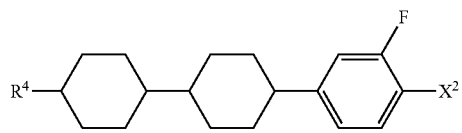
(5-30) 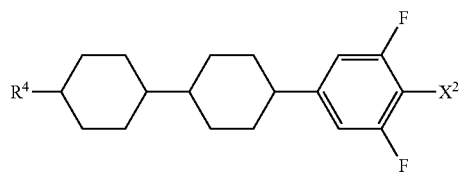
(5-31) 
(5-32) 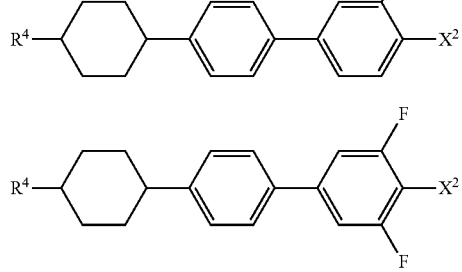
(5-33) 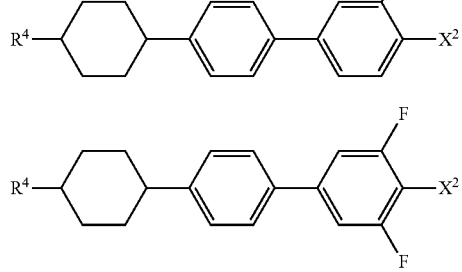
(5-34) 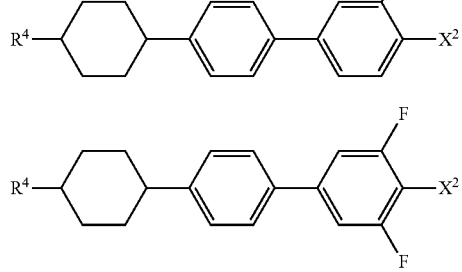
(5-35) 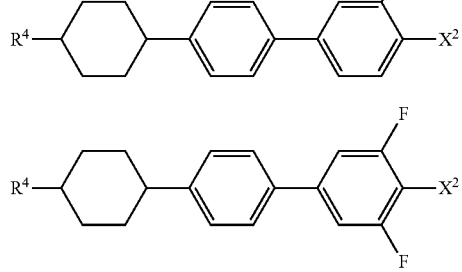
(5-36) 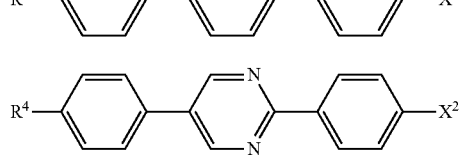
(5-37) 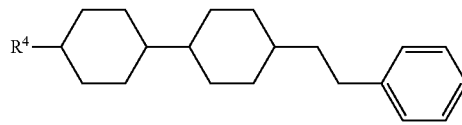
(5-38) 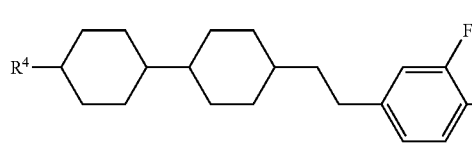
(5-39) 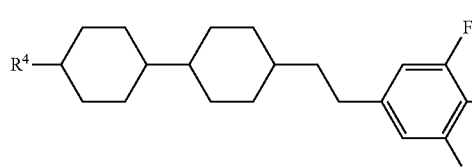
(5-40) 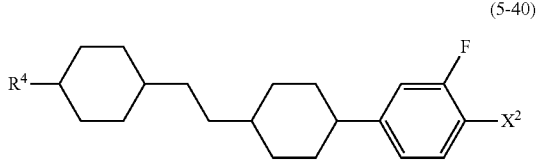
(5-41) 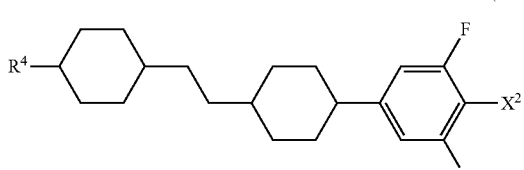
(5-42) 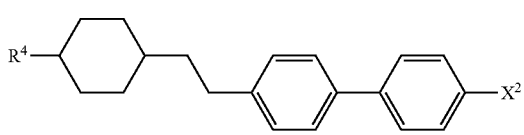
(5-43) 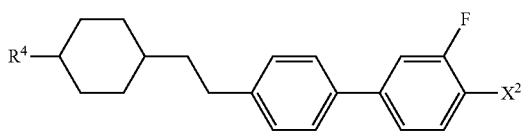
(5-44) 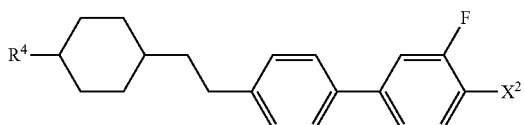
(5-45) 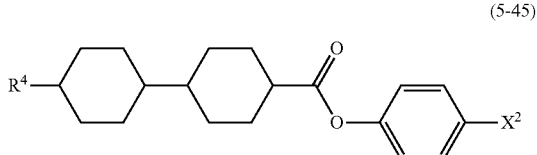
(5-46) 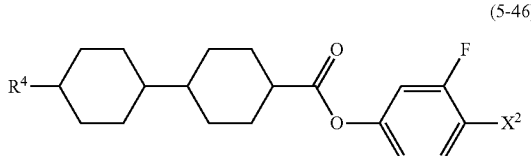
(5-47) 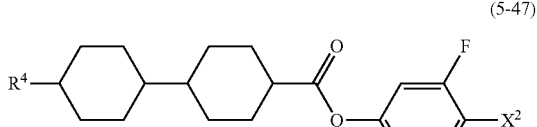
(5-48) 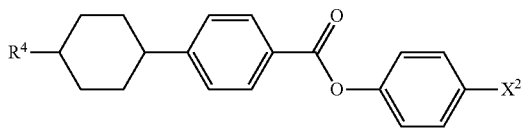

(5-49)
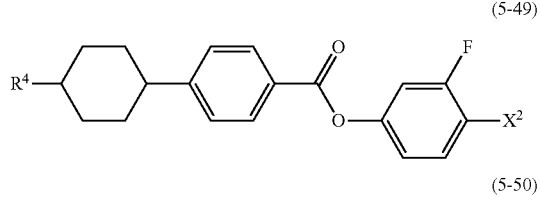

(5-50)
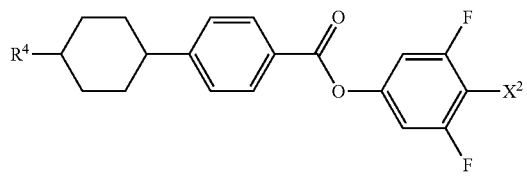

(5-51)
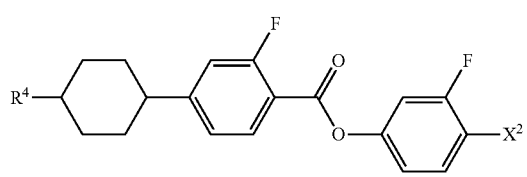

(5-52)
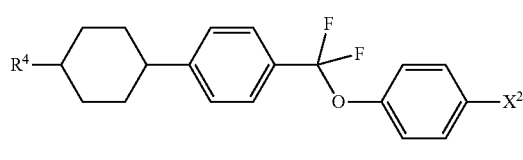

(5-53)
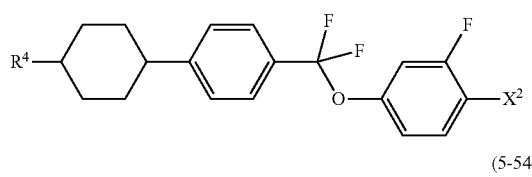

(5-54)
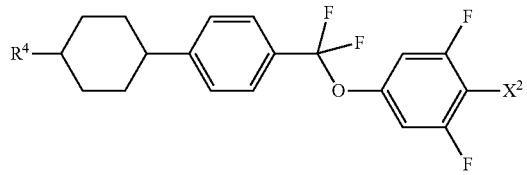

(5-55)
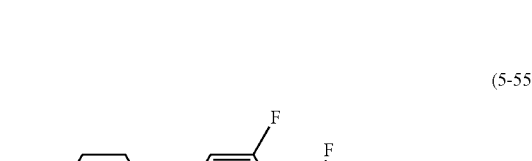

(5-56)
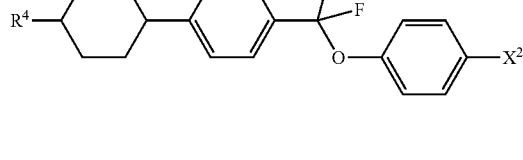

(5-57)
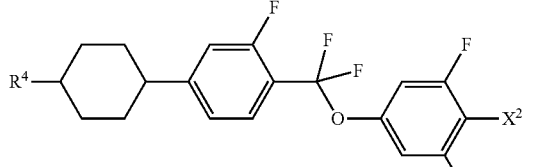

(5-58)
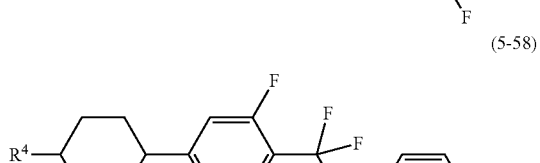

(5-59)
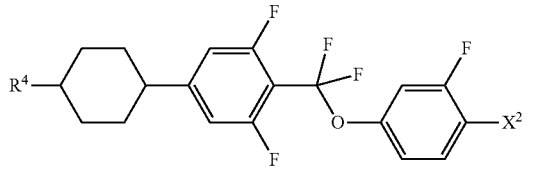

(5-60)
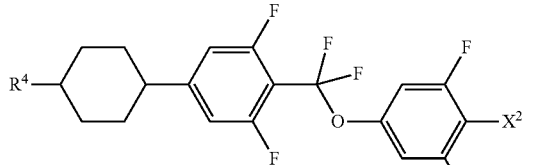

(5-61)
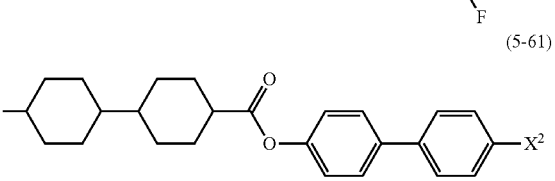

(5-62)
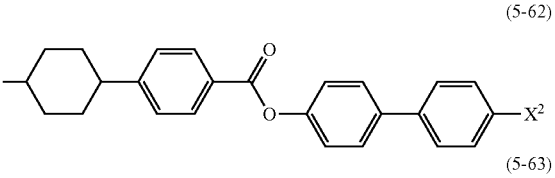

(5-63)
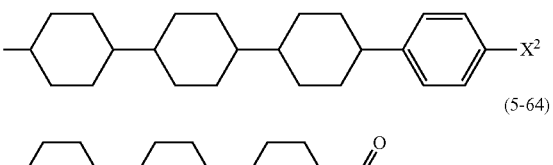

(5-64)
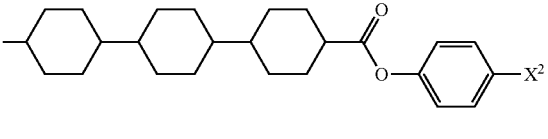

In the formula, the definitions of $R^4$ and $X^2$ are just the same as those described previously.

The compound (5), that is to say, the component C, is mainly used in the preparation of the liquid crystal composition for use in a STN mode, a TN mode and a PSA mode, since the dielectric anisotropy is positive and the value is particularly large. The threshold voltage of the composition can be decreased by the addition of the component C. The viscosity can be adjusted, the refractive index anisotropy can be adjusted, and the temperature range of a liquid crystal phase can be increased. Furthermore, the component C can also be utilized for an improvement of the steepness.

The content of the component C is suitably in the range of 0.1% to 99.9% by weight, preferably in the range of 10% to 97% by weight, and more preferably in the range of 40% to 95% by weight in the preparation of the liquid crystal composition for use in a STN or TN mode. The threshold voltage, the temperature range of a liquid crystal phase, the refractive index anisotropy, the dielectric anisotropy, the viscosity and so forth can be adjusted by the addition of a component which will be described below.

The component D, that is to say, the compounds (6) to (11), are desirable in the preparation of the liquid crystal composition of the invention, having negative dielectric anisotropy for use in a VA (vertical alignment) mode, a PSA (polymer sustained alignment) mode and so forth.

Desirable examples of the compounds (6) to (11) (the component D) include the compounds (6-1) to (6-6), the compounds (7-1) to (7-15), the compound (8-1), the compounds (9-1) to (9-3), the compounds (10-1) to (10-11) and the compounds (11-1) to (11-10).

(6-1)
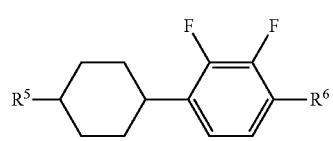

(6-2)
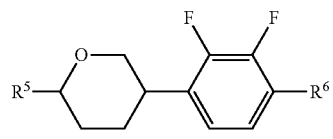

(6-3)
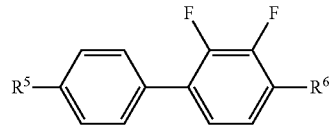

(6-4)
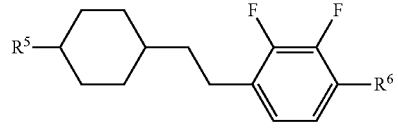

(6-5)
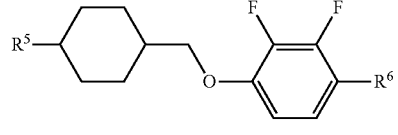

(6-6)
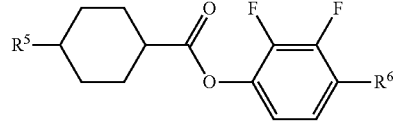

(7-1)
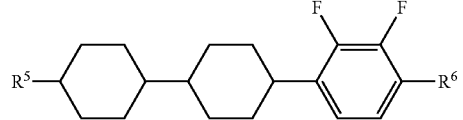

-continued (7-2)
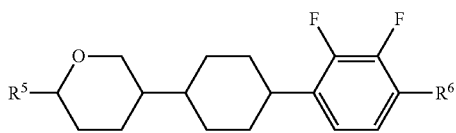

(7-3)
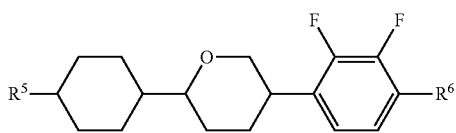

(7-4)
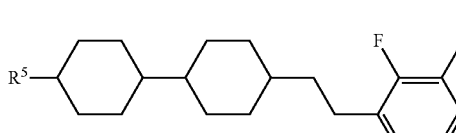

(7-5)
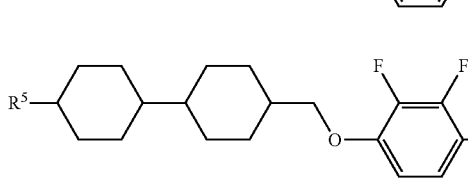

(7-6)
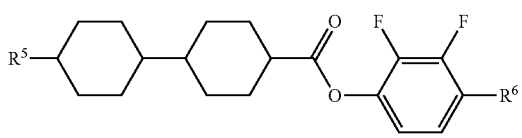

(7-7)
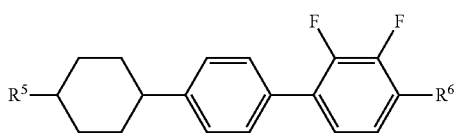

(7-8)
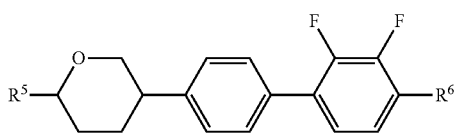

(7-9)
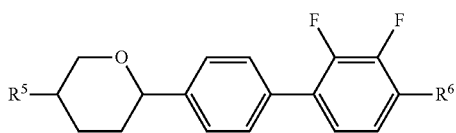

(7-10)
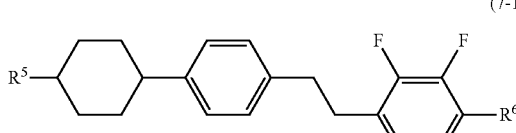

(7-11)
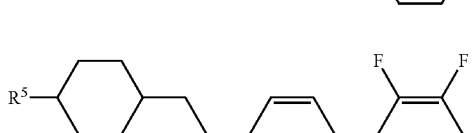

(7-12)

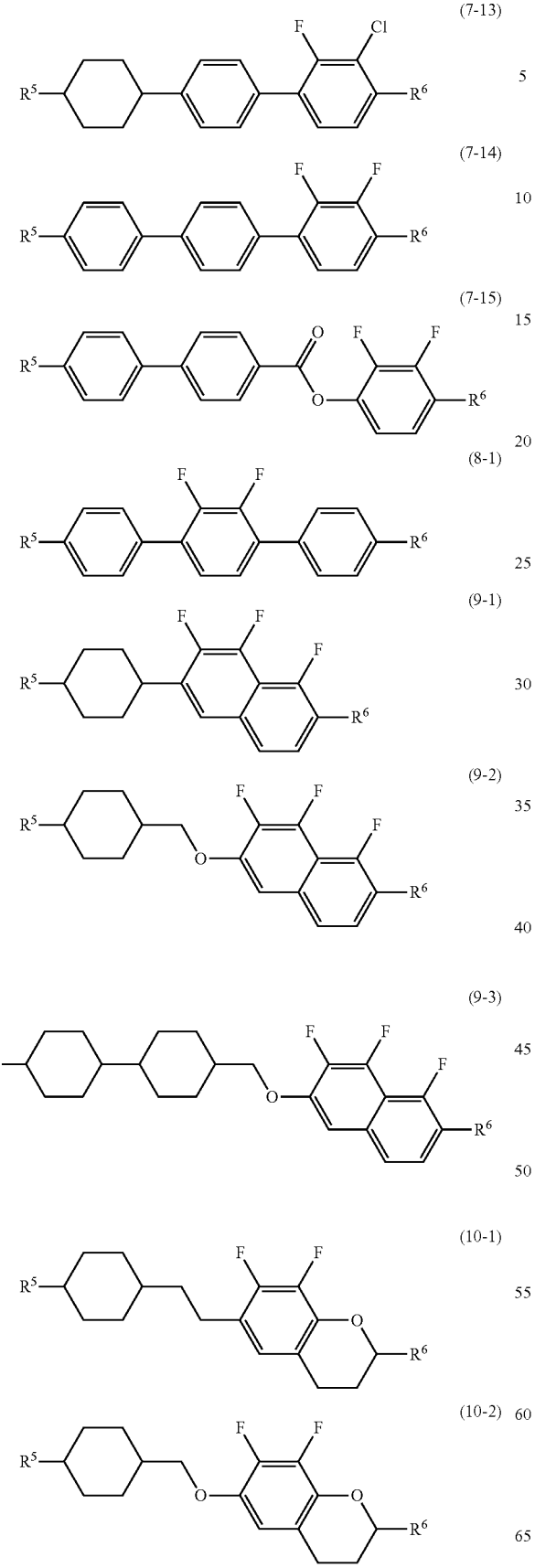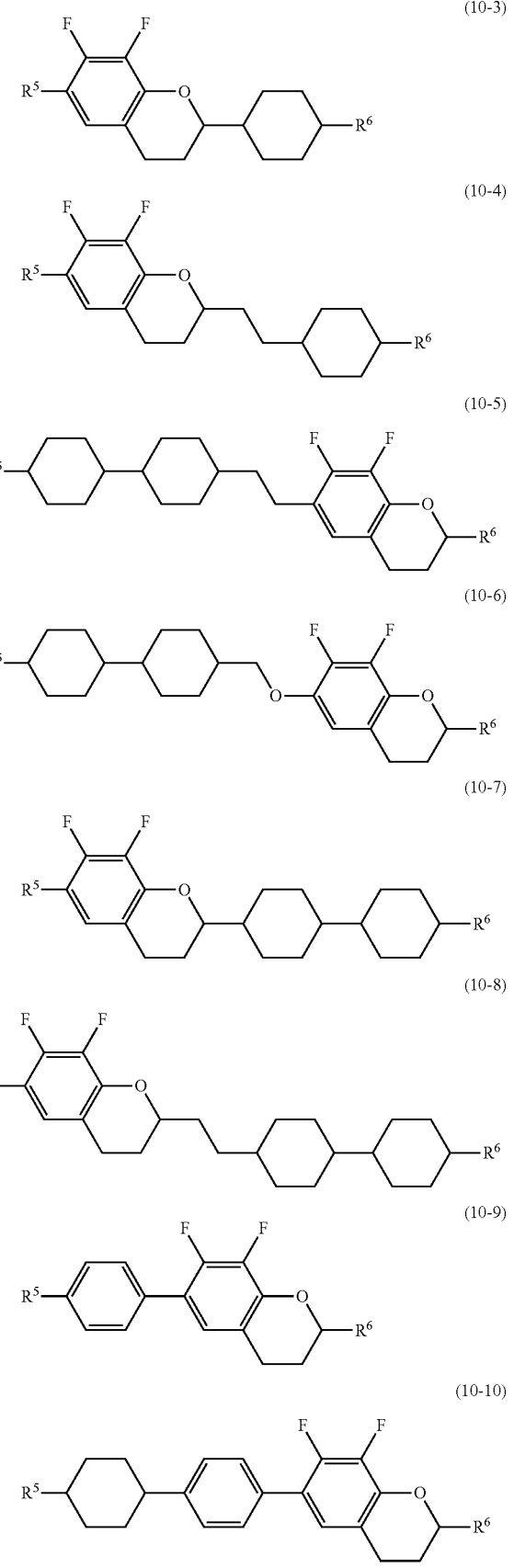

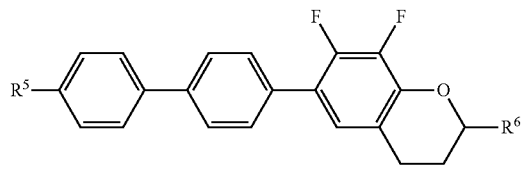
(10-11)

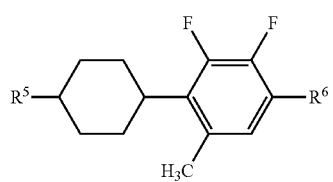
(11-1)

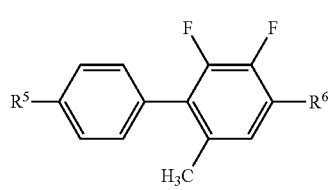
(11-2)

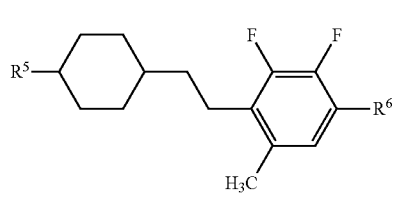
(11-3)

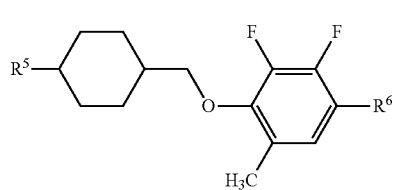
(11-4)

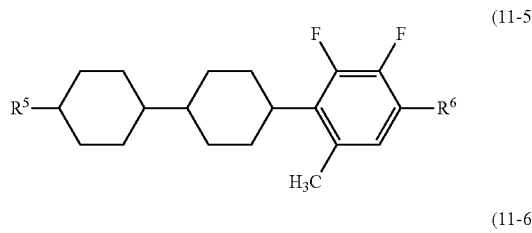
(11-5)

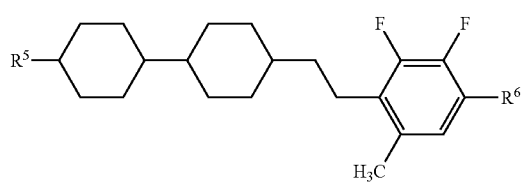
(11-6)

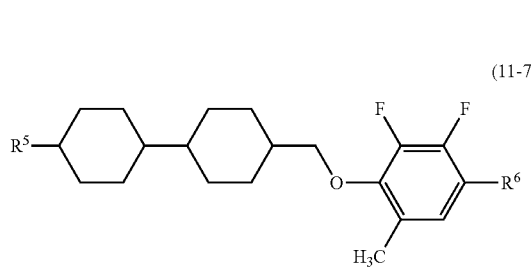
(11-7)

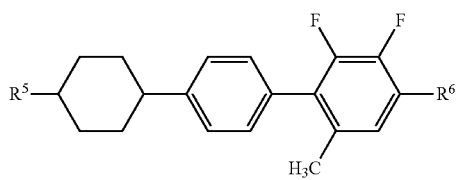
(11-8)

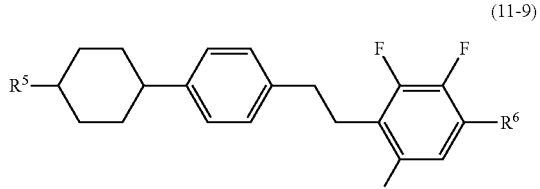
(11-9)

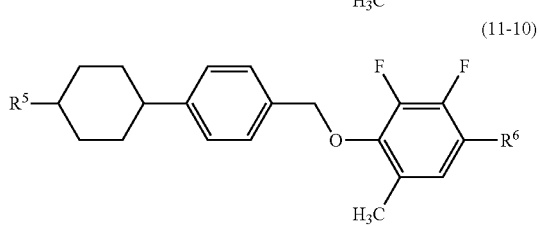
(11-10)

In the formulas, the definitions of $R^5$ and $R^6$ are just the same as those described previously.

The compounds of the component D are mainly used in the liquid crystal composition having negative dielectric anisotropy for use in a VA mode and a PSA mode. As the content of the component D is increased, the threshold voltage of the composition decreases, however, the viscosity increases. Accordingly, it is desirable that the content of the component D should decrease as long as the required value of the threshold is satisfied. On the other hand, there are cases where sufficient voltage drive may not be attained in the content less than 40% by weight, since the absolute value of the dielectric anisotropy is about 5.

The compound (6) among the component D is effective mainly in adjusting the threshold voltage, adjusting the viscosity, or adjusting the refractive index anisotropy, since it is a two-ring compound. The compounds (7) and (8) are effective in increasing the clearing point, increasing the temperature range of a nematic phase, decreasing the threshold voltage or increasing the refractive index anisotropy for instance, since it is a three-ring compound. The compounds (9), (10) and (11) are effective in decreasing the threshold voltage for instance.

The content of the component D is preferably 40% by weight or more, and more preferably in the range of 50% to 95% by weight based on the total amount of the composition, in the preparation of the composition for use in a VA mode and a PSA mode. The elastic constant can be adjusted and the voltage-transmission curve of the composition can be adjusted by the addition of the component D. It is desirable that the content of the component D should be 30% by weight or less based on the total amount of the composition when the component D is added to a composition having positive dielectric anisotropy.

Desirable examples of the compounds (12), (13) and (14) (the component E) include the compounds (12-1) to (12-11), the compounds (13-1) to (13-19) and the compounds (14-1) to (14-6).

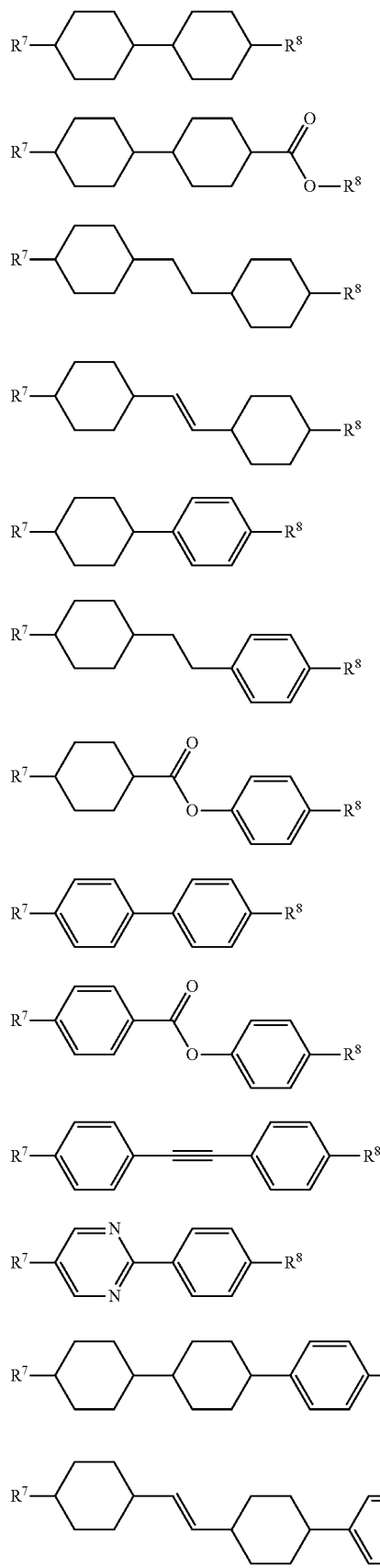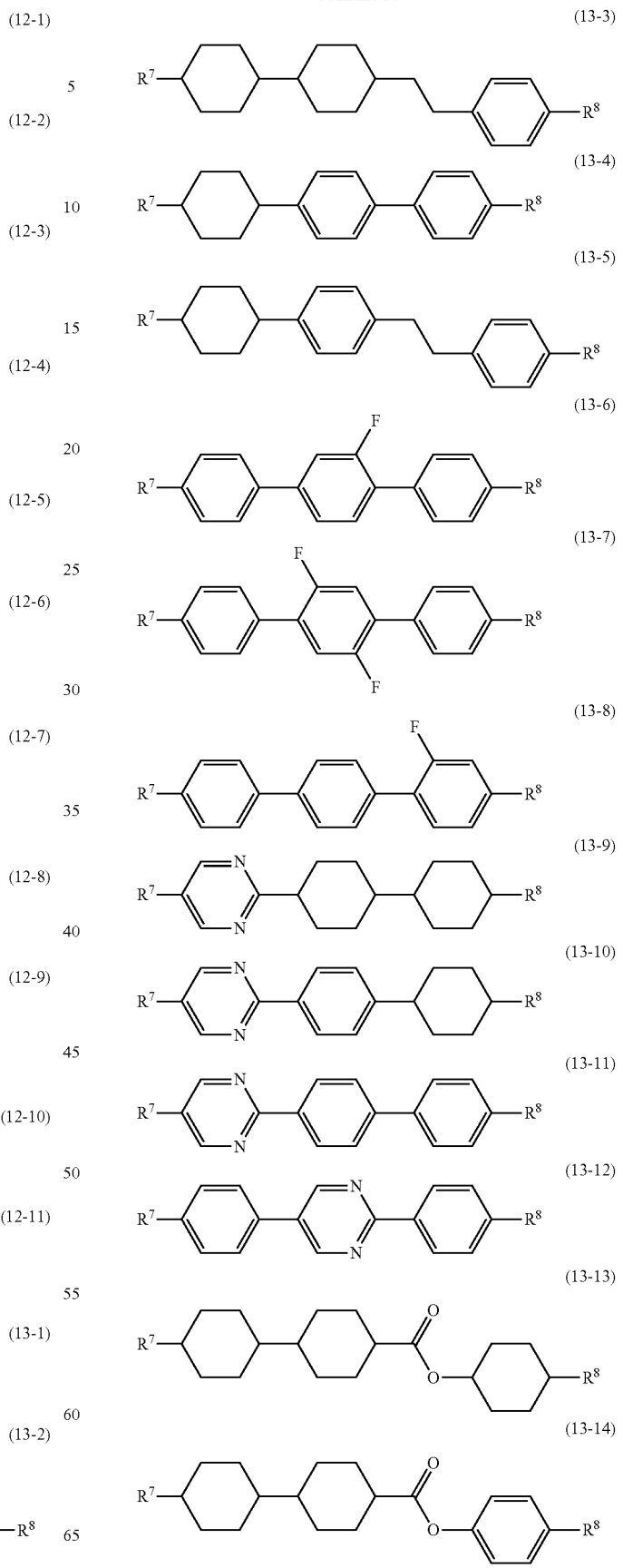

(13-15)
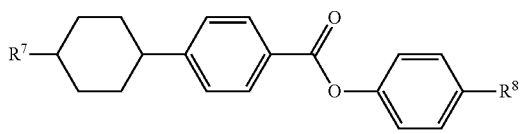

(13-16)
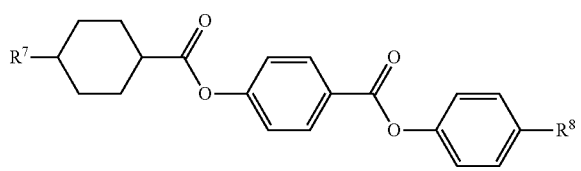

(13-17)
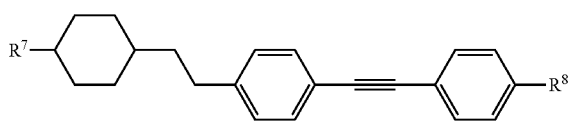

(13-18)
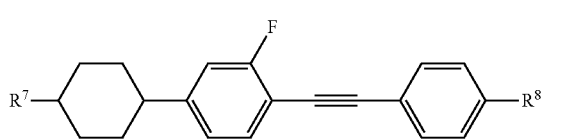

(13-19)
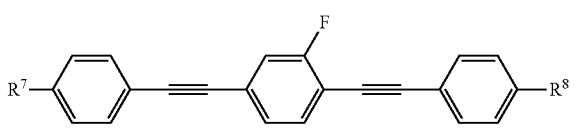

(14-1)
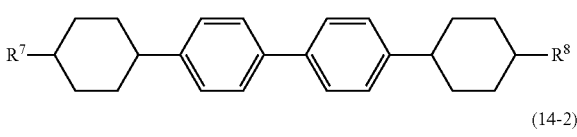

(14-2)
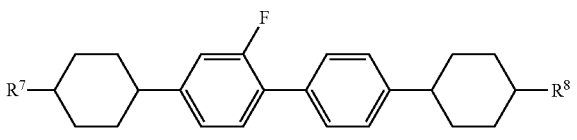

(14-3)
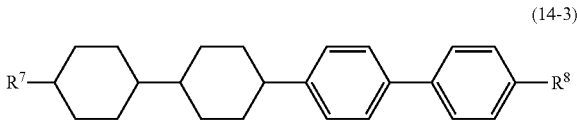

(14-4)
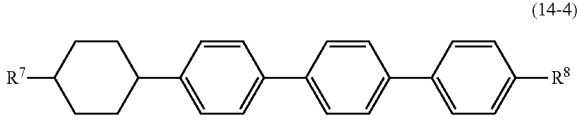

(14-5)
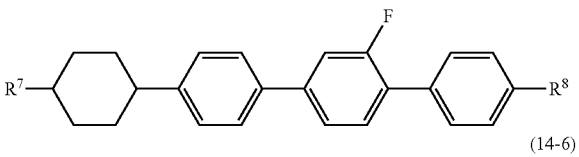

(14-6)

In the formulas, the definitions of $R^7$ and $R^8$ are just the same as those described previously.

The compounds (12) to (14) (the component E) are close to neutral, since the absolute value of the dielectric anisotropy is small. The compound (12) is effective mainly in adjusting the viscosity or adjusting the refractive index anisotropy. The compounds (13) and (14) are effective in increasing the temperature range of a nematic phase, which is caused by an increase in the clearing point for instance, or adjusting the refractive index anisotropy.

As the content of the component E is increased, the threshold voltage of the liquid crystal composition increases and the viscosity decreases. Accordingly, it is desirable that the content should increase as long as the required value of the threshold voltage of the liquid crystal composition is satisfied. The content of the component E is preferably 30% by weight or more, and more preferably 50% by weight or more based on the total amount of the composition, in the preparation of the liquid crystal composition for use in a TFT mode or a PSA mode. The content of the component E is preferably 30% by weight or more, and more preferably 40% by weight or more based on the total amount of the composition, in the preparation of the liquid crystal composition for use in a TN mode, a STN mode or a PSA mode.

The liquid crystal composition of the invention is desirable to include at least one of the compound (1) of the invention in the range of 0.1% to 99% by weight for exhibiting excellent characteristics.

The liquid crystal composition of the invention is generally prepared according to known methods such as the mutual dissolution of necessary components at a high temperature, for example. An additive that is well-known to a person skilled in the art may be added to the composition depending on its intended use. For example, a liquid crystal composition of the invention, including an optically active compound, or including a polymerizable compound and a polymerization initiator, or a liquid crystal composition, to which a dye is added, for use in a GH mode can be prepared, those of which will be described below. The additive is generally well known to a person skilled in the art, and is described in the literature and so forth in detail.

In the liquid crystal composition of the invention, one or more optically active compounds may be added to the liquid crystal composition of the invention described above.

A known chiral dopant is added as an optically active compound. The chiral dopant is effective in inducing a helical structure in liquid crystals, adjusting a necessary twist angle and thus preventing a reverse twist. Examples of the chiral dopant include the following optically active compounds (Op-1) to (Op-13).

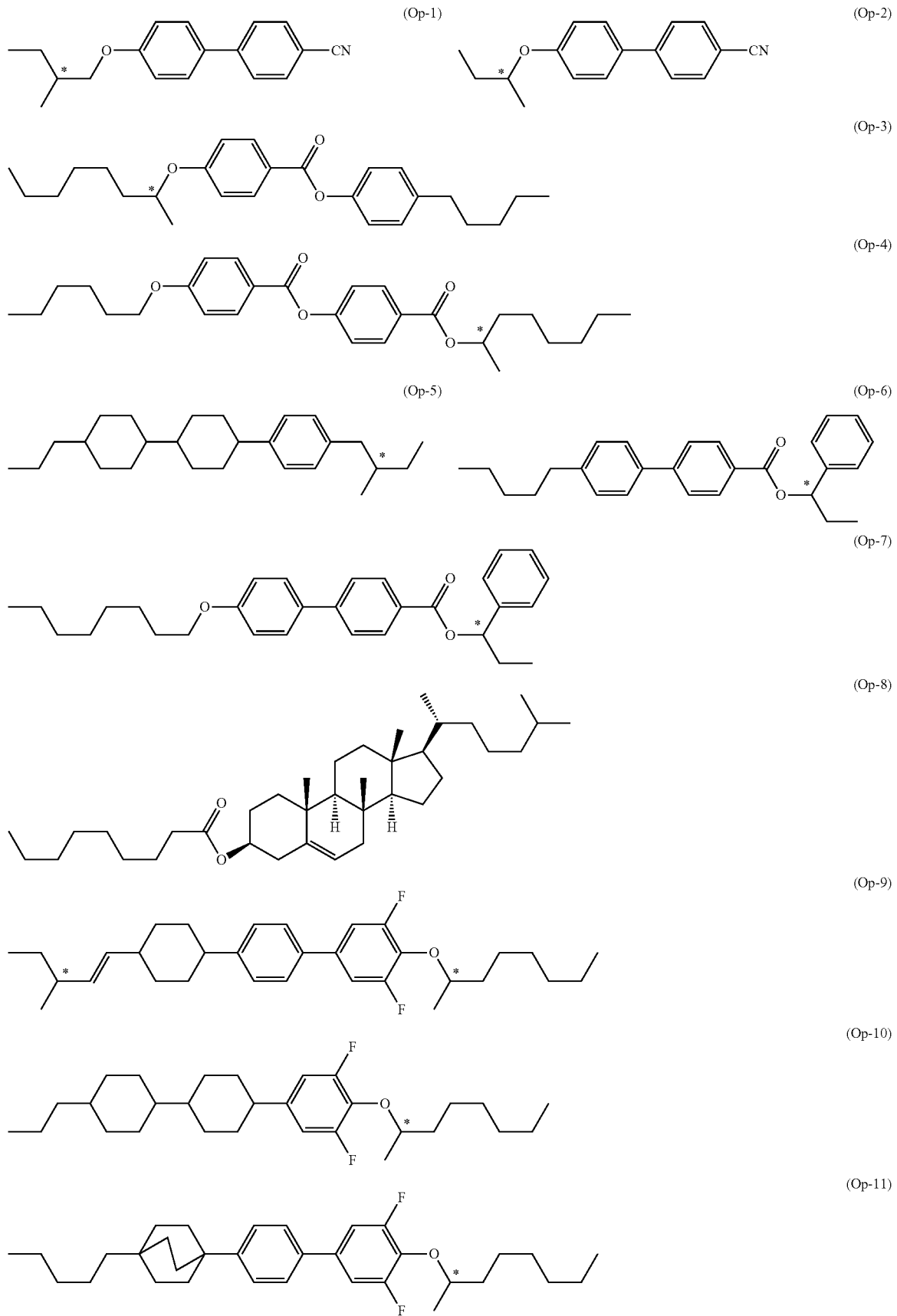

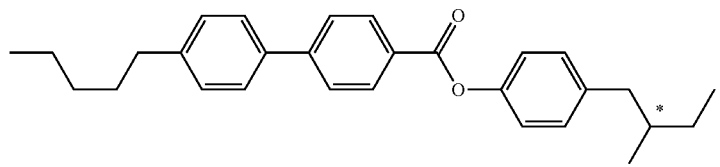

(Op-12)

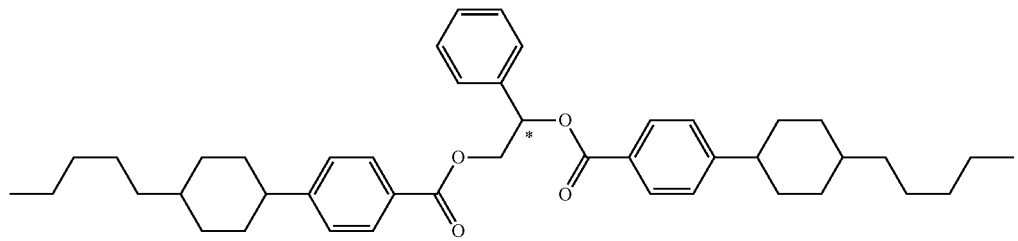

(Op-13)

A helical pitch is usually adjusted by the addition of this optically active compound to the liquid crystal composition of the invention. It is desirable to adjust the helical pitch to the range of 40 micrometers to 200 micrometers in a liquid crystal composition for use in a TFT mode and a TN mode. It is desirable to adjust the helical pitch to the range of 6 micrometers to 20 micrometers in a liquid crystal composition for use in a STN mode. It is desirable to adjust the helical pitch to the range of 1.5 micrometers to 4 micrometers for use in a BTN (bistable twisted nematic) mode. Two or more optically active compounds may be added for the purpose of adjusting the temperature dependence of the helical pitch.

The liquid crystal composition of the invention can be used as a liquid crystal composition for use in a GH mode by the addition of a dichroic dye such as a merocyanine, stylyl, azo, azomethine, azoxy, quinophthalone, anthraquinone or tetrazine compound.

The liquid crystal composition of the invention can be used as a liquid crystal composition for a NCAP-device prepared by micro-encapsulating nematic liquid crystals, and for a polymer-distributed liquid crystal display device (PDLCD) prepared by forming a three-dimensional network polymer in liquid crystals, such as a polymer network liquid crystal display device (PNLCD), and also for use in an ECB (electrically controlled birefringence) mode or a DS mode.

The liquid crystal composition of the invention can be used as a liquid crystal composition for use in a PSA (polymer sustained alignment) mode by the addition of a polymerizable compound. Examples of the polymerizable compound include compounds having polymerizable groups such as acrylates, methacrylates, vinyl compounds, vinyloxy compounds, propenyl ethers, epoxy compounds, vinyl ketones and oxetanes. The polymerizable compound is polymerized on irradiation with ultraviolet light or the like, preferably in the presence of a suitable initiator such as a photopolymerization initiator. Suitable conditions for the polymerization, and a suitable type and a suitable amount of the initiator are known to a person skilled in the art and are described in the literature. For example, Irgacure 651 (registered trademark), Irgacure 184 (registered trademark) or Darocure 1173 (registered trademark) (Ciba Japan K.K.), each of which is a photo-initiator, is suitable for radical polymerization.

The invention will be explained below in more detail based on examples, and the invention is not limited to the examples at the same time. The term "%" means "weight %," unless otherwise noted.

Analytical methods will be explained first, since the resulting compounds herein were identified on the basis of nuclear magnetic resonance spectra obtained by means of $^1$H-NMR analysis, gas chromatograms obtained by means of gas chromatography (GC) analysis and so forth.

$^1$H-NMR Analysis:

A model DRX-500 apparatus (made by Bruker BioSpin Corporation) was used for measurement. Samples prepared in the examples and so forth were dissolved in a deuterated solvent such as $CDCl_3$ in which the samples were soluble, and the measurement was carried out under the conditions of room temperature, twenty-four times of accumulation and 500 MHz. Tetramethylsilane (TMS) was used as the standard reference material for the zero point of the chemical shift ($\delta$ values).

GC Analysis

A Gas Chromatograph Model GC-14B made by Shimadzu Corporation was used for measurement. A capillary column CBP1-M25-025 (length 25 m, bore 0.22 mm, film thickness 0.25 micrometer; dimethylpolysiloxane as a stationary liquid phase; non-polar) made by Shimadzu Corporation was used. Helium was used as a carrier gas, and its flow rate was adjusted to 1 ml per minute. The temperature of the sample injector was set at 280° C. and the temperature of the detector (FID) was set at 300° C.

A sample was dissolved in toluene to give a 1% by weight solution, and then 1 microliter of the resulting solution was injected into the sample injector.

Chromatopac Model C-R6A made by Shimadzu Corporation or its equivalent was used as a recorder. The resulting gas chromatogram showed the retention time of the peaks and the values of the peak areas corresponding to the component compounds.

Incidentally, chloroform or hexane, for example, may also be used as a solvent for diluting the sample. The following capillary columns may also be used: DB-1 (length 30 m, bore 0.32 mm, film thickness 0.25 micrometer) made by Agilent Technologies Inc., HP-1 (length 30 m, bore 0.32 mm, film thickness 0.25 micrometer) made by Agilent Technologies Inc., Rtx-1 (length 30 m, bore 0.32 mm, film thickness 0.25 micrometer) made by Restek Corporation, BP-1 (length 30 m, bore 0.32 mm, film thickness 0.25 micrometer) made by SGE International Pty. Ltd, and so forth.

The ratio of the peak areas in the gas chromatogram corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used.

Samples for the Measurement of the Physical Properties of Compounds and so Forth Two kinds of samples are used for measuring the physical properties of a compound: one is the compound itself, and the other is a mixture of the compound and mother liquid crystals.

In the latter case using a sample in which the compound is mixed with mother liquid crystals, the measurement is carried out according to the following method. First, the sample is prepared by mixing 15% by weight of the compound that will be measured and 85% by weight of the mother liquid crystals. Then, extrapolated values are calculated from the measured values of the resulting sample by means of an extrapolation method based on the following formula. The extrapolated values are regarded as the physical properties of this compound.

[Extrapolated value]=(100×[Measured value of sample]−[% by weight of mother liquid crystals]×[Measured value of mother liquid crystals])/[% by weight of compound]

When a smectic phase appears at 25° C. or crystals deposit at 25° C. even at this ratio of the compound to the mother liquid crystals, the ratio of the compound to the mother liquid crystals is changed in the order of (10% by weight: 90% by weight), (5% by weight: 95% by weight) and (1% by weight: 99% by weight). The physical properties of the sample are measured at the ratio in which the smectic phase does not appear at 25° C. or the crystals does not deposit at 25° C. Extrapolated values are determined according to the above equation, and are regarded as the physical properties of the compound.

There are a variety of mother liquid crystals used for measurement and, for example, each component of the mother liquid crystals (A) is shown below.

Mother liquid crystals (A):

$C_3H_7$—⟨cyclohexyl⟩—COO—⟨phenyl⟩—$OC_2H_5$    17.2%

$C_3H_7$—⟨cyclohexyl⟩—COO—⟨phenyl⟩—$OC_4H_9$    27.6%

$C_4H_9$—⟨cyclohexyl⟩—COO—⟨phenyl⟩—$OC_2H_5$    20.7%

$C_5H_{11}$—⟨cyclohexyl⟩—COO—⟨phenyl⟩—$OCH_3$    20.7%

$C_5H_{11}$—⟨cyclohexyl⟩—COO—⟨phenyl⟩—$OC_2H_5$    13.8%

Incidentally, in the case where the physical properties of a liquid crystal composition were measured, the liquid crystal composition itself was used as a sample.

Methods for Measurements of the Physical Properties of Compounds and so Forth

The physical properties of compounds were measured according to the following methods. Most are measurement methods described in the Standard of Electronic Industries Association of Japan, EIAJ•ED-2521A, or the modified methods. No TFT was attached to a TN device or a VA device used for measurement.

In measured values, when a compound itself or a liquid crystal composition itself was employed as a sample, a measured value itself was described here as experimental data. When a sample was prepared by mixing the compound with mother liquid crystals, values calculated from measured values according to the extrapolation method was described here as extrapolated values.

Phase Structure and Transition Temperature (° C.)

Measurements were carried out according to the following methods (1) and (2).

(1) A compound was placed on a hot plate of a melting point apparatus (Hot Stage Model FP-52 made by Mettler Toledo International Inc.) equipped with a polarizing microscope, and the phase conditions and their changes were observed with the polarizing microscope, specifying the kind of phase while the compound was heated at the rate of 3° C. per minute.

(2) A sample was heated and then cooled at the rate of 3° C. per minute using a Perkin-Elmer differential scanning calorimeter, a DSC-7 System or a Diamond DSC System. The starting point of an endothermic peak or an exothermic peak caused by the phase change of the sample was obtained by means of the extrapolation (on set), and thus the phase transition temperature was determined.

Hereinafter, the symbol C stood for crystals, which were expressed as $C_1$ or $C_2$ when the kind of crystals was distinguishable. The symbols S and N stood for a smectic phase and a nematic phase, respectively. The symbol Iso stood for a liquid (isotropic). When a smectic B phase or a smectic A were distinguishable in the smectic phases, they were expressed as $S_B$ and $S_A$, respectively. Phase-transition temperatures were expressed as, for example, "C 50.0 N 100.0 Iso", which means that the phase-transition temperature from crystals to a nematic phase (CN) is 50.0° C., and the phase-transition temperature from the nematic phase to a liquid (NI) is 100.0° C. The same applied to the other transition temperatures.

Maximum Temperature of a Nematic Phase ($T_{NI}$; ° C.):

A sample (a liquid crystal composition, or a mixture of a liquid crystal compound and mother liquid crystals) was placed on a hot plate of a melting point apparatus (Hot Stage Model FP-52 made by Mettler Toledo International Inc.) equipped with a polarizing microscope, and was observed with the polarizing microscope while being heated at the rate of 1° C. per minute. A maximum temperature meant a temperature measured when part of the sample began to change from a nematic phase to an isotropic liquid. Hereinafter, the maximum temperature of a nematic phase may simply be abbreviated to "the maximum temperature."

Compatibility at Low Temperatures:

Samples were prepared by mixing a compound with mother liquid crystals so that the amount of the compound became 20% by weight, 15% by weight, 10% by weight, 5% by weight, 3% by weight and 1% by weight, and were placed in glass vials. After these glass vials had been kept in a freezer at −10° C. or −20° C. for a certain period of time, they were observed as to whether or not crystals or a smectic phase had been deposited.

Viscosity (Bulk Viscosity; η; Measured at 20° C.; mPa·s)

It is characterized that as viscosity (bulk viscosity) is decreased, response time decreases.

An E-type viscometer was used for measurement.

Viscosity (Rotational Viscosity; γ1; Measured at 25° C.; mPa·s)

It is characterized that as rotational viscosity is decreased, response time decreases.

Rotational viscosity was measured according to the method described in M. Imai, et al., Molecular Crystals and Liquid Crystals, Vol. 259, p. 37 (1995). A sample (a liquid crystal composition, or a mixture of a compound and mother liquid crystals) was poured into a VA device in which the distance between the two glass substrates (cell gap) was 20 micrometers. A voltage in the range of 30 V to 50 V was applied stepwise with an increment of 1 volt to the device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from the measured values and the calculating equation (8) on page 40 of the paper presented by M. Imai, et al. Incidentally, the value of the dielectric anisotropy (Δ∈) necessary for the present calculation was obtained by the method described below under the heading "Dielectric Anisotropy."

Refractive Index Anisotropy (Δn; Measured at 25° C.)

Measurement was carried out using an Abbe refractometer with a polarizing plate attached to the ocular, on irradiation with light at a wavelength of 589 nm at a temperature of 25° C. The surface of the main prism was rubbed in one direction, and then a sample (a liquid crystal composition, or a mixture of a compound and mother liquid crystals) was dropped onto the main prism. The refractive index (n∥) was measured when the direction of the polarized light was parallel to that of the rubbing. The refractive index (n⊥) was measured when the direction of polarized light was perpendicular to that of the rubbing. The value of the refractive index anisotropy was calculated from the equation: Δn=n∥−n⊥.

Dielectric Anisotropy (Δ∈; Measured at 25° C.)

An ethanol (20 mL) solution of octadecyltriethoxysilane (0.16 mL) was applied to a well-washed glass substrate. The glass substrate was rotated with a spinner, and then heated at 150° C. for 1 hour. A VA device in which the distance (cell gap) was 20 micrometers was assembled from the two glass substrates.

A polyimide alignment film was prepared on glass substrates in a similar manner. After a rubbing-treatment to the alignment film formed on the glass substrates, a TN device in which the distance between the two glass substrates was 9 micrometers and the twist angle was 80 degrees was assembled.

A sample (a liquid crystal composition, or a mixture of a compound and mother liquid crystals) was poured into the resulting VA device, a voltage of 0.5 V (1 kHz, sine waves) was applied to the sample, and then the dielectric constant (∈∥) in the major axis direction of the liquid crystal molecules was measured.

The sample (the liquid crystal composition, or the mixture of the compound and the mother liquid crystals) was poured into the resulting TN device, a voltage of 0.5 V (1 kHz, sine waves) was applied to the sample, and then the dielectric constant (∈⊥) in the minor axis direction of the liquid crystal molecules was measured.

The value of the dielectric anisotropy was calculated from the equation of (Δ∈)=(∈∥)−(∈⊥).

SYNTHETIC EXAMPLE OF THE COMPOUND

Example 1

Preparation of 2-[4-(4-ethoxy-2,3-difluorophenoxymethyl)-6-propyldecahydronaphthalene (the compound No. 3)

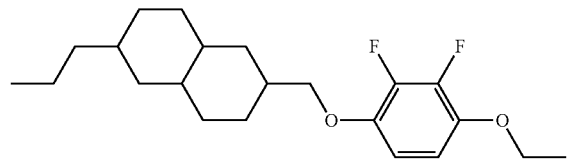

First Step:

Toluene (200 ml) and pyrrolidine (90 ml) were added to 4-propylcyclohexanone (53.0 g) in a reaction vessel equipped with a Dean-Stark apparatus under an atmosphere of nitrogen. The mixture was refluxed for 3 hours while the water formed was removed by a Dean-Stark apparatus. After the reaction mixture had been cooled to a room temperature, it was washed with brine, and dried over anhydrous magnesium sulfate. The toluene was distilled off under reduced pressure to give 1-(4-propylcyclohex-1-enyl)pyrrolidine (58.2 g).

Second Step:

Toluene (300 ml) and methyl vinyl ketone (42 ml) were added to 1-(4-propylcyclohex-1-enyl)pyrrolidine (58.2 g) in a reaction vessel at room temperature under an atmosphere of nitrogen, and the mixture was refluxed for 6 hours. After the reaction mixture had been cooled to a room temperature, 2N-hydrochloric acid (200 ml) was added and the mixture was stirred for 15 minutes. The reaction mixture was washed with brine, and dried over anhydrous magnesium sulfate. The toluene was distilled off under reduced pressure to give 2-(3-oxobutyl)-4-propylcyclohexanone (34.3 g).

Third Step:

Sodium methoxide (17.6 g) was added to absolute methanol (300 ml) in a reaction vessel under an atmosphere of nitrogen, and an absolute methanol (300 ml) solution of 2-(3-oxobutyl)-4-propylcyclohexanone (34.3 g) obtained in the second step was added dropwise at room temperature, and the mixture was stirred for 90 minutes. 1N-Hydrochloric acid (300 ml) was added, and the aqueous layer was extracted with ethyl acetate. The combined organic layers were washed with brine, and dried over anhydrous magnesium sulfate, and then the methanol was distilled off under reduced pressure. The residue was purified by silica gel column chromatography (eluent: ethyl acetate/n-heptane=1/9 by volume) to give 6-propyl-4,4a,5,6,7,8-hexahydronaphthalene-2(3H)-one (21.9 g).

Fourth Step:

Liquid ammonia (300 ml) was placed in a reaction vessel at room temperature under an atmosphere of nitrogen, and lithium (3.6 g) and then ethanol (10 ml) were added. A THF (150 ml) solution of 6-propyl-4,4a-5,6,7,8-hexahydronaphthalene-2(3H)-one (21.9 g) obtained in the third step was added dropwise, and the mixture was stirred for 30 minutes.

After ammonium chloride (25 g) had been added, the ammonia was distilled of at room temperature, and then water (200 ml) was added. The mixture was extracted with toluene, washed with water, and then dried over anhydrous magnesium sulfate. The toluene was distilled off under reduced pressure. The residue was purified by silica gel column chromatography (eluent: ethyl acetate/n-heptane=1/9 by volume) to give 6-propyl-octahydronaphthalene-2(1H)-one (14.8 g).

Fifth Step:

THF (200 ml) was added to methoxymethyltriphenylphosphonium chloride (30.3 g) in a reaction vessel under an atmosphere of nitrogen, and the solution was cooled to −20° C. t-BuOK (9.9 g) in a THF (50 ml) solution was added, and the mixture was stirred for 1 hour. A THF (100 ml) solution of 6-propyl-octahydronaphthalene-2(1H)-one (13.3 g) obtained in the fourth step was added dropwise, and the mixture was stirred for 1 hour. The reaction mixture was warmed to room temperature, and water (100 ml) was added. The mixture was extracted with toluene. The resulting organic layers were washed with water, and dried over anhydrous magnesium sulfate. The solution was concentrated to about 200 ml under reduced pressure. The concentrated solution was poured into n-hexane (1,000 ml), and solids deposited were filtered off. The solvent was distilled off from the resulting solution, and the residue was purified by silica gel column chromatography (eluent: ethyl acetate/n-heptane=1/20 by volume) to give 2-methoxymethylene-6-propyldecahydronaphthalene (13.3 g).

Sixth Step:

2-Methoxymethylene-6-propyldecahydronaphthalene (13.3 g) obtained in the fifth step was dissolved in acetone (100 ml), and hydrochloric acid (4M; 30 ml) was added, and then the mixture was stirred at room temperature for 3 hours. Water (100 ml) was added to the reaction mixture, which was extracted with toluene. The combined organic layers were washed with water, dried over anhydrous magnesium sulfate. The solvent was distilled off under reduced pressure. Ethanol (100 ml) was added to the residue, and aqueous sodium hydroxide solution (20%; 15 ml) was added under ice-cooling, and then the mixture was stirred at room temperature for 2 hours. A saturated aqueous solution of ammonium chloride was added for neutralization, and the mixture was extracted with toluene. The combined organic layers were washed with water, and dried over anhydrous magnesium sulfate. The toluene was distilled off under reduced pressure. The residue was purified by silica gel column chromatography (eluent: ethyl acetate/n-heptane=1/9 by volume) to give 6-propyl-decahydronaphthalene-2-carboxaldehyde (12.1 g).

Seventh Step:

6-Propyldecahydronaphthalene-2-carboxaldehyde (6.0 g) obtained in the sixth step was dissolved in EtOH (50 ml). Sodium borohydride (1.2 g) was added in small portions under ice-cooling, and the mixture was stirred at room temperature for 15 hours. Water (100 ml) was added and the mixture was extracted with toluene. The combined organic layers were washed with water, and dried over anhydrous magnesium sulfate. The toluene was distilled off under reduced pressure. The residue was purified by silica gel column chromatography (eluent: ethyl acetate/n-heptane=1/2 by volume) to give (6-propyldecahydronaphthalene-2-yl) methanol (4.2 g).

Eighth Step:

(6-Propyldecahydronaphthalene-2-yl)methanol (4.2 g) obtained in the seventh step was dissolved in dichloromethane (50 ml), and p-toluenesulfonyl chloride (3.8 g) was added. Pyridine (11.0 g) in a dichloromethane (50 ml) solution was added under ice-cooling, and the mixture was stirred at room temperature for 30 minutes. The reaction mixture was washed with water, and dried over anhydrous magnesium sulfate. The dichloromethane was distilled off under reduced pressure. The residue was purified by silica gel column chromatography (eluent: ethyl acetate/n-heptane=1/9 by volume) to give (6-propyldecahydronaphthalene-2-yl)methyl p-toluenesulfonate (5.8 g).

Ninth Step:

(6-Propyldecahydronaphthalene-2-yl)methyl p-toluenesulfonate (3.0 g) obtained in the eighth step was dissolved in DMF (50 ml). 4-Ethoxy-2,3-difluorophenol (1.4 g) and potassium carbonate (2.2 g) were added, and the mixture was stirred at 60° C. for 5 hours. The reaction mixture was washed with water, and dried over anhydrous magnesium sulfate. The DMF was distilled off under reduced pressure. The residue was purified by silica gel column chromatography (eluent: ethyl acetate/n-heptane=1/20 by volume) and then by recrystallization (solvent: Solmix/n-heptane=1/4 by volume) to give 2((4-ethoxy-2,3-difluorophenoxy)methyl)-6-propyl-decahydronaphthalene (1.8 g).

The chemical shift (δ ppm) in $^1$H-NMR analysis was described below, and the resulting compound was identified as 2-((4-ethoxy-2,3-difluorophenoxy)methyl)-6-propyl-decahydronaphthalene. The solvent for measurement was $CDCl_3$.

Chemical shift (δ ppm): 6.60 (m, 2H), 4.14 (q, 2H), 3.77 (d, 2H) and 1.9-0.8 (m, 26H).

The phase transition temperature of the resulting compound (No. 3) was as follows.

Transition temperature: C 73.5 (N 61.4) Iso.

Example 2

Preparation of 2-(4-(4-ethoxy-2,3-difluorophenoxy) methyl)cyclohexyl)-6-propyldecahydronaphthalene (the compound No. 68)

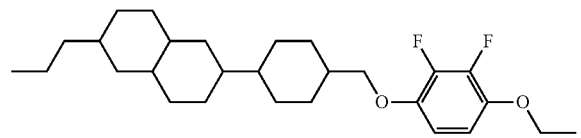

First Step:

Toluene (200 ml) and pyrrolidine (90 ml) were added to 4-(1,4-dioxaspiro[4.5]decan-8-yl)cyclohexanone (100 g) in a reaction vessel equipped with a Dean-Stark apparatus under an atmosphere of nitrogen. The mixture was refluxed for 3 hours while the water formed was removed by a Dean-Stark apparatus. After the reaction mixture had been cooled to a room temperature, it was washed with brine, and dried over anhydrous magnesium sulfate. The toluene was distilled off to give 1-(4-(1,4-dioxaspiro[4.5]decan-8-yl)cyclohex-1-enyl)pyrrolidine (105.8 g).

Second Step:

Toluene (300 ml) and methyl vinyl ketone (42 ml) were added to 1-(4-(1,4-dioxaspiro[4.5]decan-8-yl)cyclohex-1-enyl)pyrrolidine (105.8 g) obtained in the first step in a reaction vessel at room temperature under an atmosphere of nitrogen, and the mixture was refluxed for 6 hours. After the reaction mixture had been cooled to room temperature, sodium acetate (18 g), acetic acid (36 ml) and water (60 ml) were added, and the mixture was refluxed for 4 hours. After the reaction mixture had been cooled to room temperature, water (200 ml) was added, and then the aqueous layer was extracted with ethyl acetate. The combined organic layers were washed with brine, and dried over anhydrous magnesium sulfate. The methanol was distilled off under reduced pressure. The residue was purified by silica gel column chromatography (eluent: ethyl acetate/n-heptane=1/5 by volume) and then by recrystallization (solvent: Solmix/n-heptane=1/9 by volume) to give 6-(1,4-dioxaspiro[4.5]decan-8-yl))-4,4a,5,6,7,8-hexahydronaphthalene-2(3H)-one (43.3 g).

Third Step:

Liquid ammonia (500 ml) was placed in a reaction vessel under an atmosphere of nitrogen, and lithium (4.5 g) and then ethanol (10 ml) were added. A THF (100 ml) solution of 6-(1,4-dioxaspiro[4.5]decan-8-yl)-4,4a,5,6,7,8-hexahydronaphthalene-2(3H)-one (43.3 g) obtained in the second step was added dropwise, and the mixture was stirred for 30 minutes. After ammonium chloride (25 g) had been added, the ammonia was distilled off at room temperature, and water (200 ml) was added. The mixture was extracted with toluene, the extract was washed with water, and then dried over anhydrous magnesium sulfate. The toluene was distilled off under reduced pressure. The residue was purified by silica gel column chromatography (eluent: ethyl acetate/n-heptane=1/9 by volume) to give 6-(1,4-dioxaspiro[4.5]decan-8-yl)-octahydronaphthalene-2(1H)-one (36.0 g).

Fourth Step:

THF (500 ml) was added to propyltriphenylphosphonium bromide (56.9 g) in a reaction vessel under an atmosphere of nitrogen, and the solution was cooled to −20° C. t-BuOK (16.6 g) in a THF (150 ml) solution was added, and the mixture was stirred for 1 hour. A THF (200 ml) solution of 6-(1,4-dioxaspiro[4.5]decan-8-yl)-octahydronaphthalene-2(1H)-one (36.0 g) obtained in the third step was added dropwise, and the mixture was stirred for 1 hour. The reaction mixture was warmed to room temperature, and water (500 ml) was added, and then the mixture was extracted with toluene. The resulting organic layers were washed with water, and dried over anhydrous magnesium sulfate. The solution was concentrated to about 300 ml under reduced pressure. The concentrated solution was poured into n-hexane (1,500 ml), and solids deposited were filtered off. The solvent was distilled off from the resulting solution, and the residue was purified by silica gel column chromatography (eluent: ethyl acetate/n-heptane=1/20 by volume) to give 8-(6-propylidene-decahydronaphthalene-2-yl)-1,4-dioxaspiro[4.5]decane (28.3 g).

Fifth Step:

8-(6-Propylidenedecahydronaphthalene-2-yl)-1,4-dioxaspiro[4.5]decane (28.3 g) obtained in the fourth step was dissolved in toluene (150 ml) and ethanol (300 ml). Pd/C (1.4 g) was added, and the mixture was stirred under a hydrogen atmosphere at room temperature for 15 hours. Pd/C was removed by filtration, and the solvent was distilled off under reduced pressure. The residue was purified by silica gel column chromatography (eluent: ethyl acetate/n-heptane=1/9 by volume) to give 8-(6-propyldecahydronaphthalene-2-yl)-1,4-dioxaspiro[4.5]decane (27.9 g).

Sixth step: Toluene (300 ml) and formic acid (98%; 15 g) were added to 8-(6-propyldecahydronaphthalene-2-yl)-1,4-dioxaspiro[4.5]decane (27.9 g) obtained in the fifth step, and the mixture was stirred for 7 hours. After the reaction mixture had been cooled to room temperature, it was washed with aqueous sodium hydroxide solution (1M) and water, and dried over anhydrous magnesium sulfate. The toluene was distilled off under reduced pressure. The residue was purified by silica gel column chromatography (eluent: ethyl acetate/n-heptane=1/9 by volume) to give 4-(6-propyldecahydronaphthalene-2-yl)cyclohexanone (24.1 g).

Seventh step:

THF (200 ml) was added to methoxymethyltriphenylphosphonium chloride (35.9 g) in a reaction vessel under an atmosphere of nitrogen, and the solution was cooled to −20° C. t-BuOK (11.7 g) in THF (50 ml) solution was added and the mixture was stirred for 1 hour. A THF (200 ml) solution of 4-(6-propyldecahydronaphthalene-2-yl)cyclohexanone (24.1 g) obtained in the sixth step was added dropwise, and the mixture was stirred for 1 hour. The reaction mixture was warmed to room temperature, and water (200 ml) was added. The mixture was extracted with toluene. The resulting organic layers were washed with water, and dried over anhydrous magnesium sulfate. The solution was concentrated to about 200 ml under reduced pressure. The concentrated solution was poured into n-hexane (1,000 ml), and solids deposited were filtered off. The solvent was distilled off from the resulting solution, and the residue was purified by silica gel column chromatography (eluent: ethyl acetate/n-heptane=1/20 by volume) to give 2-(4-(methoxymethylene)cyclohexyl)-6-propyldecahydronaphthalene (20.9 g).

Eighth Step:

2-(4-(Methoxymethylene)cyclohexyl)-6-propyldecahydronaphthalene (20.9 g) obtained in the seventh step was dissolved in acetone (200 ml), and hydrochloric acid (4M; 40 ml) was added, and then the mixture was stirred at room temperature for 3 hours. Water (200 ml) was added, and the mixture was extracted with toluene. The combined organic layers were washed with water, and dried over anhydrous magnesium sulfate. The solvent was distilled off under reduced pressure. Ethanol (200 ml) and toluene (200 ml) were added to the residue, and aqueous sodium hydroxide solution (20%; 20 ml) was added under ice-cooling, and then the mixture was stirred at room temperature for 2 hours. A saturated aqueous solution of ammonium chloride was added to the reaction mixture for neutralization, and the mixture was extracted with toluene. The combined organic layers were washed with water, and dried over anhydrous magnesium sulfate. The toluene was distilled off under reduced pressure. The residue was purified by silica gel column chromatography (eluent: ethyl acetate/n-heptane=1/9 by volume) to give 4-(6-propyldecahydronaphthalene-2-yl)cyclohexanecarboxaldehyde (17.4 g).

Ninth Step:

4-(6-Propyldecahydronaphthalene-2-yl)cyclohexanecarboxaldehyde (17.4 g) obtained in the eighth step was dissolved in EtOH (50 ml). Sodium borohydride (1.2 g) was added in small portions under ice-cooling, and the mixture was stirred at room temperature for 15 hours. Water (100 ml) was added, and the mixture was extracted with toluene. The combined organic layers were washed with water, and dried over anhydrous magnesium sulfate. The toluene was distilled off under reduced pressure. The residue was purified by silica gel column chromatography (eluent: ethyl acetate/n-heptane=1/2 by volume) to give (4-(6-propyldecahydronaphthalene-2-yl)cyclohexyl)methanol (15.2 g).

Tenth Step:

(4-(6-Propyldecahydronaphthalene-2-yl)cyclohexyl)methanol (15.2 g) obtained in the ninth step was dissolved in dichloromethane (150 ml), and p-toluenesulfonyl chloride (10.9 g) was added. Pyridine (32 g) in a dichloromethane (150 ml) solution was added under ice-cooling, and the mixture was stirred room temperature for 30 minutes. The reaction mixture was washed with water, and dried over anhydrous magnesium sulfate. The dichloromethane was distilled off under reduced pressure. The residue was purified by silica gel column chromatography (eluent: ethyl acetate/n-heptane=1/9 by volume) to give (4-(6-propyldecahydronaphthalene-2-yl)cyclohexyl)methyl p-toluenesulfonate (20.3 g).

Eleventh Step:

(4-(6-Propyldecahydronaphthalene-2-yl)cyclohexyl)methyl p-toluenesulfonate (3.5 g) prepared in the tenth step was dissolved in DMF (50 ml). 4-Ethoxy-2,3-difluorophenol (1.6 g) and potassium carbonate (2.2 g) were added, and the mixture was stirred at 70° C. for 5 hours. The reaction mixture was washed with water, and dried over anhydrous magnesium sulfate. The DMF was distilled off under reduced pressure. The residue was purified by silica gel column chromatography (eluent: ethyl acetate/n-heptane=1/20 by volume) and then by recrystallization (solvent: Solmix/n-heptane=1/4 by volume) to give 2-(4-((4-ethoxy-2,3-difluorophenoxy)methyl)cyclohexyl)-6-propyldecahydronaphthalene (2.1 g).

The chemical shift (δ, ppm) in $^1$H-NMR analysis was described below, and the resulting compound was identified as 2-(4-((4-ethoxy-2,3-difluorophenoxy)methyl)cyclohexyl)-6-propyldecahydronaphthalene. The solvent for measurement was $CDCl_3$.

Chemical shift (δ ppm): 6.60 (m, 2H), 4.05 (q, 2H), 3.75 (d, 2H) and 2.0-0.5 (m, 36H).

The phase transition temperature of the resulting compound (No. 68) was as follows.

Transition temperature: C 60.3 N 189.5 Iso.

Example 3

Preparation of 2-((4'-ethoxy-2,2',3,3'-tetrafluorobiphenyl-4-yloxy)methyl)-6-propyldecahydronaphthalene (the compound No. 120)

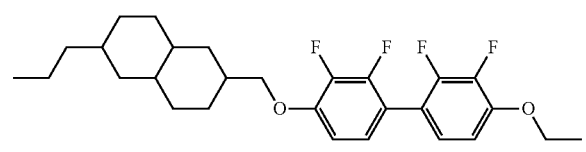 [SMILES: CCCC1CCC2CC(COc3ccc(-c4ccc(OCC)c(F)c4F)c(F)c3F)CCC2C1]

(6-Propyldecahydronaphthalene-2-yl)methyl p-toluenesulfonate (2.5 g) obtained in the eighth step in Example 1 was dissolved in DMF (30 ml). 4'-Ethoxy-2,2',3,3'-tetrafluorobiphenyl-4-ol (2.6 g) and potassium carbonate (1.8 g) were added, and the mixture was stirred at 60° C. for 5 hours. The reaction mixture was washed with water, and dried over anhydrous magnesium sulfate. The solvent was distilled off under reduced pressure. The residue was purified by silica gel column chromatography (eluent: ethyl acetate/n-heptane=1/9 by volume) and then by recrystallization (solvent: Solmix/n-heptane=1/4 by volume) to give 2-((4'-ethoxy-2,2',3,3'-tetrafluorobiphenyl-4-yloxy)methyl)-6-propyldecahydronaphthalene (2.3 g).

The chemical shift (δ, ppm) in $^1$H-NMR analysis was described below, and the resulting compound was identified as 2-((4'-ethoxy-2,2',3,3'-tetrafluorobiphenyl-4-yloxy)methyl)-6-propyldecahydronaphthalene. The solvent for measurement was $CDCl_3$.

Chemical shift (δ ppm): 7.00 (m, 2H), 6.78 (m, 2H), 4.16 (q, 2H), 3.80 (d, 2H) and 2.0-0.8 (m, 26H).

The phase transition temperature of the resulting compound (No. 120) was as follows.

Transition temperature: C 104.9 N 159.4 Iso.

Example 4

Preparation of 2-(4-((4'-ethoxy-2,2',3,3'-tetrafluorobiphenyl-4-yloxy)methyl)cyclohexyl)-6-propyldecahydronaphthalene (the compound No. 391)

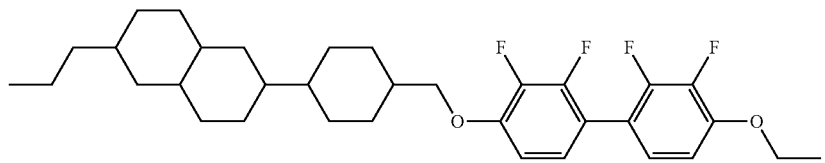

(4-(6-Propyldecahydronaphthalene-2-yl)cyclohexyl)methyl p-toluenesulfonate (2.8 g) obtained in the tenth step in Example 2 was dissolved in DMF (60 ml). 4'-Ethoxy-2,2',3,3'-tetrafluorobiphenyl-4-ol (2.1 g) and potassium carbonate (1.7 g) were added, and the mixture was stirred at 70° C. for 5 hours. The reaction mixture was washed with water, and dried over anhydrous magnesium sulfate. The solvent was distilled off under reduced pressure. The residue was purified by silica gel column chromatography (eluent: ethyl acetate/n-heptane=1/9 by volume) and then by recrystallization (solvent: Solmix/n-heptane=1/4 by volume) to give 2-(4-((4'-ethoxy-2,2',3,3'-tetrafluorobiphenyl-4-yloxy)methyl)cyclohexyl)-6-propyldeca hydronaphthalene (1.9 g).

The chemical shift (δ, ppm) in $^1$H-NMR analysis was described below, and the resulting compound was identified as 2-(4-((4'-ethoxy-2,2',3,3'-tetrafluorobiphenyl-4-yloxy)methyl)cyclohexyl)-6-propyldecahydronaphthalene. The solvent for measurement was $CDCl_3$.

Chemical shift (δ ppm): 7.00 (m, 2H), 6.80 (m, 2H), 4.16 (q, 2H), 3.86 (d, 2H) and 2.0-0.5 (m, 36H).

The phase transition temperature of the resulting compound (No. 391) was as follows.

Transition temperature: C 134.3 N 279.4 Iso.

Example 5

The following compounds (No. 1) to (No. 427) can be produced in a manner similar to that in Examples 1 to 4.

| No. | |
|---|---|
| 1 | 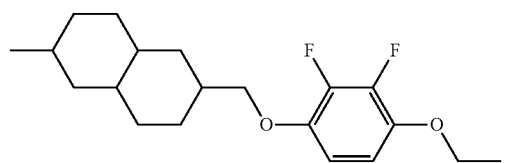 [SMILES: CCOc1ccc(OCC2CCC3CC(C)CCC3C2)c(F)c1F] |
| 2 | 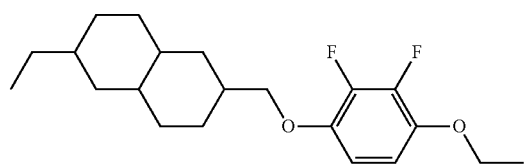 [SMILES: C=CC1CCC2CC(COc3ccc(OCC)c(F)c3F)CCC2C1] |
| 3 | 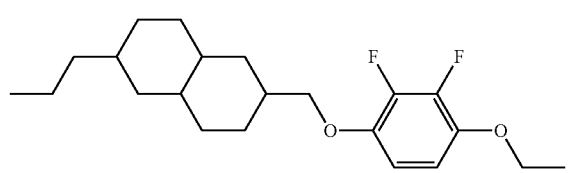 |
| 4 | 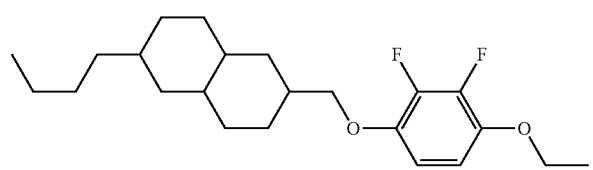 [SMILES: C=CCCC1CCC2CC(COc3ccc(OCC)c(F)c3F)CCC2C1] |
| 5 | 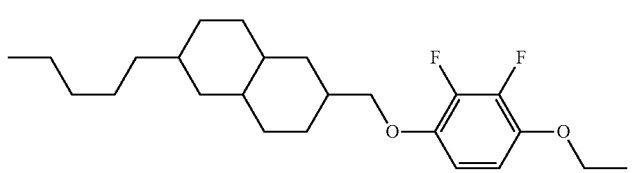 [SMILES: C/C=C/CCC1CCC2CC(COc3ccc(OCC)c(F)c3F)CCC2C1] |
| 6 | 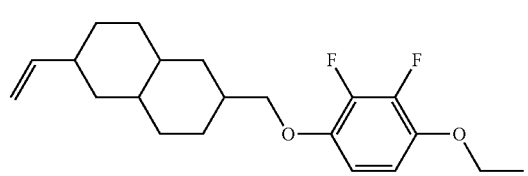 |
| 7 | 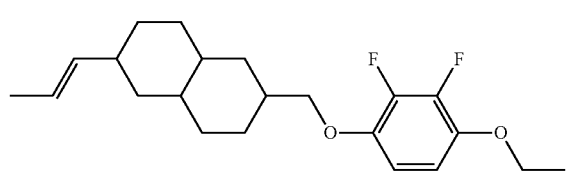 |
| 8 | 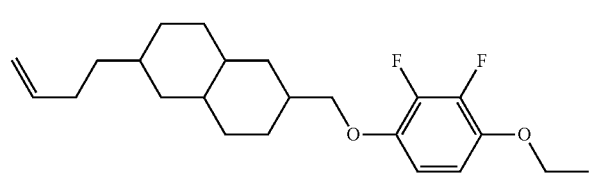 |
| 9 | 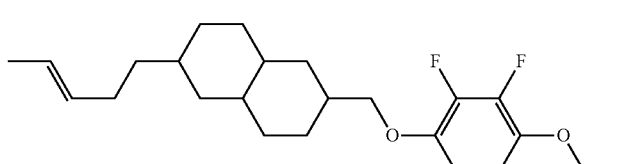 |

| No. | |
|---|---|
| 10 | 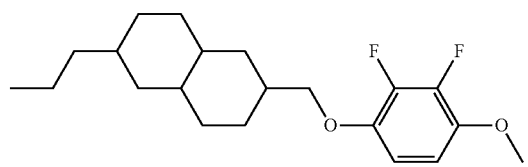 |
| 11 | 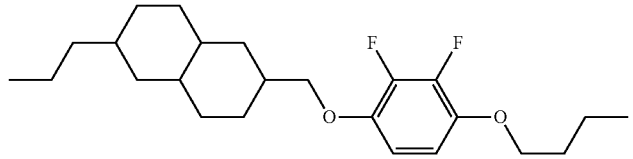 |
| 12 | 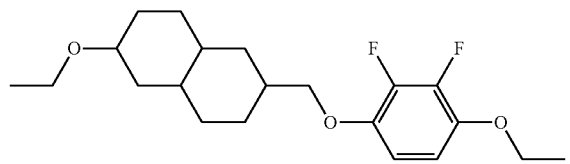 |
| 13 | 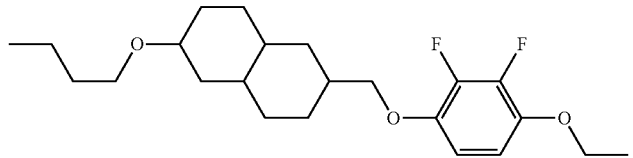 [SMILES: CCCCOC1CCC2CC(COc3ccc(OCC)c(F)c3F)CCC2C1] |
| 14 | 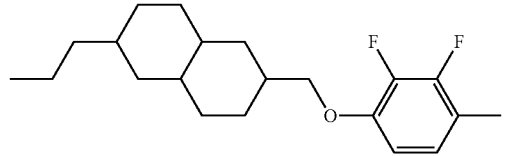 [SMILES: CCCC1CCC2CC(COc3ccc(C)c(F)c3F)CCC2C1] |
| 15 | 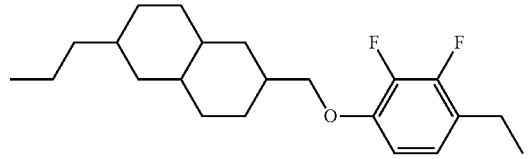 [SMILES: CCCC1CCC2CC(COc3ccc(CC)c(F)c3F)CCC2C1] |
| 16 | 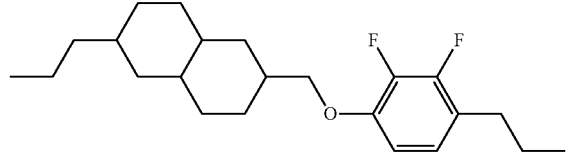 [SMILES: CCCc1ccc(OCC2CCC3CC(CCC)CCC3C2)c(F)c1F] |
| 17 | 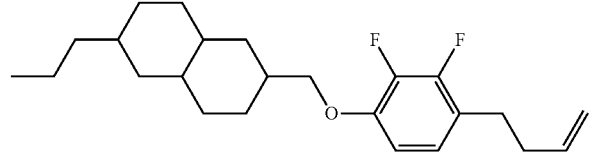 [SMILES: C=CCCc1ccc(OCC2CCC3CC(CCC)CCC3C2)c(F)c1F] |
| 18 | 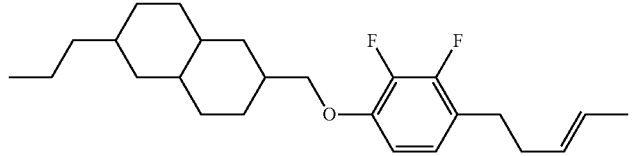 |

| No. | |
|---|---|
| 19 | 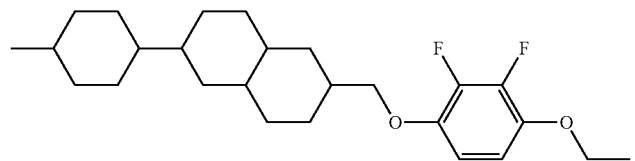 [SMILES: CCOc1ccc(OCC2CCC3CC(C4CCC(C)CC4)CCC3C2)c(F)c1F] |
| 20 | 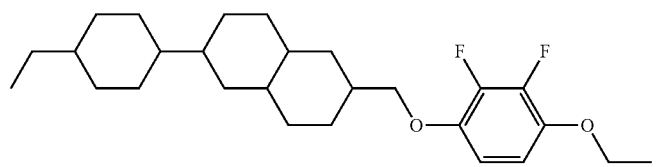 [SMILES: CCOc1ccc(OCC2CCC3CC(C4CCC(CC)CC4)CCC3C2)c(F)c1F] |
| 21 | 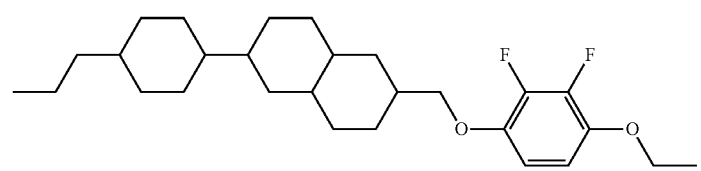 |
| 22 | 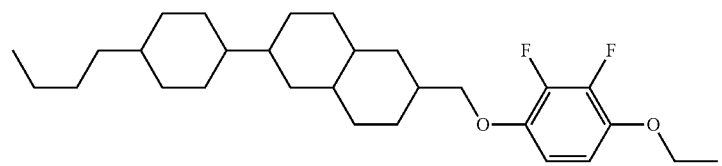 |
| 23 | 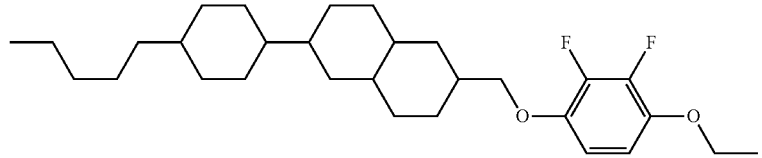 |
| 24 | 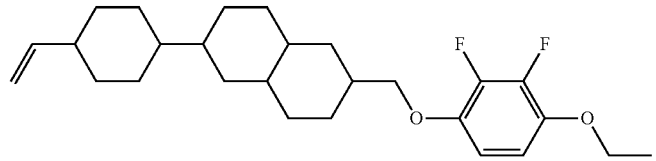 [SMILES: C=CC1CCC(C2CCC3CC(COc4ccc(OCC)c(F)c4F)CCC3C2)CC1] |
| 25 | 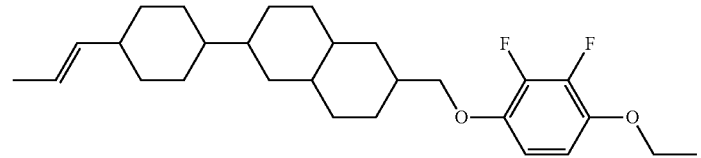 [SMILES: C/C=C/C1CCC(C2CCC3CC(COc4ccc(OCC)c(F)c4F)CCC3C2)CC1] |
| 26 | 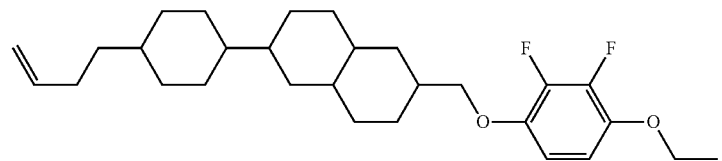 [SMILES: C=CCCC1CCC(C2CCC3CC(COc4ccc(OCC)c(F)c4F)CCC3C2)CC1] |
| 27 | 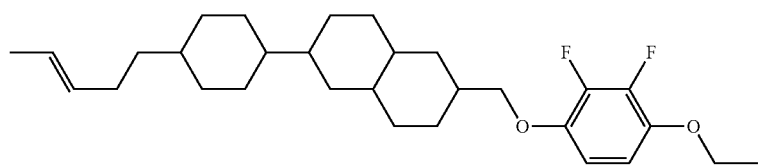 [SMILES: C/C=C/CCC1CCC(C2CCC3CC(COc4ccc(OCC)c(F)c4F)CCC3C2)CC1] |

-continued
| No. | |
|---|---|
| 28 | 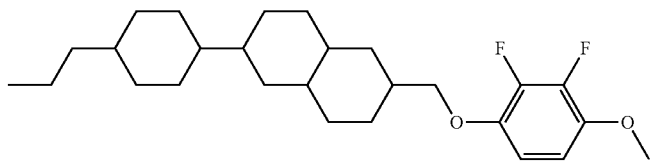 [SMILES: CCCC1CCC(C2CCC3CC(COc4ccc(OC)c(F)c4F)CCC3C2)CC1] |
| 29 | 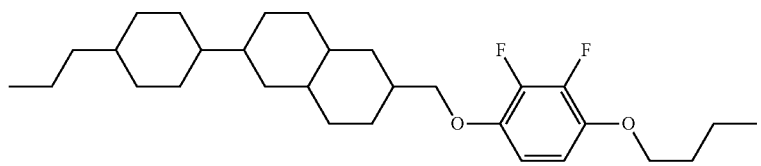 [SMILES: CCCCOc1ccc(OCC2CCC3CC(C4CCC(CCC)CC4)CCC3C2)c(F)c1F] |
| 30 | 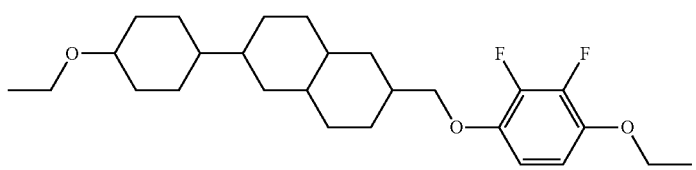 |
| 31 | 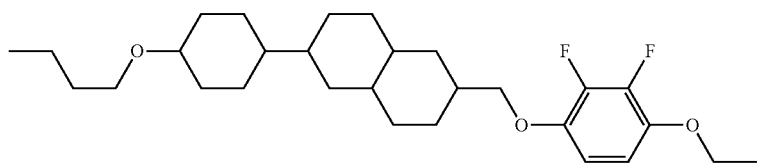 |
| 32 | 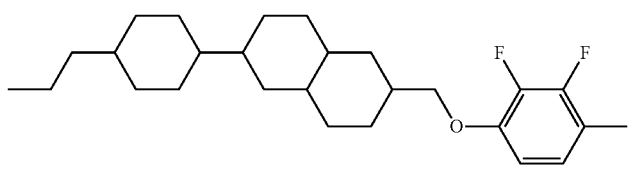 |
| 33 | 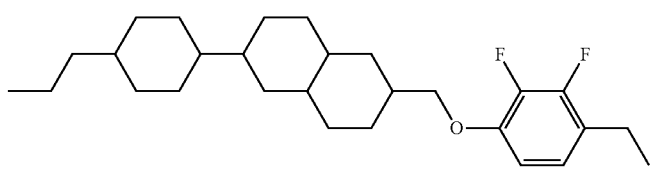 |
| 34 | 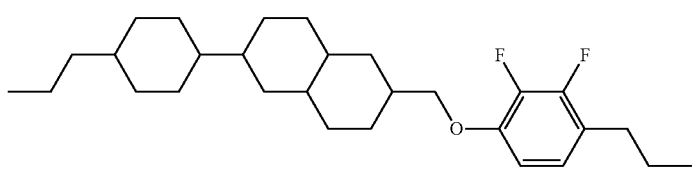 [SMILES: CCOc1ccc(OCC2CCC3CC(C4CCC(OCC)CC4)CCC3C2)c(F)c1F] |
| 35 | 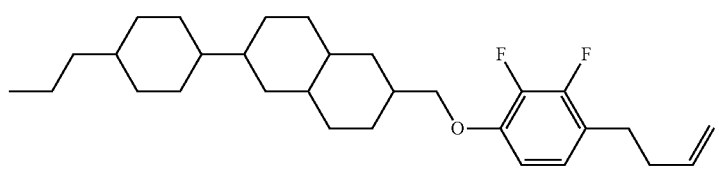 [SMILES: C=CCCc1ccc(OCC2CCC3CC(C4CCC(CCC)CC4)CCC3C2)c(F)c1F] |
| 36 | 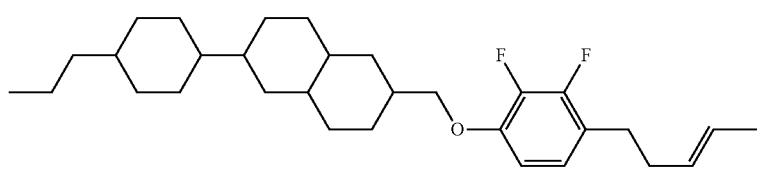 |

| No. | |
|---|---|
| 37 | 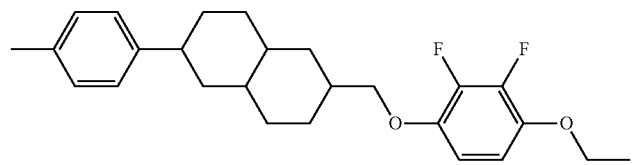 [SMILES: CCOc1ccc(OCC2CCC3CC(c4ccc(C)cc4)CCC3C2)c(F)c1F] |
| 38 | 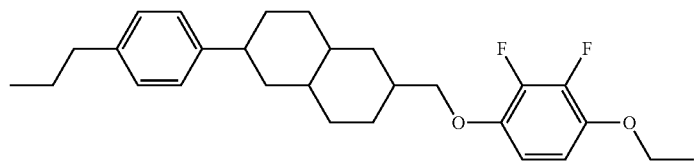 [SMILES: CCCc1ccc(C2CCC3CC(COc4ccc(OCC)c(F)c4F)CCC3C2)cc1] |
| 39 | 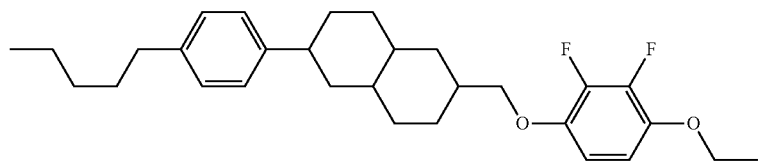 [SMILES: CCCCCc1ccc(C2CCC3CC(COc4ccc(OCC)c(F)c4F)CCC3C2)cc1] |
| 40 | 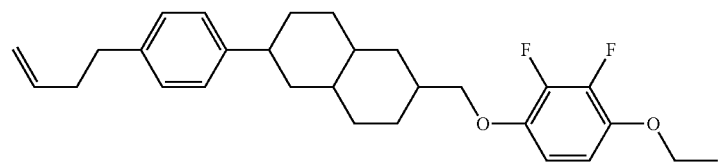 [SMILES: C=CCCc1ccc(C2CCC3CC(COc4ccc(OCC)c(F)c4F)CCC3C2)cc1] |
| 41 | 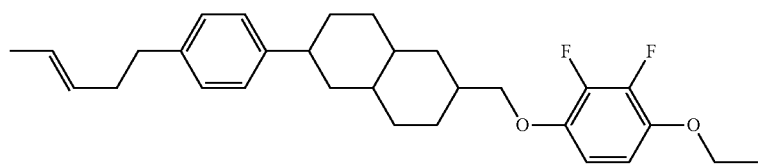 |
| 42 | 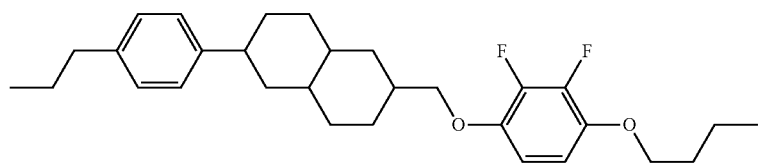 |
| 43 | 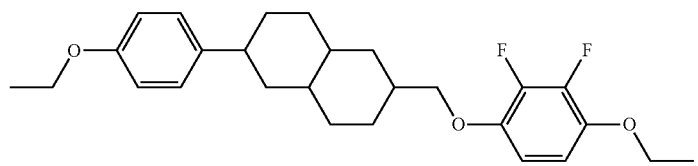 [SMILES: CCOc1ccc(C2CCC3CC(COc4ccc(OCC)c(F)c4F)CCC3C2)cc1] |
| 44 | 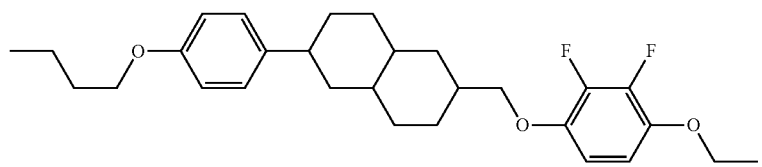 |
| 45 | 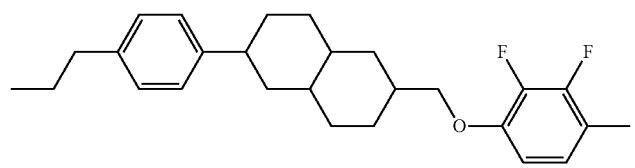 [SMILES: CCCc1ccc(C2CCC3CC(COc4ccc(C)c(F)c4F)CCC3C2)cc1] |

-continued
| No. |  |
|---|---|
| 46 | 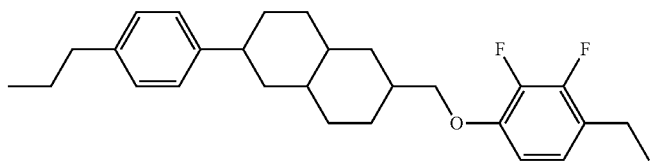 [SMILES: CCCc1ccc(C2CCC3CC(COc4ccc(CC)c(F)c4F)CCC3C2)cc1] |
| 47 | 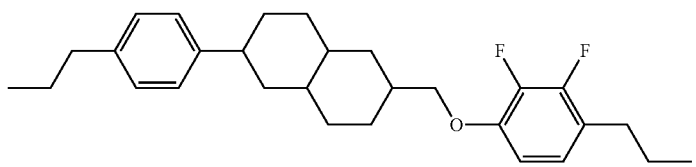 [SMILES: CCCc1ccc(C2CCC3CC(COc4ccc(CCC)c(F)c4F)CCC3C2)cc1] |
| 48 | 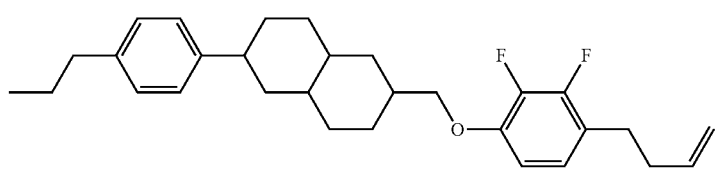 [SMILES: C=CCCc1ccc(OCC2CCC3CC(c4ccc(CCC)cc4)CCC3C2)c(F)c1F] |
| 49 | 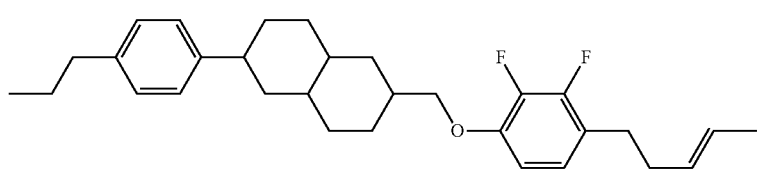 [SMILES: C/C=C/CCc1ccc(OCC2CCC3CC(c4ccc(CCC)cc4)CCC3C2)c(F)c1F] |
| 50 | 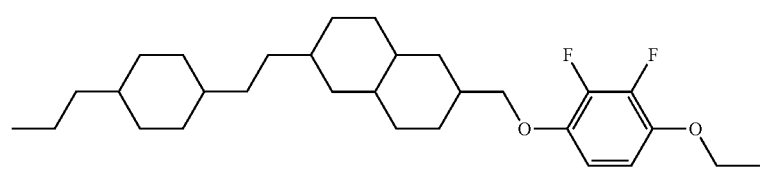 |
| 51 | 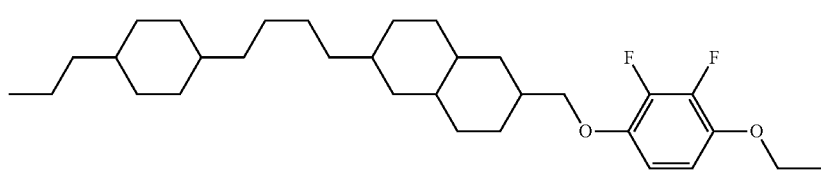 |
| 52 | 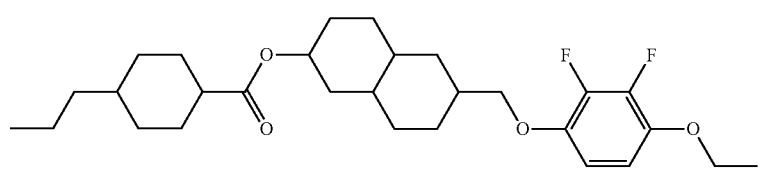 [SMILES: CCCC1CCC(C(=O)OC2CCC3CC(COc4ccc(OCC)c(F)c4F)CCC3C2)CC1] |
| 53 | 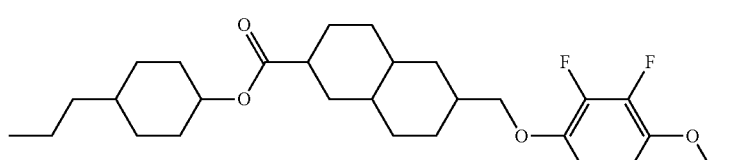 |
| 54 | 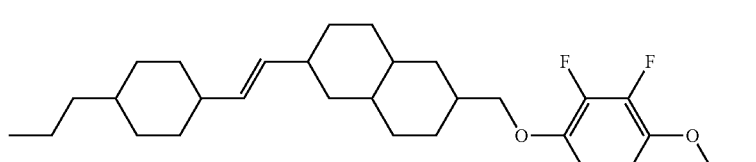 |

| No. |
| --- |
| 55 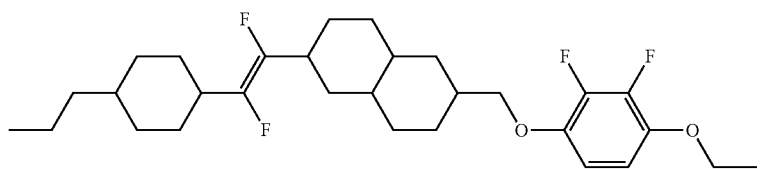 [SMILES: CCCC1CCC(/C(F)=C(\F)C2CCC3CC(COc4ccc(OCC)c(F)c4F)CCC3C2)CC1] |
| 56 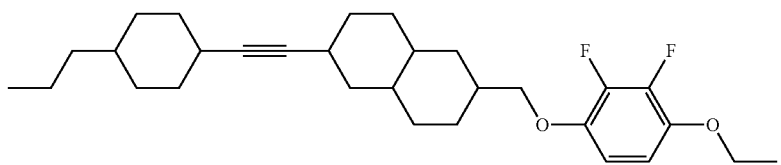 [SMILES: CCCC1CCC(C#CC2CCC3CC(COc4ccc(OCC)c(F)c4F)CCC3C2)CC1] |
| 57 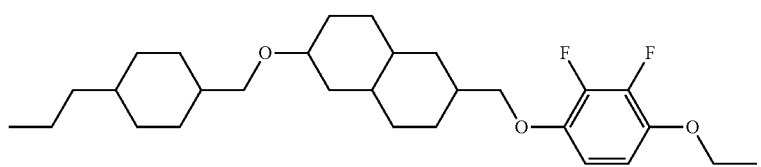 |
| 58 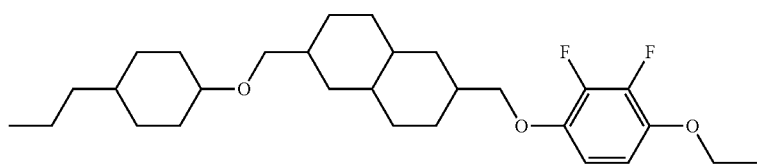 |
| 59 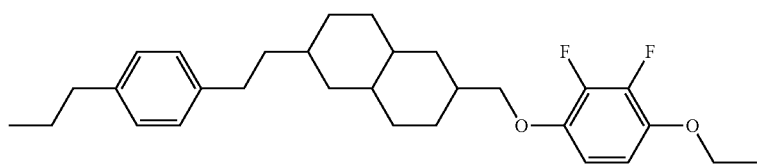 |
| 60 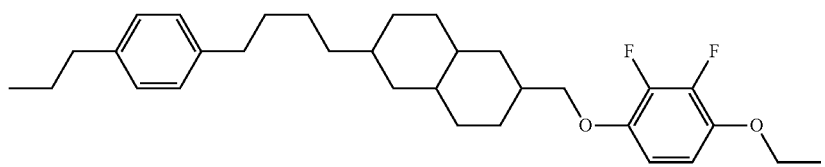 |
| 61 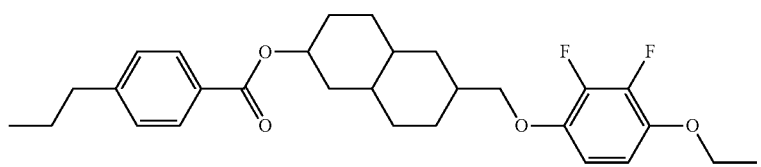 |
| 62 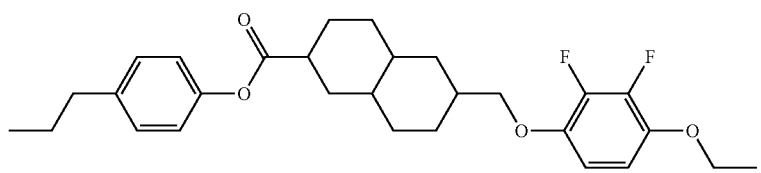 [SMILES: CCCc1ccc(OC(=O)C2CCC3CC(COc4ccc(OCC)c(F)c4F)CCC3C2)cc1] |
| 63 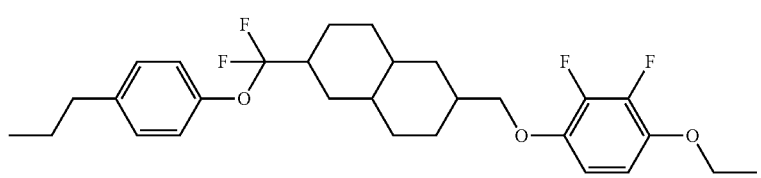 [SMILES: CCCc1ccc(OC(F)(F)C2CCC3CC(COc4ccc(OCC)c(F)c4F)CCC3C2)cc1] |

| No. |
|---|
| 64 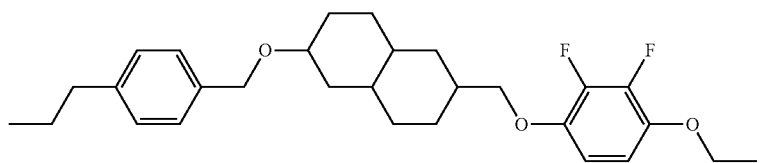 [SMILES: CCCc1ccc(COC2CCC3CC(COc4ccc(OCC)c(F)c4F)CCC3C2)cc1] |
| 65 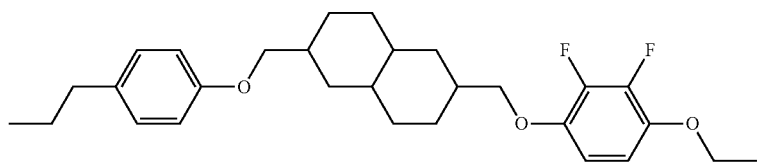 [SMILES: CCCc1ccc(OCC2CCC3CC(COc4ccc(OCC)c(F)c4F)CCC3C2)cc1] |
| 66 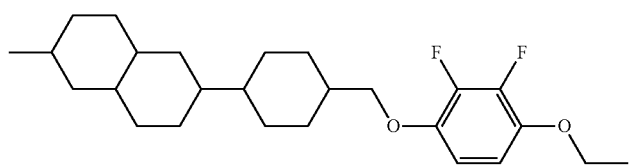 [SMILES: CCOc1ccc(OCC2CCC(C3CCC4CC(C)CCC4C3)CC2)c(F)c1F] |
| 67 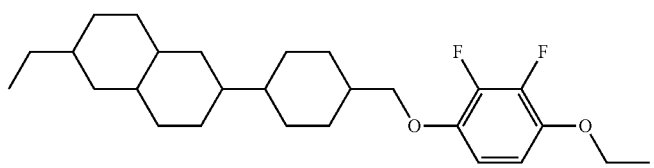 [SMILES: CCOc1ccc(OCC2CCC(C3CCC4CC(CC)CCC4C3)CC2)c(F)c1F] |
| 68 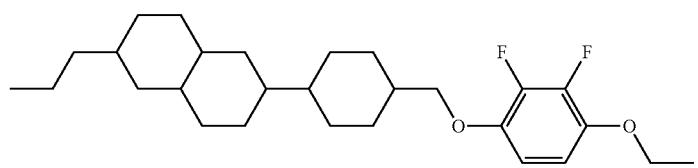 [SMILES: CCCC1CCC2CC(C3CCC(COc4ccc(OCC)c(F)c4F)CC3)CCC2C1] |
| 69 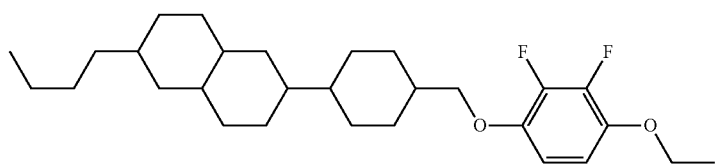 |
| 70 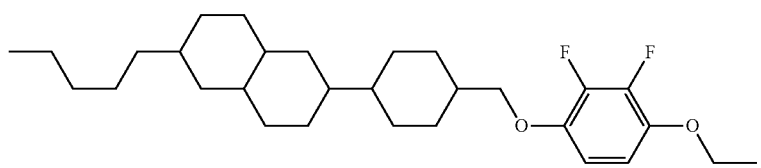 [SMILES: CCCCCC1CCC2CC(C3CCC(COc4ccc(OCC)c(F)c4F)CC3)CCC2C1] |
| 71 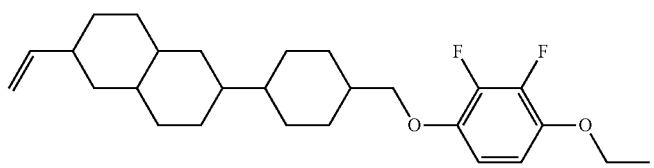 [SMILES: C=CC1CCC2CC(C3CCC(COc4ccc(OCC)c(F)c4F)CC3)CCC2C1] |
| 72 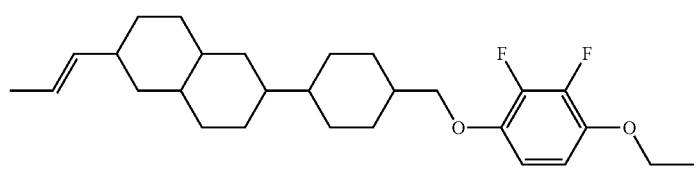 |

| No. | |
|---|---|
| 73 | 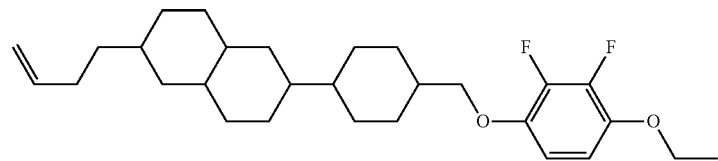 [SMILES: C=CCCC1CCC2CC(C3CCC(COc4ccc(OCC)c(F)c4F)CC3)CCC2C1] |
| 74 | 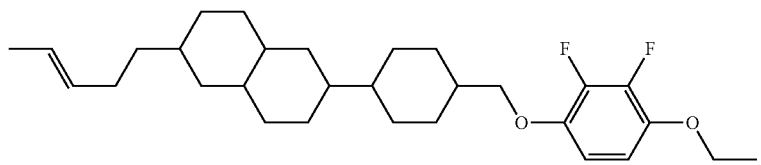 |
| 75 | 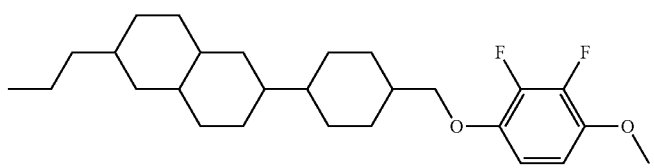 [SMILES: CCCC1CCC2CC(C3CCC(COc4ccc(OC)c(F)c4F)CC3)CCC2C1] |
| 76 | 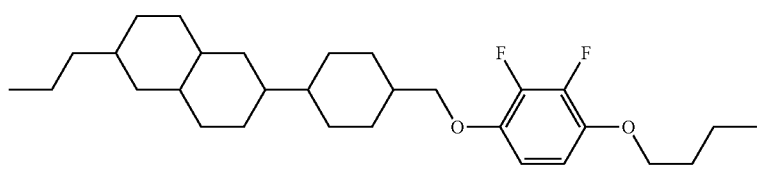 [SMILES: CCCCOc1ccc(OCC2CCC(C3CCC4CC(CCC)CCC4C3)CC2)c(F)c1F] |
| 77 | 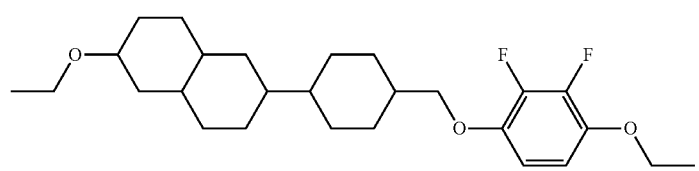 |
| 78 | 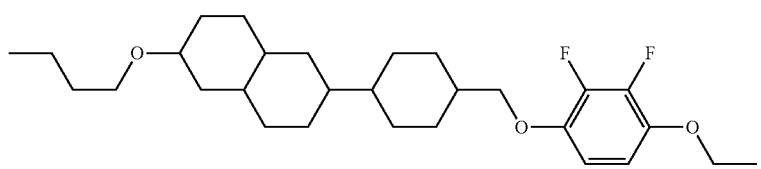 |
| 79 | 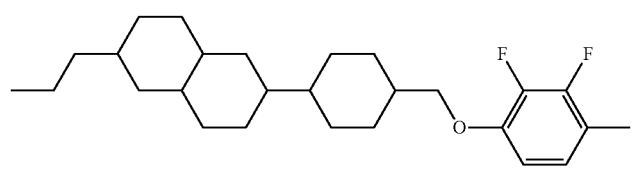 |
| 80 | 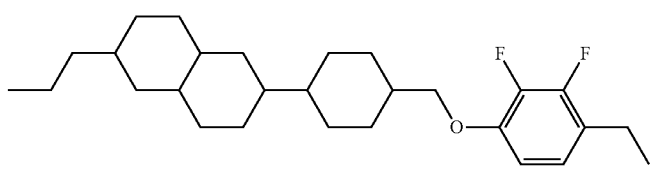 |
| 81 | 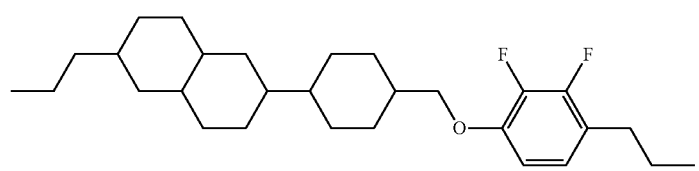 |

-continued
| No. | |
|---|---|
| 82 | 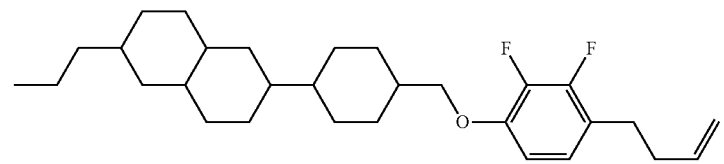 [SMILES: C=CCCc1ccc(OCC2CCC(C3CCC4CC(CCC)CCC4C3)CC2)c(F)c1F] |
| 83 | 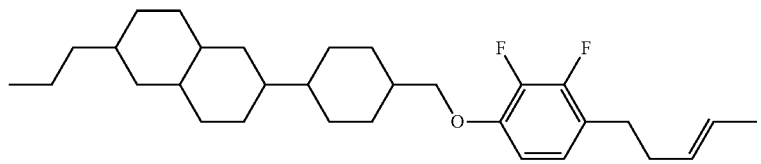 [SMILES: C/C=C/CCc1ccc(OCC2CCC(C3CCC4CC(CCC)CCC4C3)CC2)c(F)c1F] |
| 84 | 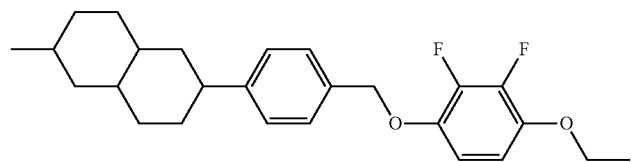 [SMILES: CCOc1ccc(OCc2ccc(C3CCC4CC(C)CCC4C3)cc2)c(F)c1F] |
| 85 | 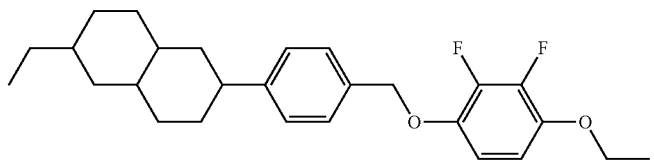 [SMILES: CCOc1ccc(OCc2ccc(C3CCC4CC(CC)CCC4C3)cc2)c(F)c1F] |
| 86 | 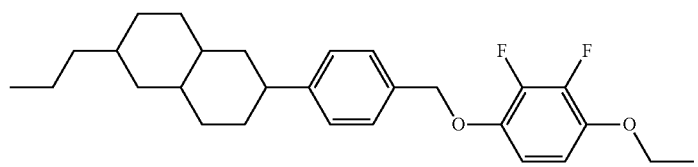 |
| 87 | 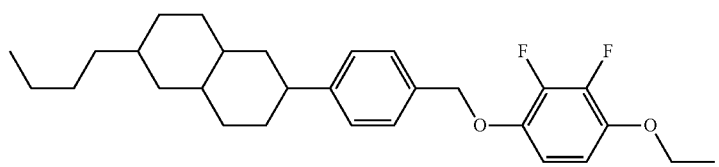 [SMILES: CCCCC1CCC2CC(c3ccc(COc4ccc(OCC)c(F)c4F)cc3)CCC2C1] |
| 88 | 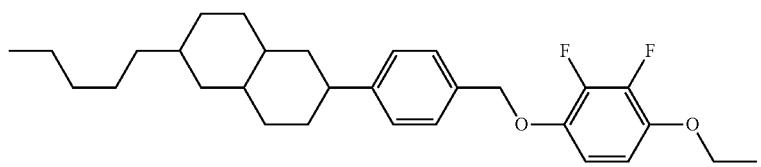 |
| 89 | 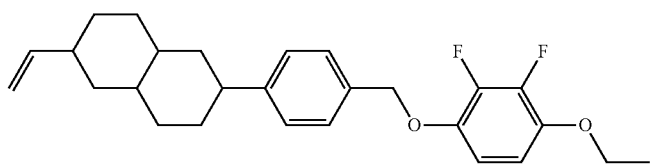 [SMILES: C=CC1CCC2CC(c3ccc(COc4ccc(OCC)c(F)c4F)cc3)CCC2C1] |
| 90 | 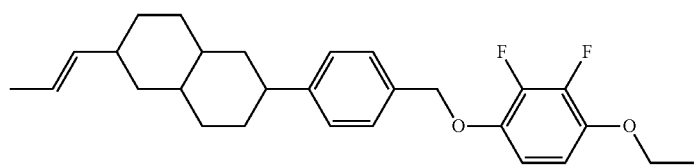 |

-continued
| No. | |
|---|---|
| 91 | 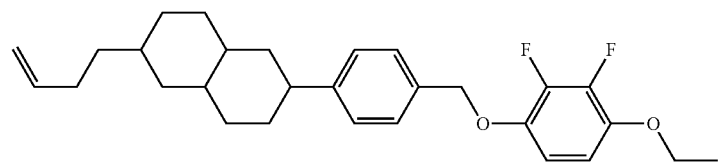 |
| 92 | 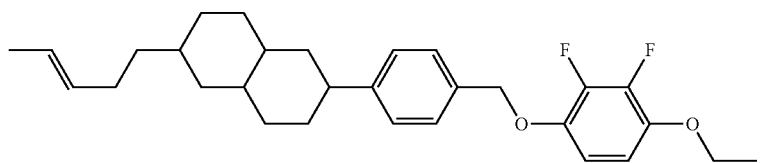 [SMILES: C/C=C/CCC1CCC2CC(c3ccc(COc4ccc(OCC)c(F)c4F)cc3)CCC2C1] |
| 93 | 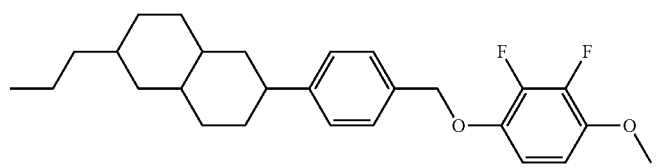 [SMILES: CCCC1CCC2CC(c3ccc(COc4ccc(CC)c(F)c4F)cc3)CCC2C1] |
| 94 | 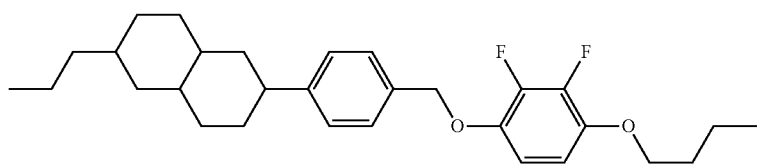 |
| 95 | 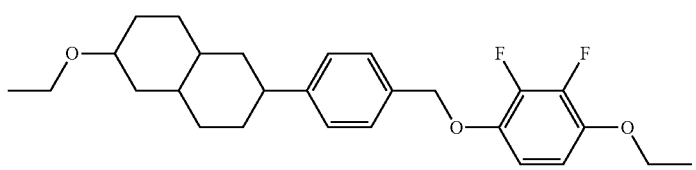 |
| 96 | 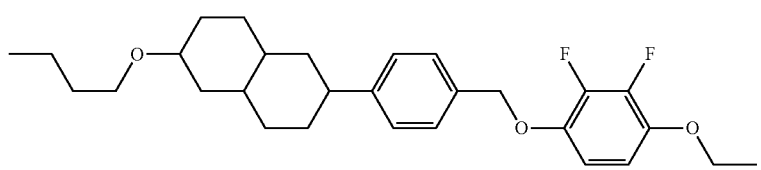 |
| 97 | 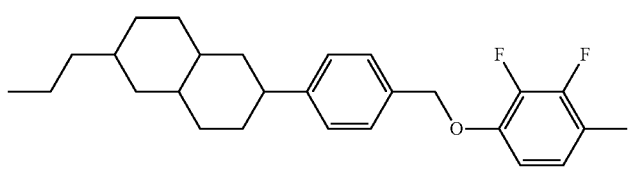 |
| 98 | 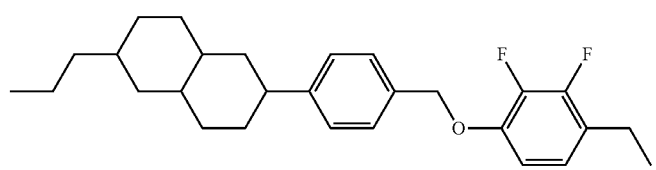 |
| 99 | 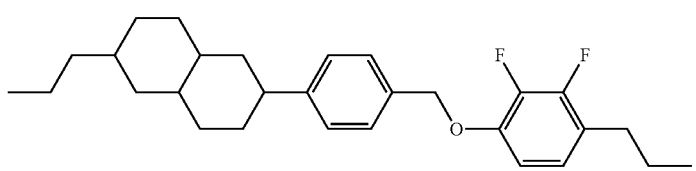 |

-continued
| No. | |
|---|---|
| 100 | 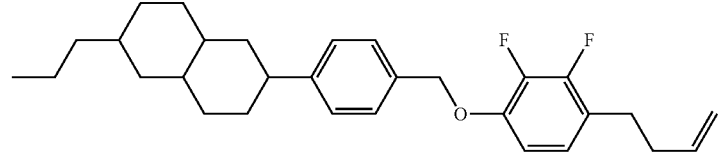 [SMILES: C=CCCc1ccc(OCc2ccc(C3CCC4CC(CCC)CCC4C3)cc2)c(F)c1F] |
| 101 | 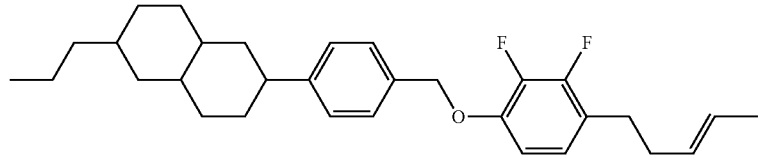 [SMILES: C/C=C/CCc1ccc(OCc2ccc(C3CCC4CC(CCC)CCC4C3)cc2)c(F)c1F] |
| 102 | 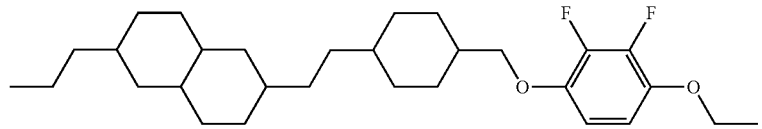 |
| 103 | 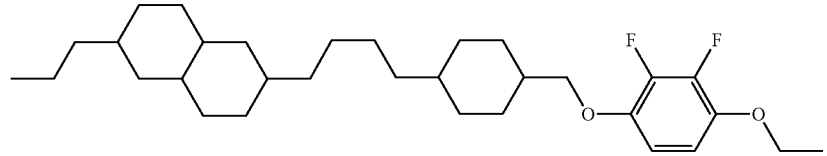 [SMILES: CCCC1CCC2CC(CCCCC3CCC(COc4ccc(OCC)c(F)c4F)CC3)CCC2C1] |
| 104 | 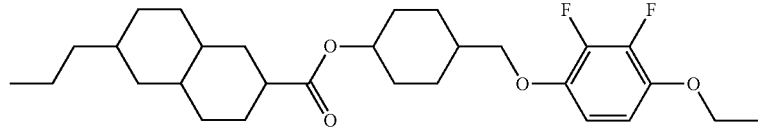 |
| 105 | 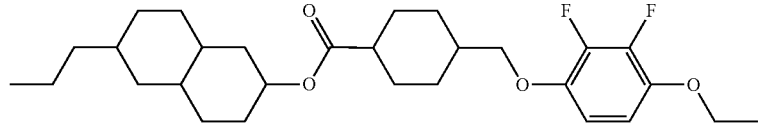 [SMILES: CCCC1CCC2CC(OC(=O)C3CCC(COc4ccc(OCC)c(F)c4F)CC3)CCC2C1] |
| 106 | 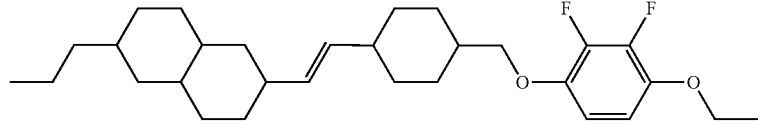 [SMILES: CCCC1CCC2CC(/C=C/C3CCC(COc4ccc(OCC)c(F)c4F)CC3)CCC2C1] |
| 107 | 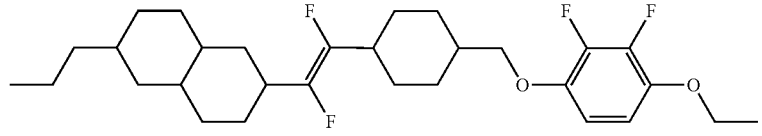 [SMILES: CCCC1CCC2CC(/C(F)=C(\F)C3CCC(COc4ccc(OCC)c(F)c4F)CC3)CCC2C1] |
| 108 | 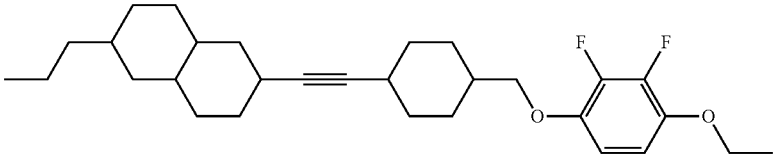 [SMILES: CCCC1CCC2CC(C#CC3CCC(COc4ccc(OCC)c(F)c4F)CC3)CCC2C1] |
| 109 | 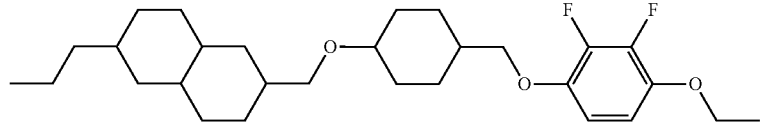 |

| No. | |
|---|---|
| 110 | 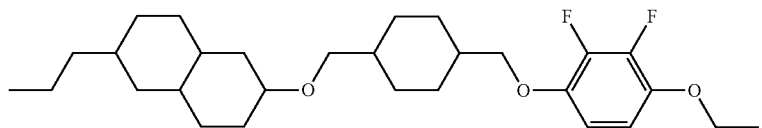 [SMILES: CCCC1CCC2CC(OCC3CCC(COc4ccc(OCC)c(F)c4F)CC3)CCC2C1] |
| 111 | 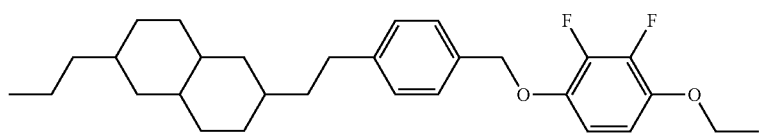 |
| 112 | 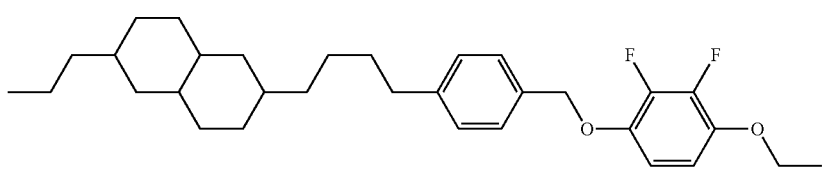 [SMILES: CCCC1CCC2CC(CCCCc3ccc(COc4ccc(OCC)c(F)c4F)cc3)CCC2C1] |
| 113 | 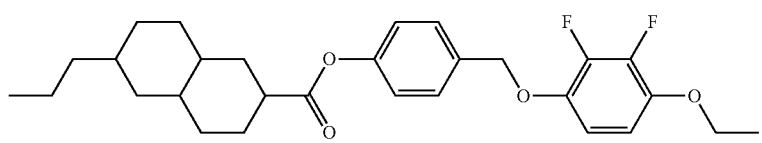 [SMILES: CCCC1CCC2CC(C(=O)Oc3ccc(COc4ccc(OCC)c(F)c4F)cc3)CCC2C1] |
| 114 | 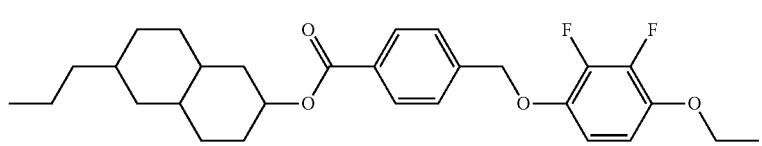 [SMILES: CCCC1CCC2CC(OC(=O)c3ccc(COc4ccc(OCC)c(F)c4F)cc3)CCC2C1] |
| 115 | 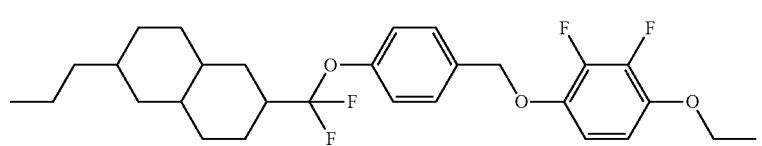 [SMILES: CCCC1CCC2CC(C(F)(F)Oc3ccc(COc4ccc(OCC)c(F)c4F)cc3)CCC2C1] |
| 116 | 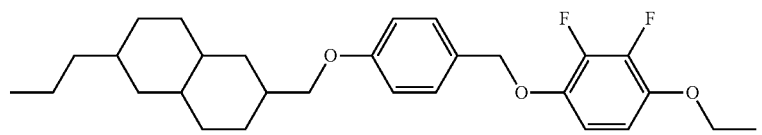 [SMILES: CCCC1CCC2CC(COc3ccc(COc4ccc(OCC)c(F)c4F)cc3)CCC2C1] |
| 117 | 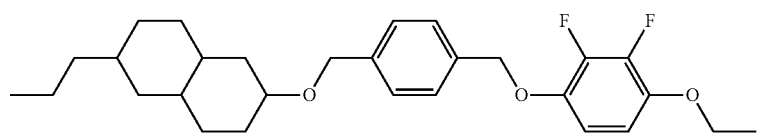 [SMILES: CCCC1CCC2CC(OCc3ccc(COc4ccc(OCC)c(F)c4F)cc3)CCC2C1] |
| 118 | 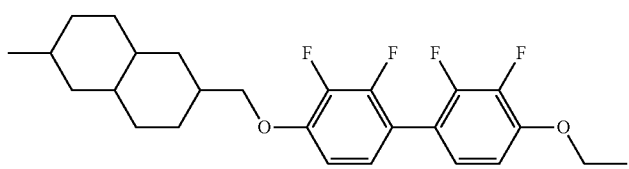 [SMILES: CCOc1ccc(-c2ccc(OCC3CCC4CC(C)CCC4C3)c(F)c2F)c(F)c1F] |
| 119 | 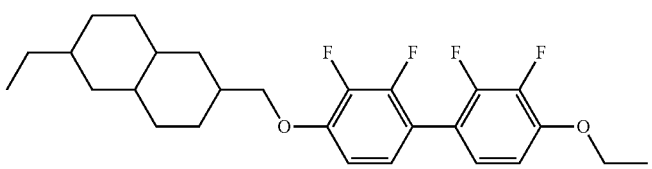 |

| No. | |
|---|---|
| 120 | 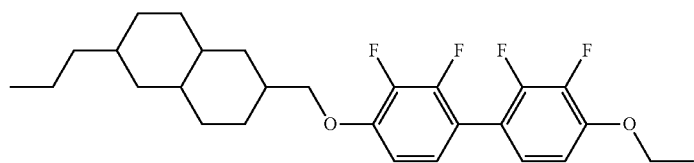 |
| 121 | 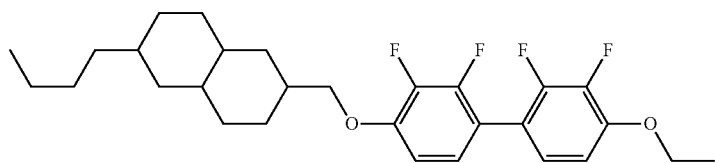 [SMILES: CCCCC1CCC2CC(COc3ccc(-c4ccc(OCC)c(F)c4F)c(F)c3F)CCC2C1] |
| 122 | 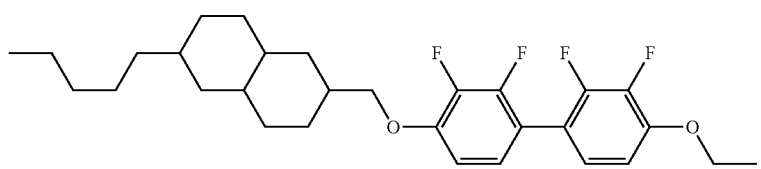 [SMILES: CCCCCC1CCC2CC(COc3ccc(-c4ccc(OCC)c(F)c4F)c(F)c3F)CCC2C1] |
| 123 | 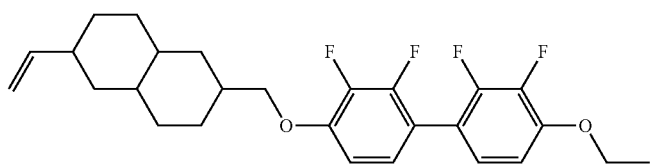 [SMILES: C=CC1CCC2CC(COc3ccc(-c4ccc(OCC)c(F)c4F)c(F)c3F)CCC2C1] |
| 124 | 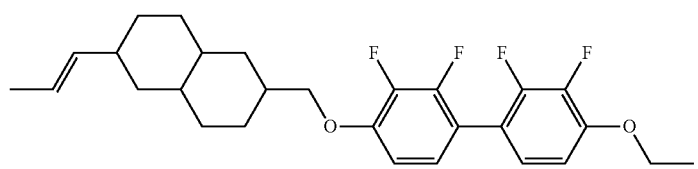 |
| 125 | 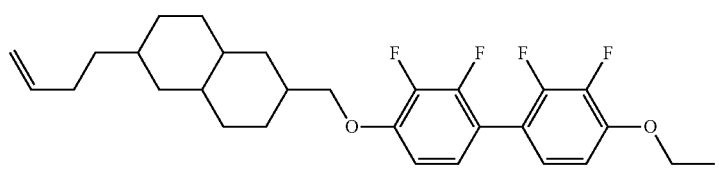 [SMILES: C=CCCC1CCC2CC(COc3ccc(-c4ccc(OCC)c(F)c4F)c(F)c3F)CCC2C1] |
| 126 | 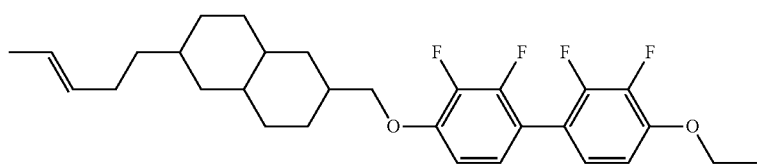 [SMILES: C/C=C/CCC1CCC2CC(COc3ccc(-c4ccc(OCC)c(F)c4F)c(F)c3F)CCC2C1] |
| 127 | 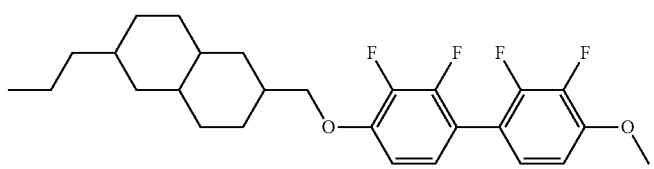 [SMILES: CCCC1CCC2CC(COc3ccc(-c4ccc(OC)c(F)c4F)c(F)c3F)CCC2C1] |
| 128 | 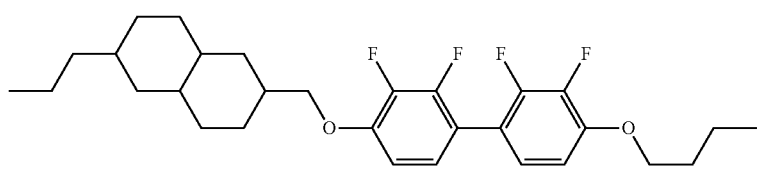 [SMILES: CCCCOc1ccc(-c2ccc(OCC3CCC4CC(CCC)CCC4C3)c(F)c2F)c(F)c1F] |

| No. | |
|---|---|
| 129 | 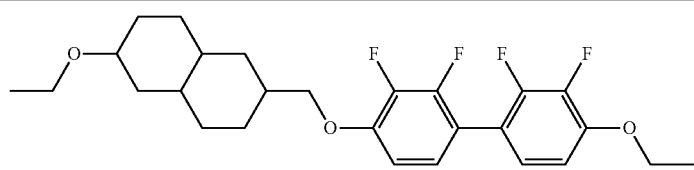 |
| 130 | 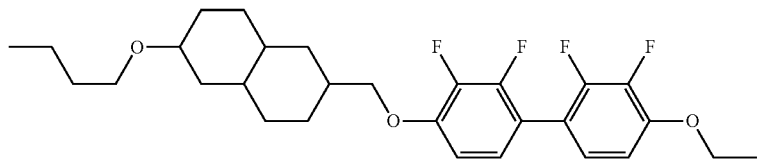 |
| 131 | 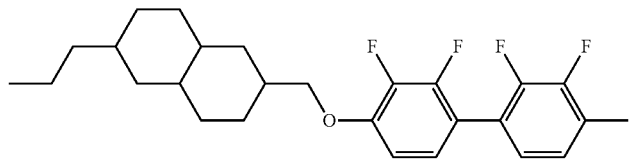 [SMILES: CCCC1CCC2CC(COc3ccc(-c4ccc(C)c(F)c4F)c(F)c3F)CCC2C1] |
| 132 | 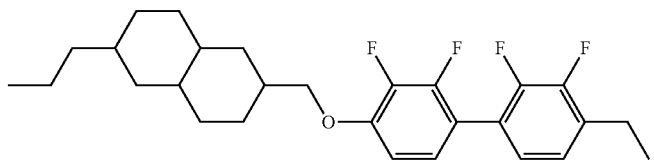 |
| 133 | 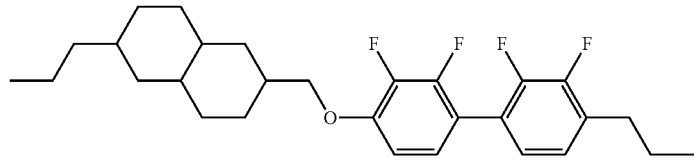 |
| 134 | 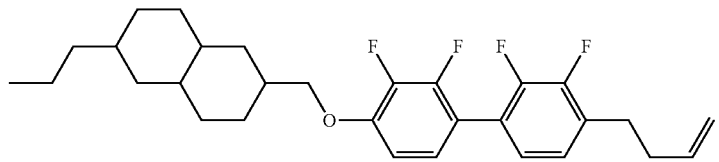 [SMILES: C=CCCc1ccc(-c2ccc(OCC3CCC4CC(CCC)CCC4C3)c(F)c2F)c(F)c1F] |
| 135 | 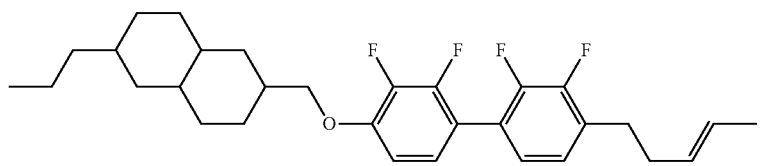 [SMILES: C/C=C/CCc1ccc(-c2ccc(OCC3CCC4CC(CCC)CCC4C3)c(F)c2F)c(F)c1F] |
| 136 | 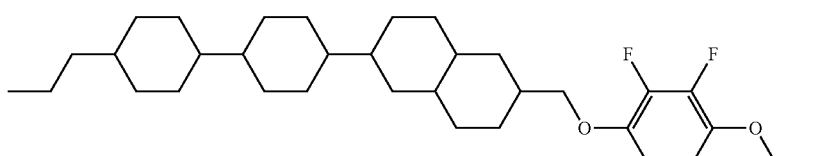 |
| 137 | 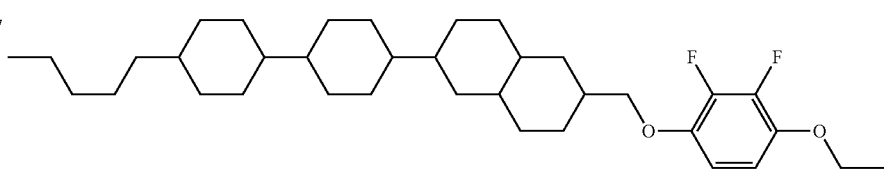 |

| No. | |
|---|---|
| 138 | 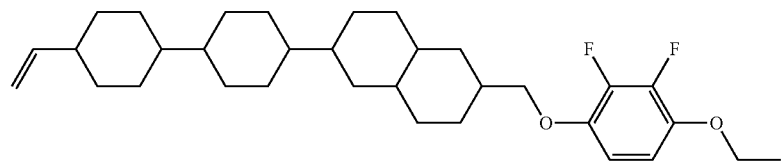 |
| 139 | 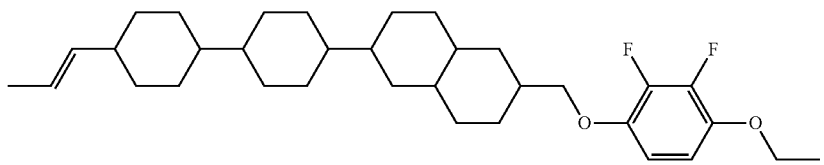 [SMILES: CCCC1CCC(C2CCC(C3CCC4CC(COc5ccc(OCC)c(F)c5F)CCC4C3)CC2)CC1] |
| 140 | 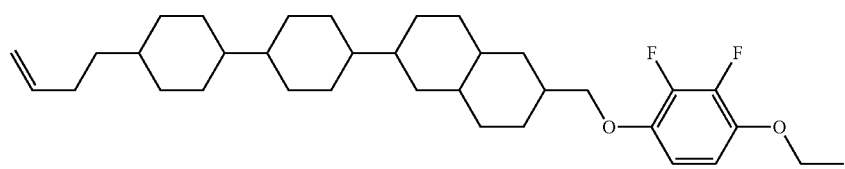 [SMILES: C=CCCC1CCC(C2CCC(C3CCC4CC(COc5ccc(OCC)c(F)c5F)CCC4C3)CC2)CC1] |
| 141 | 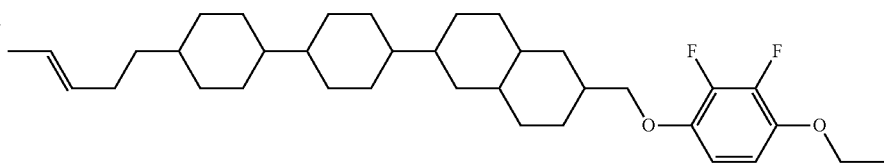 [SMILES: C/C=C/CCC1CCC(C2CCC(C3CCC4CC(COc5ccc(OCC)c(F)c5F)CCC4C3)CC2)CC1] |
| 142 | 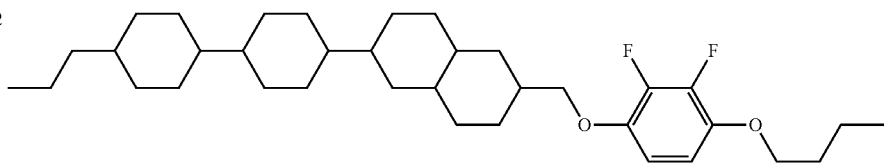 |
| 143 | 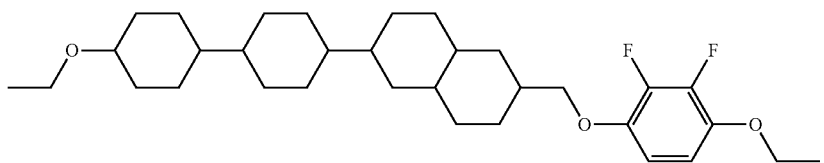 |
| 144 | 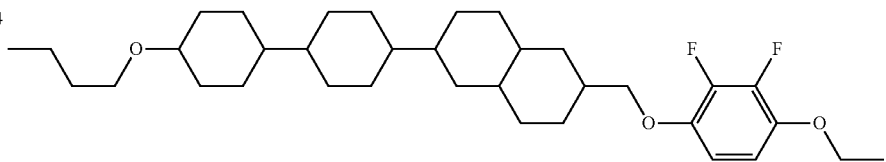 |
| 145 | 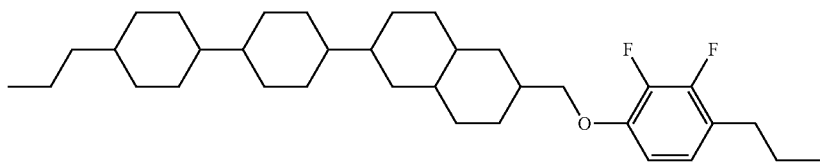 |
| 146 | 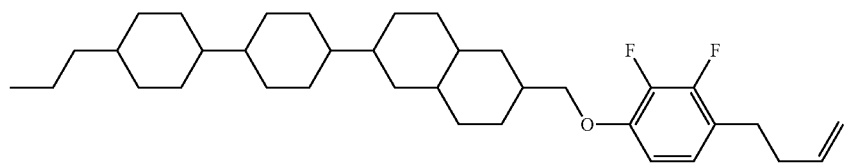 |

| No. | |
|---|---|
| 147 | 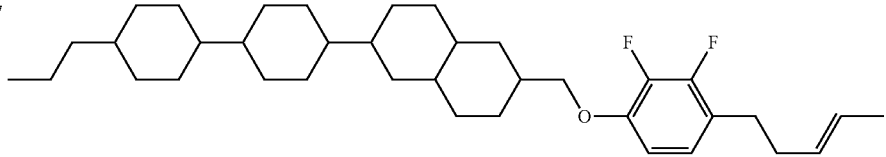 |
| 148 | 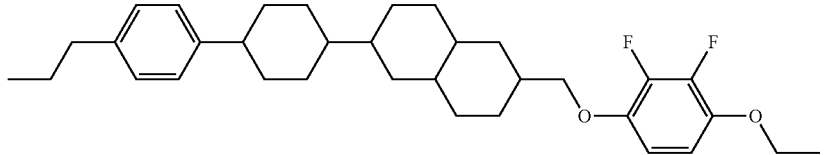 |
| 149 | 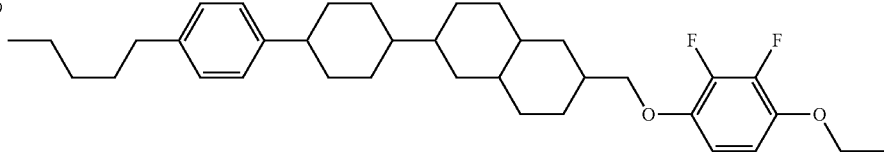 |
| 150 | 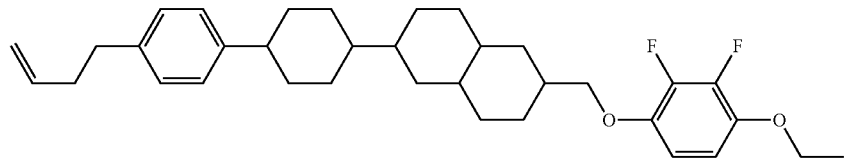 [SMILES: C=CCCc1ccc(C2CCC(C3CCC4CC(COc5ccc(OCC)c(F)c5F)CCC4C3)CC2)cc1] |
| 151 | 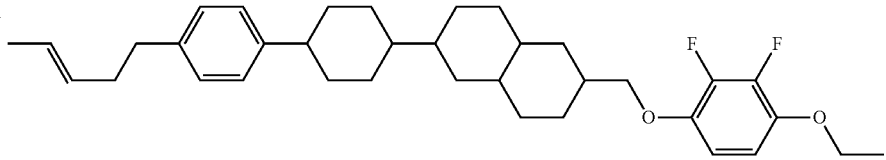 |
| 152 | 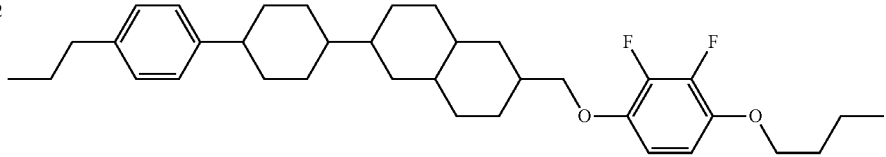 |
| 153 | 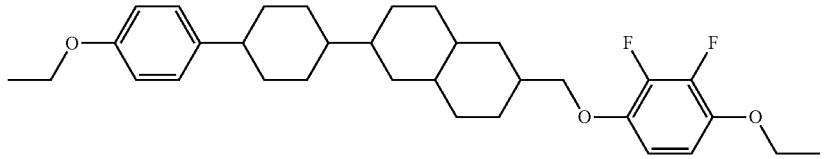 [SMILES: CCOc1ccc(C2CCC(C3CCC4CC(COc5ccc(OCC)c(F)c5F)CCC4C3)CC2)cc1] |
| 154 | 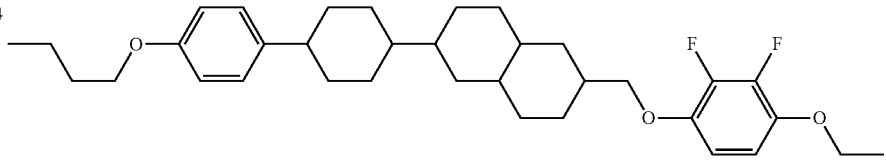 |
| 155 | 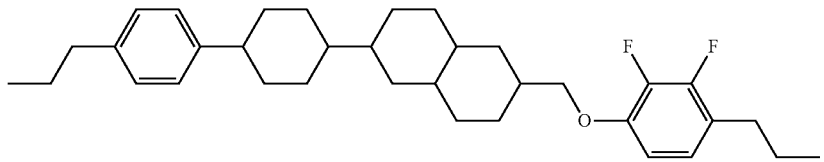 |

-continued
| No. | |
|---|---|
| 156 | 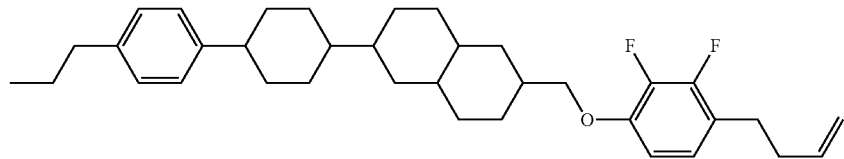 [SMILES: C=CCCc1ccc(OCC2CCC3CC(C4CCC(c5ccc(CCC)cc5)CC4)CCC3C2)c(F)c1F] |
| 157 | 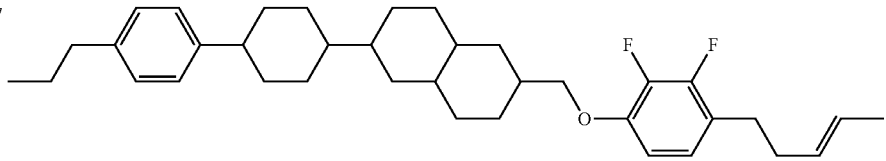 [SMILES: C/C=C/CCc1ccc(OCC2CCC3CC(C4CCC(c5ccc(CCC)cc5)CC4)CCC3C2)c(F)c1F] |
| 158 | 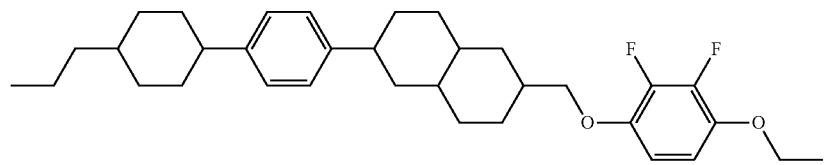 [SMILES: CCCC1CCC(c2ccc(C3CCC4CC(COc5ccc(OCC)c(F)c5F)CCC4C3)cc2)CC1] |
| 159 | 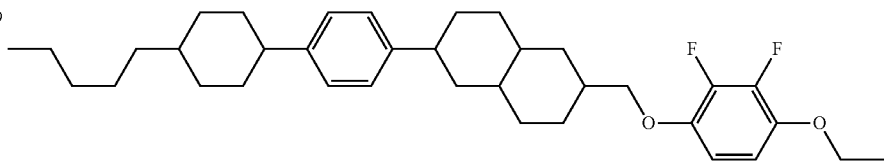 |
| 160 | 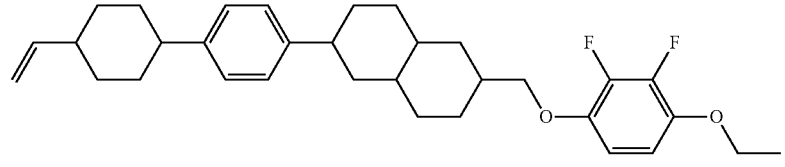 |
| 161 | 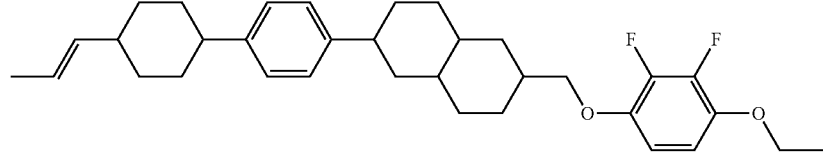 [SMILES: C/C=C/C1CCC(c2ccc(C3CCC4CC(COc5ccc(OCC)c(F)c5F)CCC4C3)cc2)CC1] |
| 162 | 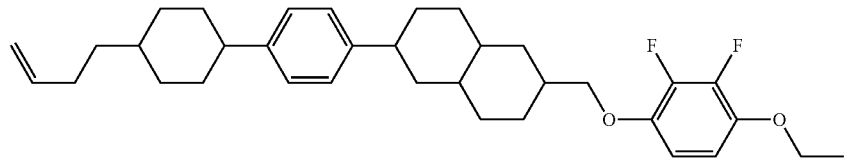 [SMILES: C=CCCC1CCC(c2ccc(C3CCC4CC(COc5ccc(OCC)c(F)c5F)CCC4C3)cc2)CC1] |
| 163 | 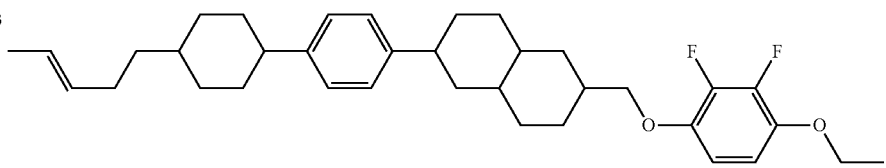 |
| 164 | 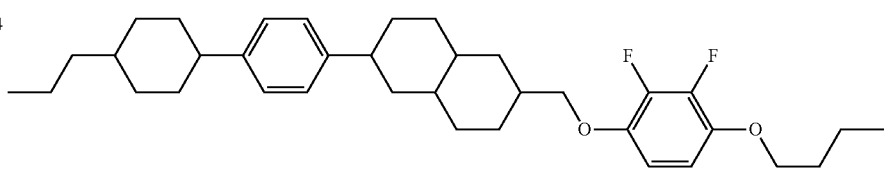 |

-continued
| No. | |
|---|---|
| 165 | 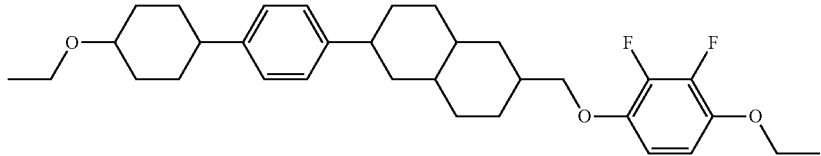 |
| 166 | 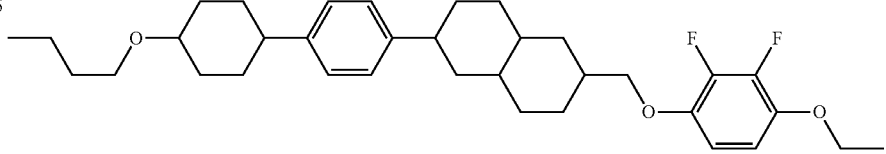 |
| 167 | 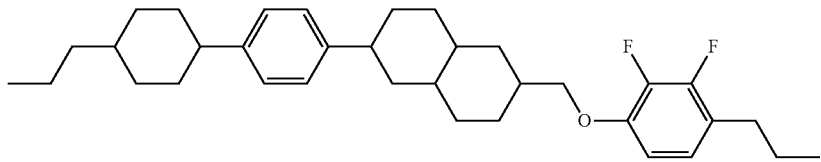 [SMILES: CCCc1ccc(OCC2CCC3CC(c4ccc(C5CCC(CCC)CC5)cc4)CCC3C2)c(F)c1F] |
| 168 | 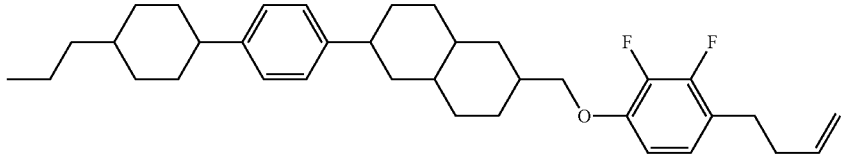 |
| 169 | 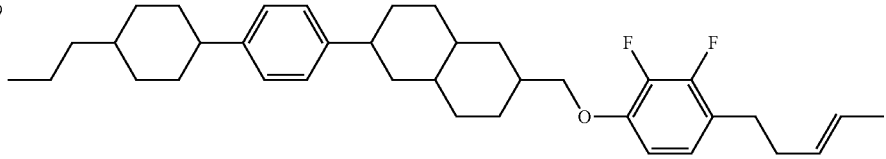 |
| 170 | 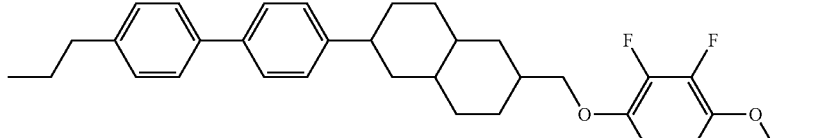 |
| 171 | 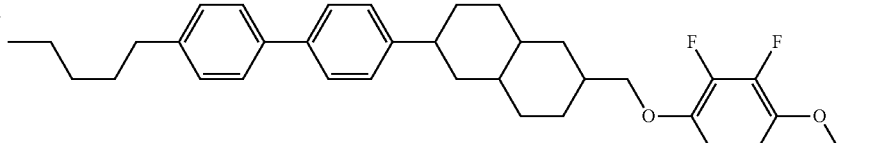 |
| 172 | 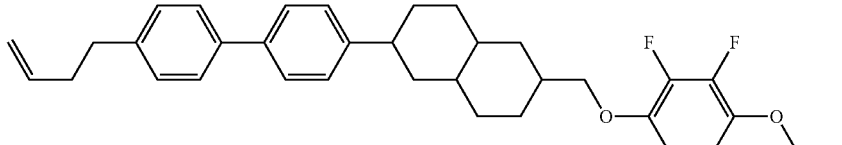 |
| 173 | 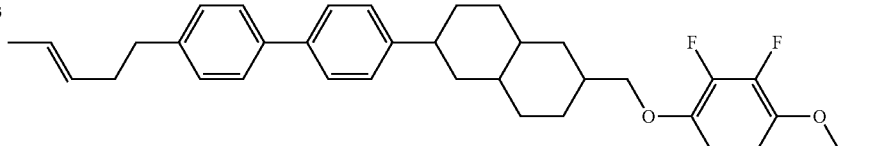 |

-continued
| No. | |
|---|---|
| 174 | 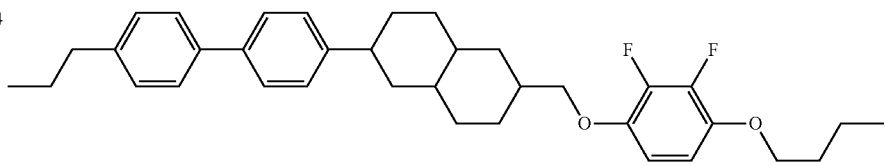 |
| 175 | 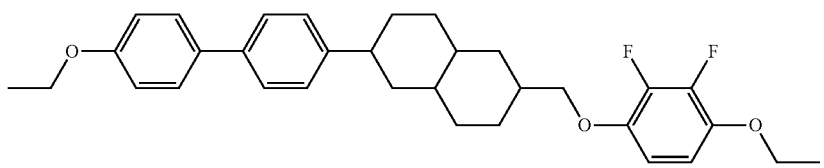 [SMILES: CCCc1ccc(-c2ccc(C3CCC4CC(COc5ccc(OCC)c(F)c5F)CCC4C3)cc2)cc1] |
| 176 | 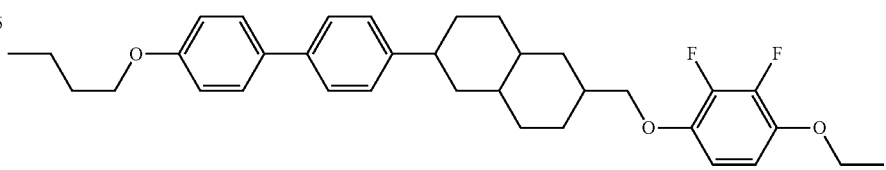 |
| 177 | 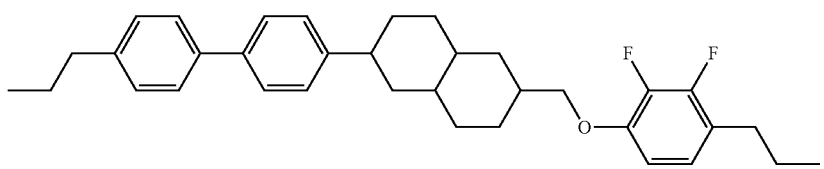 [SMILES: CCCc1ccc(-c2ccc(C3CCC4CC(COc5ccc(CCC)c(F)c5F)CCC4C3)cc2)cc1] |
| 178 | 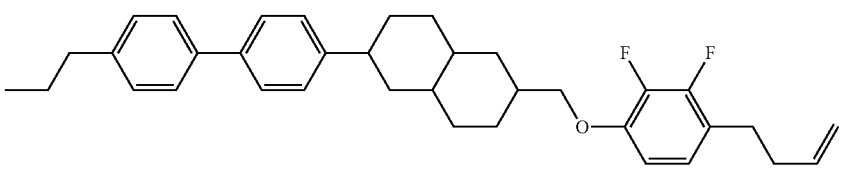 [SMILES: C=CCCc1ccc(OCC2CCC3CC(c4ccc(-c5ccc(CCC)cc5)cc4)CCC3C2)c(F)c1F] |
| 179 | 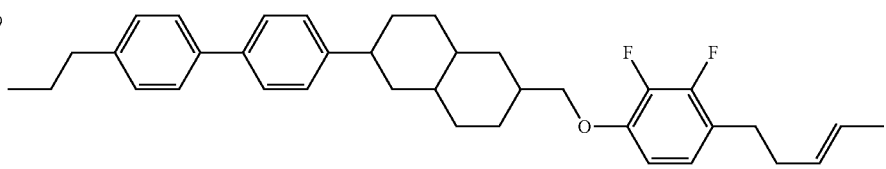 [SMILES: C/C=C/CCc1ccc(OCC2CCC3CC(c4ccc(-c5ccc(CCC)cc5)cc4)CCC3C2)c(F)c1F] |
| 180 | 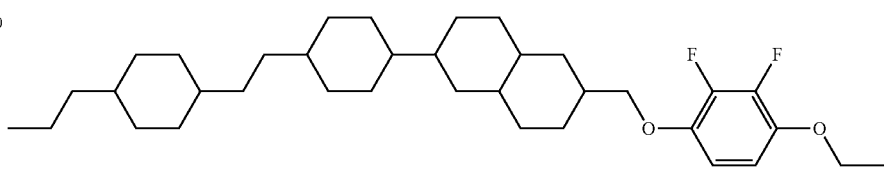 |
| 181 | 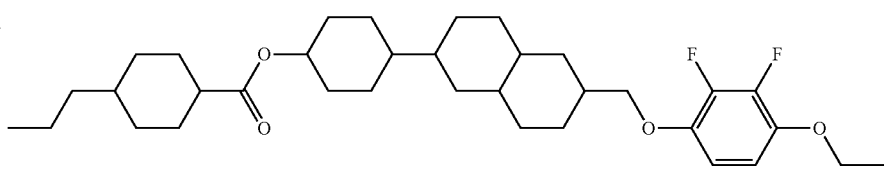 [SMILES: CCCC1CCC(C(=O)OC2CCC(C3CCC4CC(COc5ccc(OCC)c(F)c5F)CCC4C3)CC2)CC1] |
| 182 | 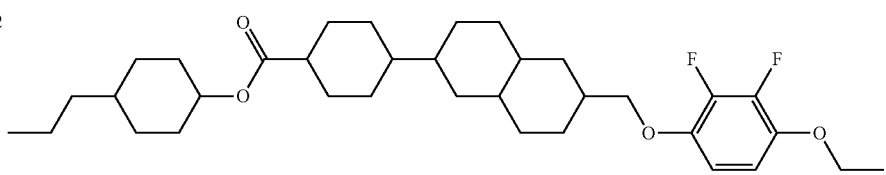 [SMILES: CCCC1CCC(OC(=O)C2CCC(C3CCC4CC(COc5ccc(OCC)c(F)c5F)CCC4C3)CC2)CC1] |

-continued
| No. |
|---|
| 183 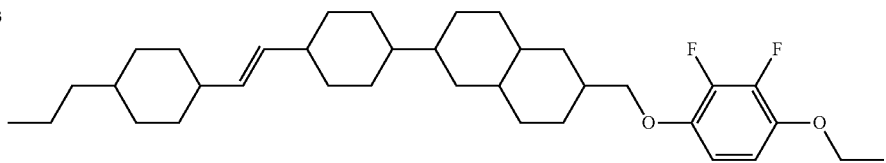 |
| 184 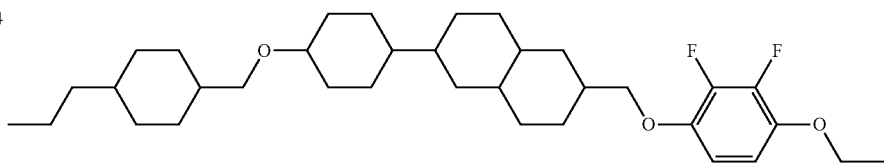 |
| 185 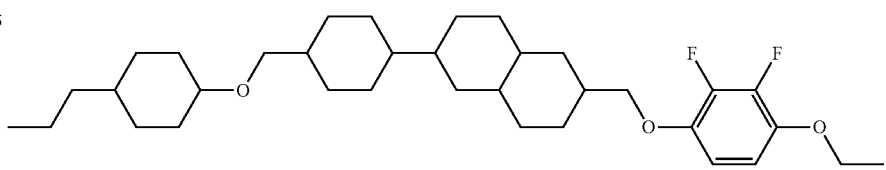 |
| 186 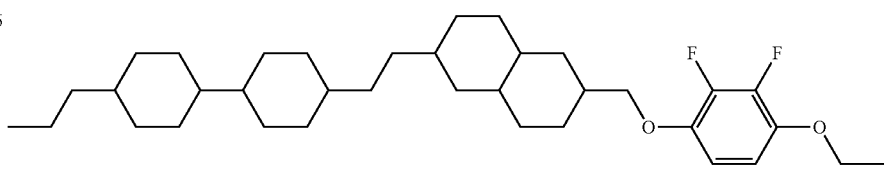 |
| 187 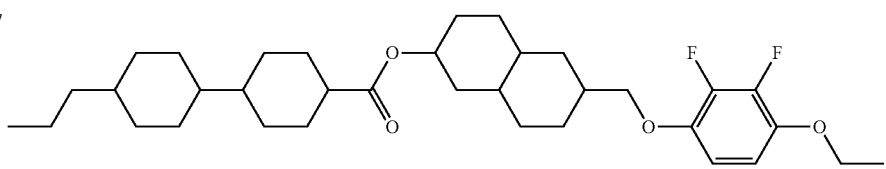 |
| 188 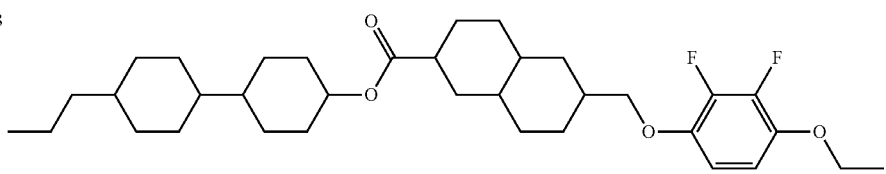 |
| 189 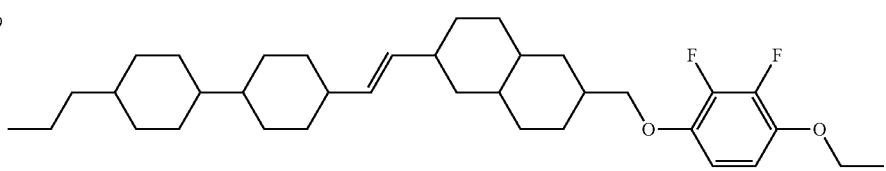 [SMILES: CCCC1CCC(C2CCC(/C=C/C3CCC4CC(COc5ccc(OCC)c(F)c5F)CCC4C3)CC2)CC1] |
| 190 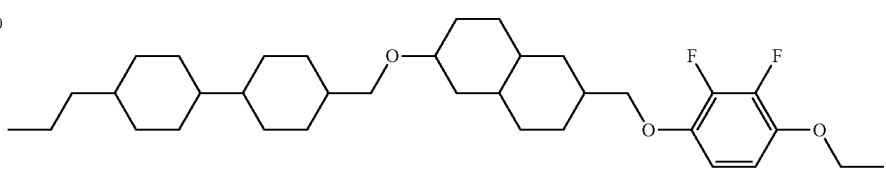 |
| 191 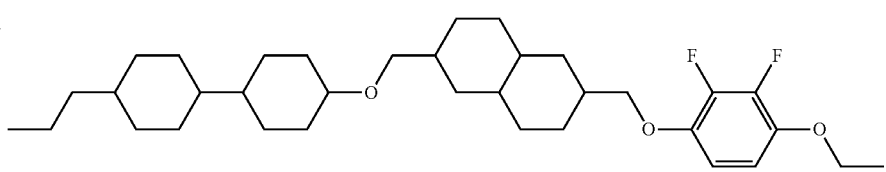 |

| No. |
|---|
| 192 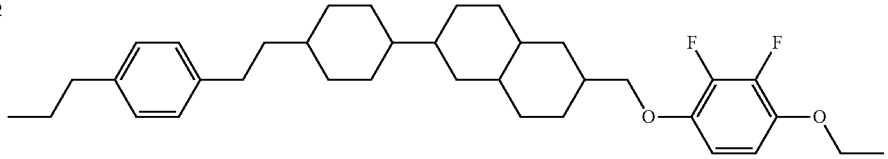 |
| 193 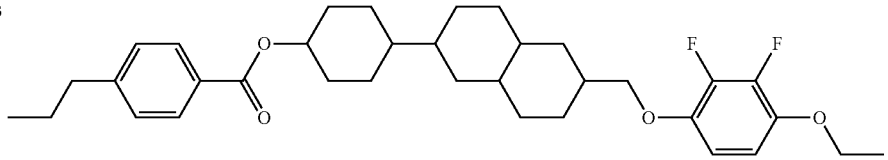 |
| 194 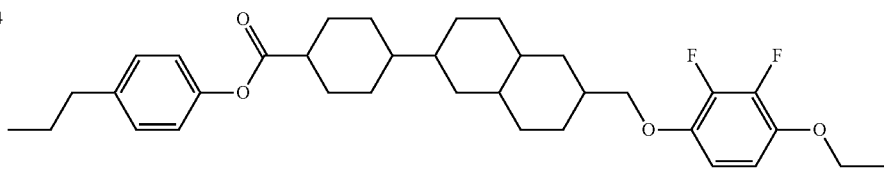 |
| 195 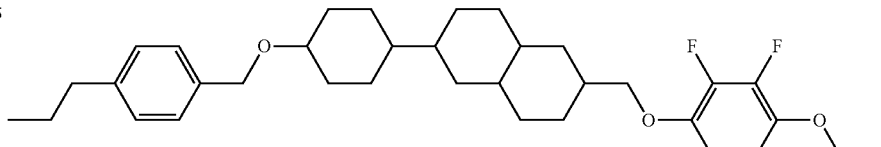 |
| 196 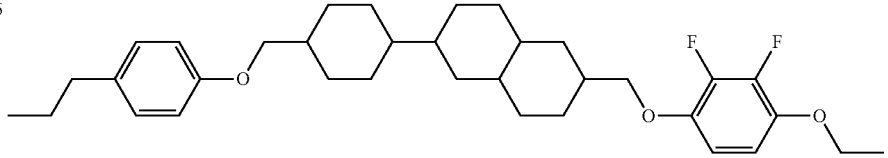 |
| 197 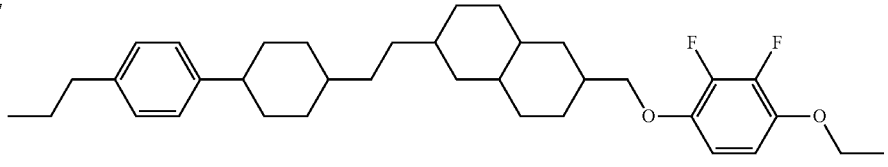 [SMILES: CCCc1ccc(C2CCC(CCC3CCC4CC(COc5ccc(OCC)c(F)c5F)CCC4C3)CC2)cc1] |
| 198 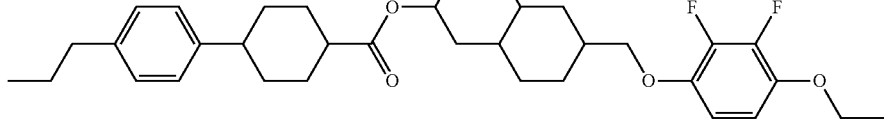 |
| 199 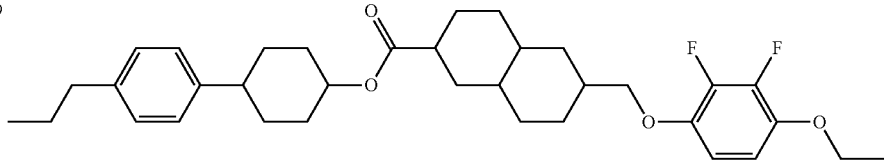 |
| 200 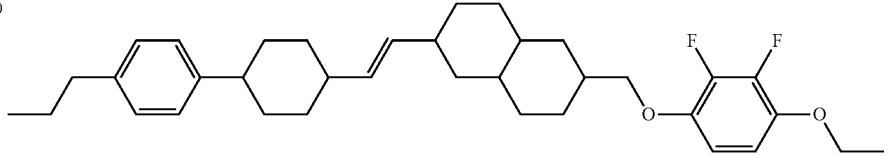 |

-continued
| No. | |
|---|---|
| 201 | 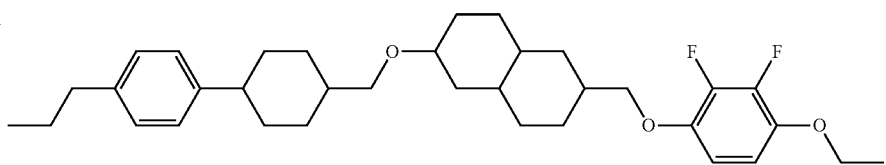 [SMILES: CCCc1ccc(C2CCC(COC3CCC4CC(COc5ccc(OCC)c(F)c5F)CCC4C3)CC2)cc1] |
| 202 | 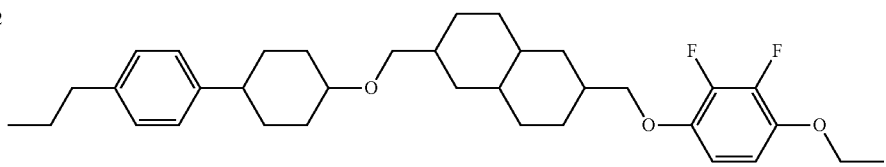 |
| 203 | 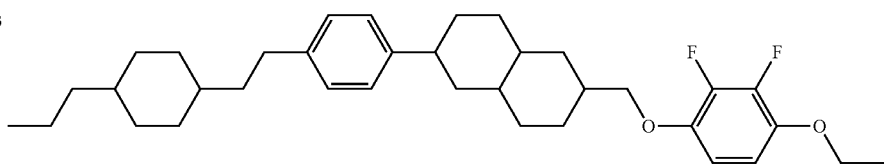 |
| 204 | 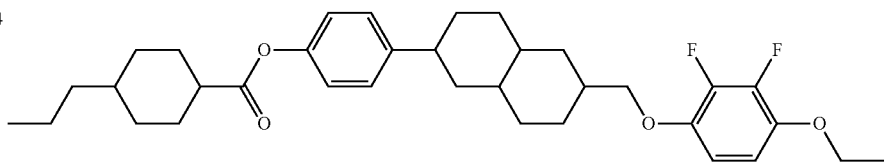 |
| 205 | 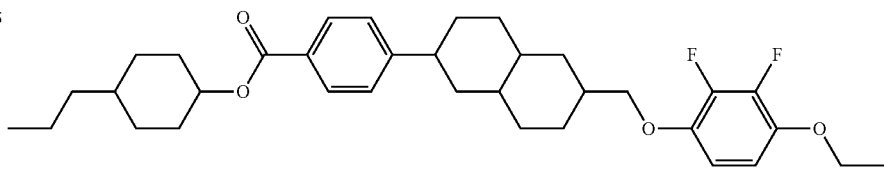 |
| 206 | 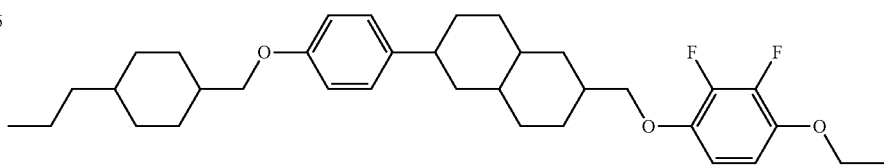 |
| 207 | 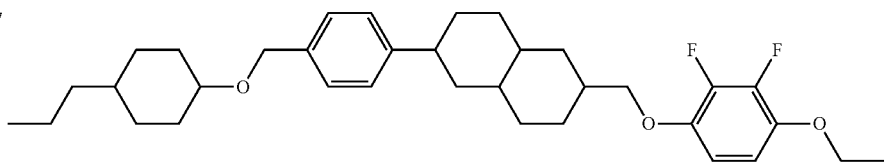 |
| 208 | 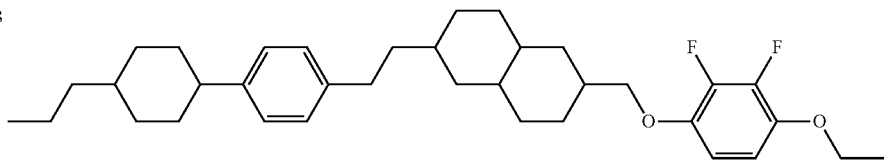 |
| 209 | 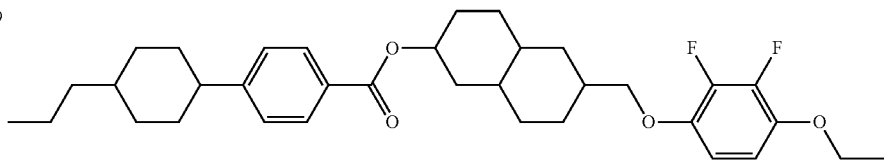 |

-continued
| No. |
|---|
| 210 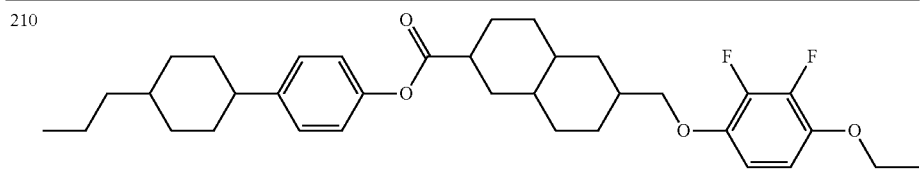 |
| 211 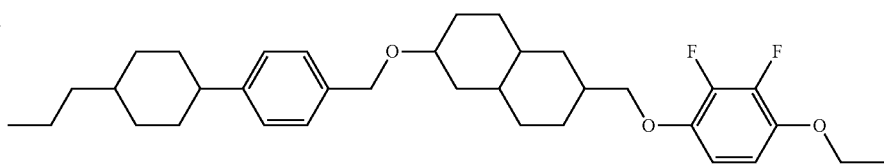 |
| 212 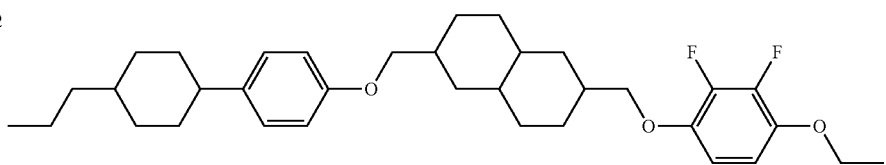 |
| 213 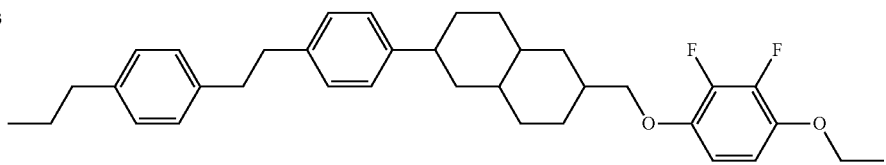 |
| 214 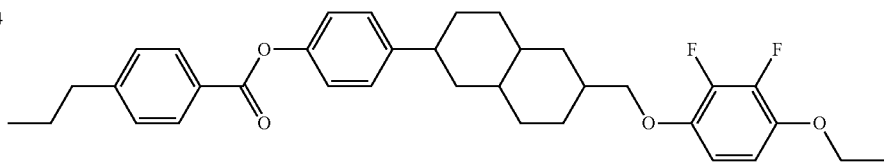 |
| 215 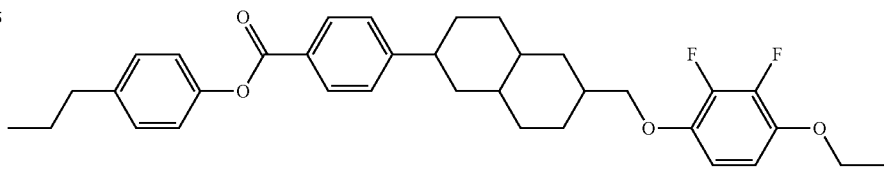 |
| 216 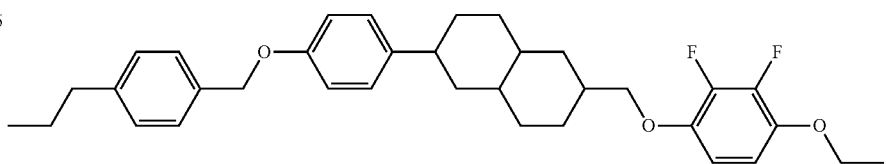 |
| 217 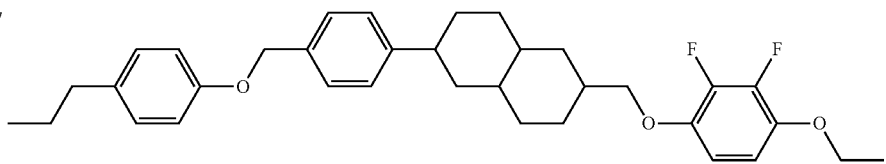 |
| 218 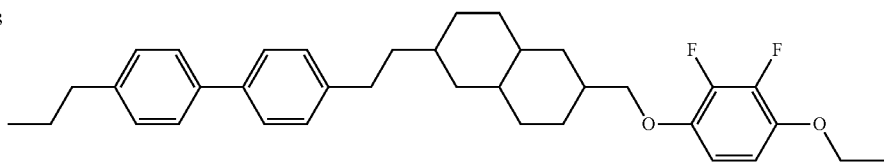 |

-continued
| No. | |
|---|---|
| 219 | 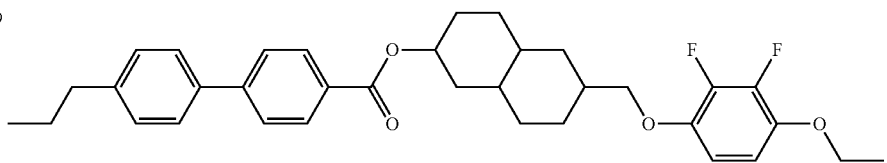 |
| 220 | 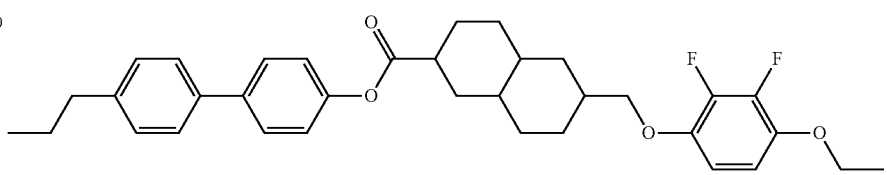 |
| 221 | 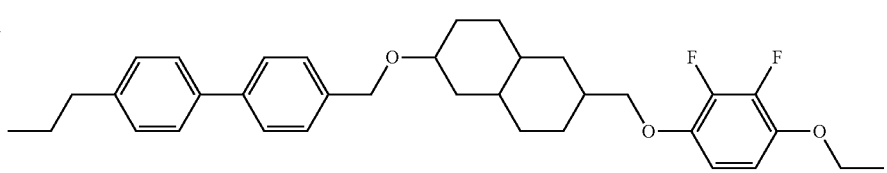 [SMILES: CCCc1ccc(-c2ccc(COC3CCC4CC(COc5ccc(OCC)c(F)c5F)CCC4C3)cc2)cc1] |
| 222 | 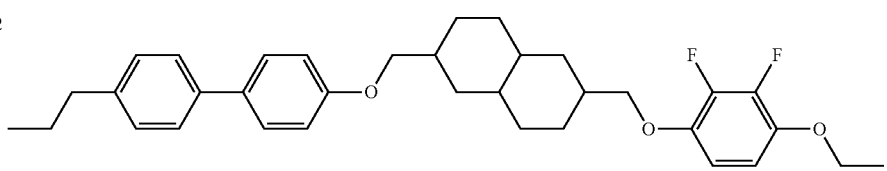 |
| 223 | 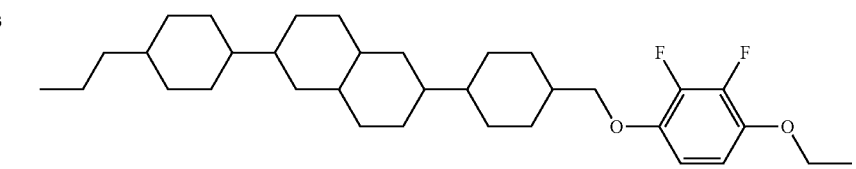 |
| 224 | 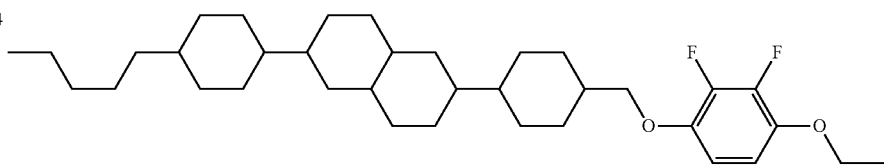 |
| 225 | 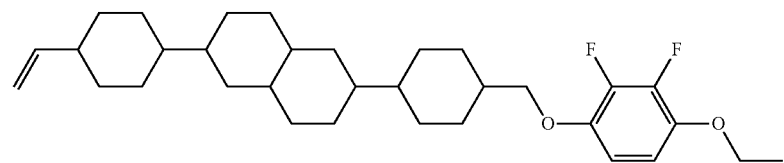 [SMILES: C=CC1CCC(C2CCC3CC(C4CCC(COc5ccc(OCC)c(F)c5F)CC4)CCC3C2)CC1] |
| 226 | 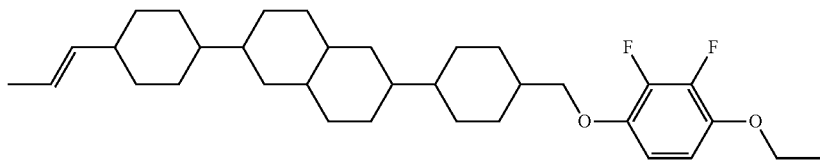 |
| 227 | 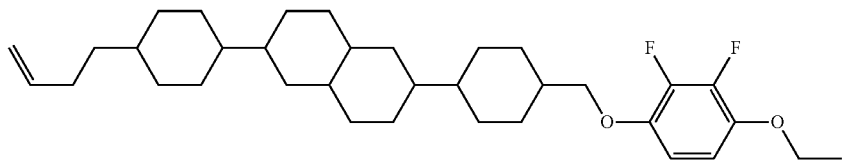 [SMILES: C=CCCC1CCC(C2CCC3CC(C4CCC(COc5ccc(OCC)c(F)c5F)CC4)CCC3C2)CC1] |

-continued
| No. | |
|---|---|
| 228 | 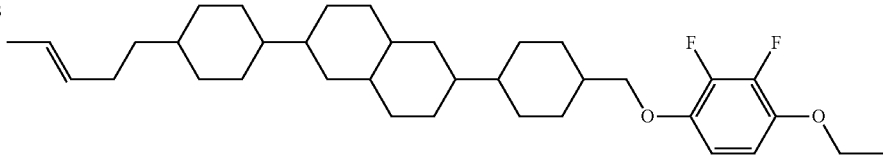 |
| 229 | 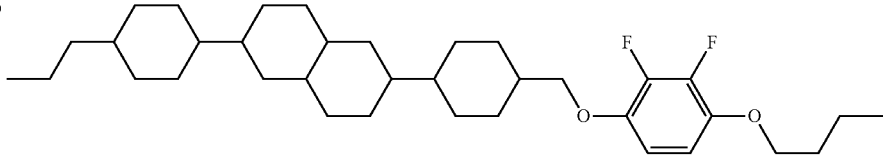 |
| 230 | 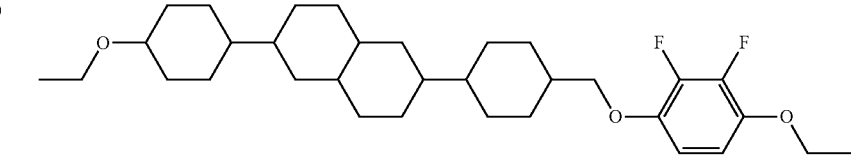 |
| 231 | 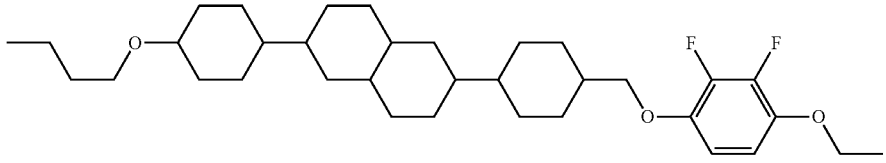 [SMILES: CCCCOC1CCC(C2CCC3CC(C4CCC(COc5ccc(OCC)c(F)c5F)CC4)CCC3C2)CC1] |
| 232 | 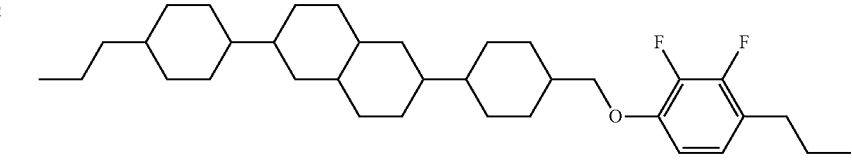 |
| 233 | 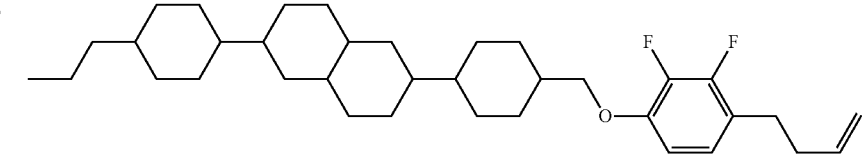 [SMILES: C=CCCc1ccc(OCC2CCC(C3CCC4CC(C5CCC(CCC)CC5)CCC4C3)CC2)c(F)c1F] |
| 234 | 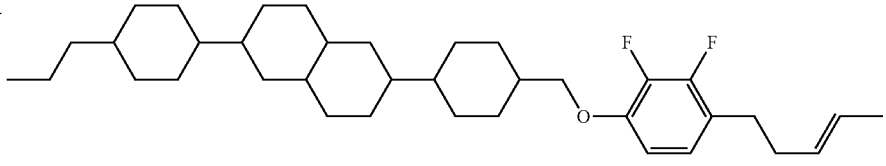 |
| 235 | 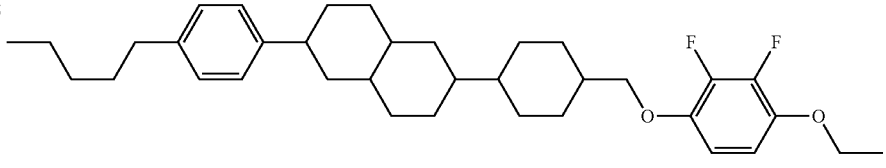 [SMILES: C/C=C/CCc1ccc(C2CCC3CC(C4CCC(COc5ccc(OCC)c(F)c5F)CC4)CCC3C2)cc1] |
| 236 | 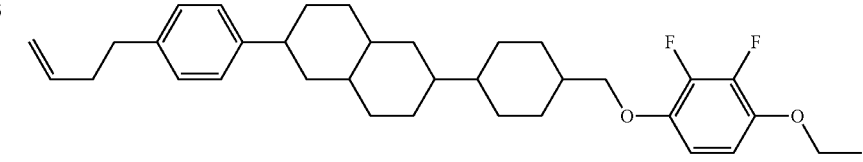 |

| No. | |
|---|---|
| 237 | 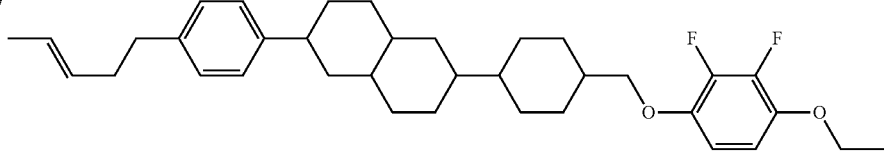 [SMILES: CCCCOc1ccc(C2CCC3CC(C4CCC(COc5ccc(OCC)c(F)c5F)CC4)CCC3C2)cc1] |
| 238 | 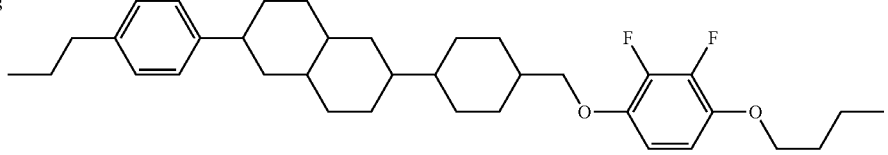 |
| 239 | 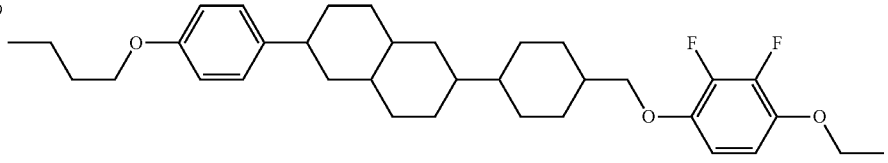 |
| 240 | 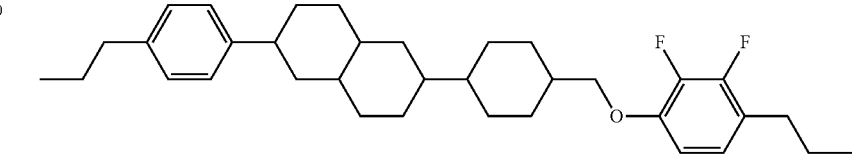 |
| 241 | 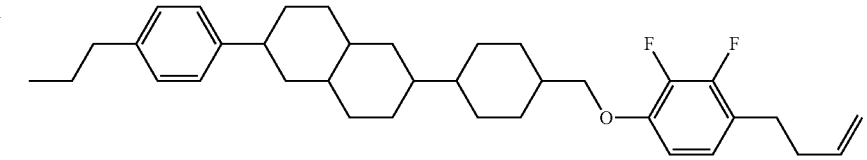 |
| 242 | 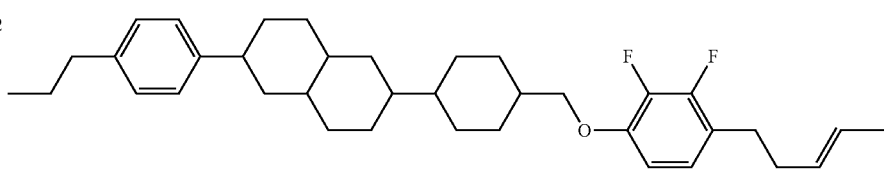 |
| 243 | 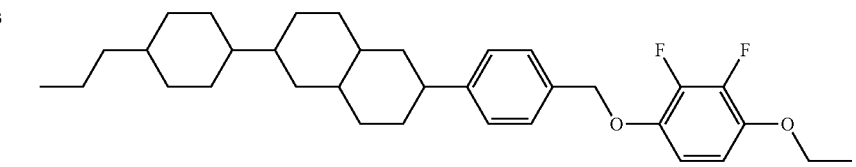 |
| 244 | 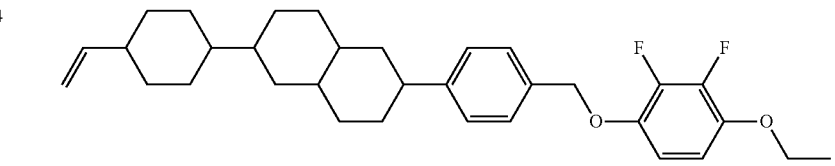 |
| 245 | 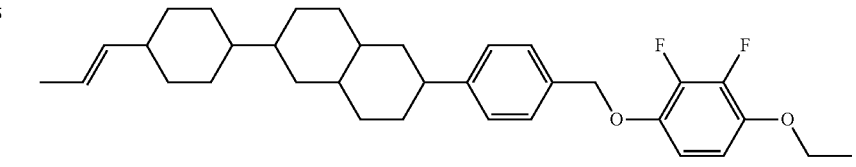 |

| No. |
|---|
| 246 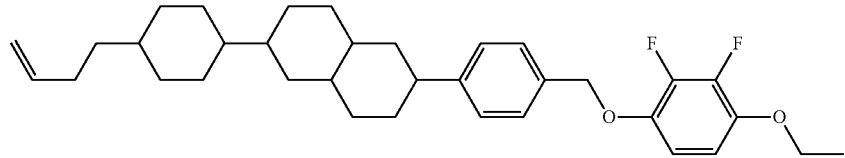 |
| 247 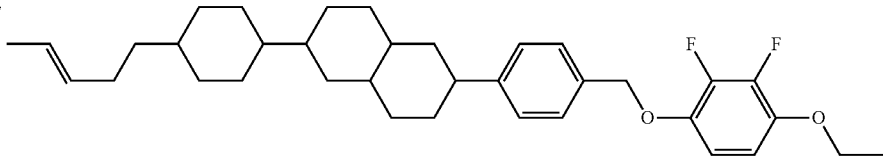 |
| 248 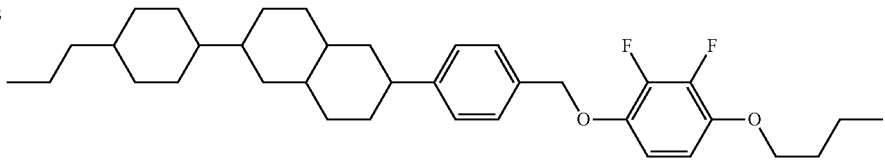 |
| 249 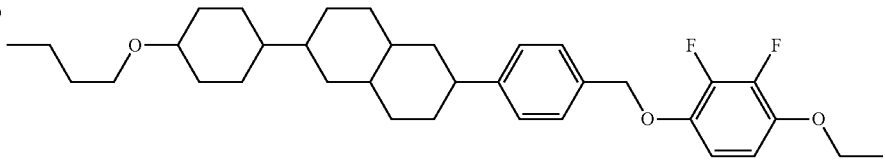 |
| 250 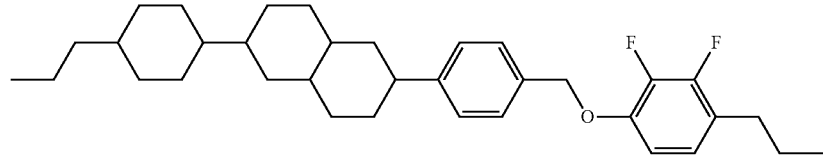 [SMILES: CCCC1CCC(C2CCC3CC(c4ccc(COc5ccc(OCC)c(F)c5F)cc4)CCC3C2)CC1] |
| 251 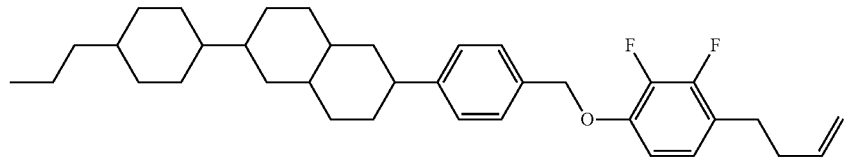 |
| 252 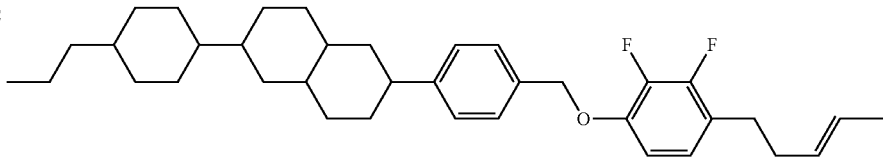 [SMILES: C/C=C/CCc1ccc(OCc2ccc(C3CCC4CC(C5CCC(CCC)CC5)CCC4C3)cc2)c(F)c1F] |
| 253 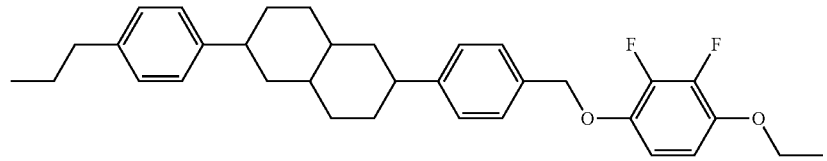 |
| 254 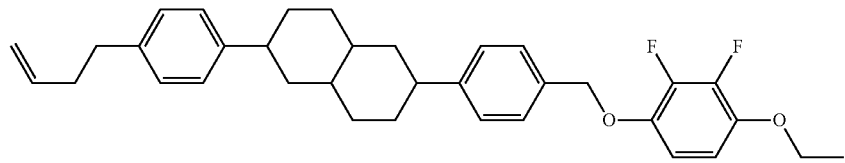 [SMILES: C=CCCc1ccc(C2CCC3CC(c4ccc(COc5ccc(OCC)c(F)c5F)cc4)CCC3C2)cc1] |

-continued
| No. | |
|---|---|
| 255 | 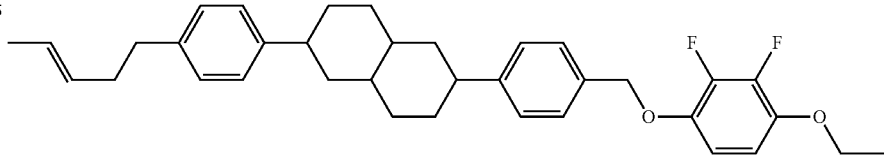 |
| 256 | 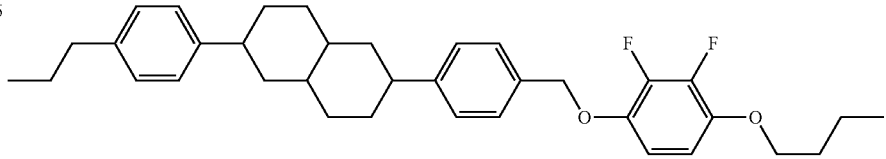 |
| 257 | 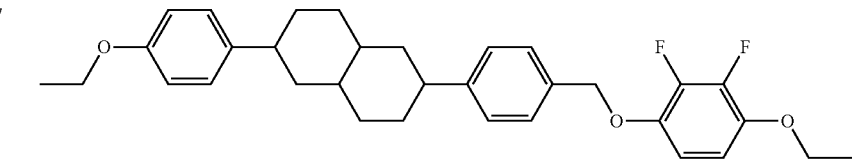 |
| 258 | 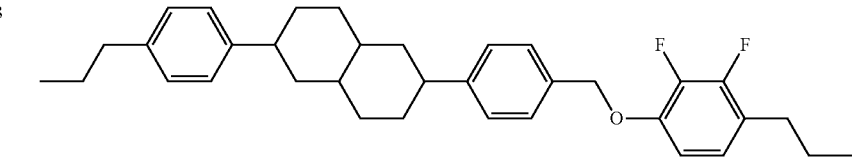 |
| 259 | 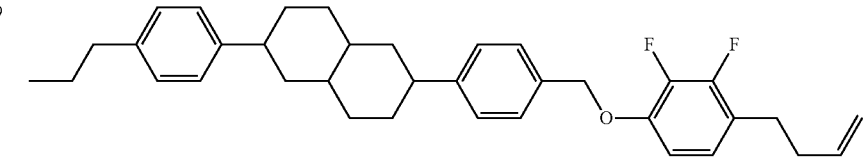 |
| 260 | 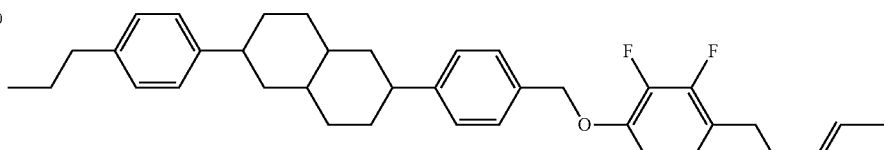 |
| 261 | 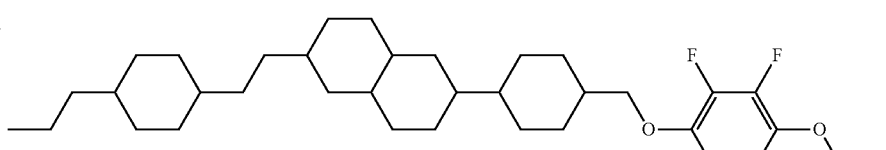 |
| 262 | 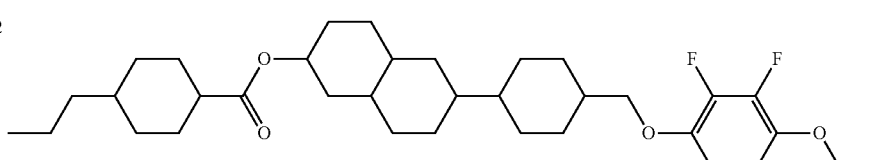 |
| 263 | 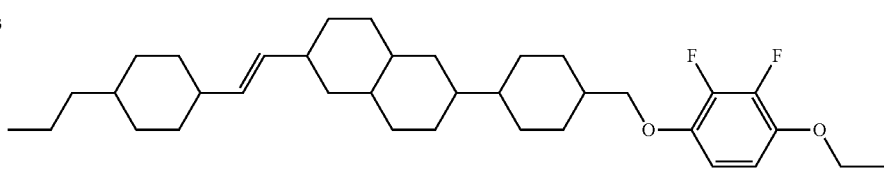 |

-continued
| No. | |
|---|---|
| 264 | 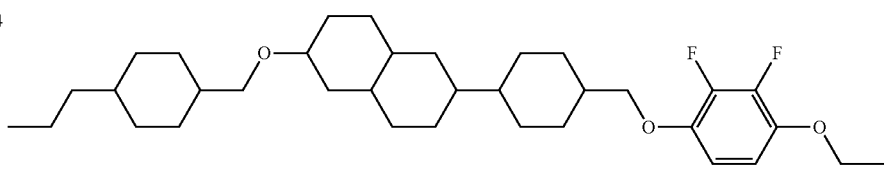 |
| 265 | 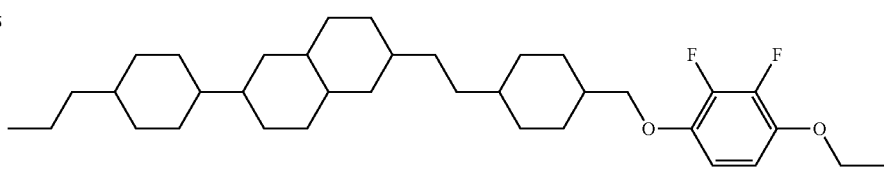 |
| 266 | 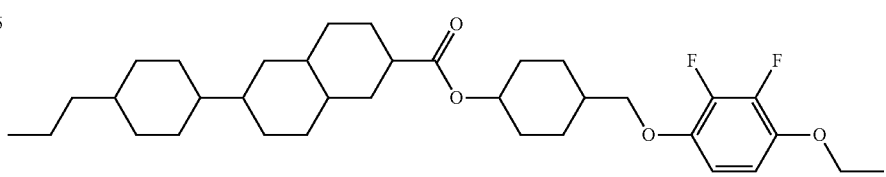 |
| 267 | 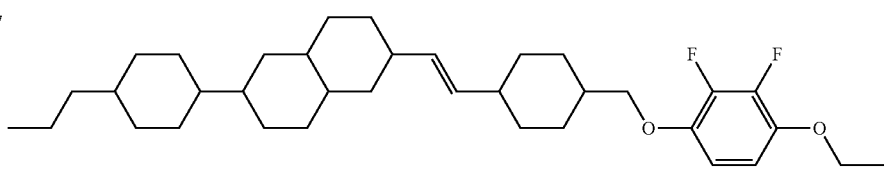 |
| 268 | 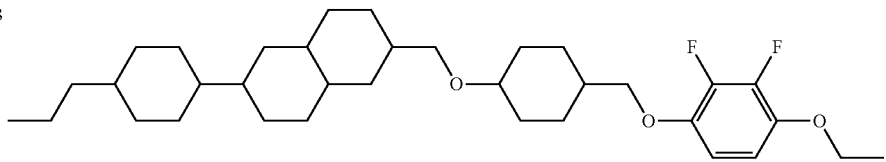 |
| 269 | 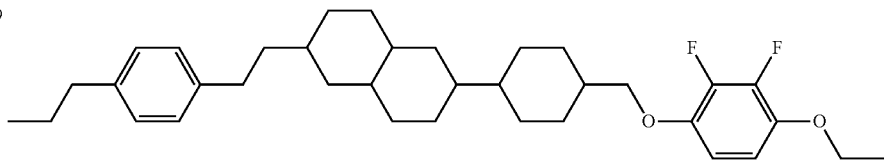 |
| 270 | 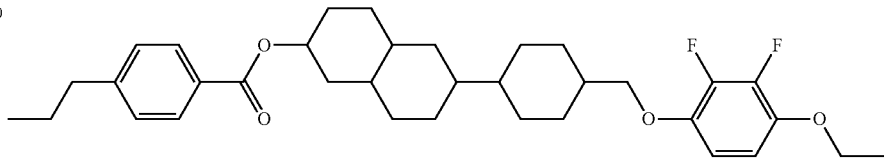 |
| 271 | 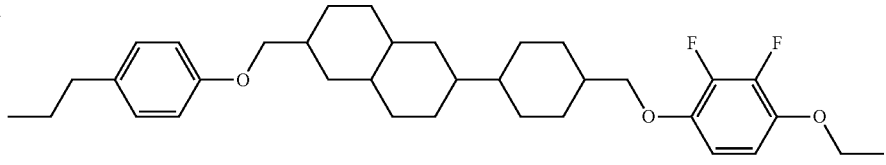 [SMILES: CCCc1ccc(OCC2CCC3CC(c4ccc(COc5ccc(OCC)c(F)c5F)cc4)CCC3C2)cc1] |
| 272 | 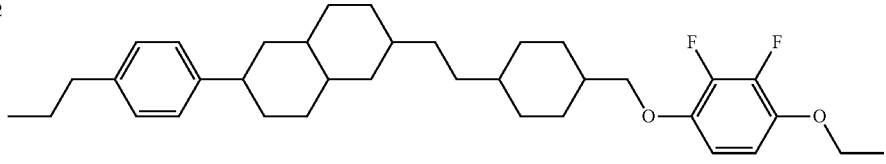 |

| No. |
|---|
| 273 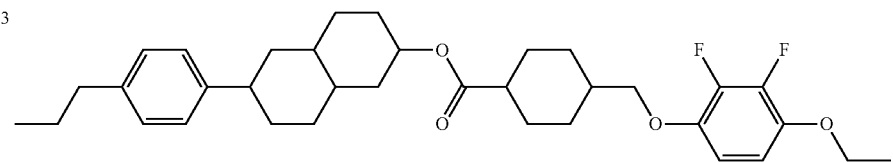 |
| 274 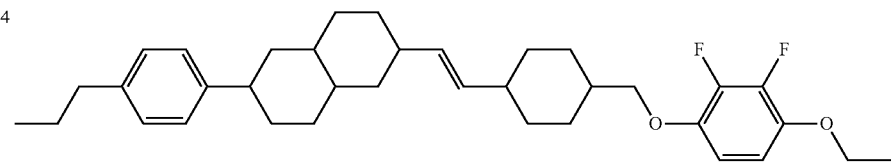 |
| 275 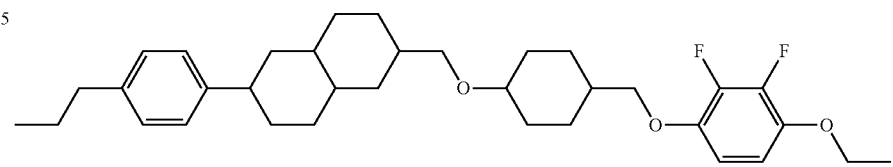 |
| 276 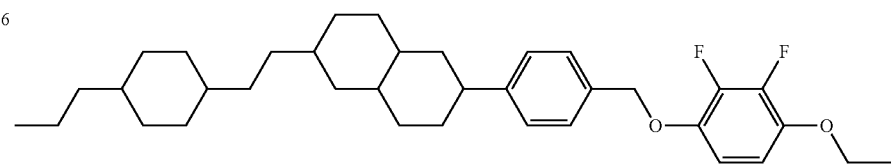 |
| 277 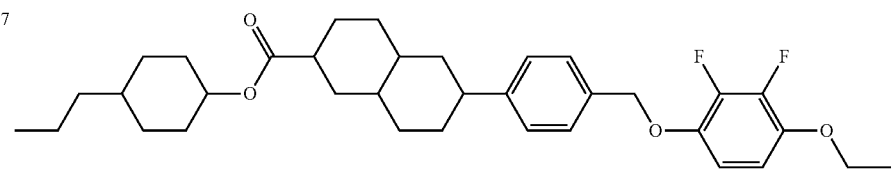 |
| 278 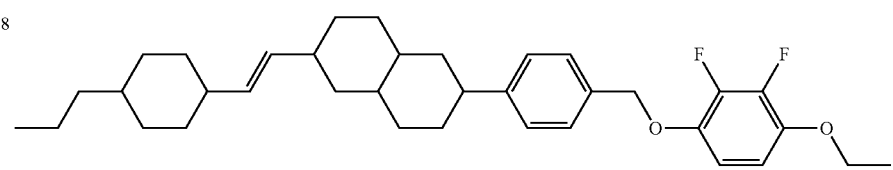 |
| 279 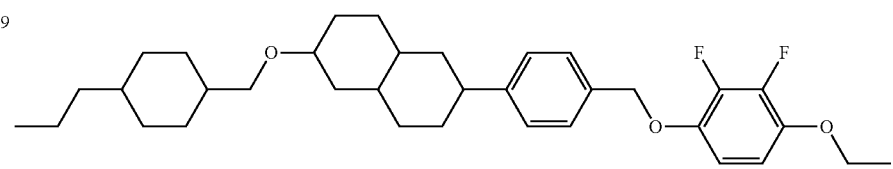 |
| 280 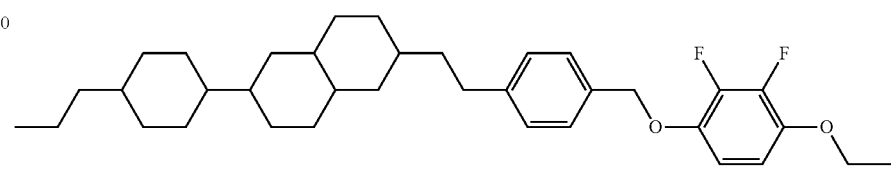 |
| 281 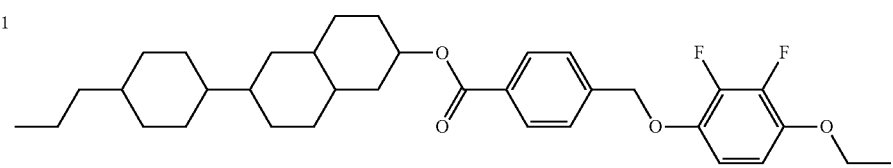 |

| No. |
|---|
| 282 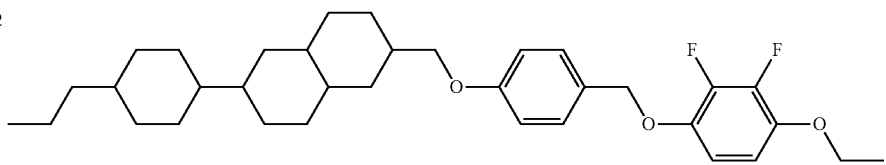 |
| 283 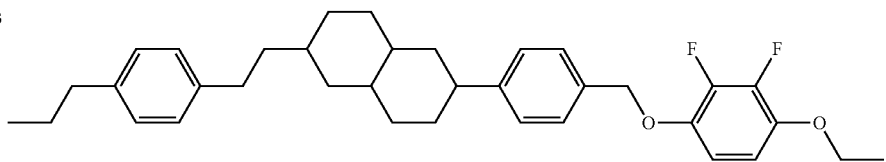 |
| 284 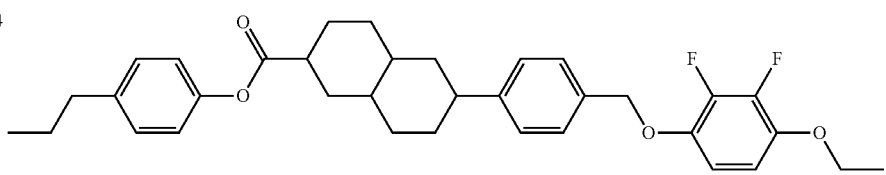 |
| 285 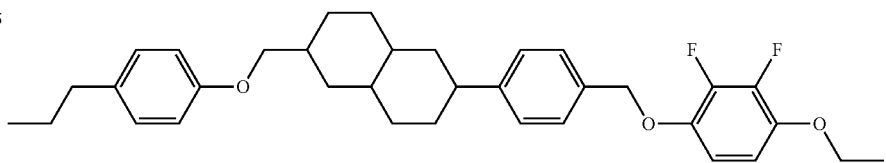 |
| 286 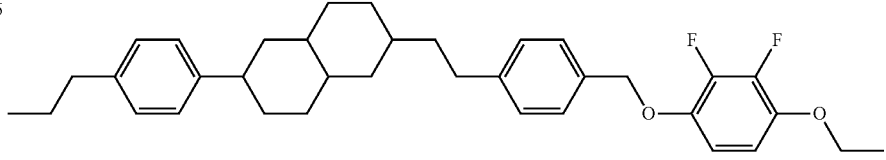 |
| 287 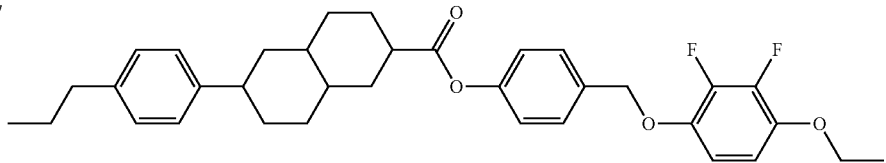 |
| 288 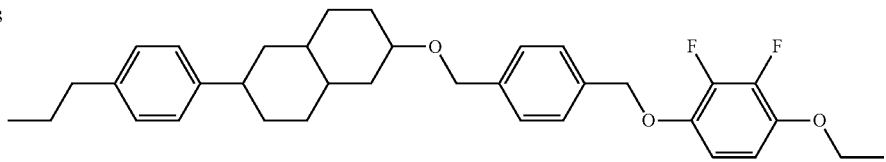 |
| 289 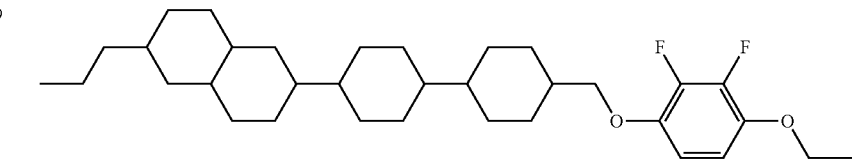 |
| 290 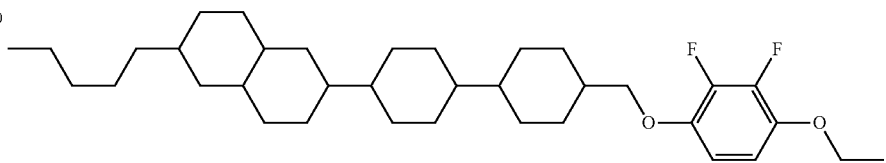 |

-continued
| No. | |
|---|---|
| 291 | 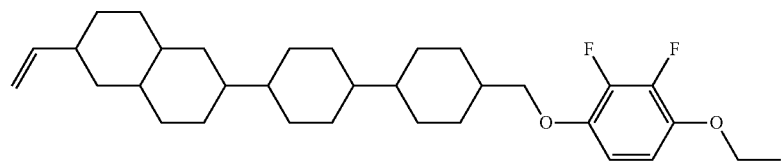 [SMILES: C=CC1CCC2CC(C3CCC(C4CCC(COc5ccc(OCC)c(F)c5F)CC4)CC3)CCC2C1] |
| 292 | 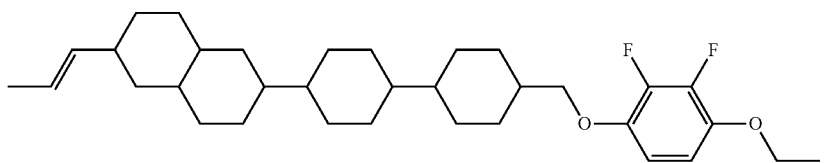 |
| 293 | 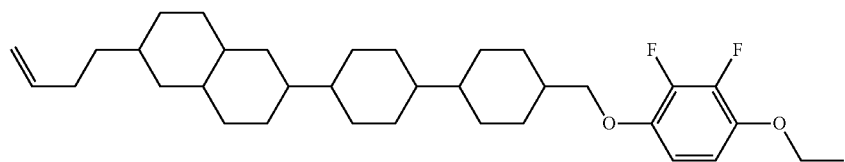 |
| 294 | 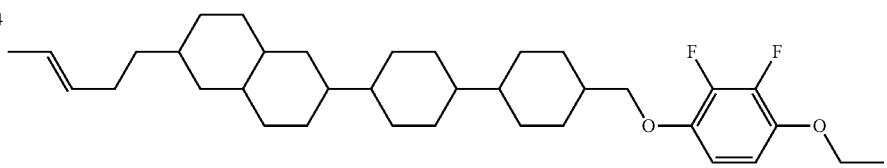 |
| 295 | 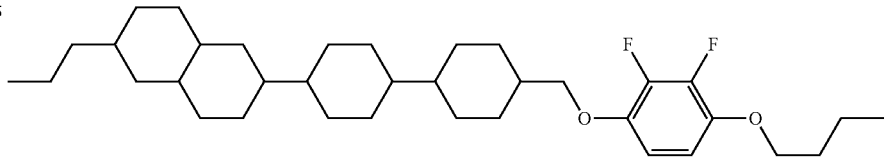 |
| 296 | 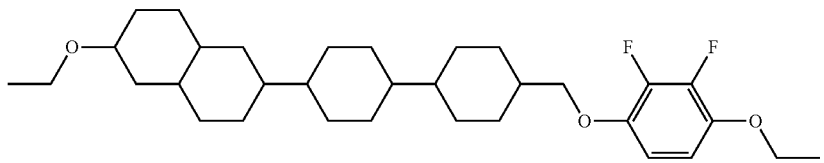 [SMILES: CCOc1ccc(OCC2CCC(C3CCC(C4CCC5CC(OCC)CCC5C4)CC3)CC2)c(F)c1F] |
| 297 | 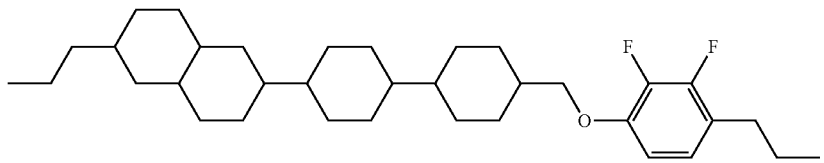 [SMILES: CCCc1ccc(OCC2CCC(C3CCC(C4CCC5CC(CCC)CCC5C4)CC3)CC2)c(F)c1F] |
| 298 | 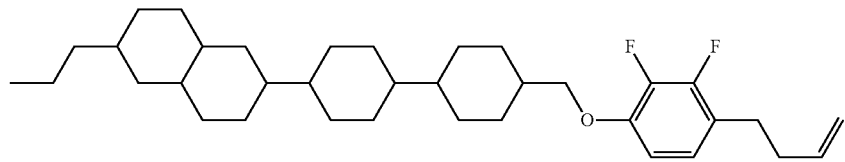 [SMILES: C=CCCc1ccc(OCC2CCC(C3CCC(C4CCC5CC(CCC)CCC5C4)CC3)CC2)c(F)c1F] |
| 299 | 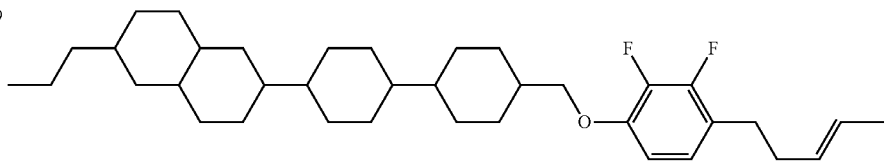 |

-continued
| No. | |
|---|---|
| 300 | 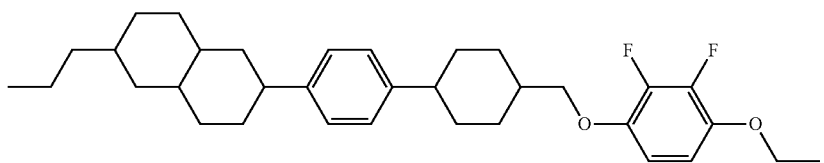 [SMILES: CCCC1CCC2CC(c3ccc(C4CCC(COc5ccc(OCC)c(F)c5F)CC4)cc3)CCC2C1] |
| 301 | 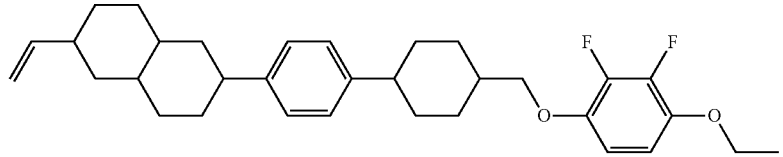 |
| 302 | 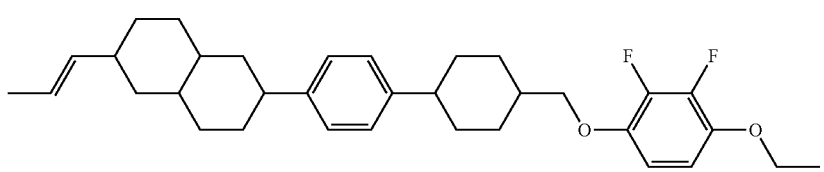 |
| 303 | 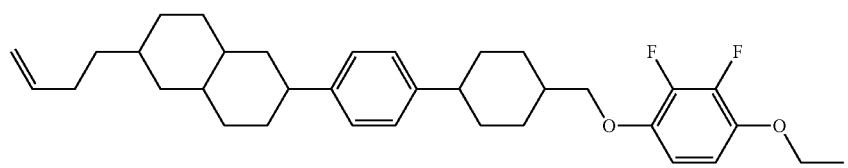 [SMILES: C=CCCC1CCC2CC(c3ccc(C4CCC(COc5ccc(OCC)c(F)c5F)CC4)cc3)CCC2C1] |
| 304 | 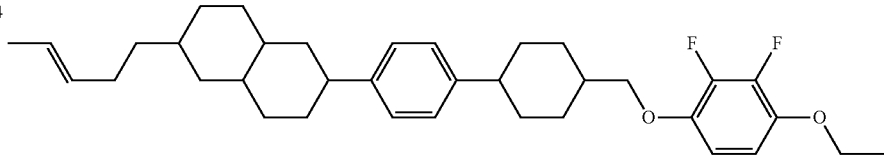 |
| 305 | 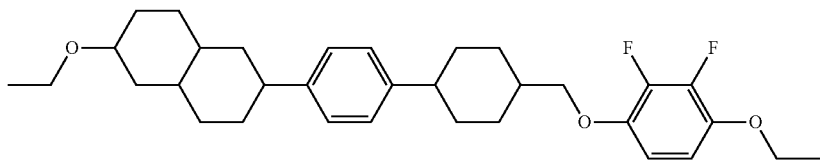 |
| 306 | 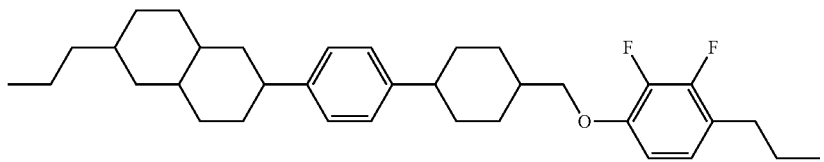 [SMILES: CCCc1ccc(OCC2CCC(c3ccc(C4CCC5CC(CCC)CCC5C4)cc3)CC2)c(F)c1F] |
| 307 | 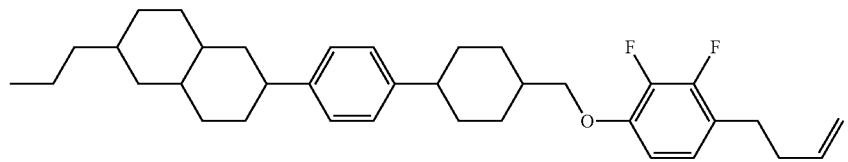 [SMILES: C=CCCc1ccc(OCC2CCC(c3ccc(C4CCC5CC(CCC)CCC5C4)cc3)CC2)c(F)c1F] |
| 308 | 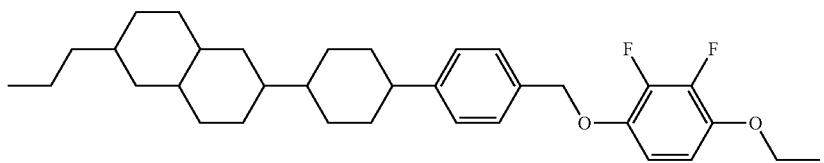 |

| No. |
|---|
| 309 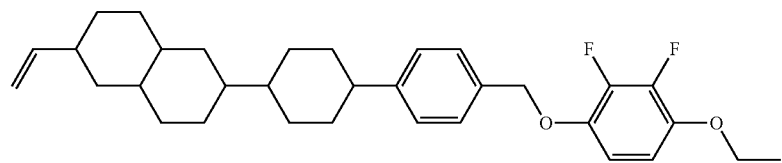 [SMILES: C=CC1CCC2CC(C3CCC(c4ccc(COc5ccc(OCC)c(F)c5F)cc4)CC3)CCC2C1] |
| 310 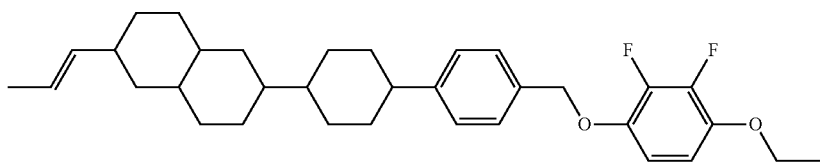 [SMILES: C/C=C/C1CCC2CC(C3CCC(c4ccc(COc5ccc(OCC)c(F)c5F)cc4)CC3)CCC2C1] |
| 311 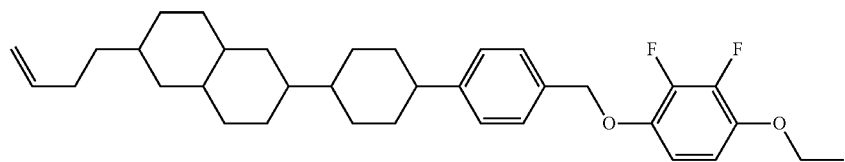 [SMILES: C=CCCC1CCC2CC(C3CCC(c4ccc(COc5ccc(OCC)c(F)c5F)cc4)CC3)CCC2C1] |
| 312 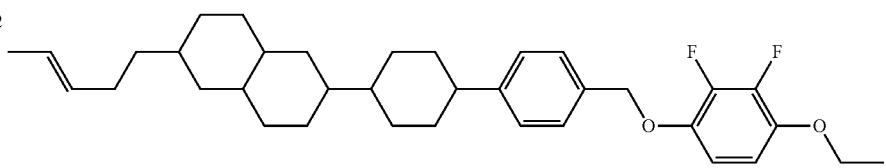 |
| 313 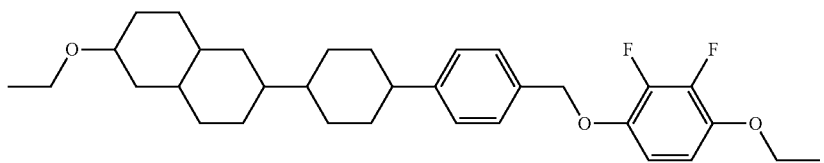 |
| 314 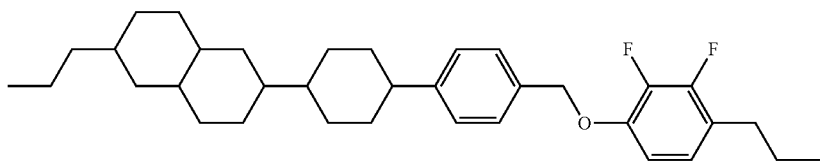 |
| 315 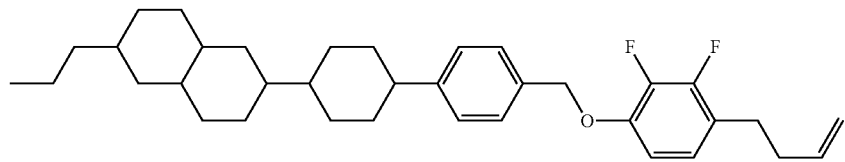 |
| 316 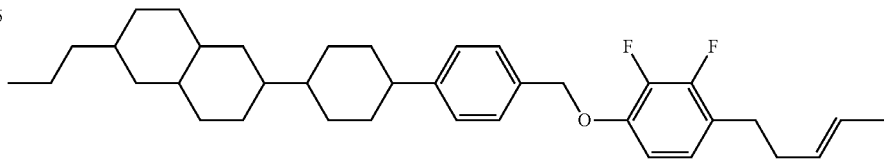 |
| 317 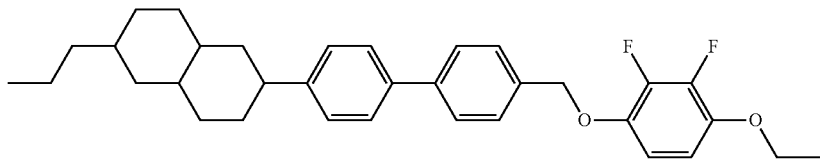 |

-continued
| No. | |
|---|---|
| 318 | 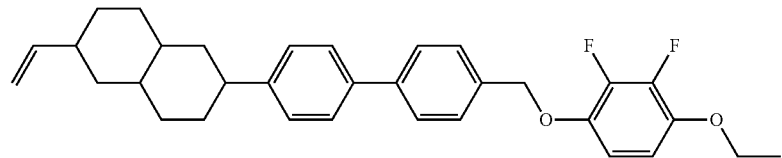 [SMILES: C=CC1CCC2CC(c3ccc(-c4ccc(COc5ccc(OCC)c(F)c5F)cc4)cc3)CCC2C1] |
| 319 | 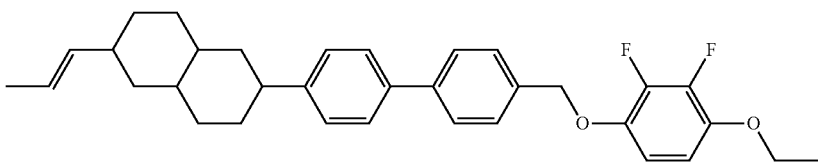 [SMILES: C/C=C/C1CCC2CC(c3ccc(-c4ccc(COc5ccc(OCC)c(F)c5F)cc4)cc3)CCC2C1] |
| 320 | 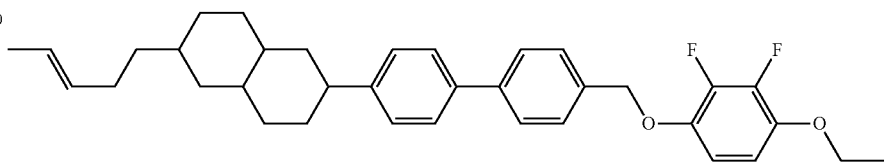 |
| 321 | 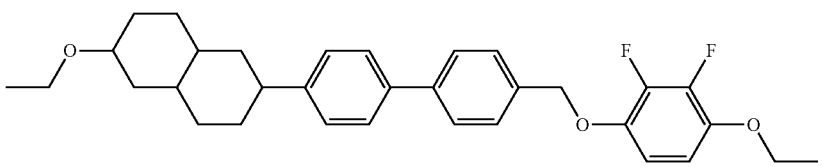 |
| 322 | 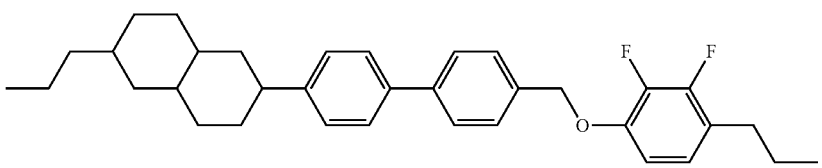 [SMILES: CCCc1ccc(OCc2ccc(-c3ccc(C4CCC5CC(CCC)CCC5C4)cc3)cc2)c(F)c1F] |
| 323 | 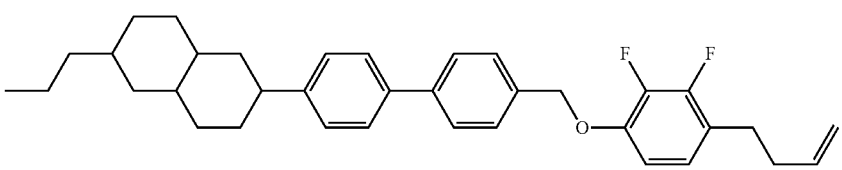 [SMILES: C=CCCc1ccc(OCc2ccc(-c3ccc(C4CCC5CC(CCC)CCC5C4)cc3)cc2)c(F)c1F] |
| 324 | 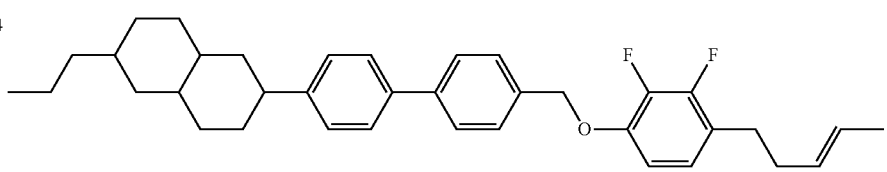 |
| 325 | 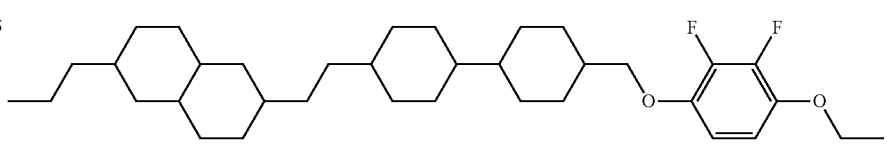 |
| 326 | 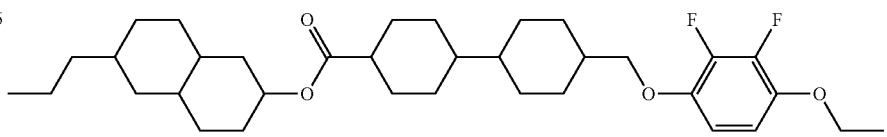 |

-continued
| No. | |
|---|---|
| 327 | 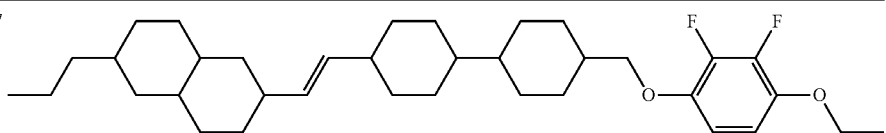 |
| 328 | 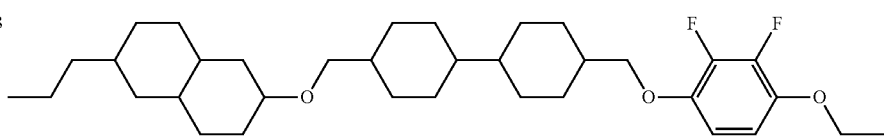 |
| 329 | 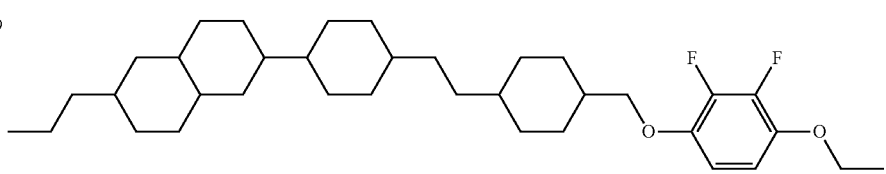 |
| 330 | 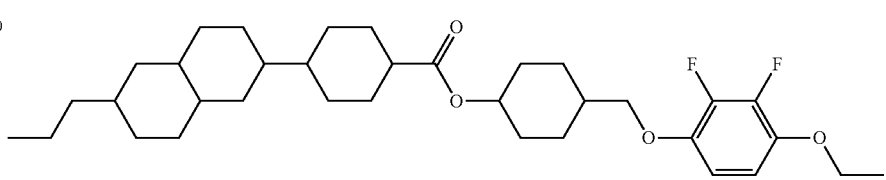 |
| 331 | 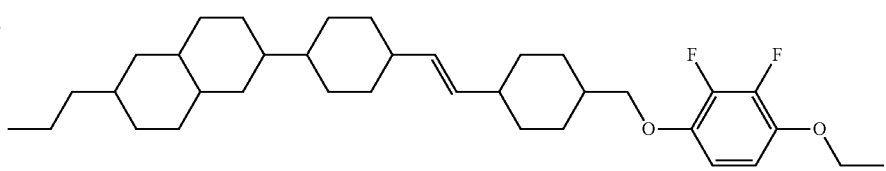 [SMILES: CCCC1CCC2CC(C3CCC(/C=C/C4CCC(COc5ccc(OCC)c(F)c5F)CC4)CC3)CCC2C1] |
| 332 | 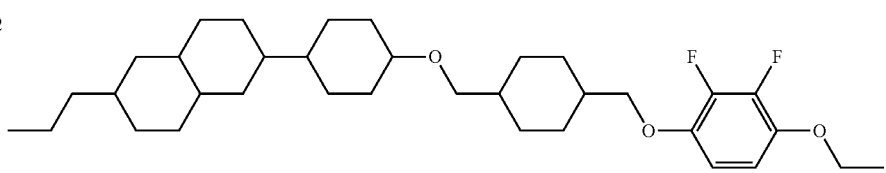 |
| 333 | 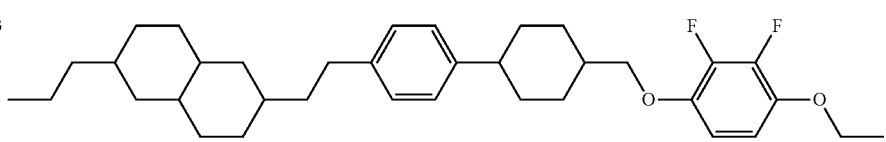 |
| 334 | 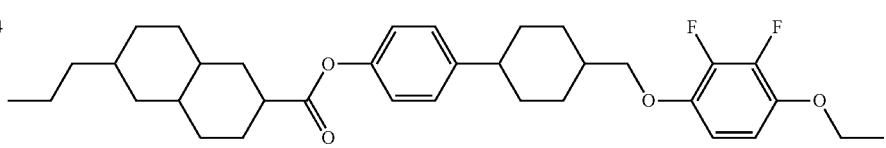 [SMILES: CCCC1CCC2CC(C(=O)Oc3ccc(C4CCC(COc5ccc(OCC)c(F)c5F)CC4)cc3)CCC2C1] |
| 335 | 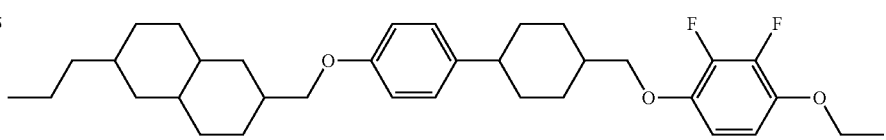 |
| 336 | 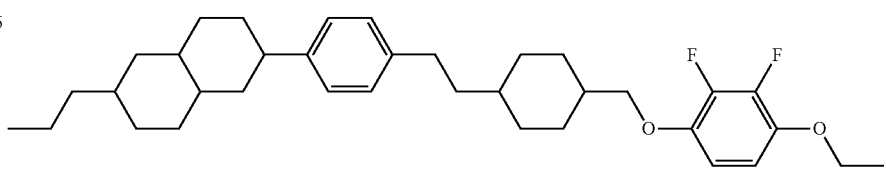 |

| No. | |
|---|---|
| 337 | 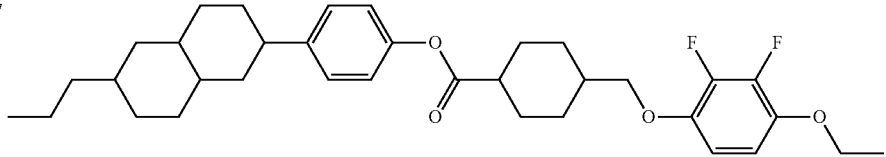 |
| 338 | 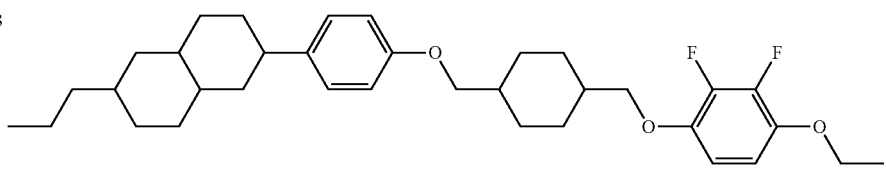 |
| 339 | 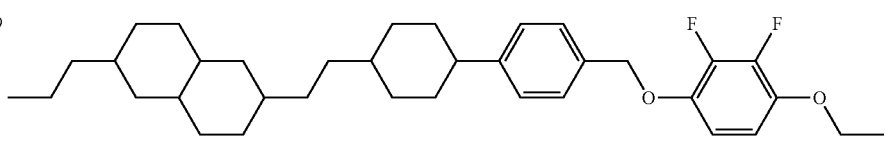 |
| 340 | 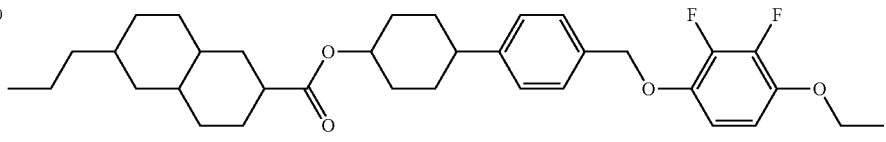 |
| 341 | 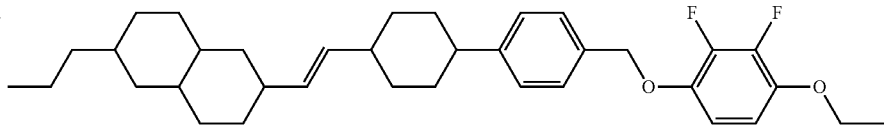 |
| 342 | 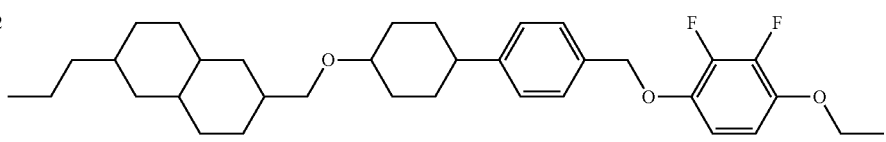 |
| 343 | 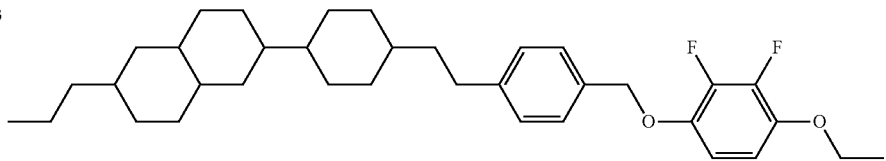 [SMILES: CCCC1CCC2CC(C3CCC(CCc4ccc(COc5ccc(OCC)c(F)c5F)cc4)CC3)CCC2C1] |
| 344 | 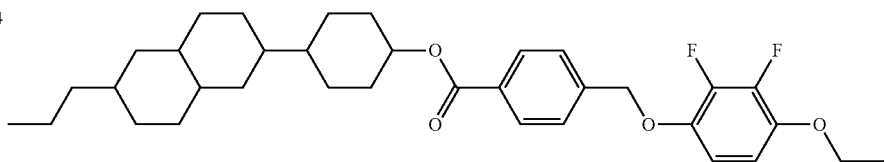 |
| 345 | 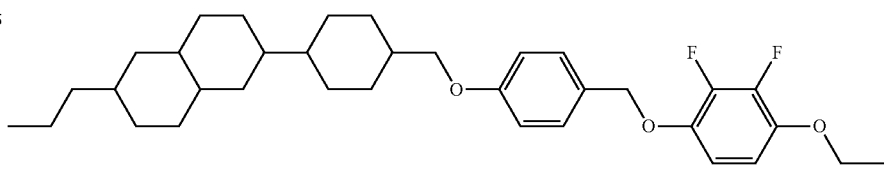 |
| 346 | 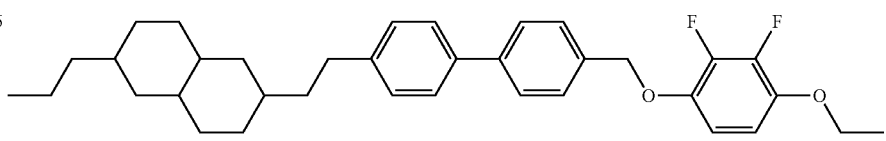 |

| No. | |
|---|---|
| 347 | 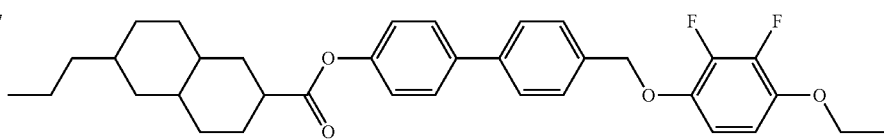 |
| 348 | 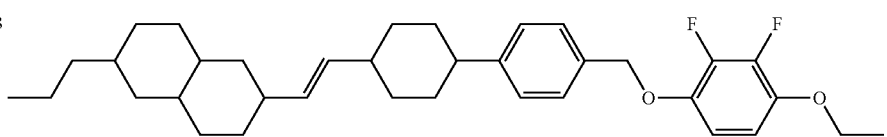 |
| 349 | 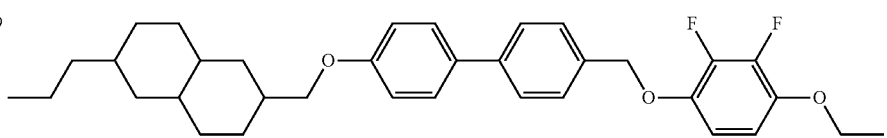 |
| 350 | 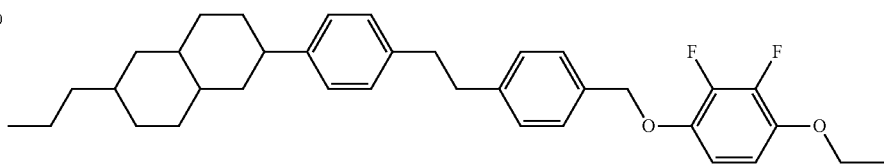 |
| 351 | 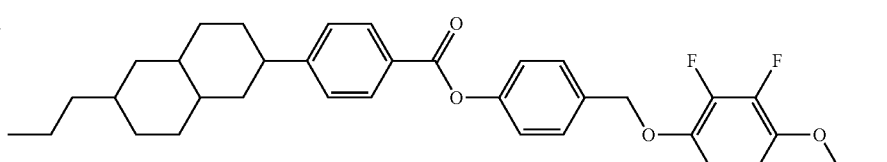 |
| 352 | 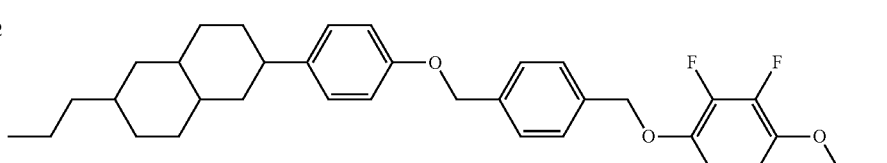 |
| 353 | 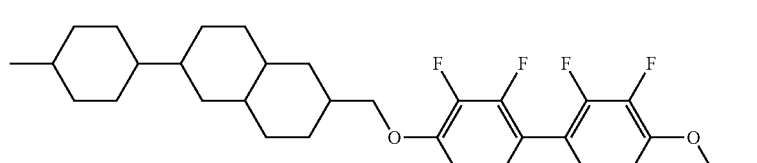 |
| 354 | 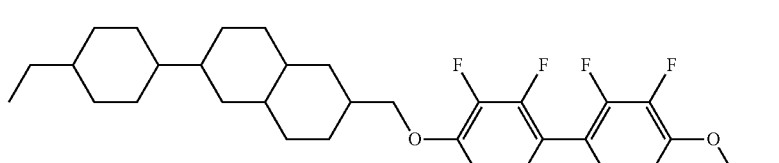 |
| 355 | 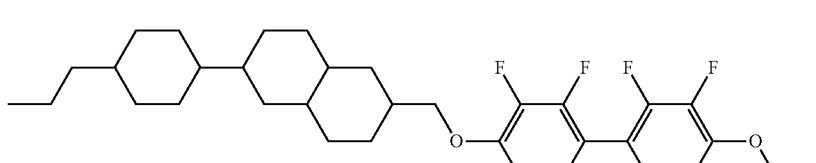 |

| No. |
| --- |
356
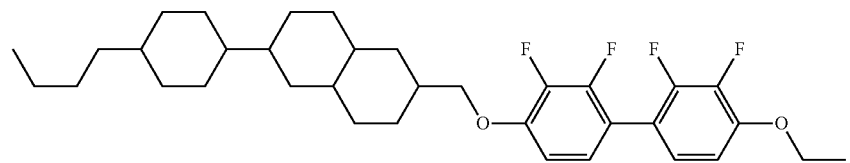
357
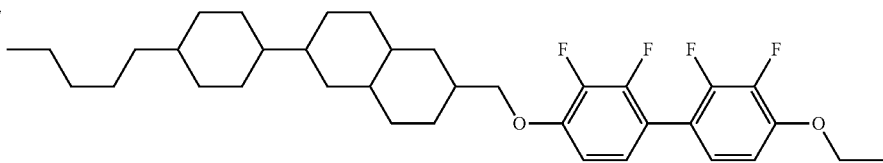
358
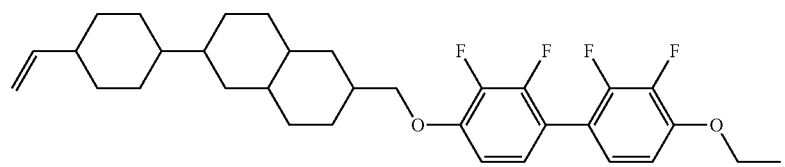 [SMILES: CCOc1ccc(-c2ccc(OCC3CCC4CC(C5CCC(CC)CC5)CCC4C3)c(F)c2F)c(F)c1F]
359
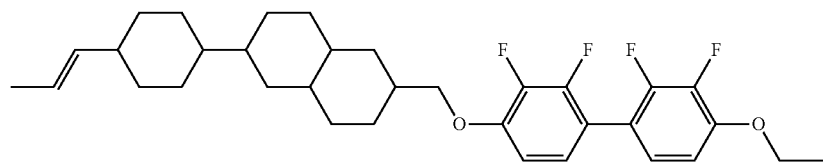 [SMILES: C/C=C/C1CCC(C2CCC3CC(COc4ccc(-c5ccc(OCC)c(F)c5F)c(F)c4F)CCC3C2)CC1]
360
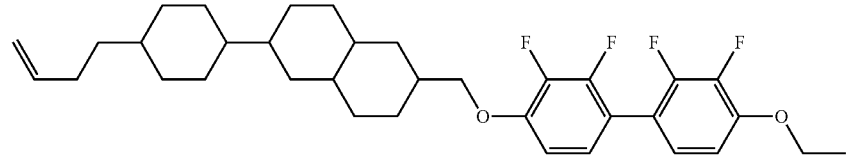 [SMILES: C=CCCC1CCC(C2CCC3CC(COc4ccc(-c5ccc(OCC)c(F)c5F)c(F)c4F)CCC3C2)CC1]
361
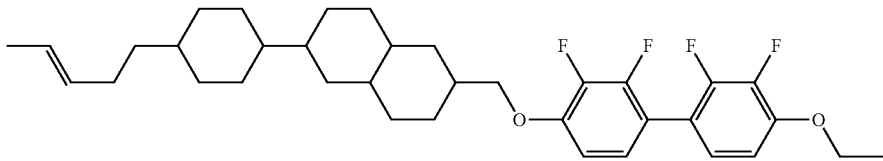 [SMILES: C/C=C/CCC1CCC(C2CCC3CC(COc4ccc(-c5ccc(OCC)c(F)c5F)c(F)c4F)CCC3C2)CC1]
362
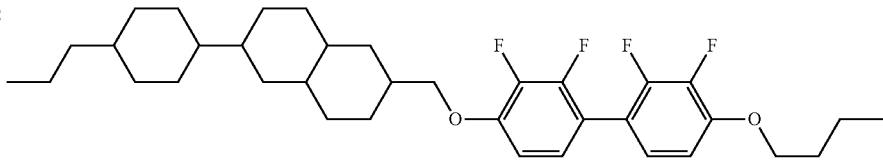 [SMILES: CCCCOc1ccc(-c2ccc(OCC3CCC4CC(C5CCC(CCC)CC5)CCC4C3)c(F)c2F)c(F)c1F]
363
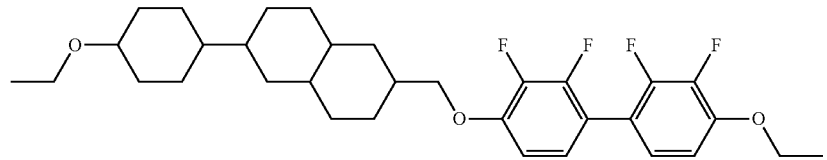
364
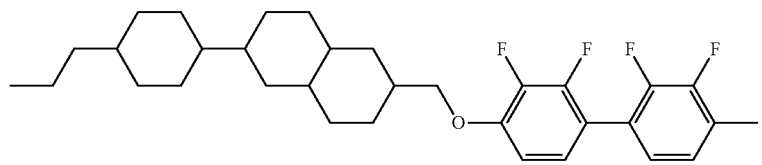 [SMILES: CCCC1CCC(C2CCC3CC(COc4ccc(-c5ccc(C)c(F)c5F)c(F)c4F)CCC3C2)CC1]

-continued
| No. | |
|---|---|
| 365 | 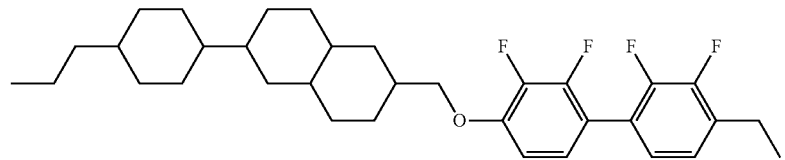 |
| 366 | 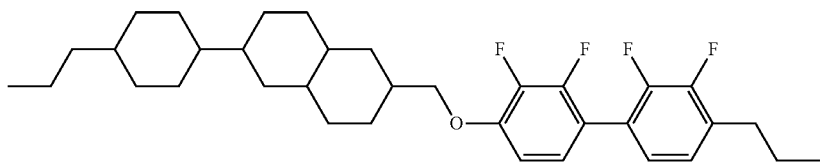 [SMILES: CCCc1ccc(-c2ccc(OCC3CCC4CC(C5CCC(CCC)CC5)CCC4C3)c(F)c2F)c(F)c1F] |
| 367 | 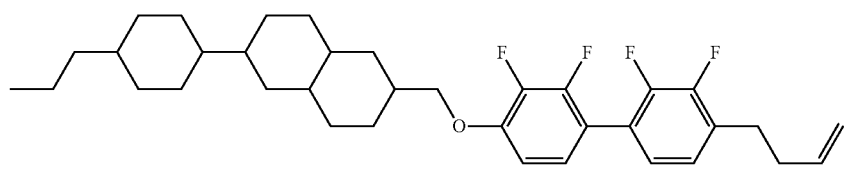 [SMILES: C=CCCc1ccc(-c2ccc(OCC3CCC4CC(C5CCC(CCC)CC5)CCC4C3)c(F)c2F)c(F)c1F] |
| 368 | 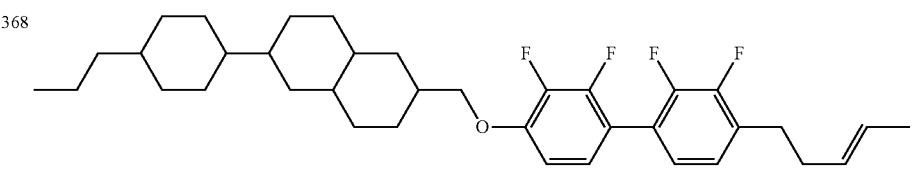 |
| 369 | 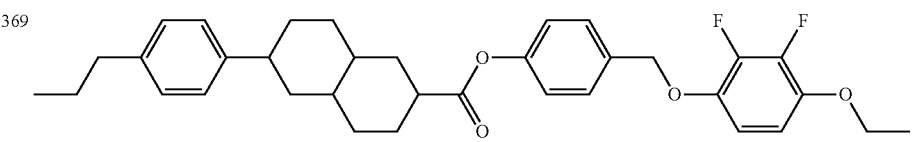 |
| 370 | 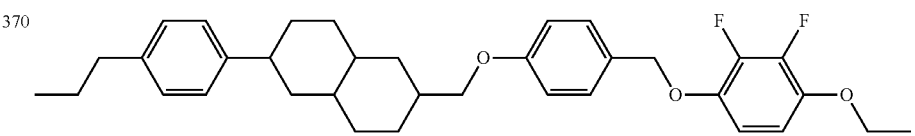 |
| 371 | 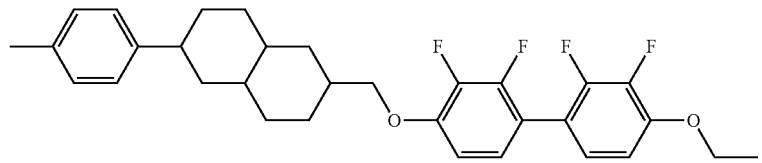 [SMILES: CCOc1ccc(-c2ccc(OCC3CCC4CC(c5ccc(C)cc5)CCC4C3)c(F)c2F)c(F)c1F] |
| 372 | 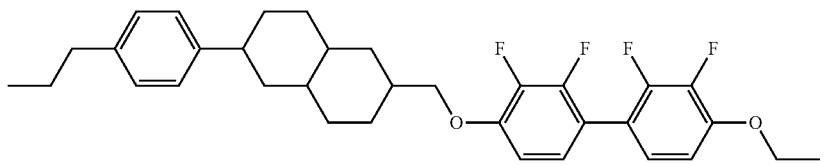 |
| 373 | 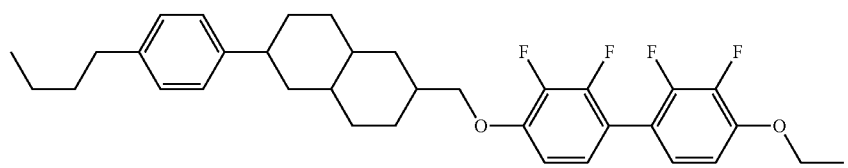 |

-continued
| No. | |
|---|---|
| 374 | 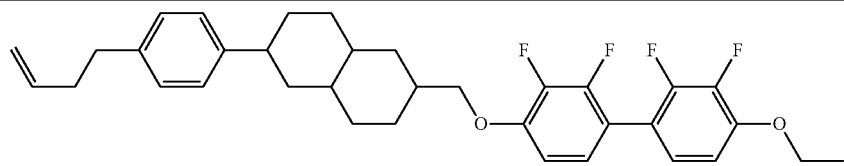 |
| 375 | 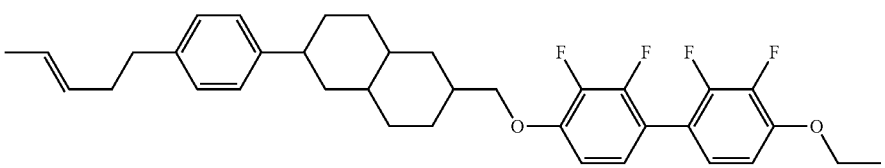 |
| 376 | 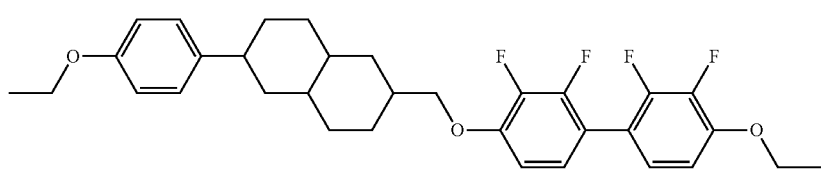 [SMILES: CCCc1ccc(C2CCC3CC(COc4ccc(-c5ccc(OCC)c(F)c5F)c(F)c4F)CCC3C2)cc1] |
| 377 | 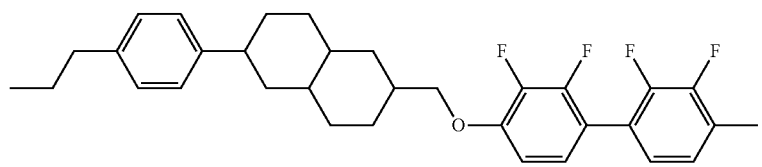 [SMILES: CCCc1ccc(C2CCC3CC(COc4ccc(-c5ccc(C)c(F)c5F)c(F)c4F)CCC3C2)cc1] |
| 378 | 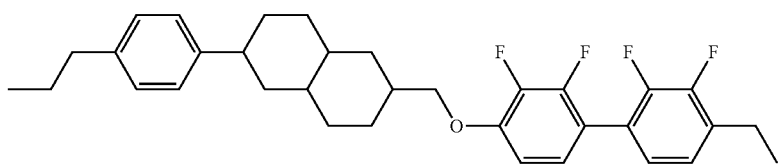 [SMILES: CCCc1ccc(C2CCC3CC(COc4ccc(-c5ccc(CC)c(F)c5F)c(F)c4F)CCC3C2)cc1] |
| 379 | 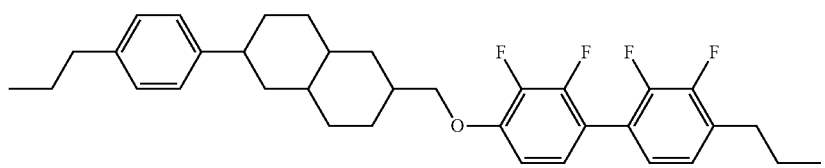 |
| 380 | 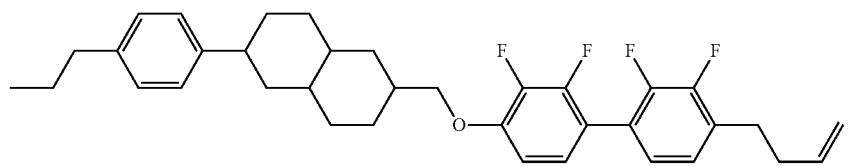 [SMILES: C=CCCc1ccc(-c2ccc(OCC3CCC4CC(c5ccc(CCC)cc5)CCC4C3)c(F)c2F)c(F)c1F] |
| 381 | 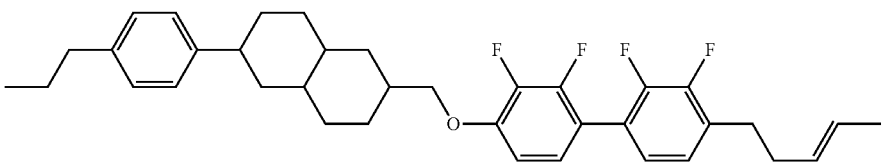 [SMILES: C/C=C/CCc1ccc(-c2ccc(OCC3CCC4CC(c5ccc(CCC)cc5)CCC4C3)c(F)c2F)c(F)c1F] |
| 382 | 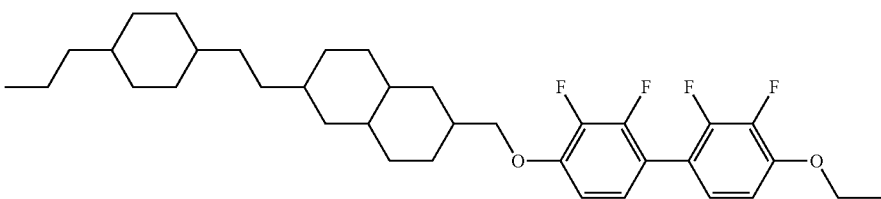 [SMILES: CCCC1CCC(CCC2CCC3CC(COc4ccc(-c5ccc(OCC)c(F)c5F)c(F)c4F)CCC3C2)CC1] |

| No. |
|---|
| 383 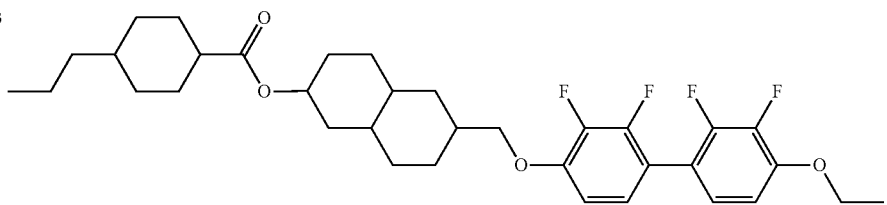 [SMILES: CCCC1CCC(C(=O)OC2CCC3CC(COc4ccc(-c5ccc(OCC)c(F)c5F)c(F)c4F)CCC3C2)CC1] |
| 384 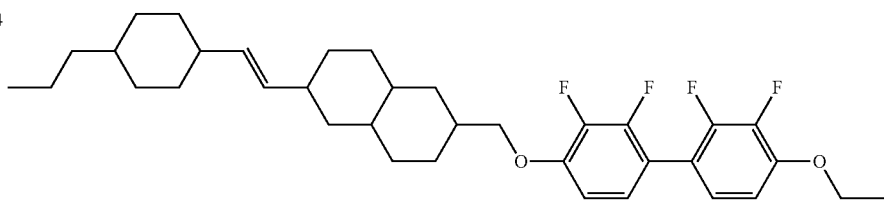 |
| 385 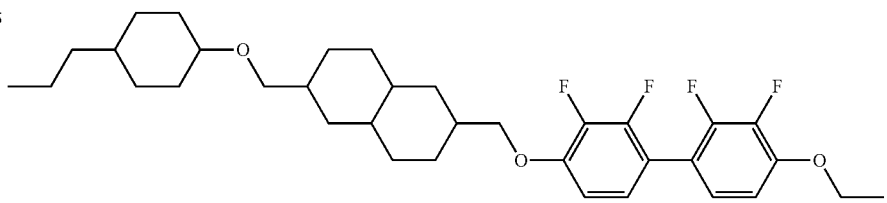 |
| 386 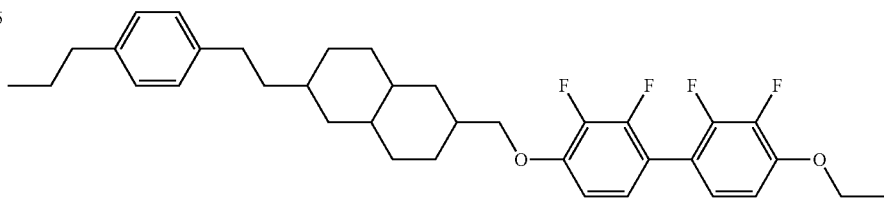 |
| 387 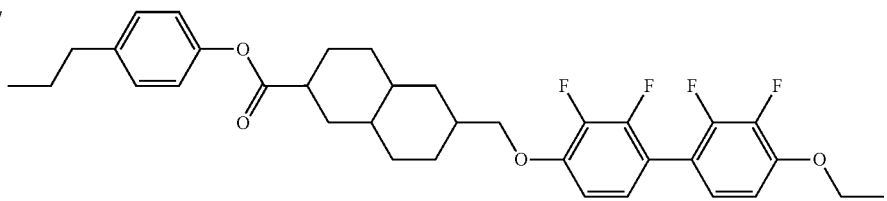 |
| 388 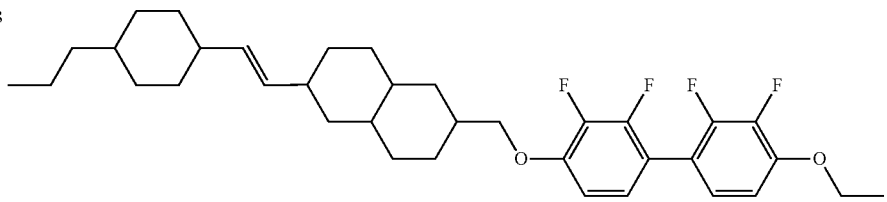 |
| 389 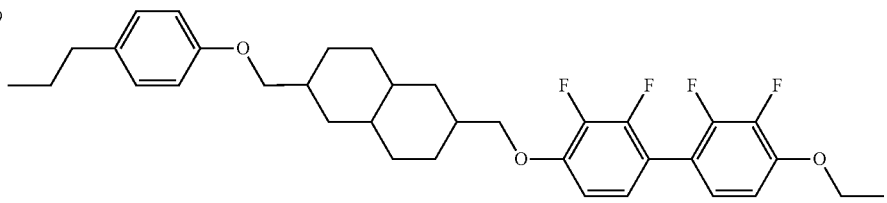 |

-continued
| No. | |
|---|---|
| 390 | 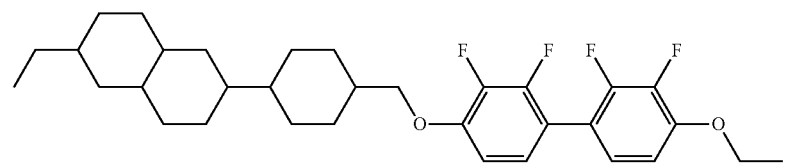 [SMILES: C=CC1CCC2CC(C3CCC(COc4ccc(-c5ccc(OCC)c(F)c5F)c(F)c4F)CC3)CCC2C1] |
| 391 | 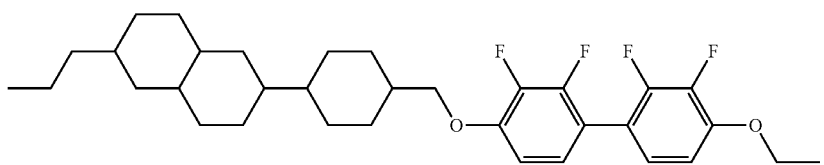 |
| 392 | 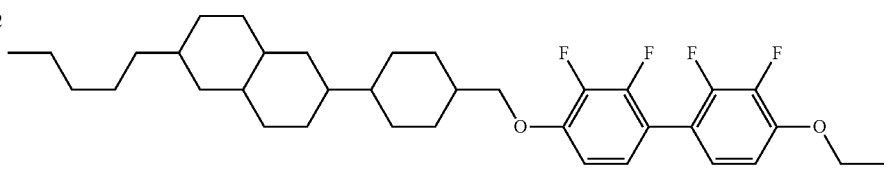 |
| 393 | 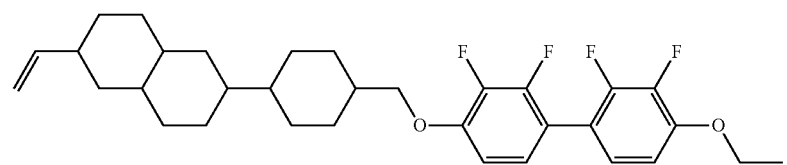 |
| 394 | 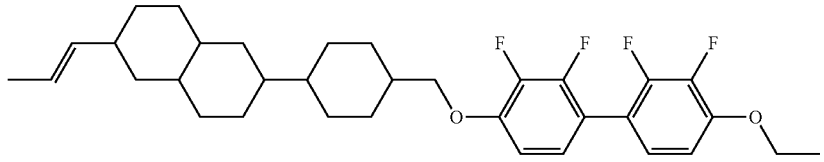 [SMILES: C/C=C/C1CCC2CC(C3CCC(COc4ccc(-c5ccc(OCC)c(F)c5F)c(F)c4F)CC3)CCC2C1] |
| 395 | 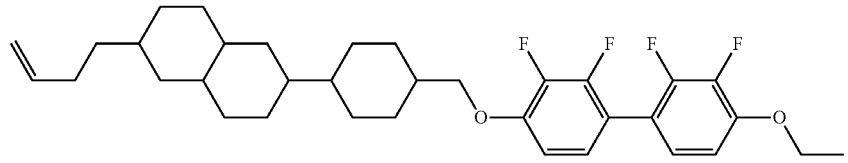 |
| 396 | 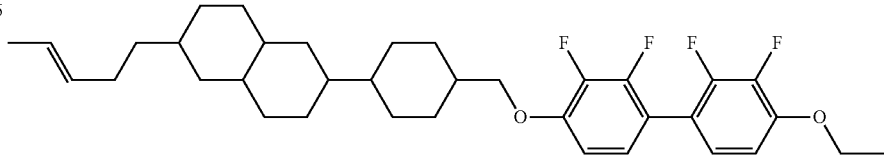 |
| 397 | 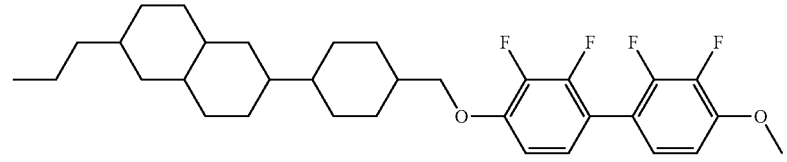 [SMILES: CCCC1CCC2CC(C3CCC(COc4ccc(-c5ccc(OC)c(F)c5F)c(F)c4F)CC3)CCC2C1] |
| 398 | 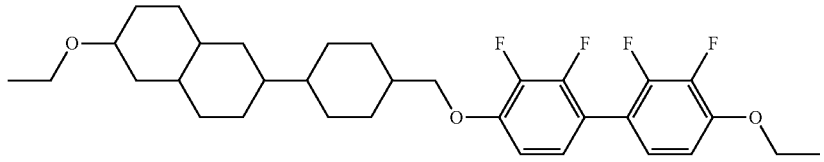 |

| No. | |
|---|---|
| 399 | 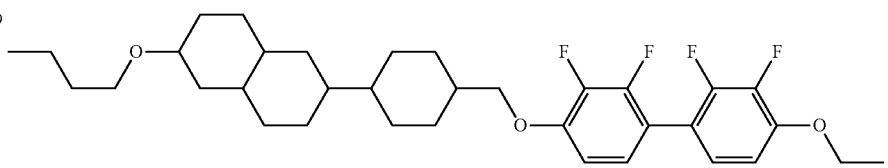 |
| 400 | 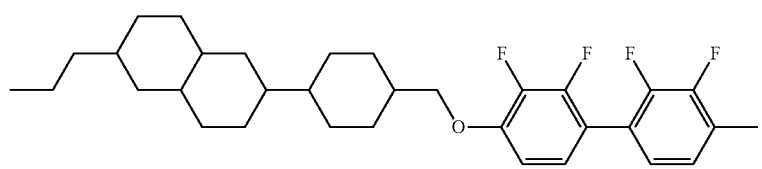 [SMILES: CCCC1CCC2CC(C3CCC(COc4ccc(-c5ccc(C)c(F)c5F)c(F)c4F)CC3)CCC2C1] |
| 401 | 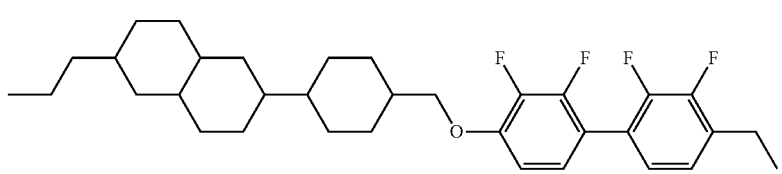 [SMILES: CCCC1CCC2CC(C3CCC(COc4ccc(-c5ccc(CC)c(F)c5F)c(F)c4F)CC3)CCC2C1] |
| 402 | 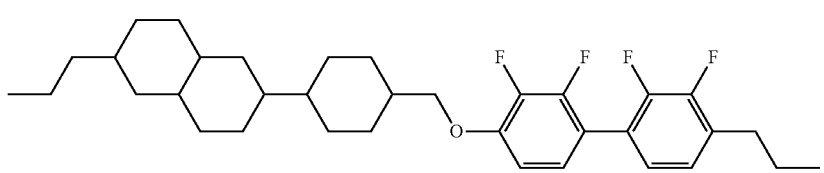 |
| 403 | 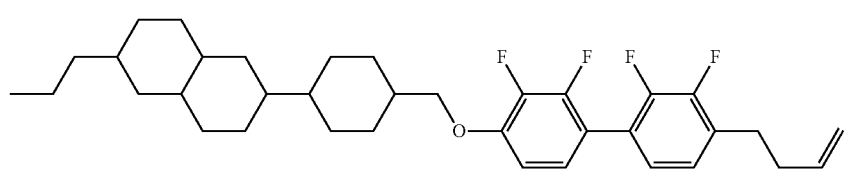 [SMILES: C=CCCc1ccc(-c2ccc(OCC3CCC(C4CCC5CC(CCC)CCC5C4)CC3)c(F)c2F)c(F)c1F] |
| 404 | 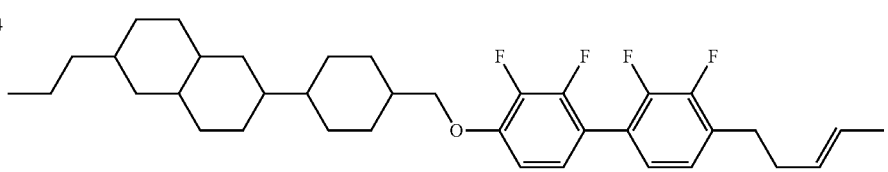 |
| 405 | 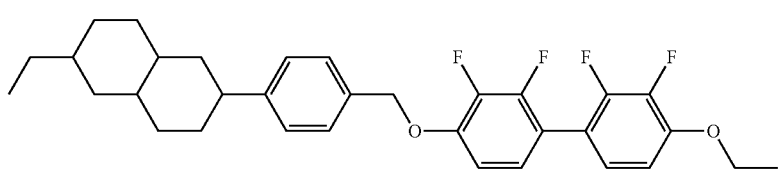 [SMILES: CCOc1ccc(-c2ccc(OCc3ccc(C4CCC5CC(CC)CCC5C4)cc3)c(F)c2F)c(F)c1F] |
| 406 | 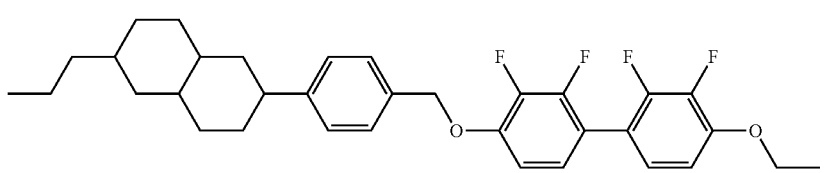 |
| 407 | 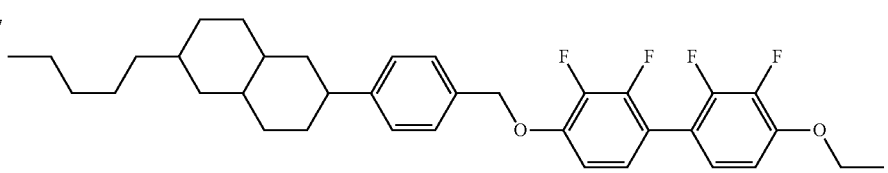 |

-continued
| No. | |
|---|---|
| 408 | 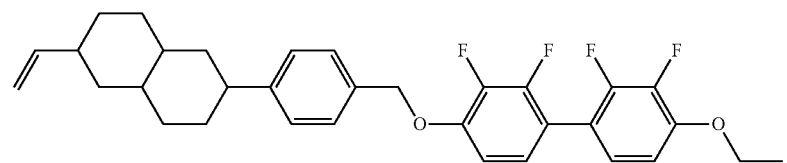 [SMILES: C=CC1CCC2CC(c3ccc(COc4ccc(-c5ccc(OCC)c(F)c5F)c(F)c4F)cc3)CCC2C1] |
| 409 | 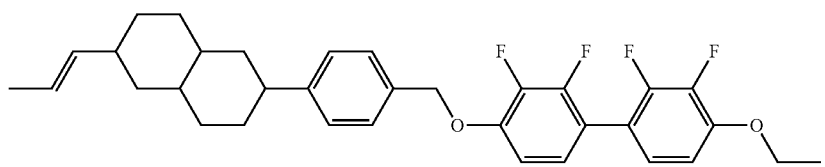 |
| 410 | 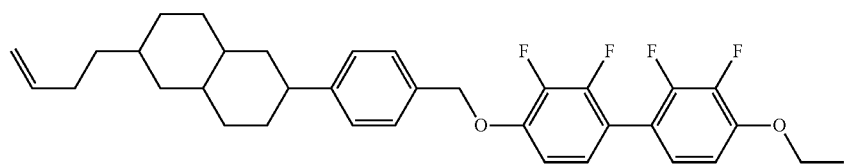 |
| 411 | 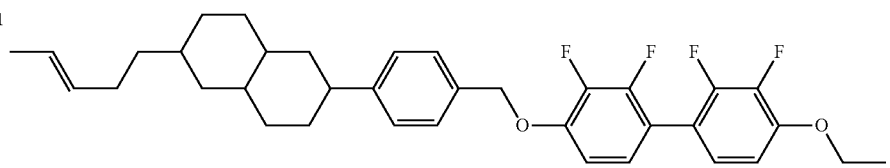 |
| 412 | 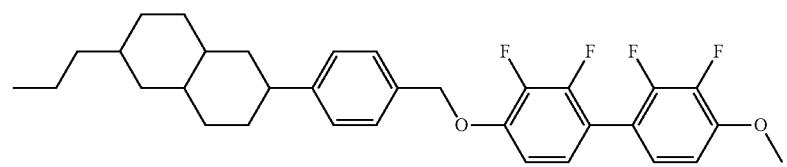 [SMILES: CCCC1CCC2CC(c3ccc(COc4ccc(-c5ccc(OC)c(F)c5F)c(F)c4F)cc3)CCC2C1] |
| 413 | 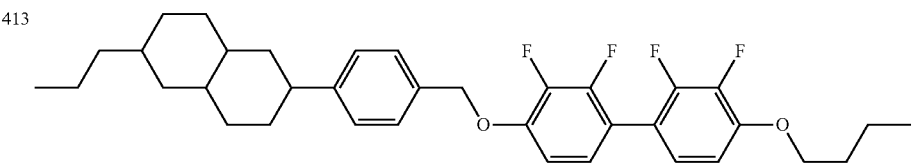 |
| 414 | 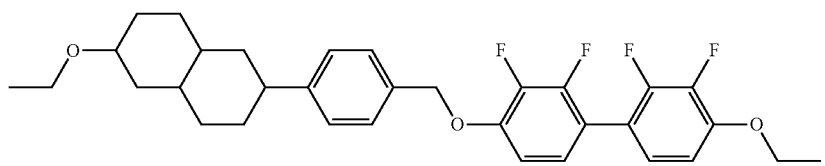 |
| 415 | 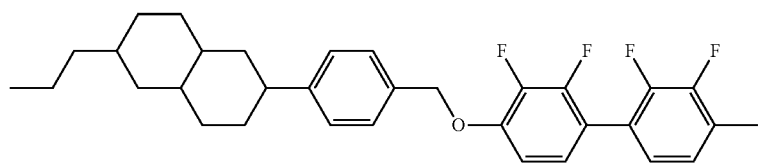 [SMILES: CCCC1CCC2CC(c3ccc(COc4ccc(-c5ccc(C)c(F)c5F)c(F)c4F)cc3)CCC2C1] |
| 416 | 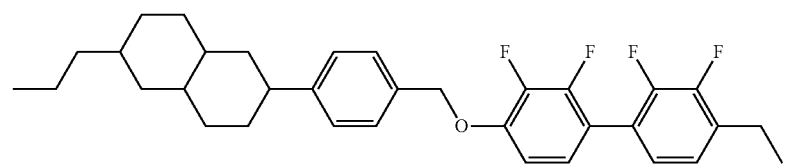 [SMILES: CCCC1CCC2CC(c3ccc(COc4ccc(-c5ccc(CC)c(F)c5F)c(F)c4F)cc3)CCC2C1] |

-continued
| No. | |
|---|---|
| 417 | 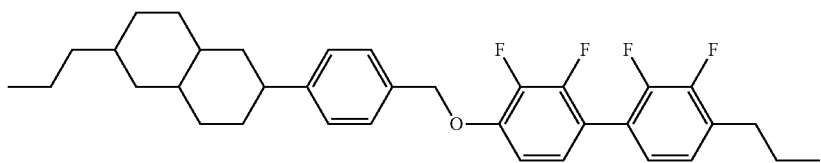 [SMILES: CCCc1ccc(-c2ccc(OCc3ccc(C4CCC5CC(CCC)CCC5C4)cc3)c(F)c2F)c(F)c1F] |
| 418 | 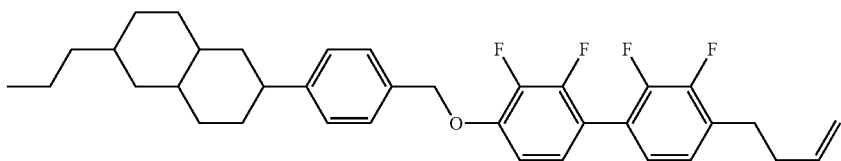 |
| 419 | 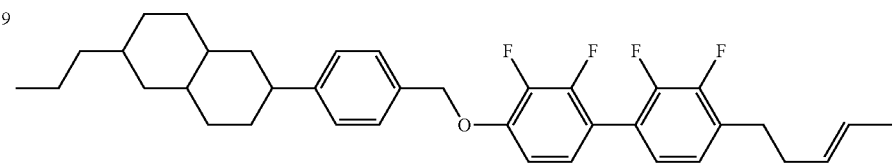 |
| 420 | 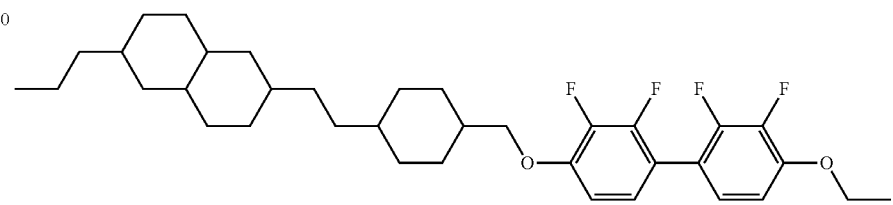 |
| 421 | 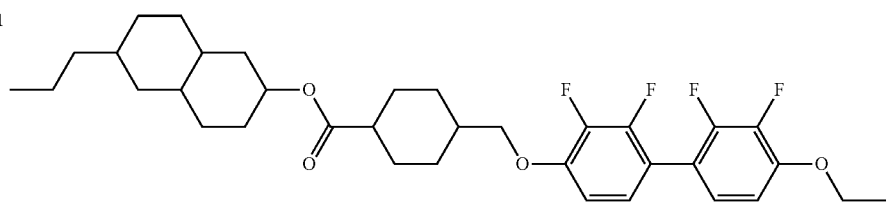 |
| 422 | 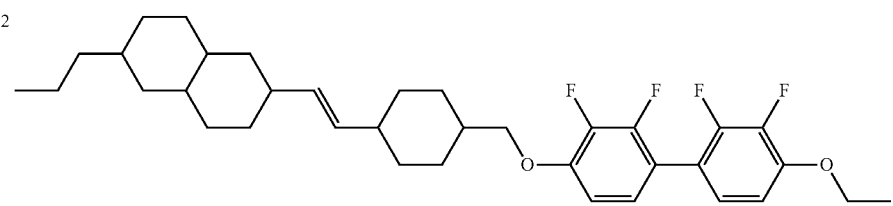 |
| 423 | 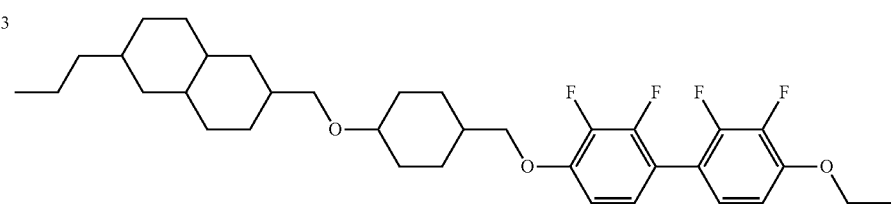 |
| 424 | 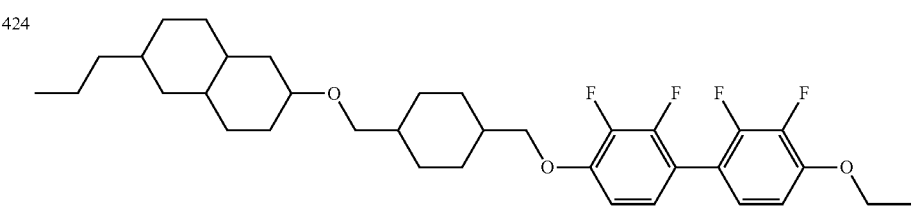 |

| No. | |
|---|---|
| 425 | 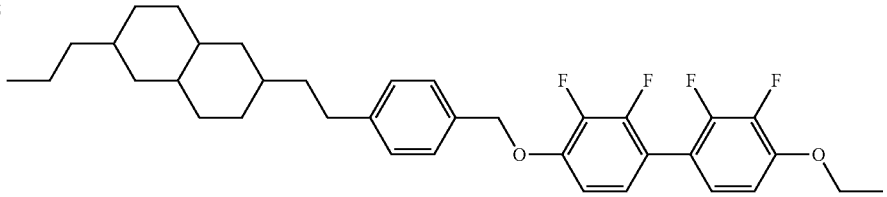 [SMILES: CCCC1CCC2CC(CCc3ccc(COc4ccc(-c5ccc(OCC)c(F)c5F)c(F)c4F)cc3)CCC2C1] |
| 426 | 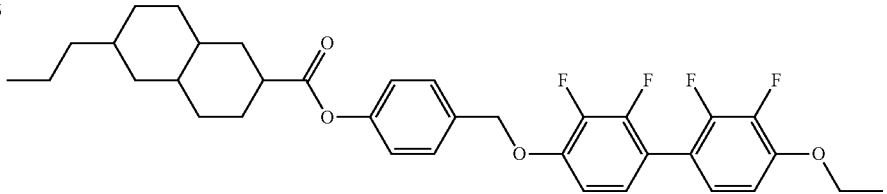 [SMILES: CCCC1CCC2CC(C(=O)Oc3ccc(COc4ccc(-c5ccc(OCC)c(F)c5F)c(F)c4F)cc3)CCC2C1] |
| 427 | 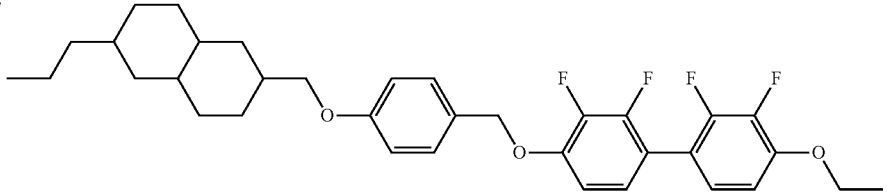 |

Example of the Liquid Crystal Composition

Typical compositions of the invention were summarized in Example 6. First, compounds that are a component of the composition and their amounts (% by weight) were shown. The compounds were expressed in the symbols of a left-terminal group, a bonding group, a ring structure and a right-terminal group according to the definition in Table 3.

TABLE 3

Method of Description of Compounds using Symbols
R—(A₁)—Z₁—...—Zₙ—(Aₙ)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |
| 2) Right-terminal Group —R' | Symbol |
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —CH=$CF_2$ | —VFF |
| —$COOCH_3$ | —EMe |
| —F | —VFF |
| —CN | —C |
| 3) Bonding Group —$Z_n$— | Symbol |
| —$OC_nH_{2n}O$— | OnO |
| —$C_nH_{2n}$— | n |
| —COO— | E |
| —CH=CH— | V |
| —C≡C— | T |
| —$CH_2O$— | 1O |

TABLE 3-continued

Method of Description of Compounds using Symbols
R—(A₁)—Z₁—...—Zₙ—(Aₙ)—R'

| | |
|---|---|
| —$OCH_2$— | O1 |
| —$SiH_2$— | Si |
| —$CF_2O$— | X |
| —$OCF_2$— | x |
| 4) Ring Structure —$A_n$— | Symbol |
| cyclohexane ring | H |
| cyclohexene ring | ch |
| benzene ring | B |
| 2-fluorobenzene ring | B(2F) |
| 3-fluorobenzene ring | B(3F) |

TABLE 3-continued

Method of Description of Compounds using Symbols
R—(A₁)—Z₁—...—Zₙ—(Aₙ)—R'

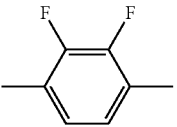  B(2F,3F)

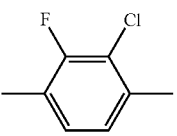  B(2F,3CL)

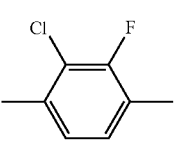  B(2CL, 3F)

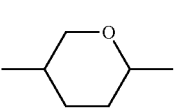  dh

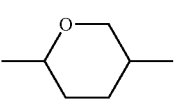  Dh

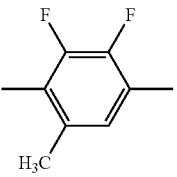  B(2F,3F,6Me)

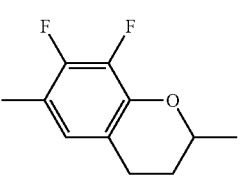  Cro(7F,8F)

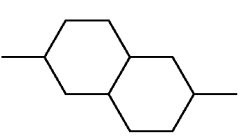  Npd

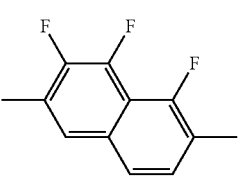  Np(1F,7F,8F)

5) Examples of Description

Example 1.

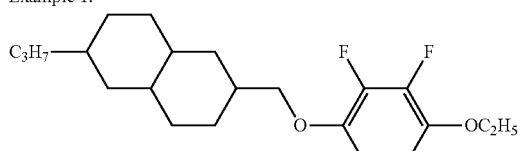

3-Npd1OB(2F,3F)-O2

TABLE 3-continued

Method of Description of Compounds using Symbols
R—(A₁)—Z₁—...—Zₙ—(Aₙ)—R'

Example 2.

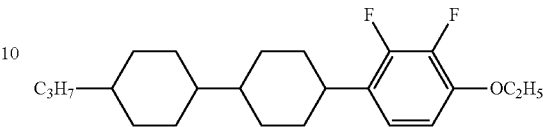

3-HHB(2F,3F)-O2

Example 3.

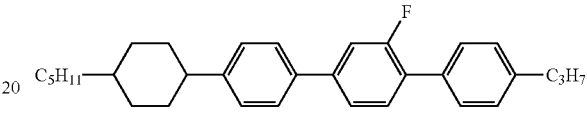

5-HBB(3F)B-3

Example 4.

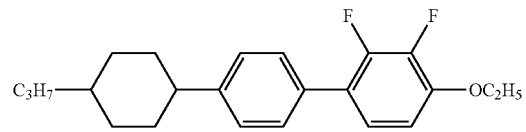

3-HBB(2F,3F)-O2

Example 6

Composition Example 1

| | | |
|---|---|---|
| 3-Npd1OB(2F,3F)-O2 | (No. 3) | 20% |
| 3-HB(2F,3F)-O2 | (6-1) | 20% |
| 5-H2B(2F,3F)-O2 | (6-4) | 20% |
| 3-HHB(2F,3F)-O2 | (7-1) | 10% |
| 5-HHB(2F,3F)-O2 | (7-1) | 10% |
| 2-HBB(2F,3F)-O2 | (7-7) | 10% |
| 3-HBB(2F,3F)-O2 | (7-7) | 10% |

NI = 73.6° C.; Δn = 0.106; Δε = −7.4; η = 37.3 mPa · sec.

Composition Example 2

| | | |
|---|---|---|
| 3-Npd1OB(2F,3F)-O2 | (No. 3) | 15% |
| 3-HB(2F,3F)-O2 | (6-1) | 20% |
| 5-H2B(2F,3F)-O2 | (6-4) | 5% |
| 3-HHB(2F,3F)-O2 | (7-1) | 10% |
| 5-HHB(2F,3F)-O2 | (7-1) | 10% |
| 2-HH1OB(2F,3F)-O2 | (7-5) | 4% |
| 3-HH1OB(2F,3F)-O2 | (7-5) | 4% |
| 2-HBB(2F,3F)-O2 | (7-7) | 10% |
| 3-HBB(2F,3F)-O2 | (7-7) | 10% |
| 5-HB-3 | (12-5) | 10% |
| 3-HBBH-3 | (14-1) | 2% |

NI = 82.2° C.; Δn = 0.109; Δε = −6.9; η = 36.8 mPa · sec.

Composition Example 3

| | | |
|---|---|---|
| 3-Npd1OB(2F,3F)-O2 | (No. 3) | 10% |
| 3-HB(2F,3F)-O2 | (6-1) | 20% |
| 3-H2B(2F,3F)-O2 | (6-4) | 10% |
| 5-H2B(2F,3F)-O2 | (6-4) | 10% |
| 3-HHB(2F,3F)-O2 | (7-1) | 5% |
| 5-HHB(2F,3F)-O2 | (7-1) | 5% |
| 2-HBB(2F,3F)-O2 | (7-7) | 10% |
| 3-HBB(2F,3F)-O2 | (7-7) | 10% |
| 5-HB-3 | (12-5) | 10% |
| 3-HBB-2 | (13-4) | 5% |
| 2-BB(3F)B-3 | (13-6) | 5% |

NI = 62.3° C.; Δn = 0.115; Δε = −6.0; η = 30.7 mPa·sec.

Composition Example 4

| | | |
|---|---|---|
| 3-Npd1OB(2F,3F)B(2F,3F)-O2 | (No. 120) | 10% |
| 3-HB(2F,3F)-O2 | (6-1) | 10% |
| 5-HB(2F,3F)-O2 | (6-1) | 10% |
| 3-H2B(2F,3F)-O2 | (6-4) | 15% |
| 5-H2B(2F,3F)-O2 | (6-4) | 15% |
| 3-HHB(2F,3F)-O2 | (7-1) | 10% |
| 5-HHB(2F,3F)-O2 | (7-1) | 10% |
| 2-HBB(2F,3F)-O2 | (7-7) | 10% |
| 3-HBB(2F,3F)-O2 | (7-7) | 10% |

NI = 77.0° C.; Δn = 0.111; Δε = −7.5; η = 42.6 mPa·sec.

Composition Example 5

| | | |
|---|---|---|
| 3-Npd1OB(2F,3F)-O2 | (No. 3) | 5% |
| 3-Npd1OB(2F,3F)B(2F,3F)-O2 | (No. 120) | 10% |
| 3-HB(2F,3F)-O2 | (6-1) | 20% |
| 5-HB(2F,3F)-O2 | (6-1) | 10% |
| 5-H2B(2F,3F)-O2 | (6-4) | 20% |
| 3-HHB(2F,3F)-O2 | (7-1) | 5% |
| 5-HHB(2F,3F)-O2 | (7-1) | 5% |
| 2-HBB(2F,3F)-O2 | (7-7) | 10% |
| 3-HBB(2F,3F)-O2 | (7-7) | 10% |
| 2-BB(3F)B-3 | (13-6) | 5% |

NI = 70.5° C.; Δn = 0.118; Δε = −7.4; η = 42.8 mPa·sec.

Composition Example 6

| | | |
|---|---|---|
| 3-Npd1OB(2F,3F)B(2F,3F)-O2 | (No. 120) | 10% |
| 3-HB(2F,3F)-O2 | (6-1) | 10% |
| 5-HB(2F,3F)-O2 | (6-1) | 10% |
| 3-H2B(2F,3F)-O2 | (6-4) | 13% |
| 5-H2B(2F,3F)-O2 | (6-4) | 20% |
| 3-HHB(2F,3F)-O2 | (7-1) | 5% |
| 5-HHB(2F,3F)-O2 | (7-1) | 5% |
| 3-HBB(2F,3F)-O2 | (7-7) | 10% |
| 4-HBB(2F,3F)-O2 | (7-7) | 10% |
| 2-BB(3F)B-3 | (13-6) | 5% |
| 3-HBBH-3 | (14-1) | 2% |

NI = 75.3° C.; Δn = 0.118; Δε = −7.2; η = 43.0 mPa·sec.

Composition Example 7

| | | |
|---|---|---|
| 3-NpdH1OB(2F,3F)-O2 | (No. 68) | 8% |
| 3-HB(2F,3F)-O4 | (6-1) | 10% |
| 5-HB(2F,3F)-O4 | (6-1) | 10% |
| V-HB(2F,3F)-O4 | (6-1) | 7% |
| 3-H2B(2F,3F)-O2 | (6-4) | 20% |
| 2-HH1OB(2F,3F)-O2 | (7-5) | 5% |
| 3-HH1OB(2F,3F)-O2 | (7-5) | 5% |
| 3-HBB(2F,3F)-O2 | (7-7) | 10% |
| 4-HHB(2F,3Cl)-O2 | (7-12) | 5% |
| 3-HH2B(2F,3F,6Me)-O2 | (11-6) | 5% |
| 3-HH1OCro(7F,8F)-5 | (10-6) | 3% |
| 5-HH1OCro(7F,8F)-5 | (10-6) | 3% |
| 2-HH1OCro(7F,8F)-4 | (10-6) | 3% |
| 3-BB(2F,3F)B-O2 | (8-1) | 6% |

NI = 73.1° C.; Δn = 0.102; Δε = −7.3; η = 46.5 mPa·sec.

Composition Example 8

| | | |
|---|---|---|
| 3-Npd1OB(2F,3F)B(2F,3F)-O2 | (No. 120) | 5% |
| 3-NpdH1OB(2F,3F)B(2F,3F)-O2 | (No. 391) | 3% |
| 3-H2B(2F,3F)-O2 | (6-4) | 25% |
| 5-H2B(2F,3F)-O2 | (6-4) | 25% |
| 2-HBB(2F,3F)-O2 | (7-7) | 10% |
| 3-HBB(2F,3F)-O2 | (7-7) | 10% |
| 2-HHB(2F,3CL)-O2 | (7-12) | 5% |
| 3-HHB(2F,3CL)-O2 | (7-12) | 5% |
| 3-HH1OB(2F,3F,6Me)-O2 | (11-7) | 5% |
| 5-HH1OB(2F,3F,6Me)-O2 | (11-7) | 5% |
| 5-HH1ONp(1F,7F,8F)-O4 | (9-3) | 2% |

NI = 74.3° C.; Δn = 0.107; Δε = −7.1; η = 44.6 mPa·sec.

Composition Example 9

| | | |
|---|---|---|
| 3-Npd1OB(2F,3F)-O2 | (No. 3) | 6% |
| 3-NpdH1OB(2F,3F)-O2 | (No. 68) | 6% |
| 3-HB(2F,3F)-O4 | (6-1) | 10% |
| 5-HB(2F,3F)-O4 | (6-1) | 10% |
| V-HB(2F,3F)-O4 | (6-1) | 5% |
| 3-H2B(2F,3F)-O2 | (6-4) | 15% |
| 5-H2B(2F,3F)-O2 | (6-4) | 15% |
| 2-HHB(2F,3CL)-O2 | (7-12) | 6% |
| 3-HHB(2F,3CL)-O2 | (7-12) | 6% |
| 4-HHB(2F,3CL)-3 | (7-12) | 6% |
| 3-BB(2F,3F)B-O2 | (8-1) | 6% |
| 5-HBB(3F)B-2 | (14-5) | 9% |

NI = 70.6° C.; Δn = 0.106; Δε = −6.3; η = 43.0 mPa·sec.

Composition Example 10

| | | |
|---|---|---|
| 3-Npd1OB(2F,3F)-O2 | (No. 3) | 4% |
| 3-NpdH1OB(2F,3F)-O2 | (No. 68) | 3% |
| 3-H2B(2F,3F)-O2 | (6-4) | 15% |
| 5-H2B(2F,3F)-O2 | (6-4) | 15% |
| 2-HHB(2F,3F)-1 | (7-1) | 8% |
| 3-BB(3F)XB(3F)-F | (3-93) | 15% |
| 2-HBB(3F)-F | (3-23) | 15% |
| 3-H2BTB-2 | (13-17) | 8% |

-continued

| | | |
|---|---|---|
| 4-H2BTB-2 | (13-17) | 8% |
| 5-HBB(3F)B-2 | (14-5) | 9% |

NI = 78.9° C.; Δn = 0.137; Δε = −1.1.

Composition Example 11

| | | |
|---|---|---|
| 3-Npd1OB(2F,3F)-O2 | (No. 3) | 4% |
| 3-NpdH1OB(2F,3F)-O2 | (No. 68) | 3% |
| 3-H2B(2F,3F)-O2 | (6-4) | 15% |
| 5-H2B(2F,3F)-O2 | (6-4) | 15% |
| 2-HHB(2F,3F)-1 | (7-1) | 8% |
| 2-HBB(3F)-F | (3-23) | 10% |
| 3-HB-C | (13-17) | 20% |
| 3-H2BTB-2 | (13-17) | 8% |
| 4-H2BTB-2 | (13-17) | 8% |
| 5-HBB(3F)B-2 | (14-5) | 9% |

NI = 77.3° C.; Δn = 0.136; Δε = −0.2.

Industrial Applicability

The invention provides a new liquid crystal compound having an excellent compatibility with other liquid crystal materials and a large refractive index anisotropy (Δn).

The invention also provides a liquid crystal composition including the liquid crystal compound as a component, and having desired physical properties and the features described above, those of which were caused by suitably selecting the rings, the substituents, the bonding groups and so forth of the compound. It also provides a liquid crystal display device containing the liquid crystal composition. The liquid crystal display device is widely used for the display of a watch, a calculator, a word processor or the like.

What is claimed is:

1. A compound represented by the formula (1):

$$R^1 \text{-}(A\text{-}Z^1)_m\text{-}[\text{decahydronaphthalene}]\text{-}(Z^2\text{-}B)_n\text{-}Z^3\text{-}(\text{phenylene with }Y^1, Y^2)_p\text{-}R^2 \quad (1)$$

in the formula (1), $R^1$ and $R^2$ are independently alkyl having 1 to 10 carbons, and in the alkyl, arbitrary —CH$_2$— may be replaced by —O—, —S—, —CO— or —SiH$_2$—, and arbitrary —(CH$_2$)$_2$— may be replaced by —CH=CH— or —C≡C—;

the ring A and the ring B are independently 1,4-cyclohexylene or 1,4-phenylene, and in the rings, arbitrary one —CH$_2$— may be replaced by —O—, —S—, —CO— or —SiH$_2$— and arbitrary —(CH$_2$)$_2$— may be replaced by —CH=CH—, in the 1,4-phenylene, arbitrary —CH= may be replaced by —N=, and in the rings, arbitrary hydrogen may be replaced by halogen, —CF$_3$, —CHF$_2$, —CH$_2$F, —OCF$_3$, —OCHF$_2$ or —OCH$_2$F;

$Z^1$ and $Z^2$ are independently a single bond or alkylene having 1 to 4 carbons, and in the alkylene, arbitrary —CH$_2$— may be replaced by —O—, —S—, —CO— or —SiH$_2$—, arbitrary —(CH$_2$)$_2$— may be replaced by —CH=CH— or —C≡C—, and arbitrary hydrogen may be replaced by halogen; and $Z^3$ is —CH$_2$O— or —OCH$_2$—;

$Y^1$ and $Y^2$ are independently halogen, —CF$_3$, —CHF$_2$, —CH$_2$F, —OCF$_3$, —OCHF$_2$ or —OCH$_2$F; and m and n are independently 0, 1 or 2, p is 1 or 2, and the sum of m, n and p is 1, 2 or 3.

2. The compound according to claim 1, wherein in the formula (1), $R^1$ and $R^2$ are independently alkyl having 1 to 10 carbons, alkoxy having 1 to 9 carbons or alkenyl having 2 to 10 carbons;

the ring A and the ring B are independently 1,4-cyclohexylene, 1,4-cyclohexenylene, 1,3-dioxane-2,5-diyl, 1,4-phenylene or pyrimidine-2,5-diyl;

$Z^1$ and $Z^2$ are independently a single bond, —(CH$_2$)$_2$—, —(CH$_2$)$_4$—, —COO—, —OCO—, —CF$_2$O—, —OCF$_2$—, —CH=CH—, —CF=CF—, —CH≡C—, —CH$_2$O— or —OCH$_2$—; and $Y^1$ and $Y^2$ are independently fluorine or chlorine.

3. The compound according to claim 2, wherein in the formula (1), $R^2$ is alkoxy having 1 to 9 carbons.

4. The compound according to claim 2, wherein in the formula (1), $Z^3$ is —CH$_2$O—.

5. The compound according to claim 2, wherein in the formula (1), $R^1$ is alkyl having 1 to 7 carbons, alkoxy having 2 to 6 carbons or alkenyl having 2 to 7 carbons; and $R^2$ is alkoxy having 2 to 6 carbons;

the ring A and the ring B are independently 1,4-cyclohexylene or 1,4-phenylene;

$Z^1$ and $Z^2$ are independently a single bond, —(CH$_2$)$_2$—, —COO—, —OCO—, —CH=CH—, —CH$_2$O— or —OCH$_2$—; and $Y^1$ and $Y^2$ are fluorine.

6. The compound according to claim 2, wherein in the formula (1), $Z^1$ and $Z^2$ are a single bond.

7. A compound represented by the formula (1-1):

$$R^1\text{-}[\text{decahydronaphthalene}]\text{-CH}_2\text{O-}[\text{2,3-difluorophenylene}]\text{-}R^2 \quad (1\text{-}1)$$

in the formula (1-1), $R^1$ is alkyl having 1 to 7 carbons, alkoxy having 2 to 6 carbons or alkenyl having 2 to 7 carbons; and $R^2$ is alkoxy having 2 to 6 carbons.

8. A compound represented by the formula (1-2) or (1-3):

$$R^1\text{-}A\text{-}[\text{decahydronaphthalene}]\text{-CH}_2\text{O-}[\text{2,3-difluorophenylene}]\text{-}R^2 \quad (1\text{-}2)$$

-continued (1-3)
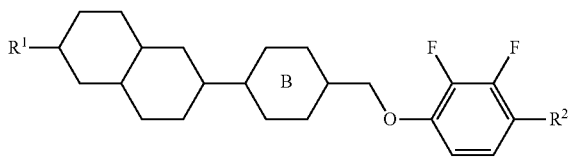

(2)
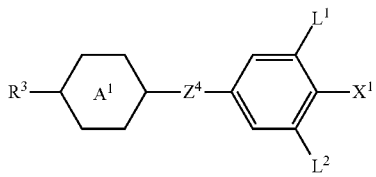

in the formulas (1-2) and (1-3), $R^1$ is alkyl having 1 to 7 carbons, alkoxy having 2 to 6 carbons or alkenyl having 2 to 7 carbons; $R^2$ is alkoxy having 2 to 6 carbons; and the ring A and the ring B are independently 1,4-cyclohexylene or 1,4-phenylene.

9. A compound represented by the formula (1-4):

(3)
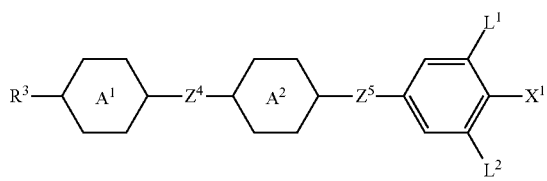

(1-4)
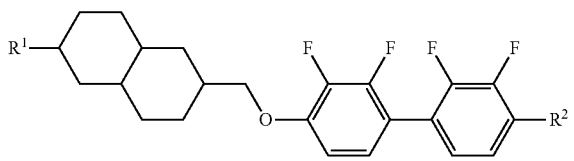

(4)
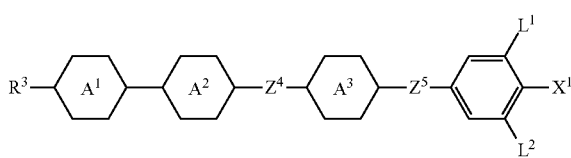

in the formula (1-4), $R^1$ is alkyl having 1 to 7 carbons, alkoxy having 2 to 6 carbons or alkenyl having 2 to 7 carbons; and $R^2$ is alkoxy having 2 to 6 carbons.

10. A compound represented by the formula (1-5) or (1-6):

(1-5)
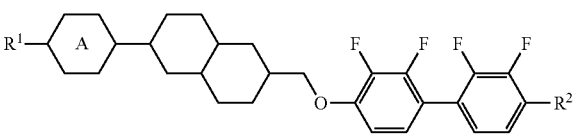

in the formulas (2)-(4), $R^3$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

$X^1$ is independently fluorine, chlorine, —$OCF_3$, —$OCHF_2$, —$CF_3$, —$CHF_2$, —$CH_2F$, —$OCF_2CHF_2$ or —$OCF_2CHFCF_3$;

the ring $A^1$, the ring $A^2$ and the ring $A^3$ are independently 1,4-cyclohexylene, 1,3-dioxane-2,5diyl-pyrimidine-2,5-diyl, 1-tetrahydropyran-2,5-diyl or 1,4-phenylene in which arbitrary hydrogen may be replaced by fluorine;

$Z^4$ and $Z^5$ are independently —$(CH_2)_2$—, —$CH_2)_4$—, —COO—, —$CF_2O$—, —$OCF_2$—, —CH=CH—, —C≡C—, —$CH_2O$— or a single bond; and $L^1$ and $L^2$ are independently hydrogen or fluorine.

13. The liquid crystal composition according to claim 11, including at least one compound selected from the group of compounds represented by the general formula (5) as the second component:

(5)
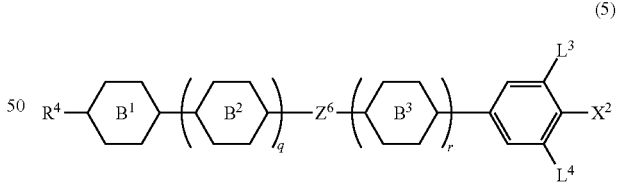

(1-6)
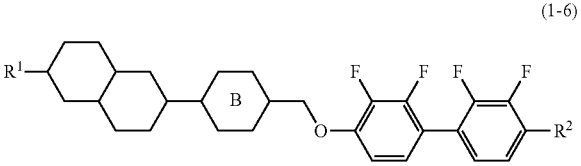

in the formulas (1-5) and (1-6), $R^1$ is alkyl having 1 to 7 carbons, alkoxy having 2 to 6 carbons or alkenyl having 2 to 7 carbons; $R^2$ is alkoxy having 2 to 6 carbons; and the ring A and the ring B are independently 1,4-cyclohexylene or 1,4-phenylene.

11. A liquid crystal composition including a first component and a second component, wherein the first component is at least one selected from compounds according to claim 2.

12. The liquid crystal composition according to claim 11, including at least one compound selected from the group of compounds represented by the general formulas (2), (3) and (4) as the second component:

in the formula (5), $R^4$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

$X^2$ is —C≡N or —C≡C—CN;

the ring $B^1$, the ring $B^2$ and the ring $B^3$ are independently 1,4-cyclohexylene, 1,4-phenylene in which arbitrary hydrogen may be replaced by fluorine, 1,3-dioxane-2,5-diyl, 1-tetrahydropyran-2,5-diyl or pyrimidine-2,5-diyl;

$Z^6$ is —$(CH_2)_2$—, —COO—, —$CF_2O$—, —$OCF_2$—, —C≡C—, —$CH_2O$— or a single bond;

$L^3$ and $L^4$ are independently hydrogen or fluorine; and q is 0, 1 or 2, and r is 0 or 1.

14. The liquid crystal composition according to claim 11, including at least one compound selected from the group of compounds represented by the general formulas (6), (7), (8), (9), (10) and (11) as the second component:

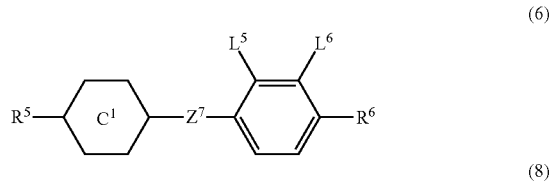
(6)

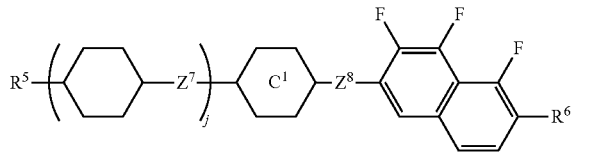
(7)

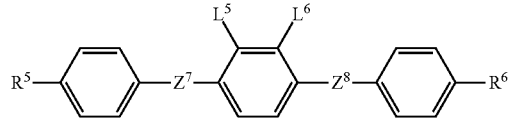
(8)

(9)

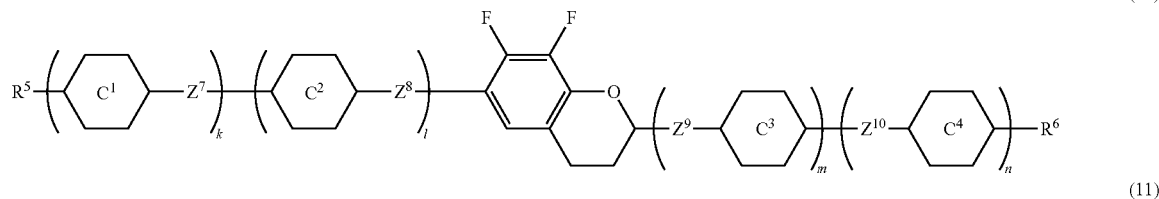
(10)

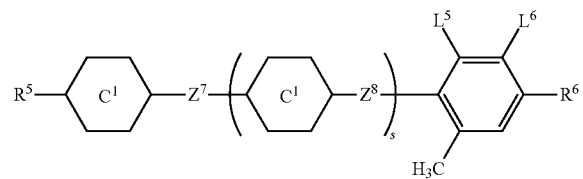
(11)

in the formulas (6)-(11), $R^5$ and $R^6$ are independently alkyl having 1 to 10 carbons or alkenyl having 2 to 10 carbons, and in the alkyl and the alkenyl arbitrary —CH$_2$— may be replaced by —O—, and in the alkenyl arbitrary hydrogen may be replaced by fluorine;

the ring $C^1$, the ring $C^2$, the ring $C^3$ and the ring $C^4$ are independently 1,4-cyclohexylene, 1,4-cyclohexenylene, 1,4-phenylene in which arbitrary hydrogen may be replaced by fluorine, 6-tetrahydropyran-2,5-diyl or decahydro-2,6-naphthalene;

$Z^7$, $Z^8$, $Z^9$ and $Z^{10}$ are independently —(CH$_2$)$_2$—, —COO—, —CH$_2$O—, —OCF$_2$—, —OCF$_2$(CH$_2$)$_2$— or a single bond;

$L^5$ and $L^6$ are independently fluorine or chlorine; and j, k, l, m, n and s are independently 0 or 1, and the sum of k, l, m and n is 1 or 2.

15. The liquid crystal composition according to claim 11, including at least one compound selected from the group of compounds represented by the general formulas (12), (13) and (14) as the second component:

(12)

-continued

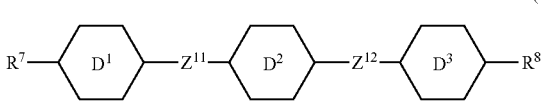
(13)

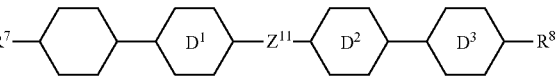
(14)

in the formulas (12)-(14), $R^7$ and $R^8$ are independently alkyl having 1 to 10 carbons or alkenyl having 2 to 10 carbons, and in the alkenyl, arbitrary hydrogen may be replaced by fluorine and arbitrary —CH$_2$— may be replaced by —O—;

the ring D1, the ring $D^2$ and the ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and 11 and $Z^{12}$ are independently —C≡C—, —COO—, —(CH$_2$)$_2$—, —CH=CH— or a single bond.

16. The liquid crystal composition according to claim 12, further including at least one compound selected from the group of compounds represented by the general formula (5):

(5)

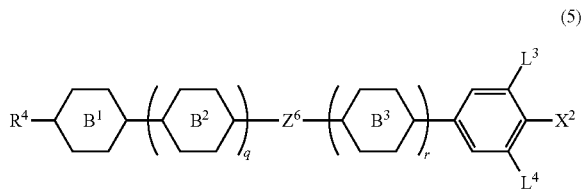

in the formula (5), $R^4$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

$X^2$ is —C≡N or —C≡C—CN;

the ring $B^1$, the ring $B^2$ and the ring $B^3$ are independently 1,4-cyclohexylene, 1,4-phenylene in which arbitrary hydrogen may be replaced by fluorine, 1,3-dioxane-2,5-diyl, 1-tetrahydropyran-2,5-diyl or pyrimidine-2,5-diyl;

$Z^6$ is —$(CH_2)_2$—, —COO—, —$CF_2O$—, —$OCF_2$—, —C≡C—, —$CH_2$— or a single bond;

$L^3$ and $L^4$ are independently hydrogen or fluorine; and q is 0, 1 or 2, and r is 0 or 1.

17. The liquid crystal composition according to claim 12, further including at least one compound selected from the group of compounds represented by the general formulas (12), (13) and (14):

(12)

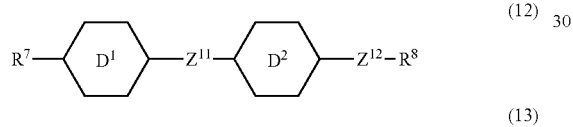

(13)

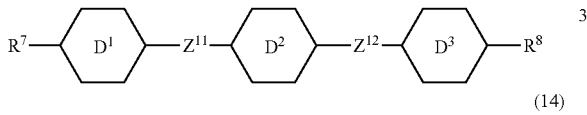

(14)

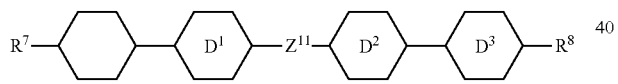

in the formulas (12)-(14), $R^7$ and $R^8$ are independently alkyl having 1 to 10 carbons or alkenyl having 2 to 10 carbons, and in the alkenyl, arbitrary hydrogen may be replaced by fluorine and arbitrary —$CH_2$— may be replaced by —O—;

the ring $D^1$, the ring $D^2$ and the ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{11}$ and $Z^{12}$ are independently —C≡C—, —COO—, —$(CH_2)_2$—, —CH— or a single bond.

18. The liquid crystal composition according to claim 13, further including at least one compound selected from the group of compounds represented by the general formulas (12), (13) and (14):

(12)

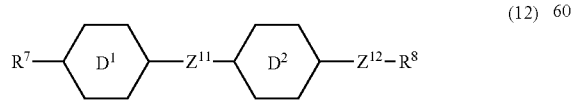

(13)

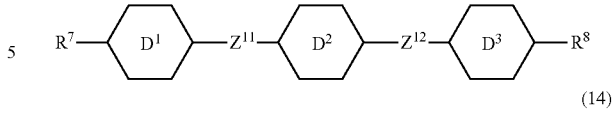

(14)

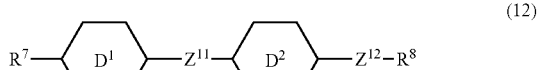

in the formulas (12)-(14), $R^7$ and $R^8$ are independently alkyl having 1 to 10 carbons or alkenyl having 2 to 10 carbons, and in the alkenyl, arbitrary hydrogen may be replaced by fluorine and arbitrary —$CH_2$— may be replaced by —O—;

the ring $D^1$, the ring $D^2$ and the ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{11}$ and $Z^{12}$ are independently —C≡C—, —COO—, —$(CH_2)_2$—, —CH=CH— or a single bond.

19. The liquid crystal composition according to claim 14, further including at least one compound selected from the group of compounds represented by the general formulas (12), (13) and (14):

(12)

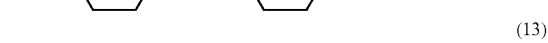

(13)

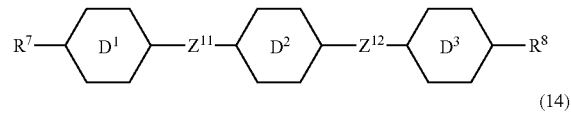

(14)

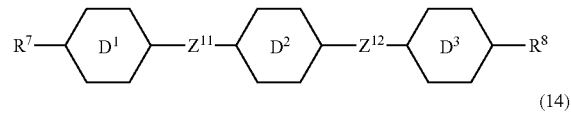

in the formulas (12)-(14), $R^7$ and $R^8$ are independently alkyl having 1 to 10 carbons or alkenyl having 2 to 10 carbons, and in the alkenyl, arbitrary hydrogen may be replaced by fluorine and arbitrary —$CH_2$— may be replaced by —O—;

the ring $D^1$, the ring $D^2$ and the ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{11}$ and $Z^{12}$ are independently —C≡C—, —COO—, —$(CH_2)_2$—, —CH=CH— or a single bond.

20. The liquid crystal composition according to claim 11, further including at least one optically active compound and/or at least one polymerizable compound.

21. The liquid crystal composition according to claim 11, further including at least one antioxidant and/or at least one ultraviolet light absorber.

22. A liquid crystal display device containing the liquid crystal composition according to claim 11.

* * * * *